US012670638B2

(12) United States Patent
Ruud et al.

(10) Patent No.: US 12,670,638 B2
(45) Date of Patent: Jun. 30, 2026

(54) GRAPHICS PROCESSORS AND GRAPHICS PROCESSING METHOD FOR VISIBILITY TESTING GROUPS OF FRAGMENTS AT A PATCH LEVEL

(71) Applicant: Arm Limited, Cambridge (GB)

(72) Inventors: Ole Magnus Ruud, Oslo (NO); Sandeep Kakarlapudi, Trondheim (NO); Tord Kvestad Øygard, Kirkenes (NO); Per Kristian Kjøll, Trondheim (NO); Toni Viki Brkic, Lund (SE)

(73) Assignee: ARM Limited, Cambridge (GB)

( * ) Notice: Subject to any disclaimer, the term of this patent is extended or adjusted under 35 U.S.C. 154(b) by 315 days.

(21) Appl. No.: 18/509,687

(22) Filed: Nov. 15, 2023

(65) Prior Publication Data

US 2024/0169619 A1 May 23, 2024

Related U.S. Application Data

(63) Continuation-in-part of application No. 17/989,671, filed on Nov. 17, 2022, now Pat. No. 12,322,023, and (Continued)

(30) Foreign Application Priority Data

Nov. 17, 2022 (GB) ...................................... 2217219
Nov. 17, 2022 (GB) ...................................... 2217223
(Continued)

(51) Int. Cl.
*G06T 1/20* (2006.01)
*G06T 11/40* (2006.01)

(52) U.S. Cl.
CPC ................ *G06T 11/40* (2013.01); *G06T 1/20* (2013.01)

(58) Field of Classification Search
None
See application file for complete search history.

(56) References Cited

U.S. PATENT DOCUMENTS 6,092,097 A    7/2000  Suzuoka
6,246,415 B1   6/2001  Grossman et al.
(Continued)

FOREIGN PATENT DOCUMENTS

WO    2018052592 A1    3/2018

OTHER PUBLICATIONS

Non-Final Office Action dated Aug. 2, 2024, U.S. Appl. No. 17/989,548, 37 pages.
(Continued)

*Primary Examiner* — Phong X Nguyen
(74) *Attorney, Agent, or Firm* — Pearl Cohen Zedek Latzer Baratz LLP

(57) ABSTRACT

When performing tile-based rendering a first, pre-pass operation in which primitives in a sequence of primitives for a tile are processed to determine visibility information for the sequence, the visibility information being usable to determine whether fragments for a primitive in the sequence should subsequently be processed further, is performed. Thereafter a second, main pass operation is performed in which the further processing of fragments for primitives that were processed during the first, pre-pass operation is controlled based on the determined visibility information for the sequence of primitives, such that for fragments for which the visibility information indicates that the fragments should not be processed further for the render output some or all of the processing during the second, main pass is omitted. The visibility information indicates which primitives should be rendered for which sampling positions of the render output in a hierarchical manner.

20 Claims, 76 Drawing Sheets

Related U.S. Application Data a continuation-in-part of application No. 17/989,548, filed on Nov. 17, 2022, now Pat. No. 12,266,052.

(30) Foreign Application Priority Data

| | | | |
|---|---|---|---|
| Nov. 17, 2022 | (GB) | .................................. | 2217236 |
| Nov. 17, 2022 | (GB) | .................................. | 2217238 |
| Nov. 17, 2022 | (GB) | .................................. | 2217239 |
| Nov. 17, 2022 | (GB) | .................................. | 2217243 |
| Nov. 17, 2022 | (GB) | .................................. | 2217245 |
| Nov. 17, 2022 | (GB) | .................................. | 2217246 |
| Nov. 17, 2022 | (GB) | .................................. | 2217247 |
| Nov. 17, 2022 | (GB) | .................................. | 2217253 |

(56) References Cited

U.S. PATENT DOCUMENTS

| | | | |
|---|---|---|---|
| 6,480,205 | B1 | 11/2002 | Greene et al. |
| 6,535,209 | B1 | 3/2003 | Abdalla et al. |
| 7,023,437 | B1 | 4/2006 | Voorhies et al. |
| 7,375,727 | B1 | 5/2008 | Greene et al. |
| 8,325,184 | B2 | 12/2012 | Jiao et al. |
| 8,698,820 | B2 | 4/2014 | Cox et al. |
| 9,626,795 | B2 | 4/2017 | Sathe |
| 9,767,595 | B2 | 9/2017 | Nystad et al. |
| 10,074,210 | B1 | 9/2018 | Spencer et al. |
| 10,096,147 | B2 | 10/2018 | Goel et al. |
| 11,030,783 | B1 | 6/2021 | Engh-Halstvedt et al. |
| 12,154,224 | B2 | 11/2024 | Achrenius et al. |
| 2002/0196252 | A1* | 12/2002 | Liao ......................... G06T 15/40 345/422 |
| 2005/0057564 | A1* | 3/2005 | Liao ......................... G06T 11/40 345/422 |
| 2007/0257905 | A1 | 11/2007 | French et al. |
| 2010/0007662 | A1* | 1/2010 | Cox ......................... G06T 15/40 345/420 |
| 2011/0298813 | A1* | 12/2011 | Barringer .............. G06T 15/005 345/506 |
| 2014/0071150 | A1 | 3/2014 | Fishwick et al. |
| 2014/0168220 | A1 | 6/2014 | Nystad |
| 2014/0218390 | A1 | 8/2014 | Rouet |
| 2014/0267256 | A1 | 9/2014 | Heggelund et al. |
| 2014/0267259 | A1 | 9/2014 | Frascati |
| 2014/0333620 | A1* | 11/2014 | Park ...................... G06T 15/005 345/422 |
| 2014/0354661 | A1 | 12/2014 | Balci et al. |
| 2014/0354670 | A1* | 12/2014 | Heggelund ............. G06T 11/40 345/589 |
| 2015/0002508 | A1 | 1/2015 | Tatarinov |
| 2015/0058859 | A1 | 2/2015 | Janssen |
| 2015/0062154 | A1 | 3/2015 | Ellis et al. |
| 2015/0170407 | A1* | 6/2015 | Redshaw .............. G06T 15/405 345/422 |
| 2016/0005140 | A1 | 1/2016 | Engh-Halstvedt et al. |
| 2016/0035128 | A1 | 2/2016 | Zhao |
| 2016/0035129 | A1* | 2/2016 | Bolz ......................... G06T 1/20 345/420 |
| 2016/0086299 | A1 | 3/2016 | Sharma |
| 2016/0098856 | A1* | 4/2016 | Broadhurst ........... G06T 15/005 345/422 |
| 2016/0125649 | A1* | 5/2016 | Jeong .................... G06T 15/005 345/422 |
| 2016/0217608 | A1 | 7/2016 | Howson |
| 2016/0260249 | A1* | 9/2016 | Persson ..................... G06T 1/20 |
| 2016/0322031 | A1 | 11/2016 | Liao et al. |
| 2017/0024927 | A1* | 1/2017 | Isomäki .................. G06T 17/20 |
| 2017/0148203 | A1* | 5/2017 | Hakura .................. G06T 17/20 |
| 2017/0161940 | A1 | 6/2017 | Liktor et al. |
| 2017/0178386 | A1 | 6/2017 | Redshaw et al. |
| 2017/0263039 | A1 | 9/2017 | Goel |
| 2017/0287101 | A1* | 10/2017 | Flordal .................. G06F 3/064 |
| 2018/0025463 | A1 | 1/2018 | Kazakov et al. |
| 2018/0082467 | A1 | 3/2018 | Andersson et al. |
| 2018/0082469 | A1 | 3/2018 | Andersson |
| 2018/0189925 | A1* | 7/2018 | Lee ......................... G09G 5/363 |
| 2018/0197323 | A1 | 7/2018 | Howson et al. |
| 2018/0268604 | A1 | 9/2018 | Story |
| 2018/0349315 | A1 | 12/2018 | Heggelund et al. |
| 2019/0012829 | A1 | 1/2019 | Engh-Halstvedt et al. |
| 2019/0088009 | A1 | 3/2019 | Forey et al. |
| 2019/0206121 | A1 | 7/2019 | Jin |
| 2019/0311535 | A1* | 10/2019 | Lacey .................. G06T 15/005 |
| 2019/0362533 | A1 | 11/2019 | Fuller |
| 2020/0098165 | A1 | 3/2020 | Gruber |
| 2020/0134894 | A1 | 4/2020 | Uhrenholt |
| 2020/0193703 | A1 | 6/2020 | Favela |
| 2020/0312020 | A1 | 10/2020 | Zhong et al. |
| 2020/0402295 | A1 | 12/2020 | Lentz |
| 2020/0402297 | A1* | 12/2020 | Brigg ...................... G06T 15/20 |
| 2021/0065437 | A1 | 3/2021 | Brkic et al. |
| 2021/0110510 | A1 | 4/2021 | Brigg et al. |
| 2021/0192827 | A1* | 6/2021 | Saleh .................... G06T 15/005 |
| 2021/0248805 | A1* | 8/2021 | Jesus ...................... G06T 11/40 |
| 2021/0407191 | A1* | 12/2021 | Yang ...................... G06F 8/443 |
| 2022/0092801 | A1* | 3/2022 | Achrenius ............ G06T 15/005 |
| 2022/0207827 | A1 | 6/2022 | Acharya et al. |
| 2022/0237730 | A1 | 7/2022 | Brkic |
| 2022/0366524 | A1 | 11/2022 | Uhrenholt |
| 2023/0334735 | A1* | 10/2023 | Goswami .................. G06T 7/90 |
| 2024/0087078 | A1 | 3/2024 | Ashkar et al. |
| 2024/0104684 | A1 | 3/2024 | Bhiravabhatla |
| 2024/0169639 | A1 | 5/2024 | Oygard et al. |

OTHER PUBLICATIONS

Non-Final Office Action dated Aug. 14, 2024, U.S. Appl. No. 17/989,671, 37 pages.

Extended European Search Report dated Jul. 5, 2024, European Patent Application No. 23210210.3, pp. 1-10.

Notice of Allowance dated Nov. 22, 2024, U.S. Appl. No. 17/989,548, 25 pages.

Response to Non-Final Office Action dated Sep. 19, 2024, U.S. Appl. No. 17/989,548, 14 pages.

Response to Non-Final Office Action dated Nov. 14, 2024, U.S. Appl. No. 17/989,671, 16 pages.

Notice of Allowance dated Jul. 15, 2025, U.S. Appl. No. 18/509,679, filed Nov. 15, 2023.

Notice of Allowance dated Jan. 23, 2025, U.S. Appl. No. 17/989,671, 30 pages.

Combined Search and Examination Report under Sections 17 and 18(3) dated Jun. 3, 2024, GB Patent Application No. GB 2317492.3, pp. 1-7.

Combined Search and Examination Report under Sections 17 and 18(3) dated May 24, 2023, GB Patent Application No. GB 2217223. 3, pp. 1-6.

Combined Search and Examination Report under Sections 17 and 18(3) dated May 30, 2023, GB Patent Application No. GB 2217253. 0, pp. 1-6.

Search Report under Section 17 dated May 19, 2023, GB Patent Application No. GB 2217247.2, pp. 1-4.

Combined Search and Examination Report under Sections 17 and 18(3) dated May 19, 2023, GB Patent Application No. GB 2217238. 1, pp. 1-7.

Search Report under Section 17 dated Jun. 19, 2023, GB Patent Application No. GB 2217246.4, pp. 1-4.

Øygard, T.K., et al., "Graphics Processors", U.S. Appl. No. 17/989,548, filed Nov. 17, 2022.

Øygard, T.K., et al., "Graphics Processors", U.S. Appl. No. 17/989,671, filed Nov. 17, 2022.

Øygard, T.K., et al., "Graphics Processors", U.S. Appl. No. 18/509,432, filed Nov. 15, 2023.

Øygard, T.K., et al., "Graphics Processors", U.S. Appl. No. 18/509,436, filed Nov. 15, 2023.

Øygard, T.K., et al., "Graphics Processors", U.S. Appl. No. 18/509,439, filed Nov. 15, 2023.

Kjøll, P.K., et al., "Graphics Processors", U.S. Appl. No. 18/509,679, filed Nov. 15, 2023.

(56)                  References Cited

OTHER PUBLICATIONS

Ruud, O.M., et al., "Graphics Processors", U.S. Appl. No. 18/509,441, filed Nov. 15, 2023.
Ruud, O.M., et al., "Graphics Processors", U.S. Appl. No. 18/509,448, filed Nov. 15, 2023.
Ruud, O.M., et al., "Graphics Processors", U.S. Appl. No. 18/509,676, filed Nov. 15, 2023.
Øygard, T.K., et al., "Graphics Processors", U.S. Appl. No. 18/509,426, filed Nov. 15, 2023.
PCT International Search Report and Written Opinion, dated Feb. 19, 2024, PCT International Application No. PCT/GB2023/052995, pp. 1-17.
Examination Report dated Apr. 1, 2025, GB Patent Application No. GB2217238.1, 4 pages.
Non-final Office Action dated Jul. 21, 2025, U.S. Appl. No. 18/509,432, filed Nov. 15, 2023.
U.S. Appl. No. 19/130,178, filed May 15, 2025.
Non-final Office Action dated Aug. 8, 2025, U.S. Appl. No. 18/509,426, filed Nov. 15, 2023.
Notice of Allowance dated Aug. 25, 2025, U.S. Appl. No. 18/509,679, filed Nov. 15, 2023.
Non-final Office Action dated Aug. 26, 2025, U.S. Appl. No. 18/509,436, filed Nov. 15, 2023.
Response to Office Action dated Sep. 9, 2025, U.S. Appl. No. 18/509,432, filed Nov. 15, 2023.
Non-final Office Action dated Sep. 24, 2025, U.S. Appl. No. 18/509,439, filed Nov. 15, 2023.
Non-final Office Action dated Oct. 9, 2025, U.S. Appl. No. 18/509,441, filed Nov. 15, 2023.
Response to Office Action dated Nov. 7, 2025, U.S. Appl. No. 18/509,426, filed Nov. 15, 2023.
Notice of Allowance dated Nov. 24, 2025, U.S. Appl. No. 18/509,432, filed Nov. 15, 2023.
Response to Office Action dated Nov. 25, 2025, U.S. Appl. No. 18/509,436, filed Nov. 15, 2023.
Response to Office Action dated Dec. 23, 2025, U.S. Appl. No. 18/509,439, filed Nov. 15, 2023.
Notice of Allowance dated Jan. 6, 2026, U.S. Appl. No. 18/509,679, filed Nov. 15, 2023.
Non-final Office Action dated Jan. 8, 2026, U.S. Appl. No. 18/509,448, filed Nov. 15, 2023.
Response to Office Action dated Jan. 8, 2026, U.S. Appl. No. 18/509,441, filed Nov. 15, 2023.
Non-final Office Action dated Jan. 16, 2026, U.S. Appl. No. 18/509,676, filed Nov. 15, 2023.
Notice of Allowance dated Jan. 21, 2026, U.S. Appl. No. 18/509,426, filed Nov. 15, 2023.
Final Office Action dated Feb. 13, 2026, U.S. Appl. No. 18/509,439, filed Nov. 15, 2023.
Notice of Allowance dated Feb. 27, 2026, U.S. Appl. No. 18/509,436, filed Nov. 15, 2023.
Supplemental Response to Office Action dated Mar. 3, 2026, U.S. Appl. No. 18/509,676, filed Nov. 15, 2023.
Notice of Allowance dated Mar. 18, 2026, U.S. Appl. No. 18/509,441, filed Nov. 15, 2023.
Notice of Allowance dated Mar. 27, 2026, U.S. Appl. No. 18/509,676, filed Nov. 15, 2023.
Response to Office Action dated May 8, 2026, U.S. Appl. No. 18/509,448, filed Nov. 15, 2023.
Response to Office Action dated May 8, 2026, U.S. Appl. No. 18/509,439, filed Nov. 15, 2023.

* cited by examiner

80    Fragment shader endpoint

81    Polygon list reader

82    Primitive classification unit

83    Prepass decision unit

84    Vertex shading

85    Rasterizer

86    Early depth/stencil test/update

87    Shader execution

88    Late depth/stencil test/update

89    Shader execution

90    Blending

80 Fragment shader endpoint

81 Polygon list reader

82 Primitive classification unit

83 Prepass decision unit

84 Vertex shading

85 Rasterizer

156 Early depth equals test with disambiguation

206 Early stencil equals test with disambiguation

87 Shader execution

90 Blending

80 — Fragment shader endpoint

81 — Polygon list reader

82 — Primitive classification unit

83 — Prepass decision unit

84 — Vertex shading

85 — Rasterizer

276 — HSR ID test

87 — Shader execution

90 — Blending

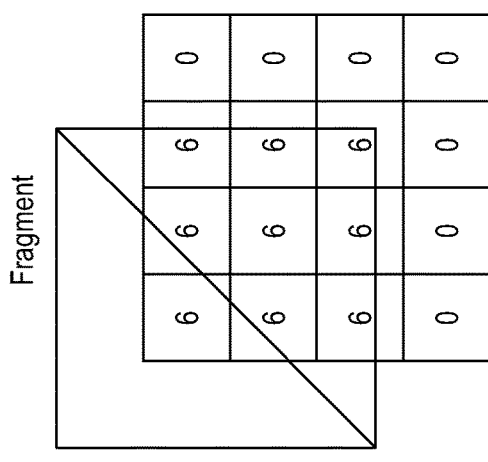
Fragment
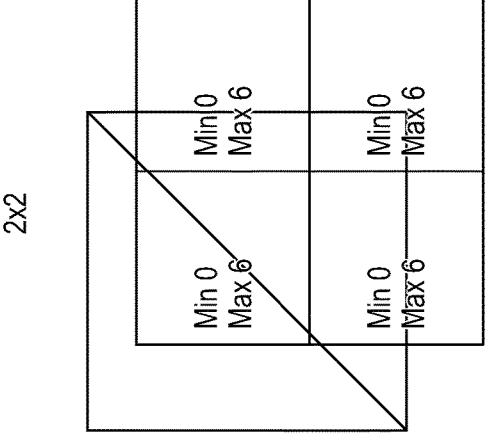
2x2
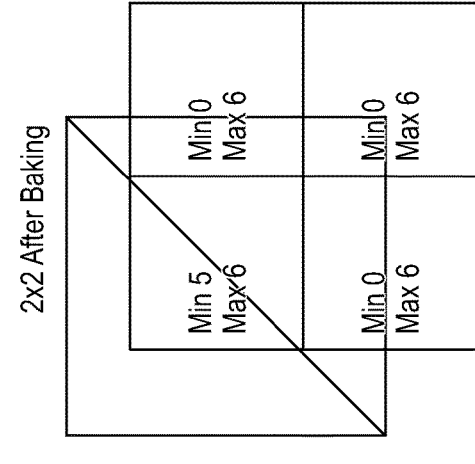
2x2 After Baking
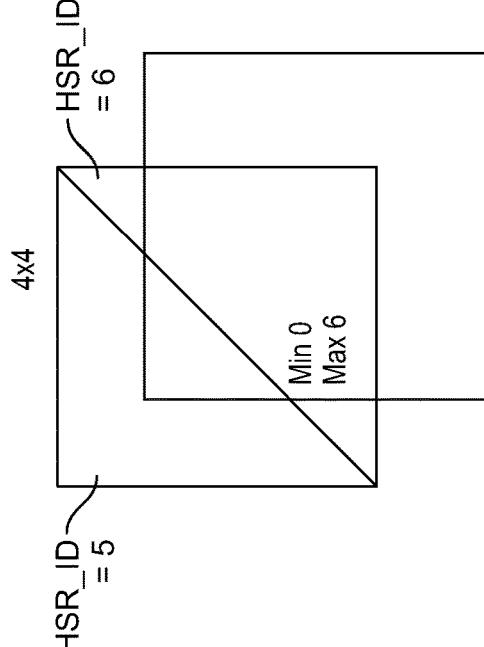
4x4
FIG. 40

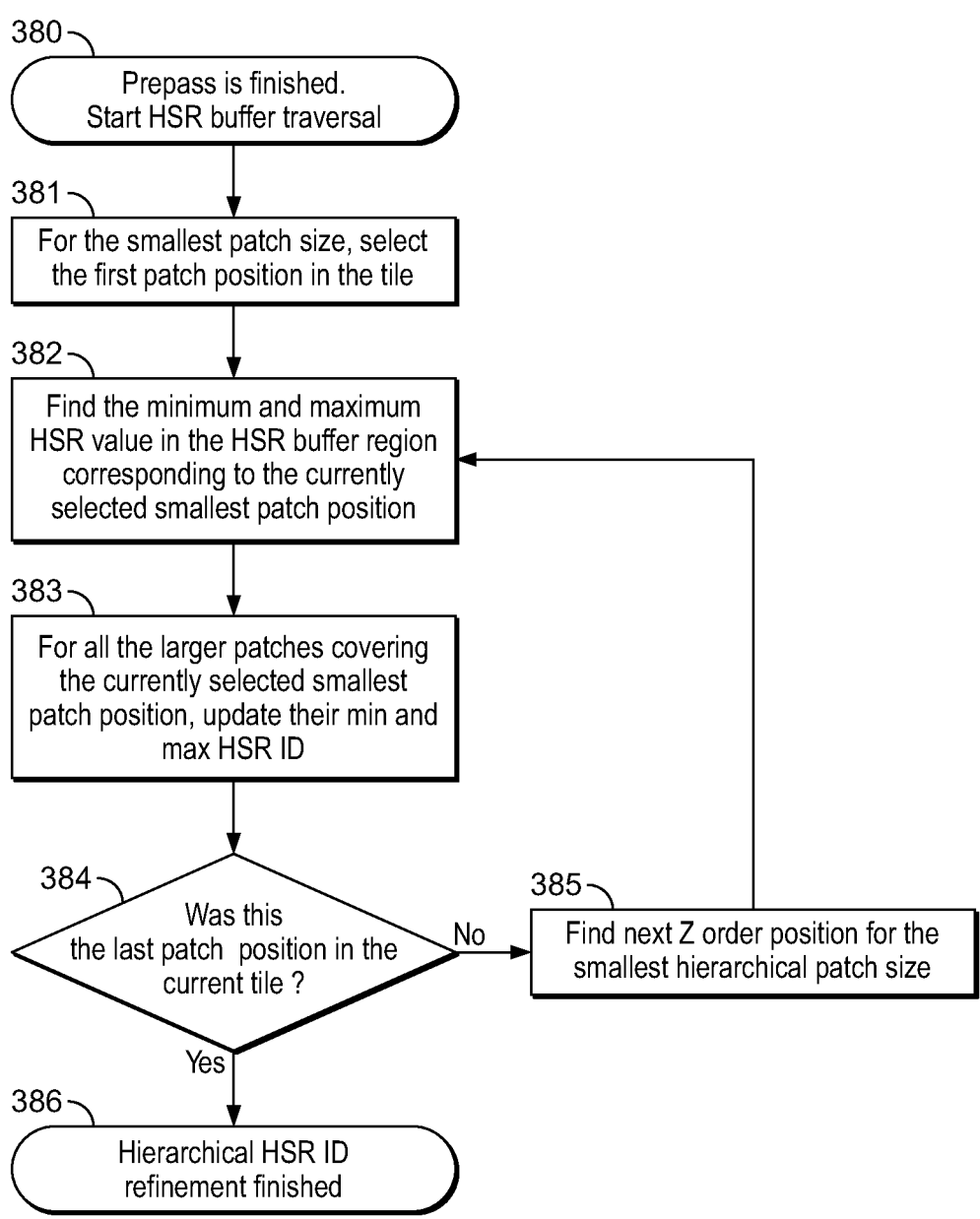

380 — Prepass is finished.
Start HSR buffer traversal

381 — For the smallest patch size, select the first patch position in the tile

382 — Find the minimum and maximum HSR value in the HSR buffer region corresponding to the currently selected smallest patch position 383 — For all the larger patches covering the currently selected smallest patch position, update their min and max HSR ID 384 — Was this the last patch position in the current tile ?

No

385 — Find next Z order position for the smallest hierarchical patch size

Yes

386 — Hierarchical HSR ID refinement finished

FIG. 41

80 ─⌐
Fragment shader endpoint

81 ─⌐
Polygon list reader

82 ─⌐
Primitive classification unit

83 ─⌐
Prepass decision unit

84 ─⌐
Vertex shading

85 ─⌐
Rasterizer

86 ─⌐
Early depth/stencil test/update

241 ─⌐
Early HSR ID update

227 ─⌐
Shader execution (optional)

228 ─⌐
Late depth/stencil test/update (optional)

242 ─⌐
Late HSR ID update (optional)

540 ─⌐
Build primitive culling data structure

80 — Fragment shader endpoint

81 — Polygon list reader

82 — Primitive classification unit

83 — Prepass decision unit

84 — Vertex shading

85 — Rasterizer

86 — Early depth/stencil test/update

590 — Early HSR ID update with culling structure update

227 — Shader execution (optional)

228 — Late depth/stencil test/update (optional)

592 — Late HSR ID update with culling structure update (optional)

720 ⌐

Determine during fallback operation that there is a further compatible primitive such that processing could switch back to pre-pass operation

721 ⌐

Check if one or more further conditions are met to switch back to pre-pass operation

722 ⌐

If one or more further conditions are met, revert to pre-pass operation; otherwise, continue in fallback operation

GRAPHICS PROCESSORS AND GRAPHICS PROCESSING METHOD FOR VISIBILITY TESTING GROUPS OF FRAGMENTS AT A PATCH LEVEL

BACKGROUND

The technology described herein relates to the processing of computer graphics, and in particular to hidden surface removal in graphics processing.

Many data processing systems include a graphics processor (graphics processing unit (GPU)) as a processing resource that is operable to perform processing tasks for, e.g., applications that are executing on a, e.g., main (e.g. host) processor (CPU) of the data processing system. A graphics processor may thus be caused to perform processing tasks for applications by providing to the graphics processor a stream of commands (instructions) to be executed by the graphics processor. For example, a driver for the graphics processor may prepare a command stream containing commands (instructions) to be performed by the graphics processor, and provide the command stream to the graphics processor, with the graphics processor then performing the commands (the operations indicated by the commands) in the command stream. The graphics processor may further comprise a suitable command stream frontend that acts to parse the driver-generated commands and schedule processing tasks for the various functional units of the graphics processor accordingly.

A graphics processor may thus be provided as a hardware accelerator that is operable to perform graphics processing on demand from a main (e.g. host) processor (CPU). The graphics processor is generally configured for performing graphics processing in a more optimised manner (e.g. compared to using the main (e.g. host) processor (CPU) to perform the processing using general-purpose computations).

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, etc. (or groups thereof).

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing.

For a given output, e.g. frame to be displayed, to be generated by the graphics processing, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processor, in order to generate the desired graphics processing output (render target), such as a frame for display. This basically involves determining which sampling positions of an array of sampling positions associated with the render output area to be processed are covered by a primitive, and then determining the appearance each sampling position should have (e.g. in terms of its colour, etc.) to represent the primitive at that sampling position. These processes are commonly referred to as rasterising and rendering, respectively. (The term "rasterisation" is sometimes used to mean both primitive conversion to sample positions and rendering. However, herein "rasterisation" will be used to refer to converting primitive data to sampling position addresses only.)

These processes are typically carried out by testing sets of one, or of more than one, sampling position, and then generating for each set of sampling positions found to include a sampling position that is inside (covered by) the primitive in question (being tested), a discrete graphical entity usually referred to as a "fragment" on which the graphics processing operations (such as rendering) are carried out. Covered sampling positions are thus, in effect, processed as fragments that will be used to render the primitive at the sampling positions in question. The "fragments" are the graphical entities that pass through the rendering process (the rendering pipeline). Each fragment that is generated and processed may, e.g., represent a single sampling position or a set of plural sampling positions, depending upon how the graphics processing system is configured.

A "fragment" is therefore effectively (has associated with it) a set of primitive data as interpolated to a given output space sampling position or points of a primitive. It may also include per-primitive and other state data that is required to shade the primitive at the sampling position (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling positions and the pixels of a display, but more typically there may not be a one-to-one correspondence between sampling positions and display pixels, as downsampling may be carried out on the rendered sample values to generate the output pixel values for displaying the final image. Similarly, where multiple sampling position values, e.g. from different overlapping primitives, at a given location affect each other (e.g. due to transparency and/or blending), the final pixel output will also depend upon plural overlapping sample values at that pixel location.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "rendering tiles". In such arrangements, the render output is typically divided (by area) into regularly-sized and shaped rendering tiles (they are usually rectangles, e.g. squares). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (referred to herein as "primitive" lists but also commonly referred to as "polygon" or "tile" lists).

Once the primitive lists have been prepared for all the render output regions, each rendering tile is processed, by rasterising and rendering the primitives listed for the region of the render output corresponding to the rendering tile.

The process of preparing primitive lists for regions of the render output thus basically involves determining the primitives that should be processed for a given render output region. This process is usually carried out by determining (at a desired level of accuracy) the primitives that intersect (i.e. that will appear (at least in part) within) the render output region in question, and then preparing a list of those primitives for future use by the graphics processing system. Thus, for each primitive to be processed, the graphics processor reads in the associated vertex data, converts the vertex positions at least to screen space (vertex shading), and then determines using the shaded vertex positions for each primitive which region(s) of the render output the primitive at least partially covers (and so should therefore be rendered for).

It should be noted here that where a primitive falls into more than one render output region, as will frequently be the case, it is included in a primitive list for each region that it falls within. A render output region for which a primitive list is prepared could be a single rendering tile, or a group of plural rendering tiles, etc.

In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning").

The primitive lists prepared in this way can then be written out, e.g., to memory, and once a first processing pass including the tiling operation is complete, such that all of the primitive lists (for all of the primitives for all of render output regions) have been prepared, the primitive lists can then be used by the graphics processor, e.g. in a second (deferred) processing pass, to perform the actual rendering of the rendering tiles, with the information stored in the primitive lists being used accordingly to identify the primitives to be rendered for each rendering tile when generating the desired render output, e.g. to display the frame.

Thus, the command stream for causing a graphics processor to perform tile-based rendering may comprise a first set of commands to cause the graphics processor to prepare the desired primitives lists and a second set of commands to subsequently cause the graphics processor to render the rendering tiles. These rendering commands may be issued in respect of any desired regions of the render output. For example, in some arrangements, a command may be prepared by the driver for the graphics processor relating to a processing job to render a certain region comprising a group of plural rendering tiles. The command stream frontend of the graphics processor may then break the processing job into respective processing tasks for rendering the individual tiles which are then processed accordingly to perform the rendering. Various arrangements are possible in this regard.

One drawback of current graphics processing systems is that because primitives are processed sequentially, and typically not in perfect front-to-back order, a given sampling position (and hence fragment and pixel) may be shaded multiple times as an output is processed, e.g. for display. This occurs when a first received and rendered primitive is subsequently covered by a later primitive, such that the rendered first primitive is not in fact seen at the pixel(s) (and sampling position(s)) in question. Primitives can be over-written many times in this manner and this typically leads to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases (as the cost of shading a given fragment using programmable fragment shading is relatively greater). In order to improve graphics processing performance (e.g. in terms of speed and/or bandwidth), and energy efficiency, it is therefore desirable to try to avoid rendering any such invisible fragments.

The problem of "overdraw" could be significantly reduced by sending primitives for rendering in front-to-back order. However, other graphics processing requirements, such as the need for coherent access to resources such as textures, and the need to minimise the number of API calls per frame, generally mandate other ordering requirements for primitives. Also, a full front-to-back sort of primitives prior to rendering may not be practical while still maintaining a sufficient throughput of primitives to the graphics processing unit. These and other factors mean that front-to-back ordering of primitives for a given render output, e.g., frame, is generally not possible or desirable in practice.

A number of hidden surface removal techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.). Hidden surface removal thus concerns the process of identifying which of the geometry within a scene will actually be visible in the final render output to try to avoid unnecessarily processing fragments that have no visible effect.

For example, some form of hidden surface removal may be performed before a primitive and/or fragment is sent for rendering, to see if the primitive or fragment etc. will be obscured by a primitive that has already been rendered (in which case the new fragment and/or primitive need not be rendered). Such hidden surface removal may comprise, for example, early occlusion culling, such as early-Z (depth) and/or stencil, testing processes, and so on.

These arrangements typically try to identify, e.g., fragments that will be occluded by already processed primitives (and therefore that do not need processing) before the later fragments are issued to the rendering pipeline. In these arrangements, the depth value, e.g., of a new fragment to be processed is compared to the current depth value for that fragment position in the depth buffer to see if the new fragment is occluded or not. This can help to avoid sending fragments that are occluded by already processed primitives through the rendering pipeline.

However, these "early" (prior to rendering) hidden surface removal techniques only take account of fragments that have completed their processing (that have already been rendered) at the time the new, e.g., primitive or fragment (the primitive or fragment being "early" tested) is being tested. This is because the relevant test data (such as the Z-buffer) only contains data from fragments that have already been processed.

Another possibility is to attempt to kill threads corresponding to fragments that are found to be obscured by later fragments in-flight, e.g. using a 'forward pixel kill' operation as described in United States Patent Application Publication No. 2019/0088009 (Arm Limited). This approach generally works well in most cases.

However, such arrangements typically use a fixed-size buffer to store 'cullable' fragments which means that if the buffer is full, culling efficiency may be lost. Further, there is only a limited window in which fragments can be culled. This approach may therefore be less suitable for larger, more complex scenes, as there may be fewer opportunities for fragments to be culled.

The Applicants believe therefore that there remains scope for improved techniques for hidden surface removal in graphics processing systems.

BRIEF DESCRIPTION OF DRAWINGS

A number of embodiments of the technology described herein will now be described by way of example only and with reference to the accompanying drawings, in which:

FIG. 40 shows schematically a finalisation ("baking") process for refining the hierarchical HSR ID buffer at the end of the first, pre-pass operation;

FIG. 41 shows further details of the finalisation ("baking") process;

US 12,670,638 B2

Figure 75:
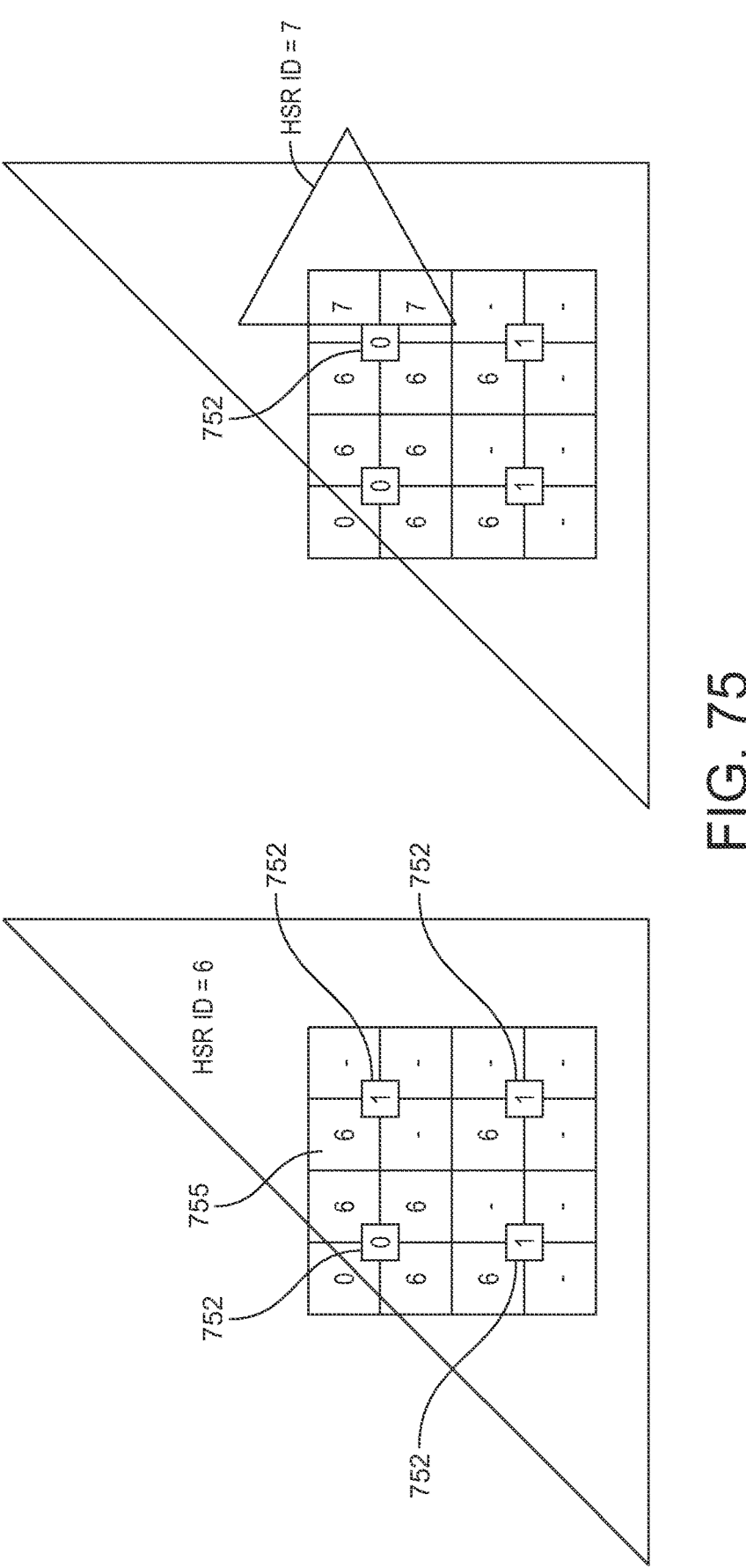
FIG. 75 shows another example using a HSR ID buffer in which respective 'equivalence bits' can be stored for respec-
Figure 76:
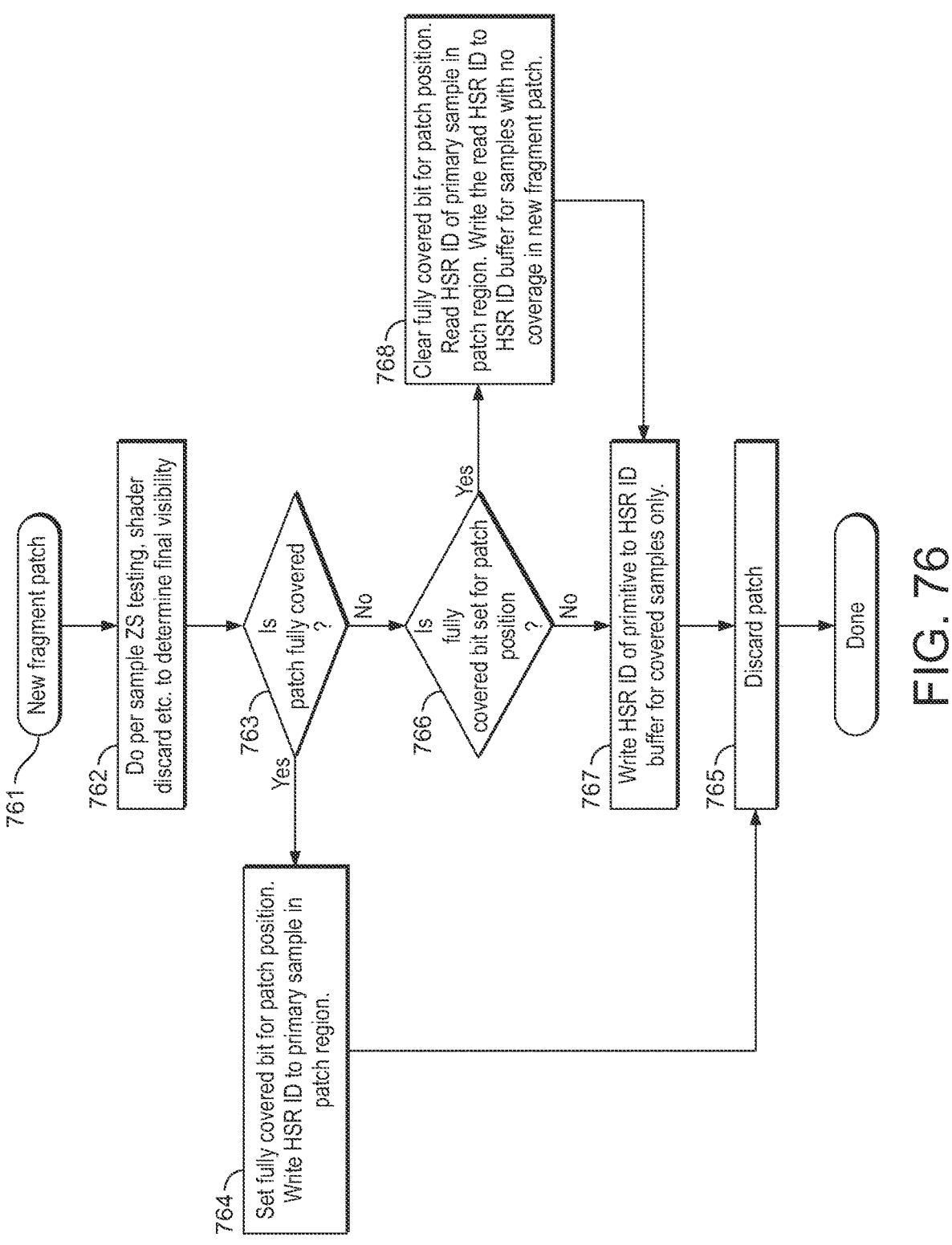
Figure 77:
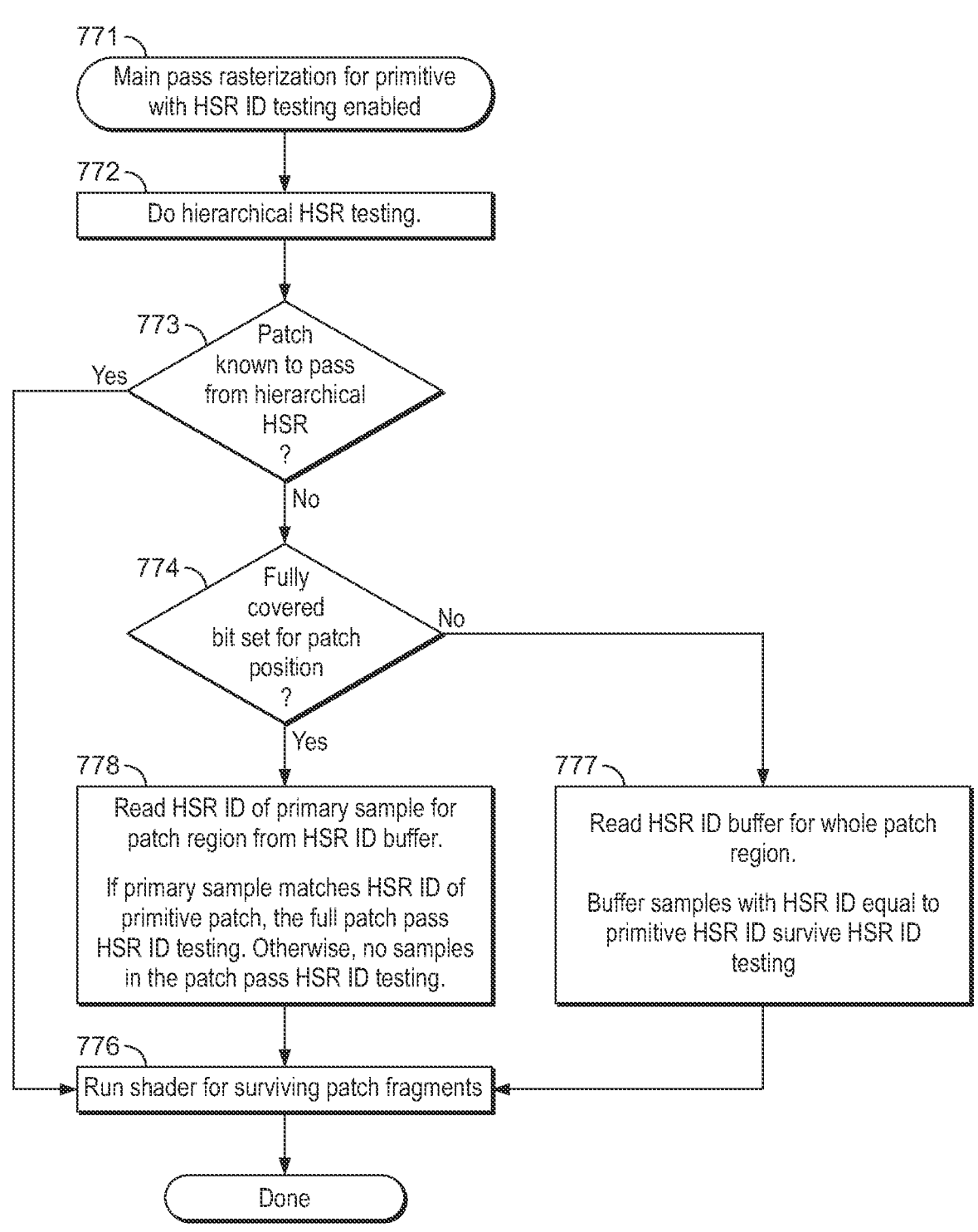

9 tive patches of sampling positions to indicate that the same primitive is visible for all sampling positions encompassed by the patch;

FIG. 76 is a flow chart illustrating the generation of the HSR ID buffer according to the example shown in FIG. 75; and FIG. 77 is a flow chart that shows the corresponding use of such HSR ID buffer during the second, main pass operation.

Like reference numerals are used for like components where appropriate in the drawings.

DETAILED DESCRIPTION

A first embodiment of the technology described herein comprises a method of operating a graphics processor to generate a render output in which, for the purposes of generating a render output, the render output is divided into a plurality of patches, the method comprising:

for a sequence of primitives to be rendered for a render output:

performing a first, pre-pass operation in which primitives in the sequence of primitives to be rendered are processed by rasterising the primitives into respective sets of one or more fragments, each fragment associated with a respective set of one or more sampling positions within the render output, and wherein as part of the first, pre-pass operation fragments for primitives in the sequence of primitives are processed to determine "visibility" information for the sequence of primitives, wherein each primitive in the sequence of primitives has a unique primitive identifier, the primitive identifiers within the sequence of primitives changing monotonically from a particular starting value, and wherein the determined visibility information comprises a set of primitive identifying information that is capable of storing respective primitive identifiers for respective sampling positions within the render output, the primitive identifier stored for a respective sampling position indicating which primitive should be further processed for the sampling position, and wherein the set of primitive identifying information is further capable of storing respective primitive identifiers for respective patches of the render output, each patch encompassing a group of plural sampling positions within the render output, wherein the primitive identifier that is stored for a respective patch of the render output indicates the first primitive in the sequence of primitives that may subsequently need to be processed further for a sampling position encompassed by the patch, the primitive identifiers stored in the set of primitive identifying information thus being usable during a subsequent visibility testing operation to determine which primitives should be processed further for which sampling positions within the render output, wherein when it is determined during the first, pre-pass operation that a primitive that fully covers a given patch of the render output would be visible based on the visibility information generated so far, the method comprises updating the set of primitive identifying information accordingly to record the primitive identifier for the primitive in question as the primitive identifier that is stored for the patch, and indicating at this point that a particular (e.g. "set") value that is different from the primitive identifier should be stored for each of the respective sampling positions encompassed by the patch;

the method further comprising:

thereafter performing a second, main pass operation in which visibility testing is performed to determine which primitives in the sequence of primitives should be further processed for which sampling positions within the render output, wherein the visibility testing for fragments that could potentially have updated the set of primitive identifying information during the first, pre-pass operation comprises testing a primitive identifier associated with the fragment being tested against a corresponding primitive identifier stored in the set of primitive identifying information for the sampling position or positions to which the fragment relates, and wherein when the fragment's primitive identifier matches the primitive identifier stored in the set of primitive identifying information, the fragment is determined to pass the visibility testing such that the fragment is processed further, the visibility testing being further configured such that fragments whose associated primitive identifier matches the primitive identifier that is stored for a given patch of the render output are also caused to pass the visibility testing for any sampling positions encompassed by the patch for which the particular ("set") value that is different from the primitive identifier is stored.

A second embodiment of the technology described herein comprises a graphics processor operable to generate a render output in which, for the purposes of generating a render output, the render output is divided into a plurality of patches, the graphics processor comprising a rendering circuit that is configured to:

for a sequence of primitives to be rendered for a render output:

perform a first, pre-pass operation in which primitives in the sequence of primitives to be rendered are processed by rasterising the primitives into respective sets of one or more fragments, each fragment associated with a respective set of one or more sampling positions within the render output, and wherein as part of the first, pre-pass operation fragments for primitives in the sequence of primitives are processed to determine "visibility" information for the sequence of primitives, wherein each primitive in the sequence of primitives has a unique primitive identifier, the primitive identifiers within the sequence of primitives changing monotonically from a particular starting value, and wherein the determined visibility information comprises a set of primitive identifying information that is capable of storing respective primitive identifiers for respective sampling positions within the render output, the primitive identifier stored for a respective sampling position indicating which primitive should be further processed for the sampling position, and wherein the set of primitive identifying information is further capable of storing respective "minimum primitive" identifiers for respective patches of the render output, each patch encompassing a group of plural sampling positions within the render output, wherein the primitive identifier that is stored for a respective patch of the render output indicates the first primitive in the sequence of primitives that may subsequently need to be processed further for a sampling position encompassed by the patch, the primitive identifiers stored in the set of primitive identifying information thus being usable during a subsequent visibility testing operation to determine which primitives should be processed further for which sampling positions within the render output, wherein when it is determined during the first, pre-pass operation that a primitive that fully covers a given patch of the render output would be visible based on the visibility information generated so far, the set of primitive identifying information is updated accordingly to record the primitive identifier for the primitive in question as the primitive identifier that is stored for the patch, and it is indicated at this point that a particular (e.g. "set") value that is different from the primitive identifier should be stored for each of the respective sampling positions encompassed by the patch;

the graphics processor further configured to cause the rendering circuit to:

thereafter perform a second, main pass operation in which visibility testing is performed to determine which primitives in the sequence of primitives should be further processed for which sampling positions within the render output, wherein the visibility testing for fragments that could potentially have updated the set of primitive identifying information during the first, pre-pass operation comprises testing a primitive identifier associated with the fragment being tested against a corresponding primitive identifier stored in the set of primitive identifying information for the sampling position or positions to which the fragment relates, and wherein when the fragment's primitive identifier matches the primitive identifier stored in the set of primitive identifying information, the fragment is determined to pass the visibility testing such that the fragment is processed further, the visibility testing being further configured such that fragments whose associated primitive identifier matches the stored primitive identifier for a given patch of the render output are also caused to pass the visibility testing for any sampling positions encompassed by the patch for which the particular ("set") value that is different to the primitive identifier is stored.

The technology described herein relates generally to hidden surface removal. In particular, the technology described herein enables improved (e.g., and in an embodiment, sample-perfect) hidden surface removal within a sequence of primitives that are to be rendered for a given render output (which sequence of primitives may, e.g., be a sequence of primitives to be rendered for an individual tile in a tile-based rendering system, but could also be any other suitably defined sequence of primitives depending on the desired render output and configuration of the graphics processor in question).

As will be explained further below, this is achieved in the technology described herein by introducing as part of the rendering operations performed for the sequence of primitives an initial, "pre-pass" operation such that the graphics processor when rendering a sequence of primitives is effectively configured to render the primitives in the sequence of primitives to be rendered in two separate processing passes.

Thus, when a sequence of primitives is issued to the graphics processor for rendering, the graphics processor is caused to initially perform a first, "pre-pass" operation in which at least some of the primitives in the sequence of primitives are rasterised into respective sets of fragments (each fragment corresponding to a set of one or more sampling positions within the render output) and the resulting fragments are then processed to determine "visibility" information relating to the fragment. The determined visibility information reflects whether or not the fragment will be visible in the final render output and therefore whether or not the fragment needs to be (and hence should be) processed further for the render output.

The primitives are however in an embodiment not rendered in full during the first, pre-pass operation and at least some of the actual final rendering operations to determine the final rendered output values (e.g. to determine the appearance (e.g. colour) that the sampling positions associated with the primitives should have in the final render output), as well as the corresponding writing out of the rendered output (e.g. colour) values, are instead in an embodiment deferred to a second, "main" pass operation, in which primitives in the sequence of primitives, including at least some primitives that were processed already during the first, pre-pass operation, are processed (again) by rasterising the primitives into their respective sets of fragments and then further processing the fragments as necessary. The further processing of fragments during the second, main pass, e.g., and in an embodiment, comprises rendering the fragments, e.g., and in an embodiment, by executing a fragment shader, in order to determine rendered output (e.g. colour) values for the sampling positions. The second, main pass operation thus in an embodiment produces the final output for the rendered tile, e.g. a set of rendered output (e.g. colour) values, and writes this out accordingly, e.g. to a respective output buffer (e.g. a tile buffer), e.g. for providing to a frame buffer for display.

According to the technology described herein, the visibility information determined by the processing of fragments during the first, pre-pass operation comprises a set of primitive identifying information that can then be (and is) subsequently used during the second, "main" pass operation to perform the desired fragment visibility testing to control the further processing of fragments for primitives in the sequence of primitives.

During the second, main pass operation, primitives that were processed during the first, pre-pass operation are thus processed again, and rasterised into their respective sets of fragments for further processing. The fragment processing during the second, main pass can then be (and is) controlled based on the set of primitive identifying information that was generated during the first, pre-pass operation. In particular, according to the technology described herein, during the second, main pass, after a primitive has been rasterised into its respective fragments, the fragments can be (and are) tested against the set of primitive identifying information to determine whether or not the fragments should be processed further. When such visibility testing determines that a fragment does not need to be (and should not be) processed further, that fragment can then be (and in an embodiment is) 'culled', e.g., and in an embodiment, without processing the fragment further. Otherwise, any fragments that survive the visibility testing are passed on for further processing (rendering), e.g., and in an embodiment, to determine the desired rendered output (e.g. colour) values for the sampling positions to which the fragments relate (although in embodiments further fragment culling operations may also be performed after the visibility testing, for example, in some embodiments, additional depth testing may be performed, at least for certain types of primitives (e.g. certain types of transparent primitive that may, e.g., be only processed in the second, main pass operation, but not the first, pre-pass operation, as will be discussed further below)).

The second, main pass operation thus comprises a step of fragment "visibility testing" that uses the set of primitive identifying information that was generated during the first, pre-pass operation to determine whether or not fragments should be processed further (i.e. based on whether or not the fragments have visible effects for the final output, as identified from the set of primitive identifying information). The set of primitive identifying information generated during the first, pre-pass operation is thus consumed during the second, main pass operation as part of such visibility testing. Accordingly, once the rendering of the sequence of primitives is complete (e.g. at the end of the second, main pass operation), the set of primitive identifying information can in an embodiment be discarded (and a new set of primitive identifying information generated for a new sequence of primitives to be processed, as appropriate).

The set of primitive identifying information according to the technology described herein is capable of storing (and does store), for respective sampling positions within the render output, respective primitive identifiers, with the respective primitive identifier stored for a respective sampling position indicating which primitive (if any) in the sequence of primitives should subsequently be further processed for that sampling position. The set of primitive identifying information in this way is usable to identify which of the primitives in the sequence of primitives should be processed further for which sampling positions within the render output.

Thus, each primitive in the sequence of primitives being processed is associated with a unique primitive identifier, with the primitive identifiers within the sequence of primitives changing monotonically from a particular starting value. For example, and in an embodiment, the primitive identifiers within the sequence of primitives increase monotonically. For instance, in a example, the primitives may be indexed within the sequence of primitives starting from 'one' (such that the first primitive in the sequence may be identified as primitive 'one', the second primitive identified as primitive 'two', and so on). The set of primitive identifying information correspondingly stores such primitive identifiers to thereby indicate which primitives in the sequence of primitives should subsequently be processed further for which of the sampling positions (which information in turn can be (and is) used to control the subsequent processing of primitive fragments during the second, main pass operation, as will be explained further below). The set of primitive identifying information thus contains a plurality of entries corresponding to the sampling positions within the render output and which entries are able to store for the respective sampling positions within the render output a respective primitive identifier indicating which primitives (if any) should be further processed for the corresponding sample position(s) within the render output.

The per-sampling position primitive identifiers can then be used as part of a subsequent fragment visibility testing operation during the second, main pass operation to identify which primitives should be further processed for which sampling positions, and hence allow fragments for other primitives to be culled accordingly for the second, main pass. In particular, the visibility testing for a fragment that was processed in the first, pre-pass operation and that could have updated the set of primitive identifying information during the first, pre-pass operation comprises testing a primitive identifier associated with the fragment against a corresponding primitive identifier stored in the set of primitive identifying information for the sampling position or positions to which the fragment relates, and wherein when the fragment's primitive identifier matches (i.e. is equal to) the primitive identifier stored in the set of primitive identifying information, the fragment passes the visibility testing such that the fragment is processed further. Otherwise, the fragment is 'culled', such that some or all further processing of the fragment is omitted. (Thus, at least for fragments that could potentially have updated the set of primitive identifying information during the first, pre-pass operation (whether or not they did in fact do so), the visibility testing uses an 'equals' test function for testing the individual fragments against respective sampling positions of the render output. However, as will be explained further below, for other fragments, e.g., and in particular, fragments for primitives that were not processed during the first pre-pass operation, or otherwise could not possibly have updated the set of primitive identifying information (e.g. since they do not write visibility (e.g. depth) information, the fragment visibility testing may be performed differently. That is, different primitives may be configured to use different fragment visibility test functions.)

Subject to the particular requirements of the technology described herein there may in general be any suitable and desired correspondence between the entries in the set of primitive identifying information and the sampling positions within the render output. For example, the set of primitive identifying information should be (and in an embodiment is) able to store a primitive identifier in respect of each sampling position within the render output. In an embodiment a single primitive is identified to be processed further for a respective sampling position. That is, the set of primitive identifying information is in an embodiment able to store (and in an embodiment does store) for each sampling position within the render output a single respective primitive identifier indicating the primitive (if any) that should be processed further for that sampling position. (Thus, where the final output value for a sampling position may depend on processing multiple fragments, e.g. due to blending, the primitive processing may in embodiments be handled differently, e.g., and in an embodiment, using a third, "fallback" mode of operation as described further below.)

The set of primitive identifying information in the technology described herein, at least according to the first and second embodiments described above, is also capable of (and contains respective entries for) storing primitive identifiers for groups of plural sampling positions (with the groups of sampling positions corresponding to respective "patches" (regions) of the render output, and hence, correspondingly, "patches" of sampling positions). In particular, the set of primitive identifying information may (and does) store for respective patches of the render output (at least) a respective ("minimum") identifier, wherein the ("minimum") primitive identifier that is stored for a respective patch of the render output indicates the first primitive in the sequence of primitives that may subsequently need to be processed further for a sampling position encompassed (covered) by the patch. As will be explained further below, by arranging the set of primitive identifying information in this "hierarchical" manner, such that respective primitive identifiers are stored both at the level of the individual sampling positions within the render output and for higher level groups of sampling positions ("patches"), this can then then allow subsequent visibility testing to be performed at one or more different levels of subdivision of the render output, e.g., and in particular, by allowing groups of fragments to be tested at the patch level, and in an embodiment culled (when possible), in one go, e.g. thus avoiding having to test individual fragments when it is possible to determine already at the patch level that the fragments have no visible effect for their respective sampling positions. This can therefore facilitate speeding up the visibility testing and hence make the overall graphics processing operation more efficient.

The first, pre-pass operation thus serves to populate the entries of the set of primitive identifying information with such information identifying the primitives (and "minimum" primitives) that may need to be processed further for respective sampling positions within the render output. Thus, during the first, pre-pass operation, primitives in the sequence of primitives are processed into their respective fragments, and the resulting fragments are then processed to determine the desired visibility information associated with the fragments (e.g., and in an embodiment, by depth (and optionally also stencil) testing the fragments against a corresponding depth (stencil) buffer to determine the fragment's visibility), and to update the set of primitive identifying information accordingly.

For example, when a fragment for a primitive is determined to be visible for a respective sampling position within the render output based on the visibility information generated so far by the processing of earlier primitives in the sequence of primitives, a respective entry in the set of primitive identifying information for the sampling position or positions to which the fragment relates should be (and in an embodiment is, subject to the particular requirements of the technology described herein) updated accordingly to record the primitive identifier for the primitive in question (i.e. the primitive that caused the update). This is then repeated for further primitives in the sequence of primitives. Thus, it will be appreciated that the entry for a given sampling position may (and will) subsequently be overwritten if a fragment for a later primitive is subsequently determined to be visible at that sampling position.

Correspondingly, when a group of fragments that fully covers a respective patch of the render output is determined to be visible for the patch based on the visibility information generated to that point, this means that that primitive is the first primitive that may potentially need to be processed further for any of the sampling positions encompassed by the patch (although again it will be appreciated that the patch may subsequently be at least partially overwritten by later fragments). Accordingly, the respective ("minimum") primitive identifier for the patch should be (and is) updated in this situation. Thus, in that case, the primitive identifier associated with the group of fragments should be (and is) written to the respective entry in the set of primitive identifying information for storing the ("minimum") primitive identifier for the patch in question, such that the primitive identifier is then stored (for subsequent use) as the respective ("minimum") primitive identifier for the patch, i.e. to indicate the first primitive in the sequence of primitives that may need to subsequently be processed further for the sampling positions encompassed by the patch.

The effect of all this is that at the end of the first, pre-pass operation, the set of primitive identifying information stores, for respective sampling positions, and also for respective patches of the render output, respective primitive identifiers that can then be used to determine which primitive in the sequence of primitives should be further processed for which sampling positions, in particular as part of the "visibility testing" described above, and to control the subsequent processing of primitives during the second, main pass operation accordingly, e.g., and in an embodiment, to cull fragments when it is possible to do so. The primitive identifiers stored in the set of primitive identifying information including both the per-sampling position and per-patch primitive identifiers are thus usable during the subsequent visibility testing in the second, main pass operation to determine which primitives should be processed further for which sampling positions within the render output.

It will be appreciated from the above that when a primitive that fully covers a patch of the render output is determined to be visible, such that the primitive should (and does) cause an update to the set of primitive identifying information in respect of that patch, i.e. such that the primitive identifier associated with the primitive is stored as the corresponding ("minimum") primitive identifier for the patch, this means that at that point, according to the visibility information generated so far, the same primitive must also be visible (and so should be further processed) for each of the individual sampling positions encompassed by the patch. That is, if a primitive that fully covers a patch of the render output is determined to be visible, and thus causes an update to the per-patch ("minimum") primitive identifier, that same primitive should also be visible to everything below the patch (i.e. the individual sampling positions but also any smaller patches of the render output encompassed by the larger patch), since, at that point, it has been determined that the same (single) primitive is visible for all sampling positions encompassed by the patch (although again, as mentioned above, some or all of the sampling positions may subsequently be overwritten by later visible primitives). In one approach, the set of primitive identifying information could therefore be updated at this point to store the same primitive identifier that is stored for the patch for each of the sampling positions encompassed by the fully covered patch.

In the first and second embodiments of the technology described herein as described above, however, in this situation, when the ("minimum") primitive identifier is updated for a patch of the render output, the set of primitive identifying information is not updated at that point to store the same primitive identifier for each of the respective sampling positions encompassed by the patch, but it is instead indicated at this point that each of the per-sampling position entries encompassed by the patch should store a particular, e.g. predetermined, "set" value that is different to the primitive identifier. For example, and in an embodiment, the particular ("set") value that is indicated in this situation is a "clear" value (e.g. zero), e.g., and in an embodiment, that is otherwise (normally) used to indicate that there is no coverage for the sampling position in question.

To ensure the correct rendering behaviour, the visibility testing in the second, main pass operation is accordingly configured such that for any fragments whose primitive identifier matches the stored ("minimum") primitive identifier for a given patch of the render output, the fragments are caused to pass the visibility testing not only when its primitive identifier matches the primitive identifier stored for the sampling position or positions to which the fragment relates (e.g. as described above for the 'normal' visibility testing of the technology described herein for fragments that could in principle have updated the fragment set of primitive identifying information in the first, pre-pass operation, for which an 'equals' test function is therefore appropriate) but also for any and all sampling positions encompassed by the patch for which the particular (e.g. "set", e.g. clear, e.g. zero) value is stored. That is, because it is indicated at the point when the ("minimum") primitive identifier for a patch is updated that all sampling positions encompassed by the patch should use the particular (e.g. "set", e.g. clear, e.g. zero) value, this means that for any sampling positions for which the final set of primitive identifying information stores the "set" (e.g. clear, e.g. zero) value, it is the primitive corresponding to the stored ("minimum") primitive identifier for the patch encompassing the sampling position that should be visible, and so the sampling positions should be treated accordingly as if they stored that same primitive identifier. The fragment visibility testing is thus configured accordingly to (e.g. automatically) pass fragments for any sampling positions for which the "set" value is stored for primitives that match the stored ("minimum") primitive identifier for the patch encompassing the sampling positions in question.

In this way, the first and second embodiments of the technology described herein described above allow the updating and writing of the set of primitive identifying information during the first, pre-pass operation to be simplified, by avoiding having to update the set of primitive identifying information to store the same primitive identifier in full for each sampling position encompassed by the fully covered patch, whilst still ensuring the desired rendering behaviour.

In this respect, the technology described herein recognises that updating the set of primitive identifying information to record the same primitive identifier for each sampling position encompassed by a given patch may be relatively time consuming. For example, this may particularly be the case where higher sampling rates (e.g. 16× multisample anti-aliasing ("MSAA") techniques) are used, in which case there may be a huge number of sampling positions encompassed by a larger patch of the render output. Thus, for multiple levels of subdivision, if a larger patch is found to be fully covered by a visible primitive, which can often be the case, especially for relatively simpler scenes, attempting to update the same primitive identifier for each and every entry encompassed by the larger patch can introduce significant processing bottlenecks within the fragment frontend operations in the first, pre-pass operation.

The first and second embodiments of the technology described herein as described above thus provide a more efficient approach for updating the set of primitive identifying information in such situations, and for performing the subsequent visibility testing, that in an embodiment avoids such bottlenecks, and that allows the stored ("minimum") primitive identifier for a patch to be effectively carried through for the sampling positions encompassed by the patch (assuming they are not overwritten by a later primitive), thus avoiding having to explicitly update each of the sampling positions encompassed by the patch with the same primitive identifier every time the ("minimum") primitive identifier for the patch is updated. This can therefore significantly improve the throughput for the first, pre-pass operation, and hence improve the performance (e.g. speed) of the overall graphics processing operation.

Thus, according to the first and second embodiments of the technology described herein described above, when it is determined during the first, pre-pass operation that a primitive that fully covers a given patch of the render output would be visible based on the visibility information generated so far, the method comprises (the graphics processor is configured to) updating the set of primitive identifying information accordingly to record the primitive identifier for the primitive in question as the "("minimum") primitive identifier for the patch. However, the set of primitive identifying information is not updated to store the same primitive identifier for the respective sampling positions encompassed by patch, and instead it is indicated at this point that a particular (e.g. "set") value that is different from the primitive identifier should be stored in the set of primitive identifying information for each of the respective sampling positions encompassed by the patch. The particular (e.g.

"set") value can be any suitable and desired value but as mentioned above is in an embodiment a "clear' value, e.g. zero, that is otherwise used to indicate that there is no primitive coverage at the sampling position in question. For example, as mentioned above, the primitives in the sequence are in an embodiment indexed starting from 'one', such that the first primitive has the primitive identifier 'one, the second primitive has the primitive identifier 'two', and so on, with 'zero' being used to indicate that there is no primitive coverage, and in an embodiment 'zero' is also used as the "set" value according to the technology described herein.

Thus, in embodiments, when it is determined during the first, pre-pass operation that a primitive that fully covers a given patch of the render output would be visible based on the visibility information generated so far, the ("minimum") primitive identifier for the patch is updated accordingly, whereas for all lower level entries in the set of primitive identifying information corresponding to sampling positions, or groups of sampling positions, that are encompassed by the patch it is indicated that zeroes should be stored.

The indicating during the first, pre-pass operation that the particular (e.g. "set") value (e.g. zero) should be stored for a sampling position based on the visibility information generated so far can take any suitable and desired form.

For example, in an embodiment, the set of primitive identifying information could be updated at this point to store the "set" value (e.g. zero) for each of the sampling positions encompassed by the patch for which the respective "("minimum") primitive identifier was updated. That is, when it is determined during the first, pre-pass operation that a primitive that fully covers a given patch of the render output would be visible based on the visibility information generated so far, such that the set of primitive identifying information is updated accordingly to record the primitive identifier for the primitive in question as the ("minimum") primitive identifier for the patch, at this point the set of primitive identifying information could also be (and in some embodiments is) updated to store the particular (e.g. "set") value for each of the respective sampling positions encompassed by the patch.

For instance, because the particular (e.g. "set") value that is used in this situation is in an embodiment relatively smaller than the actual primitive identifier (e.g. it is in an embodiment zero), this can already involve reduced effort compared to storing the actual primitive identifier multiple times.

However, in that case the set of primitive identifying information would still be updated with the same "set" value multiple times. Further, when the set of primitive identifying information is written at the end of the first, pre-pass operation, this may require iterating over the entire set of primitive identifying information, despite the same "set" value potentially being written for whole patches of sampling positions.

In an embodiment therefore, the indicating during the first, pre-pass operation that the particular (e.g. "set") value should be stored for a sampling position comprises setting one or more flags each representing a respective group of sampling positions within the render output, and which flags when set cause the graphics processor to skip iterating over respective group of sampling positions represented by the flag, and instead to simply write the particular (e.g. "set") value (e.g., and in an embodiment, to write 'zero'). For example, in embodiments, respective "clear" flags (bits) are provided, e.g. in registers, that can be used to indicate that a respective group of N sampling positions (e.g. a given patch of the render output, although in general a "clear" flag may present any suitable number and arrangement of sampling positions which may or may not correspond to one of the patches into which the render output is otherwise divided) all have the same "clear" value (e.g., and in an embodiment, are all 'zeroes'). These "clear" flags can accordingly be used during the first, pre-pass indication to indicate that the same "clear" value (e.g. zero) should be stored for each of the sampling positions represented by the "clear" flag, and are in an embodiment also used, or re-purposed, in the technology described herein for the purposes of the indicating that the same "set" value should be stored for multiple sampling positions encompassed by a given patch of the render output.

In an embodiment, therefore, when it is determined during the first, pre-pass operation that a primitive that fully covers a given patch of the render output would be visible based on the visibility information generated so far, such that the set of primitive identifying information is updated accordingly to record the primitive identifier for the primitive in question as the ("minimum") primitive identifier for the patch, one or more respective "clear" flags representing sampling positions encompassed by the patch are set accordingly to indicate that all of the sampling positions represented by the "clear" flags have the same "set" value (e.g. are all zero). Thus, in embodiments, when it is determined during the first, pre-pass operation that a primitive that fully covers a given patch of the render output would be visible based on the visibility information generated so far, a respective "fully covered" flag is in an embodiment set at that point for the patch, which "fully covered" flag in turn causes all of the "clear" flags representing sampling positions encompassed by the patch to be set in turn, as described above.

This then saves having to update the set of primitive identifying information for the sampling positions encompassed by the patch at this point during the first, pre-pass operation at all to actually update the same "set" value for all of the sampling positions encompassed by the fully covered patch, and also potentially saves having to iterate over the regions represented by the "clear" flags when writing the set of primitive identifying information to storage, as if a "clear" flag is set, the graphics processor is simply caused to write the same particular (e.g. "set") value (e.g. zero) for all sampling positions represented by the flag, without having to iterate over each of the sampling positions. This can therefore provide significant benefits compared to other approaches in terms of reducing the potential bottlenecks described above during the first, pre-pass operation. Various other arrangements would however be possible in this regard.

It will be appreciated that when it is determined during the first, pre-pass operation that a primitive that fully covers a given patch of the render output would be visible based on the visibility information generated so far, such that the set of primitive identifying information is updated accordingly to record the primitive identifier for the primitive in question as the ("minimum") primitive identifier for the patch, and it is thus indicated at that point that the particular (e.g. "set") value should be stored for each of the sampling positions encompassed by the patch, there may then be (and typically will be) later primitives in the sequence of primitives that are to be processed and that at least partially overwrite the primitive for which the ("minimum") primitive identifier is stored.

For instance, if a later primitive is determined to be visible for one or more sampling positions covered by the patch the respective primitive identifier for the later primitive should accordingly be stored for the one or more sampling positions, and this is therefore in an embodiment done (such that rather than storing the "set" value, a different primitive identifier is stored). In this case, if the later primitive does not fully cover the patch, the ("minimum") primitive identifier for the patch however should not be (and therefore is not) updated, and instead it is only the respective sampling positions that are overdrawn for which the set of primitive identifying information is updated. Of course if the later primitive fully covers the same patch, and is determined to be visible, in that case the stored ("minimum") primitive identifier for the patch can then be (and in an embodiment is) updated accordingly to record the primitive identifier for the later primitive, and it can then be (and in an embodiment is) indicated that the particular (e.g. "set") value (e.g. zero) should be stored for all sampling positions encompassed by the patch, in the same manner as described above, with this then causing any sampling positions for which the "set" value (e.g. zero) is stored to use the updated, stored ("minimum") primitive identifier for the patch accordingly, and so on. Thus, as later primitives are processed, the respective primitive identifiers for sampling positions can be and are updated accordingly.

This correspondingly means that if any one sampling position represented by a "clear" flag is subsequently overwritten, the "clear" flag should be re-set at that point (such that the actual primitive identifiers are written). In that case, for any sampling positions that should still use the ("minimum") primitive identifier stored for the patch, a zero value should still be written, but this may need to be explicitly updated at this point (since the "clear" flag can no longer be used).

As alluded to above, the set of primitive identifying information is in an embodiment then written to suitable set of primitive identifying information storage at the end of the first, pre-pass operation. For example, and in an embodiment, the set of primitive identifying information is written to local storage (e.g. in RAM), such as a portion of a tile buffer allocated for the sequence of primitives being processed. The stored set of primitive identifying information is then available for use during the fragment visibility testing during the second, main pass operation, as desired. The set of primitive identifying information for a sequence of primitives is in an embodiment then discarded once the corresponding second, main pass operation has completed. (i.e. once the rendering of the sequence of primitives is complete).

The visibility testing during the second, main pass is then performed using the determined set of primitive identifying information, e.g., and in an embodiment, in the manner described above. Thus, the fragment visibility testing for a given fragment (or group of fragments) generally comprises testing a respective primitive identifier associated with the fragment (or group of fragments) being tested against corresponding primitive identifier(s) stored in the set of primitive identifying information for the sampling position or positions to which the fragment (or group of fragments) relates. Thus, for sampling positions for which a primitive identifier is stored, the fragment visibility testing for a fragment should test the primitive identifier associated with the fragment against the stored primitive identifier.

At least for fragments for primitives that were already processed during the first, pre-pass operation, and that could in principle have updated the set of primitive identifying information, the visibility testing comprises an 'equals' test. That is, the visibility testing for a fragment that could potentially have updated the set of primitive identifying information during the first, pre-pass operation (whether or not it did in fact do so) comprises testing a primitive identifier associated with the fragment against a corresponding primitive identifier stored in the set of primitive identifying information for the sampling position or positions to which the fragment relates, and wherein when the fragment's primitive identifier matches the primitive identifier stored in the set of primitive identifying information, the fragment passes the visibility testing such that the fragment is processed further. Otherwise, the fragment is culled.

However, as described above, in the first and second embodiments of the technology described herein as described above, for sampling positions for which the particular (e.g. "set") value (e.g. the "clear" value, e.g. zero) is stored, this means that rather than simply testing the primitive identifier associated with the fragment against the ("set") value as stored, for fragments for primitives whose primitive identifier matches the stored ("minimum") primitive identifier for a patch encompassing the sampling position in question, the fragments should also be caused to pass the visibility testing for any sampling positions for which the particular (e.g. "set", e.g. 'clear', e.g. zero) value is stored (and this is therefore done).

To facilitate this, it is in an embodiment identified during the visibility testing in the second, main pass whether the primitive identifier for the fragment being tested matches the stored ("minimum") primitive identifier for a patch encompassing the sampling position in question, and when this is the case, the fragment is caused to pass visibility testing either when the primitive identifier matches the primitive identifier stored for the sampling position in question or when the "set" value is stored for the sampling position in question. (Whereas, if the primitive identifier associated with the fragment being tested does not match the stored ("minimum") primitive identifier, the fragment is in an embodiment tested in the normal way. In that case, if the particular (e.g. "set") value is stored, a fragment that performs 'equals' testing should in an embodiment fail the visibility testing since the particular ("set") value that is stored is in an embodiment selected to be different to any of the actual primitive identifiers that may be encountered. For example, as discussed above, it is in an embodiment zero.)

This means that for any sampling positions for which the particular ("set") value (e.g. zero) is stored, the particular ("set") value (e.g. zero) can effectively be interpreted appropriately during the second, main pass operation depending on whether or not the primitive identifier for the fragment being tested matches the stored ("minimum") primitive identifier for a patch encompassing the sampling position in question to ensure the desired fragment visibility testing behaviour wherein fragments of the primitive corresponding to the stored ("minimum") primitive identifier for a patch are also caused to pass visibility testing for sampling positions encompassed by the patch for which the particular ("set") value that is different to the primitive identifier is stored (e.g. rather than testing the fragments against the particular ("set") value (e.g. zero) itself which could lead to fragments being incorrectly culled).

The identification as to whether the primitive identifier for the fragment being tested matches the stored ("minimum") primitive identifier for a patch encompassing the sampling position in question can be done in various suitable manners as desired.

In an embodiment this is done by performing the fragment visibility in a hierarchical manner, in which for the purposes of visibility testing at least some primitives that were processed by the first, pre-pass operation are processed (rasterised) into respective groups of fragments, each group of fragments corresponding to a respective patch of the render output, and in which groups of fragments are tested first against corresponding patches of the render output to determine whether the group of fragments should be processed further. In that case, the visibility testing for a group of fragments in an embodiment comprises testing a primitive identifier associated with the group of fragments against the "minimum primitive" identifier stored for the patch of the render output corresponding to the group of fragments.

(This arrangement can itself beneficially allow groups of fragments ("primitive patches") to be culled/passed in one go. For example, in the case where the primitive identifiers monotonically increase within the sequence of primitives, if the primitive identifier associated with the group of fragments is lower (i.e. has a lower (smaller) value) than the stored ("minimum") primitive identifier for the patch corresponding to the group of fragments, the group of fragments can be culled at the patch level. In that case, the primitive identifier that is stored for a patch is effectively a "minimum" primitive identifier (i.e. the lowest primitive identifier associated with a primitive that may be visible for the patch). Corresponding testing can however also be performed in the case where the primitive identifiers monotonically decrease from a maximum value within the sequence of primitives, for example. In that case, the primitive identifier that is stored for a patch still indicates the first primitive in the sequence of primitives that should be further processed for the patch, but the primitive identifier will not be the lowest value (since the primitive identifiers in this case decrease). Thus, in general, the effect of the patch level testing is in an embodiment to determine whether the group of fragments being tested is associated with a primitive that occurs earlier or later in the sequence of primitives than the primitive associated with the primitive identifier that is stored as the primitive identifier for the patch that the group of fragments is being tested against, and if the group of fragments is associated with a primitive that occurs earlier in the sequence of primitives than the primitive having the primitive identifier corresponding to the primitive identifier that is stored for the patch (regardless of whether the primitive identifiers increase or decrease within the sequence), this means that the group of fragments can be culled. Otherwise, if the group of fragments survives the patch testing, the group of fragments may be further subdivided for further testing against smaller patches of the render output, and so on, down to the smallest patch size, and/or to the level of individual sampling positions (if necessary).)

In that case, when it is determined during patch visibility testing that the primitive identifier associated with the group of fragments being tested against the patch matches the ("minimum") primitive identifier stored in the set of primitive identifying information for the patch, this means that the primitive associated with the group of fragments is the primitive that caused the update of the ("minimum") primitive identifier during the first, pre-pass operation, and therefore that any sampling positions encompassed by the patch for which the particular ("set") value (e.g. zero) is stored should be interpreted accordingly such that the fragments for that primitive are caused to pass visibility testing, as described above.

Thus, in embodiments, when it is determined during patch visibility testing that the primitive identifier associated with the group of fragments being tested against the patch matches the ("minimum") primitive identifier stored in the set of primitive identifying information for the patch, a suitable flag ('is_min') associated with the group of fragments is set accordingly to indicate that the current group of fragments is associated with the primitive that caused the update of ("minimum") primitive identifier during the first, pre-pass operation. When such ('is_min') flag is set, this then causes fragments to pass the visibility testing for any sampling positions encompassed by the patch for which the particular ("set") value that is different to the primitive identifier is stored. For example, in an embodiment, any such fragments are caused to automatically pass visibility testing whenever the particular ("set") value is stored (without explicitly performing any actual testing). As another example, it may also be possible that when the "set" value is stored, this causes the testing to use the stored ("minimum") primitive identifier for the patch for the testing. Various other arrangements would be possible.

In this way, the visibility testing during the second, main pass operation can interpret any such stored "set" values accordingly to ensure the correct rendering behaviour.

The first and second embodiments of the technology described herein as described above may therefore provide various benefits compared to other possible arrangements.

In some embodiments the determined set of primitive identifying information may be further processed or 'refined' at the end of the first, pre-pass operation. For example, this may be done to attempt to refine the stored ("minimum") primitive identifiers for the respective patches of the render output, e.g. by identifying narrower ranges of primitives that may need to be processed for respective patches. As another example, the determined set of primitive identifying information may be further processed to generate an additional 'primitive culling' data structure indicating entire primitives that can be culled (since they have no visibility at all).

In such cases, the further processing or refinement may also need to interpret any such "set" values (e.g. zeros) that are stored in the set of primitive identifying information accordingly, e.g. to determine whether a 'zero' actually represents that there is no coverage, or that the 'zero' was set based a higher level patch being fully covered by a visible primitive. This can be done in a similar manner as described above by suitable hierarchal iteration over the set of primitive identifying information to determine whether there is a patch encompassing the sampling position for which the zero is stored for which a minimum primitive identifier is set, in which case the zero should be interpreted accordingly to correspond to the stored ("minimum") primitive identifier for the patch.

It will be appreciated that using particular ("set') values in place of the actual primitive identifier does not have any impact on the testing for some other primitives, e.g., and in particular, transparent primitives that use a 'greater than' visibility test, such that fragments for the primitive pass visibility testing when the primitive identifier associated with the fragment is greater (i.e. has a greater (higher) value) than the primitive identifier stored in the fragment visibility testing. For example, in that case, the primitives that use the 'greater than' visibility test are in an embodiment first tested against the ("minimum") primitive identifier stored for a patch (or set of hierarchical patches). If the primitive passes the patch level visibility test, but needs to perform per-sampling position visibility testing, it should not then matter whether the fragment for the primitive is tested against the actual ("minimum") primitive identifier or the particular ("set") value, as the particular value is in an embodiment selected to be smaller than the actual ("minimum") primitive identifier for the patch (e.g. it is in an embodiment zero), such that the fragment should always pass the 'greater than' test. Thus, the techniques described above can also handle different types of primitives that may use 'greater than' testing.

Thus, according to the first and second embodiments of the technology described herein, as described above, when a primitive is determined to fully cover a patch of sampling positions, the primitive identifier for the primitive in question can then be (and is) stored for the patch as a whole (e.g. as the respective "minimum" value in the case where the primitive identifiers monotonically increase within the sequence of primitives) to indicate that primitive is the first primitive in the sequence of primitives that may subsequently need to be processed further for a sampling position encompassed by the patch. In this case, according to the first and second embodiments of the technology described herein, rather than writing the (same) primitive identifier in full into the set of primitive identifying information for each respective sampling position encompassed by the patch, a particular (e.g. "set") different, in an embodiment smaller, value (e.g. zero) can be (and is) stored in the set of primitive identifying information for the sampling positions encompassed by the patch, which particular ("set") value is then interpreted accordingly during the second, main pass such that incoming fragments whose associated primitive identifier matches the primitive identifier that is stored for a given patch of the render output are also caused to pass the visibility testing for any sampling positions encompassed by the patch for which the particular ("set") value is stored, e.g. as explained above.

The approach according to the first and second embodiments of the technology described herein described above thus saves—in situations where it is determined that the same primitive is visible for each of the sampling positions encompassed by a given patch—having to then write the same value in full for each of the sampling positions, which can accordingly then simplify and in an embodiment accelerate the writing of the set of primitive identifying information during the first, pre-pass operation in such situations.

The Applicants, however, have also recognised that there are further possibilities for simplifying access to the set of primitive identifying information in such situations where it is determined that the same primitive is visible for each of the sampling positions encompassed by a given patch. Thus, according to further embodiments of the technology described herein, as will be explained further below, it is tracked during the first, pre-pass operation which, if any, patches are fully covered by a single primitive that is determined to be visible for the render output, and this determination that the same primitive is visible for all sampling positions encompassed by a given patch can then be (and is) used to further simplify access to the set of primitive identifying information.

In particular, according to some further embodiments of the technology described herein, as will be explained further below, when it is determined during the first, pre-pass operation that a primitive that fully covers a given patch of the render output would be visible based on the visibility information that has been determined so far, this information can be, and according to these further embodiments of the technology described herein is, tracked by updating a respective indicator (e.g. a "fully covered" flag) that is associated with the patch and which indicator is usable to indicate instances where the same primitive has been determined to be visible for all sampling positions encompassed by that patch.

Thus, according to these further embodiments of the technology described herein, respective patches of the render output are associated with respective indicators (e.g. flags) that can be used to indicate when the patch has been determined to be fully covered by a single primitive that is visible for all sampling positions encompassed by the patch. In an embodiment, each patch of the render output (at each level of patches where the render output is divided into a set of hierarchical patches) has a respective such indicator usable for this purpose. Other arrangements would however be possible. For example, in the situation where the render output is divided into a set of hierarchical patches, such indicators could be provided only in respect of the lower level patches, if that were desired.

The respective indicator for a given patch is therefore updated (and only updated) on the basis that, based on the visibility information generated so far, i.e. up to that point during the first, pre-pass operation, it has been determined that the same (single) fully-covering primitive is visible for all of the sampling positions encompassed by the patch.

Correspondingly, this indicator when provided in respect of a given patch can then be used during the subsequent second, main pass operation to identify instances of patches for which it has been determined that the same (single) primitive is visible for all sampling positions encompassed by the patch.

This can accordingly simplify access to the set of primitive identifying information since in the case where the same (single) primitive is visible for all sampling positions encompassed by a given patch, this then means that only a single instance of the primitive identifier needs to be stored in association with the patch, since it is known that all sampling positions encompassed by the patch can, and therefore should, use the same primitive identifier for the subsequent visibility testing during the second, main pass operation.

Thus, according to these further embodiments of the technology described herein, when it is determined that a primitive that fully covers a given patch of the render output would be visible based on the visibility information that has been determined so far, this determination that the same (single) primitive is visible for the entire patch of sampling positions can be used to facilitate simplifying access to the set of primitive identifying information, e.g., and in an embodiment, by storing only a single primitive identifier in association with, and for use with, all of the sampling positions encompassed by the patch (i.e. in association with, and for use with, the patch of sampling positions as a whole).

Accordingly, when it is determined during the first, pre-pass operation that a particular patch of sampling positions is fully covered by a single primitive that is determined based on the visibility information generated so far to be visible at all of the sampling positions encompassed by the patch, the respective indicator associated with that patch should be (and is) updated to reflect this determination, and the graphics processor according to these further embodiments of the technology described herein is then caused to store the primitive identifier for the single fully-covering primitive in association with the patch, and in an embodiment to store the primitive identifier such that only a single instance of the primitive identifier is stored in association with the entire patch, e.g. without then attempting to (also) store the (same) primitive identifier (or a different "set" value) in respect of the individual sampling positions encompassed by the patch.

That is, when the respective indicator for a given patch indicates that the same primitive has been determined to be visible for all sampling positions encompassed by that patch, the graphics processor can then determine on that basis that the same (single) primitive identifier can and should therefore be used for the subsequent visibility testing during the second, main pass operation for all of the sampling positions encompassed by that patch.

This then means that the primitive identifier for the fully covering primitive only needs to be stored once in association with the entire patch (and according to these further embodiments this may accordingly be done) as the subsequent visibility testing can identify using the provided indicator any instances where the same primitive has been determined to be visible for all sampling positions encompassed by a given patch, and then use the same (single) primitive identifier that has been stored in association with the patch for the visibility testing for all sampling positions encompassed by the patch.

Again, therefore, similarly to the first and second embodiments of the technology described herein, the technology described herein according to these further embodiments helps to simplify and in an embodiment accelerate access to the set of primitive identifying information in such situations where it has been determined that the same primitive is visible for all sampling positions encompassed by a given patch. As mentioned above, this situation may be relatively common, e.g., and in particular, for simpler graphics scenes, where there are often relatively larger primitives. Further, especially where higher sampling rates (e.g. 16× multisample anti-aliasing ("MSAA") techniques) are used, there may be a larger number of sampling positions encompassed by a given patch of the render output, such that the technology described herein according to these further embodiments can signify improve throughput, e.g. at least compared to having to write the same primitive identifier in full to every sampling position encompassed by the patch.

Accordingly, the technology described herein also extends according to further embodiments to such approaches where respective per-patch indicators are used to track instances where a single primitive is visible for all sampling positions encompassed by a patch, and wherein such indicator(s) can then be used during the subsequent second, main pass operation to identify instances where the same (single) primitive identifier can, and therefore should, be used (or re-used) for the visibility testing during the second, main pass operation for all of the sampling positions encompassed by the patch.

A further embodiment of the technology described herein comprises a method of operating a graphics processor to generate a render output in which, for the purposes of generating a render output, the render output is divided into a plurality of patches, the method comprising:

for a sequence of primitives to be rendered for a render output:

performing a first, pre-pass operation in which primitives in the sequence of primitives to be rendered are processed by rasterising the primitives into respective sets of one or more fragments, each fragment associated with a respective set of one or more sampling positions within the render output, wherein as part of the first, pre-pass operation fragments for primitives in the sequence of primitives are processed to determine "visibility" information for the sequence of primitives, the determined visibility information comprising a set of primitive identifying information that is capable of storing respective primitive identifiers for respective sampling positions within the render output, the primitive identifier stored for a respective sampling position indicating which primitive should be further processed for the sampling position, the set of primitive identifying information thus being usable during a subsequent visibility testing operation to determine which primitives should be processed further for which sampling positions within the render output, wherein respective patches of the render output are further associated with respective indicators that can be used to indicate that the same primitive is visible for all sampling positions encompassed by the patch, wherein when it is determined during the first, pre-pass operation that a primitive that fully covers a given patch of the render output would be visible based on the visibility information that has been determined so far, the method comprises updating the respective indicator for that patch of the render output to indicate that the same primitive is visible for all sampling positions encompassed by the patch, and storing in association with the patch a respective primitive identifier for the primitive in question, the method further comprising:

thereafter performing a second, main pass operation in which visibility testing is performed to determine which primitives in the sequence of primitives should be further processed for which sampling positions within the render output, wherein the visibility testing comprises testing a primitive identifier associated with the fragment being tested against a corresponding primitive identifier stored for the sampling position or positions to which the fragment relates to determine whether or not the primitive being tested should be processed further, and wherein when the respective indicator for a given patch indicates that the same primitive is visible for all sampling positions encompassed by the patch, the visibility testing uses the primitive identifier that is stored in association with the patch for all sampling positions encompassed by the patch.

A yet further embodiment of the technology described herein comprises a graphics processor operable to generate a render output in which, for the purposes of generating a render output, the render output is divided into a plurality of patches, the graphics processor comprising a rendering circuit that is configured to:

for a sequence of primitives to be rendered for a render output:

perform a first, pre-pass operation in which primitives in the sequence of primitives to be rendered are processed by rasterising the primitives into respective sets of one or more fragments, each fragment associated with a respective set of one or more sampling positions within the render output, wherein as part of the first, pre-pass operation fragments for primitives in the sequence of primitives are processed to determine "visibility" information for the sequence of primitives, the determined visibility information comprising a set of primitive identifying information that is capable of storing respective primitive identifiers for respective sampling positions within the render output, the primitive identifier stored for a respective sampling position indicating which primitive should be further processed for the sampling position, the set of primitive identifying information thus being usable during a subsequent visibility testing operation to determine which primitives should be processed further for which sampling positions within the render output, wherein respective patches of the render output are further associated with respective indicators that can be used to indicate that the same primitive is visible for all sampling positions encompassed by the patch, wherein when it is determined during the first, pre-pass operation that a primitive that fully covers a given patch of the render output would be visible based on the visibility information that has been determined so far, the respective indicator for that patch of the render output is updated accordingly to indicate that the same primitive is visible for all sampling positions encompassed by the patch, and a respective primitive identifier for the primitive in question is stored in association with the patch, the graphics processor further configured to cause the rendering circuit to:

thereafter perform a second, main pass operation in which visibility testing is performed to determine which primitives in the sequence of primitives should be further processed for which sampling positions within the render output, wherein the visibility testing comprises testing a primitive identifier associated with the fragment being tested against a corresponding primitive identifier stored for the sampling position or positions to which the fragment relates to determine whether or not the primitive being tested should be processed further, and wherein when the respective indicator for a given patch indicates that the same primitive is visible for all sampling positions encompassed by the patch, the visibility testing uses the primitive identifier that is stored in association with the patch for all sampling positions encompassed by the patch.

This approach according to these further embodiments of the technology described herein can thus simplify both the updating of the set of primitive identifying information during the first, pre-pass operation and also the subsequent access of such data for the visibility testing during the subsequent second, main pass operation, at least in the situation where one or more patches are fully covered by a primitive, as in that case the (same, in an embodiment single) primitive identifier that is stored in association with the patch can then be used for the visibility testing for all sampling positions encompassed by the patch.

That is, when the respective indicator for a given patch indicates that the same primitive is visible for all sampling positions encompassed by the patch, the graphics processor can accordingly determine on this basis that the same (single) primitive identifier that is stored in association with the patch can, and therefore should, be used for the subsequent visibility testing during the second, main pass operation for all of the sampling positions encompassed by the patch.

Accordingly, by tracking instances where it is determined that the same primitive is visible for all sampling positions encompassed by a particular patch in the manner described above, this can then facilitate an improved, e.g. more efficient, operation, e.g., and in an embodiment, by enabling in such cases the writing and reading of only a single primitive identifier that can then be used for all sampling positions encompassed by the patch.

Thus, according to these further embodiments of the technology described herein, as discussed above, a respective indicator is provided per patch of the render output that can be used to indicate that the same primitive is visible for all sampling positions encompassed by the patch. As mentioned above, each patch in an embodiment has its own respective indicator.

The indicator that is used to indicate for a respective patch that the patch is fully covered by a primitive may itself take any suitable and desired form.

For example, in an embodiment, the indicator may comprise a flag that can be set accordingly to indicate instances where the same primitive is visible for all sampling positions encompassed by the patch. For example, the flag may, e.g., and in an embodiment does, comprise a binary flag, e.g. a single bit, that is associated with the patch (with each respective patch in an embodiment having its own respective flag, e.g. bit, for this purpose). In that case, the flag may be, and in an embodiment is, set to a first state (e.g. set 'high', e.g. by setting the bit to '1') to indicate that the same primitive has been found to be visible for all sampling positions encompassed by the patch, whereas when the flag is set to a second, different state (e.g. is set 'low', e.g. by clearing the bit to '0') this then indicates that the same primitive is not visible for all sampling positions encompassed by the patch (such that individual primitive identifiers should be (and are) stored for use for the different individual sampling positions encompassed by the patch).

This then allows a particularly efficient mechanism for tracking the fully covered status of the patches. However, in general, the flag may be more or less complex as desired and other arrangements would of course be possible.

Thus, in embodiments, respective patches of the render output are associated with respective flags that can be used to indicate that the same primitive is visible for all sampling positions encompassed by the patch, the respective indicator that is updated for a given patch thus comprising a respective flag associated with that patch.

Thus, in embodiments, the method comprises: when it is determined during the first, pre-pass operation that a primitive that fully covers a given patch of the render output would be visible based on the visibility information that has been determined so far: setting the respective flag for the patch to indicate that the same primitive is visible for all sampling positions encompassed by the patch. In that case, the method may accordingly further comprise: during the second, main pass operation: when the respective flag is set for a given patch to indicate that the same primitive is visible for all sampling positions encompassed by the patch, using the primitive identifier that is stored in association with the patch for the visibility testing for all sampling positions encompassed by the patch.

The indicator can thus be updated (e.g. the flag can be set) during the first, pre-pass operation when a primitive is determined to be visible at all the sampling positions encompassed by the patch based on the visibility information determined so far (i.e. based on the processing of primitives in the sequence of primitives by the first, pre-pass operation up to that point). In that case, when it is determined during the first, pre-pass operation that a primitive that fully covers a given patch of the render output would be visible based on the visibility information that has been determined so far, the indicator can be updated accordingly to reflect that the same primitive identifier should be used for the subsequent visibility testing for all of the sampling positions encompassed by the patch, and instead of then writing the (same) primitive identifier into the set of primitive identifying information in respect of each of the individual sampling positions encompassed by the patch, the primitive identifier is suitably stored in association with the patch, in an embodiment such that only a single instance of the primitive identifier is stored in association with the entire patch.

Subject to the particular requirements of the technology described herein, the primitive identifier can be stored in association with the patch in any suitable and desired manner.

For example, in an embodiment, the primitive identifier is stored in the set of primitive identifying information, e.g., and in an embodiment, in a respective entry of the set of primitive identifying information that is associated with the first (e.g. 'top left') sampling position encompassed by the patch. When the respective indicator is set, this then causes the graphics processor to use the primitive identifier stored in that entry for the subsequent visibility testing equivalently for all of the sampling positions encompassed by the patch.

Other arrangements would of course be possible. For instance, the primitive identifier could in general be written to a respective entry associated with any of the sampling positions encompassed by the patch so long as this is done in a predefined manner such that the graphics processor can obtain the primitive identifier appropriately for the visibility testing. Alternatively, the primitive identifier could be stored in a separate data structure that is provided for this purpose and that is only populated in such situations where it has been determined that the same primitive identifier should be used for all sampling positions encompassed by a given patch (and correspondingly is only accessed during the second, main pass operation when the respective indicator is updated for a given patch).

As mentioned above, during the visibility testing that is performed during the subsequent second, main pass operation, when testing a particular fragment, when it is determined that the respective indicator for the patch encompassing the sampling position or positions to which the fragment relates indicates that the same primitive is visible for all sampling positions encompassed by the patch (e.g. when the indicator is updated to reflect this, e.g. the flag is set), the visibility testing then uses the (same, single) primitive identifier that is stored in association with the patch for the fragment (and this same primitive identifier value is used for fragments relating to any and all sampling position encompassed by the patch).

Thus, for a fragment that relates to a sampling position (or set of sampling positions) that is encompassed by a patch for which the respective indicator is set to indicate that the same primitive is visible for all sampling positions encompassed by the patch, the visibility testing for the fragment in question uses the primitive identifier that is stored in association with the entire patch (i.e. rather than attempting to use a primitive identifier stored for the individual sampling position or positions to which the fragment relates).

On the other hand, when the respective indicator for a given patch does not indicate that the same primitive is visible for all sampling positions encompassed by the patch (i.e. the flag is not set), the visibility testing should then use the primitive identifier that is stored in the set of primitive identifying information for the individual sampling position or positions to which the fragment relates, e.g. in the 'normal' manner for the visibility testing described above.

According to the further embodiments of the technology described herein, the respective indicator for a given patch is thus updated during the first, pre-pass operation when it is determined that a patch is fully covered by a primitive in the sequence of primitives. If the entire patch is subsequently overwritten by another (later) primitive in the sequence of primitives, in that case there is no need to update the indicator (e.g. the flag can remain set), as the patch is still fully covered, but the primitive identifier that is stored in association with the patch should be (and in an embodiment therefore is) updated accordingly to reflect that a different primitive has been determined to be visible for all sampling positions encompassed by the patch.

On the other hand, if the first, pre-pass operation determines that the patch is only partially overwritten by a subsequent primitive in the sequence of primitives, in that case the respective indicator for the patch should be updated to indicate that it is no longer the case that the same primitive identifier should be used for all sampling positions encompassed by the patch (e.g. the flag should be cleared or re-set).

In that case, the primitive identifier that is stored in associated with the patch (i.e. the primitive identifier for the most recent visible primitive in the sequence of primitives that was determined to fully cover the patch) is in an embodiment read at that point and that primitive identifier is then written to all sampling positions that are not overwritten by the new primitive, whereas the new primitive identifier is in an embodiment written to all sampling positions that are covered by the new primitive. The updating of the set of primitive identifying information at this point in response to determining that a patch that was previously determined to be fully covered has been partially overwritten by a subsequent primitive in the sequence of primitives can be done in any suitable and desired manner, including in the manner of the first and second embodiments described above, for example.

Thus, if a given patch is fully covered by a primitive, the respective indicator associated for that patch can be set to indicate this, and the primitive identifier accordingly stored in association with the patch (and in an embodiment stored only once in association with the patch). In many cases the patch will not then be overwritten, or will only be overwritten by subsequent primitives that also fully cover the patch, in which case the primitive identifier for the new fully-covering primitive should be stored as needed, but the indicator does not need to updated (e.g. the flag can remain set), as the status of the patch as being fully covered by a single, visible primitive has not changed. That is, it is only if the patch is subsequently partially overwritten that the indicator may need to be updated (e.g. the flag cleared) and respective individual primitive identifiers stored for individual sampling positions.

If during the first, pre-pass operation, the same patch is then fully overwritten again by a later primitive, the respective indicator can be updated accordingly (e.g. by clearing or re-setting the flag), and the primitive identifier stored in association with the patch, in the same manner as described above for the first fully covering primitive. In that case, the per-sampling position entries in the set of primitive identifying information could be cleared. However, this is not necessary, and the values could be left as they are, as the flag being set means that the subsequent visibility testing during the second, main pass will anyway disregard these values (and will instead use the primitive identifier that has been stored in association with the entire patch for this purpose).

Subject to the particular requirement of these further embodiment of the technology described herein, the graphics processor may otherwise be operated in any suitable and desired manner. In particular, the configuration of the first, pre-pass operation and second, main pass operation may be, and in an embodiment are, generally performed as described above in relation to the first and second embodiments of the technology described herein. That is, the processing that is performed during the first, pre-pass operation and second, main pass operation may, subject to the particular requirements of the technology described herein, otherwise be performed in the same manner described above.

Likewise, the set of primitive identifying information may generally be configured as described above in relation to the first and second embodiments of the technology described herein. Thus, the set of primitive identifying information may, and in an embodiment is, also capable of storing respective per-patch "minimum" (or "maximum") primitive identifiers, e.g. as describe above.

Various arrangements would be possible in this regard.

Thus, the graphics processor according to these further embodiments of the technology described herein may generally comprise any features, and may generally be operated in the same manner, according to any embodiments described in relation to the first and second embodiments of the technology described herein, at least to the extent these are not mutually exclusive.

That is, as will be appreciated by those skilled in the art, these further embodiments of the technology described herein can, and in an embodiment do, comprise any one or more or all of the optional features of the technology described herein described herein, as appropriate.

The render output to be generated and that is divided into patches for the purposes of the rasterisation process in the technology described herein, according to any of the embodiments described above, may comprise any render output that is to be generated by the graphics processing system (pipeline). Thus it may comprise, for example, a tile to be generated in a tile-based graphics processing system (pipeline), and/or a frame of output fragment data.

The patches that the render output is divided into for the purposes of the technology described herein can be selected as desired. Each patch within a given level of patches should represent a respective different region (area) of the render output to be generated. The patches in an embodiment each correspond to a plurality of sampling positions of the render output to be generated.

The render output is divided into at least (but in an embodiment more than) two levels of patches. For example, the render may be divided into a plurality of largest (or "first level") patches. Each of these first level patches may then encompass a set of smaller second level patches. Each of these second level patches may then encompass a set of further smaller third level patches, and so on. In an embodiment, there are four levels of patches and, each of the largest (or first level) patches comprises an entire tile of a tile-based graphics processing system.

The patches that the render output is divided into for the purposes of the technology described herein in an embodiment (but not necessarily) all have the same shape. Each patch that the render output to be generated is divided into for the rasterisation process is in an embodiment a regularly shaped area of the render output. The patches are in an embodiment rectangular (e.g. square). Most in an embodiment, the patches are square. In an embodiment, all the patches at a given subdivision level have the same size, and in an embodiment also the same shape, as each other (i.e. in an embodiment cover the same number of sampling positions of the render output).

The respective sets of plural smaller patches of the render output that each larger patch of the render output is divided into (encompasses) may contain any desired (plural) number of smaller patches of the render output. Each set of plural smaller patches that a given larger, higher level patch encompasses in an embodiment comprises an integer number of plural smaller patches. In an embodiment, each larger patch is divided into a set of four smaller patches for the rasterisation process. In an embodiment, each larger patch is to be divided into (encompasses) a 2×2 set (array) of smaller patches.

Thus, in an embodiment, the patches are arranged such that a (and each) larger patch encompasses (and will accordingly be subdivided into) a set four smaller patches, with each smaller patch being a quarter of the size of the larger patch.

Varying the patch sizes by a factor of 4 in each successive subdivision level is a particularly convenient arrangement for progressively decreasing the patch size as the process proceeds. However, it is not essential and other arrangements could be used if desired.

Each patch of the render output that is tested in an embodiment corresponds to an integer number of fragments, such as 64×64, 32×32, 16×16, 8×8, 4×4 and/or 2×2 fragments. In an embodiment, the largest patches each correspond to 64×64, fragments (which corresponds to the size of a respective rendering tile according to the embodiment), but other arrangements would of course be possible.

Each fragment in an embodiment represents sampling points (or sets of sampling points) of an array of sampling points covering the area of the render output to be generated. Each fragment may represent (have associated with it) a single sampling point, or plural sampling points, as desired. In an embodiment, each fragment represents a set of plural, in an embodiment a set of four (and in an embodiment a 2×2 array of), sampling points.

The set of primitive identifying information could store minimum (and in an embodiment maximum) primitive identifiers for only one level of patches (e.g. the largest patch level), but in an embodiment minimum (and in an embodiment maximum) primitive identifiers can be stored for more than one level of patches (e.g., and in an embodiment, for any one of the set of smaller patches which the largest patch encompasses (wherein each of the smaller patches themselves then encompasses sets of further smaller patches)). In an embodiment a minimum (and in an embodiment maximum) primitive identifier is stored for each patch at each level of subdivision of the render output. Other arrangements would however be possible.

In an embodiment, the set of primitive identifying information is able to, and does, store primitive identifiers both for individual sampling positions and for larger patches of sampling positions. For example, in some embodiments, when a primitive is determined to be visible for a patch of sampling positions, the corresponding entries for that patch (i.e. the "minimum primitive" and in an embodiment also "maximum primitive" identifiers) are updated accordingly to record the primitive identifier for the primitive in question, and the primitive identifier is also stored appropriately in the corresponding entries for any lower level patches of the render output encompassed by the patch, and also for each of the sampling positions encompassed by the patch. That is, when a primitive causes an update to the set of primitive identifying information in respect of a patch encompassing plural sampling positions, the set of primitive identifying information should accordingly be updated at that point to reflect that (based on the visibility information generated so far) that the (same) primitive should survive for each of the sampling positions encompassed by the patch (although the primitive may subsequently be overwritten for at least some of the sampling positions by later primitives in the sequence of primitives to be processed).

Subject to the requirements of the technology described herein, the layout of the set of primitive identifying information may be arranged as desired. Thus, the per-sampling position primitive identifiers and the per-patch primitive identifies may be stored in any suitable manner within the set of primitive identifying information. For example, they may be stored separately, e.g. in different portions (different buffers) of an overall set of primitive identifying information, or may be stored together. Various other arrangements would be possible in this regard.

Subject to the requirements of the technology described herein, the pre-pass and main pass operations may comprise any suitable and desired processing operations.

In an embodiment, the set of primitive identifying information is generated during the first, pre-pass operation based on the fragment depth values, in particular by depth testing the fragments against a corresponding depth buffer for the sequence of primitives, and updating the depth buffer accordingly (as needed) depending on the result of the depth testing. The actual depth testing can be performed in any suitable and desired manner, e.g. in the manner in which it is normally performed. Typically this involves testing a depth value for the (current) fragment against a corresponding depth value stored for the corresponding sampling position in a depth buffer, and when a fragment passes (survives) the depth testing, updating the depth buffer accordingly. In such case, when a fragment cause the depth buffer to be updated (such that the fragment will be visible, at least based on the current state of the depth buffer), a corresponding update can be made to the set of primitive identifying information.

Thus, in embodiments, the first, pre-pass operation comprises a sequence of operations including, in an embodiment in this order, rasterising primitives into respective sets of fragments for processing, depth testing the fragments using a depth buffer for the sequence of primitives, and updating the depth buffer, if necessary. The first, pre-pass operation in an embodiment further comprises updating the set of primitive identifying information for the sequence of primitives. The set of primitive identifying information is in an embodiment updated (and hence generated) 'on the fly' during the first, pre-pass operation. For example, and in an embodiment, whenever a fragment causes an update to the depth buffer, the primitive identifier associated with fragment is in an embodiment written to the corresponding entry or entries in the set of primitive identifying information. Thus, the same entry may be overwritten if the sampling position is subsequently determined to be covered by a later primitive in the sequence of primitives. Thus, at the end of the first, pre-pass, there is in an embodiment generated a depth buffer storing respective depth values for the sampling positions within the render output, and the set of primitive identifying information storing respective primitive identifiers identifying the primitives (and hence fragments) that are to be further processed for the sampling positions within the render output. In some embodiments the processing for a fragment during the first, main pass stops after the depth buffer and set of primitive identifying information are updated (if necessary). That is, in some embodiments, the first, pre-pass operation in an embodiment comprises (early) depth testing the fragments, but does not, e.g., execute a fragment shader (or therefore perform late depth testing). In that case, if a primitive requires fragment shading to determine its coverage, the primitive may be treated as being incompatible with the pre-pass (and instead subsequently processed by a third, "fallback" mode of operation, as will be discussed further below). In other embodiments however the fragment processing may continue beyond the depth testing and resulting updating of the depth (and optionally also stencil) buffer and the set of primitive identifying information. For example, in some embodiments, a (partial) fragment shader could be executed, and the depth (and optionally also stencil) buffer and the set of primitive identifying information updated accordingly after the fragment shading, as will be explained further below.

In embodiments the first, pre-pass operation further comprises a step of primitive classification, or checking primitive classification, the purpose of which will be explained in more detail below. This is in an embodiment performed prior to rasterisation but in general may take place at any suitable and desired point during the pre-pass operation.

As mentioned above, the set of primitive identifying information stores, in an embodiment on a per-sampling position basis, a set of primitive identifiers indicating which primitives (and hence which fragments) should be further processed for the respective sampling positions in the render output. Thus, in embodiments, the set of primitive identifying information is capable of storing a respective primitive identifier for each sampling position within the render output.

The primitive identifiers stored in the set of primitive identifying information in an embodiment uniquely identify primitives within the sequence of primitives. It will be appreciated that an application requiring graphics processing will typically also specify global primitive identifiers and these application-specified primitive identifiers could be used for the purposes of the technology described herein. However, the primitive identifiers specified by an application are typically in the form of relatively larger 32-bit values and storing these may therefore require a larger set of primitive identifying information than is necessary for processing the sequence of primitives. Additionally, from the application's perspective, the primitive identifier lasts only for a single draw call, whereas a rendering pass may constitute multiple different draw calls. Thus, in embodiments the primitives are re-indexed within the sequence of primitives for the purposes of the technology described herein, and the primitive identifiers that are stored/used for the set of primitive identifying information thus uniquely identify primitives within the sequence of primitives that is being processed (but do not necessarily uniquely identify the primitives globally). The method may thus in an embodiment comprise a step of re-indexing the primitives within the sequence of primitives. The re-indexing of the primitives is in an embodiment performed as the primitives are obtained for processing (e.g. from a primitive list reader in a tile-based rendering system). This helps reduce the size of the primitive identifiers and hence advantageously reduces the size of the set of primitive identifying information (e.g., and in an embodiment, such that the set of primitive identifying information for a sequence of primitives can be stored locally, e.g. on-chip, and discarded once the processing of the sequence of primitives is complete, without having to write to external memory).

If a sampling position is not covered by any primitives, a suitable value is in an embodiment recorded in the set of primitive identifying information to indicate this. The particular value that is recorded to indicate that a sampling position is not covered does not matter as such and any suitable default or null value can be used as desired. For example, in an embodiment, the value 'zero' may be used to indicate that there is no primitive coverage at a given sampling position. In that case, the primitives are in an embodiment indexed within the sequence of primitives starting from 'one' (such that the first primitive in the sequence may be identified as primitive 'one', the second primitive identified as primitive 'two', and so on). Various other arrangements would however be possible.

Thus, in embodiments, the set of primitive identifying information stores either a respective primitive identifier or a value indicating that the sampling position is not covered by any primitives for each sampling position within the render output.

In an embodiment the primitive identifiers for the sequence of primitives monotonically change within the sequence of primitives from a particular starting value. For example, in embodiments, the primitive identifiers monotonically increase from zero. However, it may also be possible for the primitive identifiers to monotonically decrease from a particular maximum value. This has the benefit that it can be ensured that the primitive identifier stored in the set of primitive identifying information represents the first (i.e. 'oldest') primitive in the sequence of primitives that is guaranteed to be visible at that sampling position based on the visibility information generated so far. This may in turn help manage processing of, e.g., fragment processing dependencies, in particular, for fragments that do not update the depth buffer and that cannot be culled against the set of primitive identifying information (such as fragments for (e.g.) transparent primitives that are not substantially processed during the first, pre-pass operation).

For instance, if a primitive cannot write to the depth buffer (e.g. writes to the depth buffer are disabled), which may be the case for certain types of transparent primitive, for example, the primitive could in that case (and in some embodiments is) treated as being incompatible with the two stage pre-pass operations according to the technology described herein, and is instead in an embodiment subsequently processed by a third, "fallback" mode of operation, as will be described further below. However, it may still be possible to process such primitives in the manner described above, and in some embodiments this is therefore done. Because such primitives do not (and cannot) generate visibility information, there is no need to process the primitive in the first, pre-pass, and so in an embodiment such primitives that cannot generate visibility information skip the first, pre-pass operation and are instead processed only during the second, main pass operation.

In such case, as alluded above, it may be appropriate to use a different fragment visibility test function when processing such primitives in the second, main pass (since they would necessarily fail the 'equals' test and may therefore be incorrectly culled on that basis). Thus, in embodiments, for any primitives that cannot generate visibility information during the first, pre-pass, but are still to be processed in the second, main pass (and in an embodiment that are therefore only processing in the second, main pass), the fragment visibility testing comprises determining whether the primitive identifier (for the primitive) associated with the fragment is greater than the primitive identifier stored in the corresponding entry in the set of primitive identifying information. This however relies on the primitive identifiers monotonically increasing within the sequence of primitives. For example, in that case, if a fragment is associated with a primitive having a larger primitive identifier than the corresponding identifier stored in the set of primitive identifying information for the corresponding sampling position, the graphics processor can safely render the transparent fragment as the fragment identified in the set of primitive identifying information will already have been processed.

In that case, however, it is not known during the second, main pass whether a fragment for the primitive lies in front or behind the fragment for the primitive that is identified in the set of primitive identifying information. Thus, for fragments for which the fragment visibility test function is set to be a 'greater than' test function, a fragment passing the 'greater than' visibility test could either be in front or behind the fragment that is identified in the set of primitive identifying information for the sampling position(s) in question. Thus, for primitives (fragments) for which the fragment visibility test function is set to 'greater than', it may be desired to also perform depth testing during the main pass (but in an embodiment without updating the depth buffer), to allow such fragments to be culled based on their depth values. Thus, in embodiments, for fragments for which the fragment visibility test function is set to be a 'greater than' test function, depth testing is also performed during the second, main pass. This depth testing is in an embodiment performed subsequent to the fragment visibility testing. On the other hand, the primitive classification is in an embodiment performed such that if such fragments fail the 'greater than' visibility test, indicating that the (primitive sequence) position of the associated primitive in the sequence of primitives is before the position of the primitive that is identified to be rendered in the set of primitive identifying information, it is safe to cull the fragment (and this is therefore done) (e.g. this may be the case for transparent primitives so long as they do not write depth/stencil, in which case the visibility should be determined based on rendering order, and if the transparent fails the greater than test it is guaranteed that it will be overwritten by a later primitive).

Various other arrangements would be possible in this regard.

The set of primitive identifying information as a minimum stores primitive identifiers. In some embodiments, the set of primitive identifying information may also store visibility information pertaining to larger units of graphics processing, such as for groups of primitives (e.g. a draw call). The set of primitive identifying information may also in general store any other suitable information, as desired, for example, including any suitable descriptors or flags that may be useful for controlling further processing of primitives for respective sampling positions within the render output. Thus, the set of primitive identifying information may in general store any other suitable information that may desirably be stored.

The set of primitive identifying information is in an embodiment thus generated in this way during the first, pre-pass operation and is usable to control the fragment processing during the second, main pass operation.

In an embodiment the set of primitive identifying information is stored locally to the graphics processor, and in an embodiment the set of primitive identifying information is not written to external memory. Thus, the set of primitive identifying information is in an embodiment consumed during the second, main pass operation (during a visibility testing step) and then discarded once the processing of the sequence of primitives to which the set of primitive identifying information relates is complete, e.g., and in an embodiment, without writing the set of primitive identifying information out to external memory. The set of primitive identifying information is therefore in an embodiment designed and sized to be able to fit within local storage to prevent having to ever write the set of primitive identifying information out to external memory. There may however be some cases where it is desired to write out the set of primitive identifying information, in which case this may be done.

Embodiments of the technology described herein relate to tile-based rendering. Thus, in embodiments the graphics processor is configured to perform tile-based rendering. The graphics processor may therefore have any suitable and desired processing stages and/or elements that a graphics processor may have when performing tile-based rendering.

When processing a render output in such tile-based rendering systems, an initial tiling operation is performed in order to sort the geometry, which is defined in terms of a set of primitives to be processed for the render output, relative to the rendering tiles into which the render output is subdivided for rendering. The result of this tiling operation is to generate a set of primitive lists indicative of the distribution of the primitives relative to the tiles that can be used to identify which primitives are to be rendered for which tiles. The actual rendering of the tiles is then performed in a subsequent rendering operation, with the tiles in an embodiment being rendered separately, e.g. one after another.

The operation of the technology described herein is in an embodiment performed as part of the tile rendering operations performed in response to the graphics processor receiving a command to render a tile. That is, the "pre-pass" operation is in an embodiment performed within a rendering tile. The sequence of primitives that are processed in the manner described above therefore in an embodiment correspond to a sequence of primitives to be rendered for a respective rendering tile (e.g. as identified using one or more primitive lists associated with that tile that have been generated during the tiling operations).

In an embodiment the rendering of primitives in the manner of the technology described herein, including the pre-pass operation, can be (and in an embodiment is) initiated automatically as part of the rendering operations that are performed in response to the graphics processor receiving and processing a command to render a tile. The rendering of primitives in the manner of the technology described herein, including the pre-pass operation, is therefore in an embodiment performed under full control of the graphics processor (e.g. rather than having a software application configured to render the entire scene twice).

That is, when (e.g., and in an embodiment, whenever) a new sequence of primitives for a tile is issued for rendering, in response to a command to render a tile, the graphics processor is in an embodiment configured to automatically initiate a "pre-pass" operation for processing the primitives. Further, this can be (and in an embodiment is) done entirely within the rendering stage of a tile-based rendering system, and so after the initial geometry processing to generate the tile-lists has been completed. This approach can provide various benefits.

For example, in a tile-based rendering system, a command processing circuit (command stream frontend) of the graphics processor will typically receive a stream of commands to control the operation of the graphics processor. In particular, when performing tile-based rendering, the stream of commands will in an embodiment include a first set of commands to cause the graphics processor to perform the initial geometry processing (tiling) to sort the primitives into respective primitive lists and a second set of commands to cause the graphics processor to subsequently render the tiles accordingly using the primitive lists. A respective rendering command may thus be, and in an embodiment is, provided in respect of each of the tiles into which the render output is sub-divided, wherein when such command is processed, the graphics processor is caused (by processing further commands) to identify the primitives to be rendered for the tile in question and then render the primitives in turn.

The commands are in an embodiment generated by a, e.g., main (e.g. host) processor (e.g. a CPU) that requires the graphics processing to be performed. In particular, the command streams (commands) may be generated by a driver for the graphics processor. The rendering command that triggers the pre-pass operation of the technology described herein may thus comprise a command that has been generated by the driver. In embodiments the driver-generated commands are further processed by the command processing circuit (command stream frontend) of the graphics processor to schedule processing work for the graphics processor. Thus, the command processing circuit (command stream frontend) of the graphics processor may also generate based on the driver-generated commands further 'commands' (tasks) for the graphics processor. The rendering command that that triggers the pre-pass operation of the technology described herein could thus also comprise a command that is generated by the command processing circuit (command stream frontend) of the graphics processor. Various arrangements would be possible in this regard.

By configuring the graphics processor to automatically perform such a pre-pass operation as part of the rendering operations that are performed in response to a command to render a tile, the processing can be more efficiently managed in hardware, as the control of the pre-pass is performed entirely by the graphics processor, e.g., and in an embodiment, without user specification. This therefore reduces the burden on the application programmer as the graphics processor (hardware) is configured to automatically perform the pre-pass operation to achieve hidden surface removal for whatever sequence of primitives are drawn for the scene, as part of the standard rendering operations performed in response to a command to render a tile.

This however means that the graphics processor should be, and in an embodiment is, able to handle all different types of primitives (and different primitive properties) that may be specified by an application including any potential side effects that may be associated with the processing of primitives using a pre-pass operation according to the technology described herein.

In this respect, the Applicants further recognise that it may not be appropriate, or possible, to process each and every primitive in a sequence of primitives in the manner described above by rendering the primitives in two separate passes, e.g. as there may be some primitives that are not compatible with being processed in two separate steps (such that they are incompatible with the pre-pass operation of the technology described herein).

There are various examples of why this might be the case but in general this may be because the properties of the primitive (as specified by the application) mean that the processing that is performed during the first, pre-pass operation might potentially introduce some side effect which means that if the primitive were then processed again during the second, main pass, this could introduce artefacts into the final render output. Examples might be where the primitives are transparent (particularly if the transparent primitive can still generate visibility information, e.g. can still write to the depth buffer, as in that case the transparent primitive should not be stored in the set of primitive identifying information as there may also be a corresponding opaque primitive underlying the transparent primitive that still needs to be rendered and might therefore incorrectly be culled if the transparent primitive is stored in the set of primitive identifying information. Thus, in an embodiment, the set of primitive identifying information only stores primitive identifiers for opaque primitives), wherein certain types of stencilling are required, or generally where a primitive needs to read from a buffer to determine its final render output coverage. A further example might be where a fragment shader needs to be run in order to determine the coverage associated with the primitive. In that case, if fragment shading is not enabled during the first, pre-pass operation, the pre-pass could erroneously decide that the primitive could be culled. Various other examples would be possible in this respect, e.g. depending on the specific processing that is performed during the respective processing passes.

Thus, there may be various different types of primitives that may be encountered when processing a sequence of primitives (a tile) and in order to meet the various API requirements the graphics processor should be, and in an embodiment is, able to handle all different types of primitive accordingly, without introducing artefacts.

To address this, and allow the technology described herein to be effectively used for all different types of primitives that may be defined for a render output, a "fallback" operation is in an embodiment provided such that, when the graphics processor is performing the pre-pass operation on a sequence of primitives, if a primitive is encountered during the pre-pass operation that is determined to be incompatible with being processed in this way (e.g. since it cannot be ensured that the primitive can be processed in two separate passes without potentially introducing artefacts), the pre-pass operation is not performed at least in respect of that primitive, and the incompatible primitive is instead subsequently processed (i.e. rasterised and (if necessary) rendered) with the graphics processor operating in a third, "fallback" mode of operation. In this case the pre-pass operation may not be performed only for the incompatible primitive, or the pre-pass operation may not be performed for all following primitives in the sequence (such that the pre-pass operation is effectively stopped at the primitive that was determined to be incompatible), as will be explained further below.

By providing this third, fallback mode of operation, this then ensures that any primitives that cannot (safely) be rendered in two separate passes can still be efficiently and automatically handled by the graphics processor without risking introducing any errors or artefacts into the final render output. For instance, the third fallback mode of operation is in an embodiment configured to be able to process (render) primitives in a 'fail-safe' manner, e.g. by rasterising and rendering (as necessary) the primitives to determine corresponding rendered output values in a single rendering operation, e.g. in the normal manner for a rasterisation-based rendering system.

Thus, in embodiments, the method further comprises determining that a primitive in the sequence of primitives being processed during the first, pre-pass operation is incompatible with being processed by the first, pre-pass operation; stopping (not performing) some or all of the first, pre-pass operation in respect of that primitive; and subsequently processing the primitive that was determined to be incompatible with the first, pre-pass operation in a third, fallback mode of operation.

In an embodiment it is determined for each primitive that is to be processed during the first, pre-pass operation whether or not the primitive is compatible with being processed by the first, pre-pass operation. To facilitate this, a primitive classification step may be performed that determines based on one or more properties of the primitive whether or not the primitive is compatible with being processed by the first, pre-pass operation.

This primitive classification could be performed at run-time, e.g. as part of the rendering operation, e.g., and in an embodiment, as part of the pre-pass operation. However, in general, it will be known in advance whether or not a primitive is incompatible with the pre-pass operation. There may be some conditions that can only be checked at run-time, and in that case, at least that part of the primitive classification should therefore be performed at run-time. However, there may be at least some conditions for which, in general, it may be known in advance (e.g. at compile time) whether or not any such condition(s) are met by a primitive that would mean that the primitive is incompatible with the pre-pass operations of the technology described herein. Thus, in some embodiments, the primitive classification may be performed at least in part in advance, with the result of the primitive classification then being compiled into a single indicator, e.g. a flag, that indicates whether or not the primitive is compatible with the pre-pass operation. In that case, a step of primitive classification checking may be performed during the pre-pass operation that comprises using the indicator to determine whether or not the primitive is compatible with the pre-pass operation. Various arrangements would be possible in this regard.

Thus, when performing the pre-pass operation, so long as the primitives in the sequence are compatible with the pre-pass operation, the primitives are processed by the pre-pass operation to determine the desired set of primitive identifying information. That is, so long as the current primitive is compatible with the pre-pass operation, it is processed by the pre-pass operation, and so on, until the processing reaches the end of the sequence of primitives. The primitives are in an embodiment then processed again by the second, main pass operation with the processing of the primitives being controlled accordingly based on the determined set of primitive identifying information.

On the other hand, if a primitive in the sequence of primitives being processed is determined to be incompatible with the pre-pass operation, the pre-pass operation is then not performed for that primitive, and the primitive is instead subsequently processed by the fallback operation, as will be explained further below.

It will be appreciated that this overall approach including a fallback mode of operation that allows the pre-pass operation to be stopped when a primitive that is incompatible with being processed in this way may be particularly advantageous in the context of tile-based rendering where the pre-pass operation is controlled by the graphics processor as part of the tile rendering stage, since in that case if the fallback operation is initiated when rendering a particular tile, this does not necessarily impact the rendering of any other tiles, and once the current tile (including the incompatible primitive) has been processed, the processing of the next tile can re-start with a pre-pass operation, etc.

This is a further benefit therefore of performing the pre-pass operation within a tile, in response to a command to render the tile.

In general, and as will be discussed further below, a primitive may be determined to be incompatible with being processed by the first, pre-pass operation based on a suitable primitive classification (indicator) that can be set based on one or more properties of the primitive in question. For example, if a primitive requires a fragment shader to be executed in order to determine its fragment coverage, it may not be possible to process this primitive in the pre-pass if the pre-pass does not run a fragment shader. Another example would be when a transparent primitive is encountered as this may not update the visibility information and so could be incorrectly culled if processed in two stages according to the pre-pass operations of the technology described herein. Such primitives may therefore instead be processed in the third, fallback mode of operation to ensure the rendering of the primitive can continue appropriately even when the pre-pass cannot be performed. Various other examples of incompatible primitives may exist depending on the configuration of the graphics processor (and the pre- and main passes) as will be explained further below.

In an embodiment, therefore, when processing a sequence of primitives, it is checked for each primitive to be processed whether or not the primitive is compatible with being processed by the first, pre-pass operation. If the primitive is not compatible with being processed in this way, some or all of the first, pre-pass operation is then omitted in respect of that primitive. The primitive classification check may generally be performed as part of the pre-pass operation such that when a primitive is determined to be incompatible, the pre-pass operation is in an embodiment immediately stopped in respect of that primitive. In an embodiment, the primitive classification check is performed at the start of the pre-pass operation (e.g., and in an embodiment, before the rasterisation stage) so that the substantial pre-pass fragment processing, e.g. the processing to generate the visibility information, is not started if the primitive is incompatible with being processed in this way. However, in general the primitive classification check could be performed at any suitable point during the first, pre-pass operation, as desired.

The stopping of the pre-pass operation for a primitive in response to determining that the primitive is incompatible with the pre-pass operation can be performed in any suitable and desired manner. In an embodiment the pre-pass operation is stopped for the entire sequence of primitives.

For example, when an incompatible primitive is encountered during the pre-pass, the pre-pass processing operation for the sequence of primitives may be terminated at that point, e.g., and in an embodiment, with any suitable and desired pre-pass state (e.g. including the depth buffer and optionally also the set of primitive identifying information generated so far) being written out accordingly. In some cases the identity and/or position of the incompatible primitive that triggered terminating the pre-pass may also be written out at this stage (but generally this may not be necessary as the primitives are in an embodiment classified (as compatible or not) and can be identified as such during the second, main pass by performing a corresponding step of primitive classification checking as was performed in the first, pre-pass).

Thus, stopping the pre-pass for a primitive may in some embodiments comprise terminating the pre-pass operation for the primitive, and in an embodiment for the sequence of primitives, immediately at that point. Other arrangements would however be possible. For example, in an alternative embodiment, when the pre-pass processing operation for a primitive within the sequence of primitives is stopped, the processing of the sequence of primitives could continue, but with all outputs disabled, such that the first, pre-pass operation continues to the end of the sequence of primitives but without generating any further (visibility) information. This approach may be relatively easier to manage since it avoids having to stop processing and store out intermediate pre-pass state midway through a sequence of primitives. Various other arrangements for stopping the pre-pass are contemplated.

After the pre-pass operation has been stopped, the processing may continue in any suitable manner. In embodiments, however, when the pre-pass operation is stopped in respect of a primitive (an incompatible primitive) mid-way through a sequence the primitives, the second, main pass operation is then performed for the sequence of primitives, e.g., and in an embodiment, from the start, such that primitives that have been successfully processed by the first, pre-pass operation are then processed again by the second, main pass operation.

Thus, in embodiments, when an incompatible primitive is encountered, such that the first, pre-pass operation is stopped in respect of that primitive, a second, main pass is then performed to process the primitives in the sequence of primitives up to the position of the incompatible primitive. That is, when an incompatible primitive is encountered, such that the first, pre-pass operation is stopped in respect of that primitive, the processing of the sequence of primitives is in an embodiment then re-started from the beginning of the sequence to perform the second, main pass operation in respect of the sub-sequence of primitives that have been processed so far by the first, pre-pass operation.

The (same) primitives that were processed up to the position in the sequence of the incompatible primitive are thus processed again by the second, main pass operation, with the rendering of the primitives being controlled accordingly based on the visibility information determined during the first, pre-pass operation. When the second, main pass operation reaches the position in the sequence of the incompatible primitive, the processing in an embodiment then switches into the third, "fallback" mode of operation to process the incompatible primitive. In the fallback mode of operation the primitive is in an embodiment processed, e.g. according to a normal rendering operation, without any attempt to generate or use the "visibility" information of the technology described herein. Thus, when operating in the fallback mode of operation, primitives are in an embodiment processed in a 'fail-safe' manner, e.g., and in an embodiment, in which primitives rasterised and rendered (as necessary) in a single rendering operation, e.g. in the normal manner for rasterisation-based rendering.

The switching from the main pass into the fallback mode can be controlled in various different ways but in embodiments this is controlled by having the second, main pass also check the primitive classification to determine whether the primitives are incompatible with the pre-pass operation. That is, in embodiments, the primitive classification is used both in the pre-pass to determine whether the pre-pass should be stopped (such that a main pass is initiated) and also in the main pass to determine when the processing in the main pass has reached the incompatible primitive, at which point the graphics processor switches to the fallback mode in order to render the primitive in a 'fail-safe' manner. The primitive classification check in the second, main pass is in an embodiment performed in the same manner as the primitive classification check in the first, pre-pass. For instance, in an embodiment, the primitives are pre-classified, and the primitive classification check in both passes involves checking a suitable indicator, e.g. flag. However, this need not be the case. For instance, it is also contemplated above that the primitive classification could be performed on-the-fly during the first, pre-pass operation, in which case a result of the primitive classification could be stored for use in the primitive classification check for the second, main pass. Various other arrangements would be possible in this regard.

Thus, in embodiments, when it is determined whilst performing the first, pre-pass operation that a primitive in the sequence of primitives is incompatible with being processed by the first, pre-pass operation such that the first, pre-pass operation is stopped in respect of that primitive, the method comprises: re-processing the primitives in the sequence of primitives up to the primitive in the sequence of primitives immediately before (preceding) the primitive that was determined to be incompatible with the first, pre-pass operation by the second, main pass operation in order to complete the processing of those primitives; and when the second, main pass operation reaches the primitive in the sequence of primitives that was determined to be incompatible with the first, pre-pass operation, switching the graphics processor into a third, fallback mode of operation and processing that primitive in the fallback mode of operation.

In embodiments, once the rendering circuit switches to the third, fallback mode of operation, the processing continues in this state until the end of the (current) sequence of primitives. That is, once a first incompatible primitive is encountered within a sequence of primitives, the pre-pass operation is terminated in respect of the sequence of primitives including the incompatible primitive, and any remaining (following) primitives in the sequence are all processed in the third, fallback mode of operation. Thus, in embodiments, after switching the graphics processing into the third, fallback mode of operation, the method comprises continuing to process the remaining primitives in the sequence of primitives in the fallback mode of operation, until all of the primitives in the current sequence of primitives have been processed.

Once the sequence of primitives has been processed in full, a new sequence of primitives (which may, e.g. be a sequence of primitives to be rendered for a new tile, but could also, e.g., be a new draw call for the current tile, or other suitable new sequence of primitives) may be issued for rendering, and the processing of the new sequence of primitives can start in the pre-pass operation. Thus, in embodiments, after a (the current) sequence of primitives has been processed, the method comprises performing a (new) pre-pass operation for a new (different) sequences of primitives. In an embodiment the performing of the pre-pass operation for the new sequence of primitives is initiated in response to a command to render the new sequence of primitives (e.g. in the same manner described above). For example, in embodiments, the graphics processor may subsequently receive a command to render another sequence of primitives (e.g. another tile), and in response to the command to render the other sequence of primitives (e.g. tile), the method may comprise obtaining the sequence of primitives to be processed and then initiating a pre-pass operation to process primitives for the other sequence of primitives (e.g. tile). Various other arrangements would however be contemplated in this regard and at least some of the processing for different sequences of primitives may be interleaved or performed in parallel.

It is also contemplated however that after an incompatible primitive has been processed in the third, fallback mode of operation, the graphics processor may attempt to revert to the pre-pass operation when another (e.g. the next) compatible primitive is encountered. To facilitate this, the graphics processor (e.g., and in an embodiment, including a primitive list reading circuit thereof, in the case where the primitives to be rendered are identified from respective primitive list(s)) may be operable to re-start the processing of a sequence of primitives from an arbitrary position in the sequence (such that the processing can effectively fast forward through the sequence of primitives). Various arrangements are contemplated in this regard.

By allowing the graphics processor to fallback to processing primitives in the third, fallback mode, e.g. in a single pass, e.g. in the normal manner for a rasterisation-based rendering system, when an incompatible primitive is encountered, the graphics processor is thus able to identify and handle exceptional cases where a primitive is incompatible with being processed using the pre-pass operation of the technology described herein whilst still continuing rendering the primitives appropriately. This may then lose some hidden surface removal efficiency, but is beneficial in ensuring a safer and fully complaint hardware implementation.

It will be appreciated in this regard that which primitives are incompatible with being processed using the pre-pass operation of the technology described herein may depend on the configuration of the graphics processor, and in particular the configuration of the pre-pass operation, as alluded to above. For example, where it is necessary to execute a fragment shader to determine the coverage associated with a primitive, in some cases it may be appropriate to simply flag the primitive as incompatible, e.g. if the pre-pass does not execute a fragment shader at all. However, it would also be possible to configure the pre-pass to run at least a partial fragment shader in order to expose the pre-pass to enough information to generate the desired set of primitive identifying information, whilst in an embodiment still avoiding shading the fragments in full and writing out the corresponding (colour) values. Thus, in general, the pre-pass may be more or less complex as desired and accordingly may or may not be able to handle various different types of primitives.

Thus, depending on the configuration of the pre-pass operations, it may be possible to handle some side effects in the pre-pass and whether or not a given primitive is incompatible with the pre-pass will accordingly depend on exactly how the pre-pass is configured. There are various options in this regard to determine whether or not a given primitive is incompatible with the pre-pass. In general however it will be known in advance (e.g. at compile time) whether the properties of a primitive mean that the primitive should not be processed for the pre-pass operation and the graphics processor can therefore determine primitives as being incompatible with the pre-pass based on one or more properties of the primitives as desired and flag these primitives accordingly, as described above.

Thus, embodiments of the technology described herein comprise a novel fragment "pre-pass" operation that can be used to process primitives in a sequence of primitives to determine "visibility" information that can in turn be used to control the rendering of primitives in a second, main pass in order to avoid rendering in full any primitives (fragments) that do not contribute to the final render output. The visibility information is stored in a set of primitive identifying information which fragments can be (and are) subsequently tested against during the main pass to determine which fragments should be processed further to determine the final output values for the render output. In an embodiment this pre-pass operation is performed within a rendering tile in a tile-based rendering system.

In embodiments, a "fallback" mode is provided to allow the graphics processor to handle primitives that are not compatible with being processed in this manner.

The effect of all this is provide improved (and potentially sample-perfect) hidden surface removal, that can be more efficiently implemented in hardware.

Subject to the particular requirements of the technology described herein the graphics processor may otherwise be configured (and the method performed) in any suitable manner, as desired.

The graphics processor of the technology described herein in an embodiment comprises a geometry processing (tiling) circuit and a rendering circuit.

The geometry processing (tiling) circuit is configured to generate primitive lists. The sorting of the primitives relative to the tiles can be done in any suitable manner, e.g. in the normal way for generating primitive lists. The primitive lists may be prepared for any suitable regions of the render output. Thus, there may or may not be a one-to-one correspondence between the primitive lists and the actual rendering tiles.

Once all of the geometry has been processed, the primitive lists are in an embodiment then written out, e.g. to external (e.g. main) memory.

The primitive lists are then used during a subsequent rendering state in order to perform the actual rendering of the individual tiles. The rendering circuit of the graphics processor thus in an embodiment comprises a primitive list reading circuit that is configured to, when a tile is issued for rendering, identify using the respective primitive list or lists applying to the tile in question a sequence of primitives that should be processed for the tile.

The primitive list reading circuit is thus in an embodiment configured to obtain the primitive lists, e.g. from memory, identify a sequence of primitives that should be processed for the tile and issue the identified primitives for rendering. This may be done in any suitable and desired manner, e.g. depending on the format of the primitive lists. For example, where the primitive lists apply to hierarchically arranged regions of the render output (such that there is not necessarily a one-to-one correspondence between primitive lists and tiles to be rendered and such that a given tile may be associated with multiple primitive lists) the step of identifying the sequence of primitives may comprise processing multiple primitive lists and merging primitives from the multiple primitive lists into the desired rendering order.

These operations are in an embodiment performed in response to a command to render a tile. The identified primitives are then issued accordingly into a rendering pipeline for further processing, as will be explained further below. In some embodiments however the sequences of primitives may be identified in advance (and, e.g., prefetched) of the graphics processor executing the rendering command that triggers the pre-pass operation. Various arrangements would be possible in this regard.

The technology described herein relates particularly to the rendering operations that are performed on the primitives that are identified to be processed. The rendering is in an embodiment performed in a pipelined manner as a series of processing stages. Subject to the requirements of the technology described herein the rendering pipeline may in general comprise any suitable and desired processing stages that a graphics processing (rendering) pipeline may contain.

In particular the rendering according to the technology described herein uses a rasterisation-based approach.

The rendering circuit (pipeline) of the graphics processor of the technology described herein thus generally includes a rasteriser for processing primitives into respective sets of fragments and a renderer that is configured to process (render) the resulting fragments to determine the appearance (e.g. colour) that corresponding sampling positions should have in the final render output.

The rasteriser (rasteriser circuit) can be configured to operate in any suitable and desired manner, for example as in known rasterising arrangements. It should operate to generate graphics fragments for processing in dependence upon which sampling positions (or which sets of sampling positions) of an array of sampling positions covering the area of the render output, a given primitive, etc., received by the rasteriser covers (at least in part).

The rasteriser in an embodiment generates a graphics fragment for each sampling position covered by, and/or for each set of plural sampling positions (e.g., sampling mask) found to include a sampling position that is covered by, the (and each) primitive being rasterised (and that is not otherwise culled from processing for another reason, such as by the primitive failing an early depth test).

Correspondingly, each fragment generated by the rasteriser may represent (have associated with it) a single sampling position, or plural sampling positions, as desired. In an embodiment, each fragment represents a set of plural, in an embodiment a set of four (and in an embodiment a 2×2 array of), sampling positions.

The renderer (fragment processing circuit) of the graphics processor should be operable to render (shade) graphics fragments it receives to generate the desired output graphics fragment data. It may contain any suitable and desired rendering elements and may be configured in any suitable and desired manner. Thus, for example, it may comprise a fixed function rendering pipeline, including one or more fixed function rendering stages (circuits), such as texture mappers, blenders, fogging units, etc. In embodiments the renderer comprises a fragment shader (a shader pipeline) (i.e. a programmable processing circuit that is operable to and that can be programmed to carry out fragment shading programs on fragments in order to render them).

The renderer (fragment processing circuit) will process the fragments it receives to then generate output rendered fragment data, which rendered fragment data is then in an embodiment written to an output buffer, such as a frame buffer, in external memory, for use (e.g. to display a frame on a display). The rendered fragment data may be written to the (external) output buffer via an intermediate buffer, such as a tile (e.g. colour) buffer (as will be the case in a tile-based graphics processing system).

The render output to be generated may comprise any render output that is to be generated by the graphics processor. Thus it may comprise, for example, a tile to be generated in a tile-based graphics processor, and/or all or part of a frame of output fragment data.

As mentioned above, in the technology described herein, the rendering of primitives is effectively performed in two, separate processing passes: a first, "pre-pass" which is performed to generate visibility information for the sequence of primitives being processed and a second, "main" pass which performs the actual final rendering operations to produce the final rendered output (e.g. colour) values.

The result of the first, pre-pass is thus to generate the desired "visibility" information in the form of the fragment "visibility" buffer. As described above, the result of the first, pre-pass operation is thus that a dedicated data structure (the set of primitive identifying information) is populated that stores for each sampling position in the render output a respective primitive identifier indicating which primitive should be rendered for that sampling position. The set of primitive identifying information generated during the first, pre-pass operation is then consumed during the second, main pass by an appropriate visibility testing stage that tests the primitive identifier associated with the current fragment against the corresponding primitive identifier stored in the set of primitive identifying information to determine whether or not the fragment should be processed further.

Subject to the requirements of the technology described herein, the processing that is performed in the first, pre-pass may comprise any suitable and desired processing. In general, however, the first, pre-pass operation comprises rasterising primitives into respective sets of one or more fragments and then performing one or more fragment processing operations to determine the desired visibility information. The visibility information is typically, and in embodiments, based on the fragment depth values. That is, which fragment will be visible at a particular sampling position will typically be, and is in an embodiment, determined (at least in part) by which fragment is front-most in the scene (i.e. has the closest depth value).

The first, pre-pass thus in an embodiment comprises (early) depth testing the fragments to update a depth buffer for the render output. The depth buffer stores a set of per-sampling position depth values for the render output. Thus, in embodiments, the first, pre-pass operation comprises testing a (the current) fragment's depth value against a corresponding depth value stored in a depth (Z) buffer. If the fragment survives the depth testing, the depth buffer is in an embodiment then updated to include the current fragment's depth value, and so on, until all of the fragments for the primitives have been processed. The resulting depth buffer at the end of the first, pre-pass therefore represents the depth buffer for the sequence of primitives as a whole.

In some embodiments the first, pre-pass thus comprises rasterising the primitives into respective sets of one or more fragments and then depth testing the fragments to update a depth buffer. The depth buffer is in an embodiment used to generate a set of primitive identifying information, as described above, which set of primitive identifying information is written to suitable storage at the end of the first, pre-pass. The depth buffer is in an embodiment also written to suitable storage at the end of the first, pre-pass. The depth and set of primitive identifying information could be written out to external memory but in embodiments the depth and set of primitive identifying information are written to local storage, e.g. a dedicated portion of RAM that has been allocated for the current rendering operation (e.g. for a tile that is being rendered), and which local storage can thus be overwritten once the current rendering operation (the rendering of the current tile) is complete. Various arrangements would be possible in this regard.

As mentioned above, in embodiments the fragment processing for the first, pre-pass operation finishes at this point, i.e. after writing out the set of primitive identifying information (and any other buffers, such as a depth buffer that may need desirably be written out). Thus, in embodiments, after the (early) depth testing is performed, and the depth buffer updated accordingly (as needed), the fragment processing for the first, pre-pass is finished, and the fragments are not processed further by the pre-pass operation (although the pre-pass operation may continue, e.g., to populate the set of primitive identifying information and/or a primitive culling data structure, before the pre-pass operation itself is complete). Thus, in embodiments, the first, pre-pass operation does not, e.g., execute a fragment shader to render the fragments (e.g. to determine colour values for the final render output). In some embodiments a (partial) fragment shader may however be executed. For example, this may be appropriate to handle primitives where a fragment shader is needed to determine the fragment's depth value and/or coverage. In that case, final (colour) output is in an embodiment still disabled and fragment shader is run far enough to update depth buffer, but the fragments are in an embodiment not rendered in full to avoid having to calculate the final rendered output data at this stage, since it may be overwritten later. (Otherwise, such primitives where the shader modifies the depth value may need to be treated as incompatible primitives.)

The pre-pass operation in an embodiment also comprises a step of primitive classification checking, as explained above, to determine whether or not a primitive is compatible with the pre-pass. In an embodiment the step of primitive classification checking is performed at the start of the pre-pass, e.g., and in an embodiment, prior to rasterising the primitives. Other arrangements would however be possible.

If the primitive is compatible the pre-pass operation continues as normal. Otherwise, if a primitive is incompatible with the pre-pass, the pre-pass is in an embodiment not performed for that primitive. In that case, the main pass is in an embodiment then initiated to process primitives in the sequence of primitives up to the primitive immediately before (preceding) the incompatible primitive, and when the main pass reaches the incompatible primitive, the graphics processor is then switched to the third, fallback mode of operation (as discussed above).

After the first, pre-pass is finished (or has been terminated, e.g. in response to encountering an incompatible primitive), a second, main pass operation is performed to further process the primitives that have been processed during the first, pre-pass as necessary to generate the final render output.

The result of the second, main pass is thus to generate the final render output, e.g. by performing fragment shading to generate a set of rendered output (e.g. colour) values for the final render output. The processing in the second, main pass may thus generally comprise rasterising the primitives into their respective sets of fragments and then executing a fragment shader in order to determine the corresponding rendered output values for the sampling positions in the render output (e.g. to determine the appearance (e.g. colour) that the associated sampling positions should have in the final render output).

The second, main pass may include any other rendering stages, such as blending, etc., that may desirably be performed. The second, main pass in an embodiment also comprises a step of primitive classification (checking) to determine whether or not a primitive is compatible with the pre-pass operation, and in an embodiment to trigger switching to the third, fallback mode of operation as necessary, e.g. as explained above.

As described above, the second, main pass further includes a visibility test that uses the visibility information (the set of primitive identifying information) generated during the first, main pass to control processing of primitives (or fragments) for the second, main pass. In an embodiment the visibility test is performed on a per-fragment basis. Thus, in an embodiment the visibility test is performed after rasterisation. In an embodiment the visibility test is performed prior to the rendering operations that determine the rendered output values for the sampling positions (e.g., and in an embodiment, prior to fragment shading).

In embodiments, the depth buffer is not updated during the second, main pass. In some embodiments, there is no fragment depth testing at all during the second, main pass. That is, in some embodiments, hidden surface removal is performed using only the set of primitive identifying information. However, in some cases, fragment depth testing may still be performed (but with writes to the depth buffer being disabled). For example, depending on the type of primitive and hence the test function used when testing a given fragment against the set of primitive identifying information, it may still be desired to perform some depth testing during the main pass This may particularly be the case where primitives do not (and cannot) update the depth buffer and may therefore be skipped for the pre-pass, in which case the primitives may be processed by the second, main pass but the fragment visibility test function is in an embodiment modified to be a GREATER THAN test against the set of primitive identifying information, as described above. This may be the case, for example, for transparent primitives that do not write depth. In that case, only primitives that have a primitive identifier greater than the corresponding entry in the set of primitive identifying information should be further processed for the second, main pass. However, the transparent primitive may still be obscured in the final render output, so that it could potentially be culled. Depth testing may therefore be used to cull any primitives that do not generate visibility information (such that a GREATER THAN test is used) and that pass the fragment visibility test but that do not in fact have any visible effects.

Thus, in general, the same primitives may (and in an embodiment do) undergo different processing in the respective processing passes. For example, in an embodiment, the first, pre-pass involves at least rasterising the primitives into fragments and performing depth testing that is used to generate visibility information. The pre-pass may or may not execute a fragment shader. However in an embodiment the pre-pass at least does not write out, and in an embodiment does not generate either, the final rendered output (e.g. colour) values. The second, main pass on the other hand in an embodiment rasterises primitives into fragments, performs some visibility test using the visibility information generated during the pre-pass, and then performs fragment shading to generate and output (e.g. colour) values for any fragments that survive the visibility test.

The processing that is performed in either the pre-pass or the main pass may in general also comprise any other suitable processing steps (stages) that may be desired.

So long as the primitives are compatible with being processed in the manner of the technology described herein (using a pre-pass), the graphics processor is in an embodiment (initially) caused to process all the primitives in the sequence of primitives in the first, pre-pass mode and to then process the sequence of primitives again (from the start) in the second, main pass mode.

In an embodiment therefore the same sequence of primitives is subjected to both the first, pre-pass operation and to the second, main pass operation. It is in this regard also contemplated for example that the granularity of the processing may change between the pre-pass and the main pass. For example, the pre-pass may be performed in respect of an entire tile, but the tile could then be sub-divided into smaller sub-tiles for performing the main pass, such that a plurality of main passes are performed. Correspondingly, the pre-pass operation could be performed for sub-tiles, with the main pass then being performed for multiple (e.g. all) of the sub-tiles together. Various arrangements would be possible in this regard.

In embodiments all of the primitives in a sequence of primitives are processed in the same way. However, other arrangements would be possible and dividing the rendering into two separate passes may also allow for further possible optimisations.

For example, if it can be determined that a primitive will have no further effect after having executed in the pre-pass, in that case it may be possible to avoid processing the primitive further in the second, main pass, regardless of the visibility information. An example of when this might be the case would be where the primitive writes only to the depth and/or stencil buffers but does not output a colour value. This is typically known in advance and can thus be determined, e.g., from suitable state information (e.g. descriptors) associated with the primitive.

It may also be possible to determine during the first, pre-pass operation that some primitives (in their entirety) do not need to be further processed. For example, in some embodiments, in addition to the visibility information that is consumed during the second, main pass to control the fragment processing in the main pass as described above, a "primitive culling" data structure may be generated as part of the pre-pass that indicates any primitives that can already be culled in their entirety to avoid unnecessary processing for those primitives in the second, main pass. Thus, if it is determined during the first, pre-pass operation that none of the fragments associated with a primitive have any visible effect, in that case the primitive as a whole can be culled, e.g., and in an embodiment, without any fragment processing. Thus, in some embodiments, if it can be determined that all fragments for a primitive are invisible, the primitive can be culled. This primitive culling can be (and in an embodiment is) done at the start of the second, main pass, e.g., after the primitive classification (where this is performed), but in an embodiment before rasterising the primitive into its respective fragments. In this way, the primitive can be removed from the sequence of primitives for the main pass thus avoiding any unnecessary fragment processing. As it may be prohibitive to store this information per primitive, embodiments use a fixed-size primitive culling data structure. This can be populated as desired and used to control processing of primitives for the second, main pass.

Various other arrangements would be possible for skipping some or all processing during the second, main pass.

Correspondingly, if it can be determined that a given primitive does not contribute any meaningful output for the pre-pass, some or all of the processing of that primitive by the first, pre-pass operation can accordingly be skipped. For example this may be the case for primitives that do not generate any visibility information, such as transparent primitives that do not write out depth values, as discussed above. Some of all processing of the primitive in the first, pre-pass operation may thus be omitted, such that the primitive is in an embodiment substantially processed only in the main pass operation (or only in the fallback mode). An example of this might be transparent primitives that do not update the depth buffer. These could simply be treated as incompatible primitives that trigger the fallback mode but the primitive classification checking during the first, pre-pass operation could alternatively be further modified to identify such primitives and stop the processing of such primitives by the first, pre-pass operation, such that the primitives are instead substantially processed only in the second, main pass operation but with an appropriately modified fragment visibility test, as discussed above, that is selected for such primitives.

On the other hand, there are some cases where all primitives need to be processed in a single processing pass, e.g. for occlusion/pipeline queries, e.g. that may be performed as part of the depth (or stencil) test/update. In that case, the graphics processor may be configured to ensure that all of the primitives are processed in the first, pre-pass operation, even if a primitive could in principle skip the first, pre-pass operation (since the primitive does not generate any visibility information). Alternatively, if occlusion/pipeline queries are enabled, this might simply trigger a fallback operation.

The pre-pass operation of the technology described herein also interacts with pre-frame shaders. For example, there are various full frame shaders that may be run in certain conditions prior to rendering the application-specified geometry. These can serve various purposes, e.g. pre-loading the depth, stencil and/or colour buffers with data. In general, because the pre-pass does not output colour values, the technology described herein in an embodiment does not allocate a colour buffer until the pre-pass has been completed. Thus, a pre-frame shader that populates the colour buffer (colour read back) is correspondingly in an embodiment executed after the pre-pass. This may also allow culling of the colour read backs using the visibility information. On the other hand, pre-frame shaders that populate the depth and/or stencil buffers (ZS read back) are in an embodiment executed before the pre-pass.

Various other arrangements and optimisations would be possible in this regard.

As explained above, any primitives that cannot (safely) be processed using separate pre-pass and main pass operations are instead in an embodiment processed in a third, fallback mode of operation. The fallback mode of operation in an embodiment rasterises and renders primitives in a 'fail-safe' manner, e.g., and in an embodiment, in the normal manner for a rasterisation-based rendering system. That is, during the fallback mode, primitives are rasterised into sets of fragments and the resulting fragments are then rendered to determine corresponding rendered output values (e.g. to determine the appearance (e.g. colour values) that the associated sampling positions should have).

The fallback mode may in general perform any suitable and desired fragment processing. For example, in embodiments, the fallback mode may perform other suitable forms of hidden surface removal, such as (early/late) depth testing, e.g. in the normal manner for such depth testing.

As mentioned above, the fallback mode of operation is triggered when an incompatible primitive is encountered within a sequence of primitives being processed. There are various conditions that might mean that a primitive is incompatible with being processed in the manner of the technology described herein. For example, this might include one or more of: (i) the primitive is transparent (particularly if the primitive is transparent but can still update the depth buffer, as the set of primitive identifying information should in an embodiment only indicate opaque primitives); (ii) the primitive has side effects; (iii) the primitive uses stencilling; (iv) the primitive does not write to all render targets; (iv) the primitive does not write to depth buffer; (v) a shader is required to determine the primitive coverage; (vi) the shader emits a depth value. Which of these conditions mean a primitive is incompatible with being processed in the manner of the technology described herein may in general depend on the configuration of the pre-pass operation. For example, as mentioned above, in some embodiments a (partial) shader may be executed during the pre-pass, in which case the pre-pass may be able to process at least some primitives for which a shader is required to determine the primitive coverage. As another example, when the visibility information comprises a dedicated set of primitive identifying information, which is generated during the pre-pass (according to the second main embodiment for determining the visibility information described above), in that case the pre-pass may be handle stencilling in the pre-pass. Similarly, the pre-pass operation may be further modified or optimised to allow at least some fragment shader side effects to be handled, or to handle primitives that do not write to all render targets. Various other examples might be possible depending on the configuration of the graphics processor.

It will be appreciated from the above that the rendering circuit of the graphics processor is effectively configurable in a number of different states that modulate the processing that is performed for primitives that are passed to the rendering circuit. The rendering state can be controlled in any suitable manner as desired. For example, as mentioned above, the primitives can be annotated with classification information indicating whether or not the primitives are compatible with being processed using the pre-pass operation of the technology described herein, which information can be used to cause the graphics processor to switch out of the pre-pass mode of operation. Suitable flags may also be used to determine whether the graphics processor is currently in the pre-pass or main pass state. Thus, when a primitive is being processed, a determination may be made as to the current state of the graphics processor which then controls the processing that is performed.

For instance, when a (new) sequence of primitives is issued for rendering, the rendering circuit in an embodiment begins in the first, pre-pass state. Thus, if the first primitive is compatible with the pre-pass operation, the graphics processor remains in the pre-pass state, and performs the pre-pass operations accordingly. The next primitive is then issued for processing. On the other hand, if an incompatible primitive is encountered when the graphics processor is in the pre-pass state, the pre-pass operation is in an embodiment stopped in respect of that primitive, and the graphics processor is in an embodiment then switched to the main pass state, with the processing for primitives re-starting from the beginning of the sequence of primitives with the graphics processor configured in the main pass state.

Similarly, when the graphics processor is in the main pass state, so long as the primitive is compatible, the graphics processor remains in the main pass state, and performs the main pass operations. On the other hand, when the graphics processor in the main pass state encounters an incompatible primitive, this in an embodiment triggers a switch into the fallback state. The graphics processor then remains in the fallback state and continues processing the current primitive (i.e. continues from the position that the main pass stopped at).

The graphics processor state machine is therefore in an embodiment controlled in this way based on the primitive classification and the current operating mode of the graphics processor in order to control the pre-pass operation of the technology described herein. In this way, the graphics processor can be controlled to switch between operating modes (pre-pass/main pass/fallback) appropriately when processing a sequence of primitives.

In embodiments there is a single (physical) rendering pipeline and the operations that are performed are thus modulated based on the current state of the graphics processor, i.e. whether the graphics processor is performing a pre-pass or a main pass, etc. However, the rendering circuit could also be configured to have multiple physically separate (parallel) rendering pipelines which can handle the different operations according to the different states of the rendering circuit.

Various other arrangements would be possible.

The technology described herein may generally find application in any suitable graphics processing system. The technology described herein relates particularly to tile-based rendering systems.

The technology described herein can be used for all forms of output that a graphics processing pipeline may be used to generate, such as frames for display, render-to-texture outputs, etc.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium, such as a ROM chip, RAM, flash memory, CD ROM or disk, or could be a signal, such as an electronic signal over wires, an optical signal or a radio signal, such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that graphics processors may also generally be used for processing other, e.g. non-graphics, data and that the technology described herein may therefore also be applied to other contexts as well.

Figure 1:
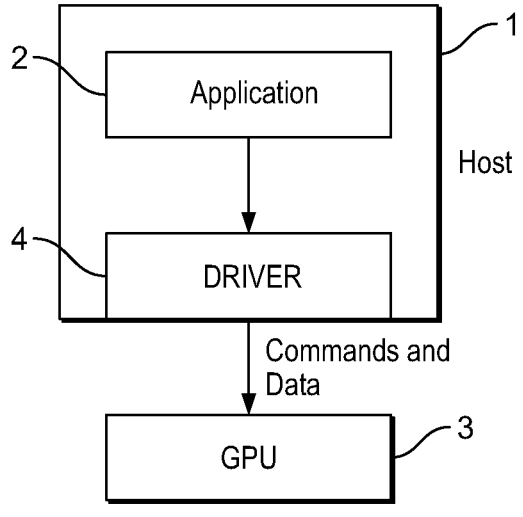
FIG. 1 shows schematically an exemplary graphics processing system.

FIG. 1 shows an exemplary graphics processing system. An application 2, such as a game, executing on a host processor 1 will require graphics processing operations to be performed by an associated graphics processing unit (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

In the present embodiments, the appropriate commands and data for performing the processing tasks required by the application 2 are provided to the graphics processor 3 in the form of one or more command streams, that each include sequences of commands (instructions) to cause the graphics processor to perform desired processing tasks.

The overall preparation of the command streams is performed by the driver 4 on the host processor 1 and the command streams may, for example, be stored in appropriate command stream buffers, from where they can then be read by the graphics processor 3 for execution. Each command stream will typically contain commands (instructions) to set parameters for graphics processor tasks, as well as commands (instructions) to execute a task, etc.

Figure 2:
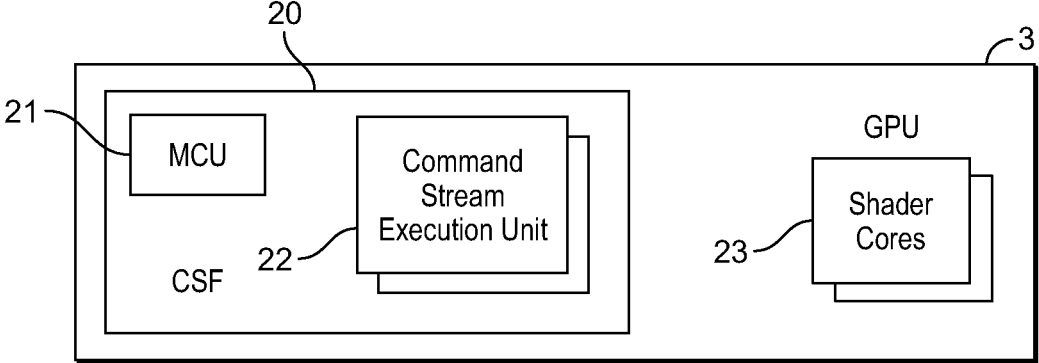
FIG. 2 shows schematically a graphics processor that can be operated in the manner of the technology described herein.

In order to facilitate this operation, the graphics processor 3 includes, as shown in FIG. 2, a command stream frontend 20 that includes a command stream supervisor (controller) 21 (in the form of a microcontroller) that is operable to schedule and issue commands from the command streams to respective command stream execution units 22. The command stream execution units 22 then execute the commands in the respective command streams to trigger the processing execution units 23 of the graphics processor (which in the present example are shown as comprising a plurality of shader cores, although other arrangements would, of course, be possible) to perform the desired processing tasks.

The present embodiments relate particularly to graphics processing systems that use so-called "tile-based" rendering. In tile-based rendering, the two-dimensional scene to be displayed is sub-divided or partitioned into a plurality of smaller sub-regions, usually referred to as "tiles". The tiles (sub-regions) are each rendered separately (typically one-after-another). The rendered sub-regions (tiles) are then recombined to provide the complete frame for display. In such arrangements, the scene is typically divided into regularly-sized and shaped sub-regions (tiles) (they are usually e.g., squares or rectangles) but this is not essential.

In a tile-based rendering system, it is accordingly usually desirable to be able to identify and know those primitives that are actually present in a given sub-region (e.g. tile), so as to, e.g., avoid unnecessarily rendering primitives that are not actually present in a tile. In order to facilitate this, it is known to prepare for respective sub-regions of the render output (which sub-regions may correspond to respective tiles, but could also, e.g., correspond to a group of tiles) a list of the primitives to be rendered for that sub-region (e.g. that will appear in the sub-region). Such a "primitive list" (which can also be referred to as a "tile-list") identifies (e.g. by reference to a primitive indicator) the primitives to be rendered for the sub-region in question (and hence can be used to identify the primitives to be rendered for the respective tile or tiles corresponding to the sub-region in question).

The process of sorting the primitives according to the regions of the render output is commonly referred to as "binning" and is usually carried out by determining (at a desired level of accuracy) the primitives that intersect (i.e. that will appear (at least in part) within) the region in question, and then preparing a list of those primitives for future use by the graphics processing system. (It should be noted here that where a primitive falls into more than one region (as will frequently be the case), it is included in the primitive list for each region that it falls within.)

Figure 3:
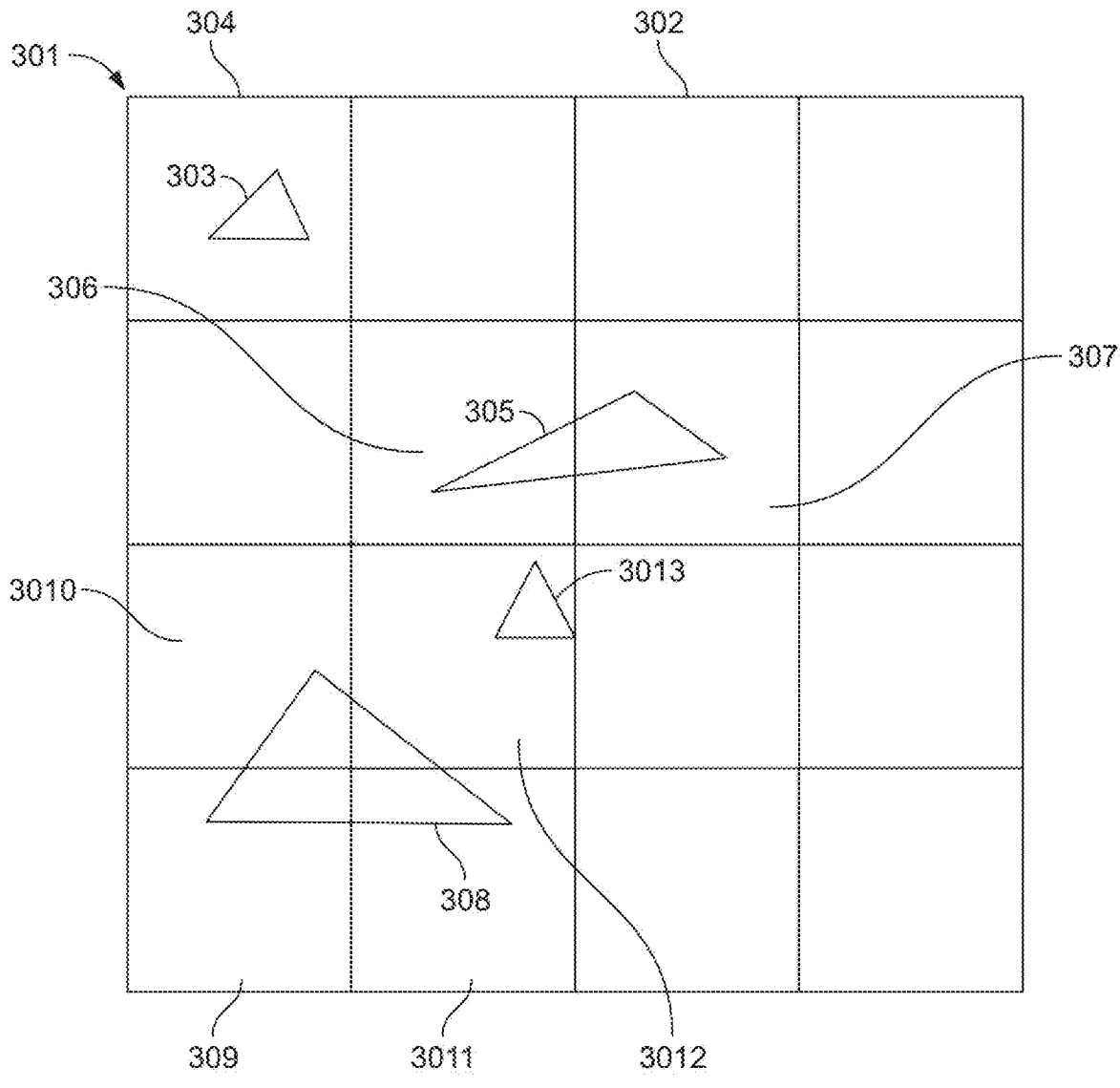
FIG. 3 illustrates an exemplary tile-based rendering operation.

FIG. 3 illustrates an "exact" binning process, where it is determined exactly which tiles a given primitive will appear at least in part in, and the primitive then included in the primitive lists for those tiles only. As shown in FIG. 3, the scene 301 to be displayed is divided into sixteen regularly sized sub-regions or tiles 302. It is then determined for each primitive in the scene, which tile or tiles the primitive actually appears (falls) within. The primitive is added to the primitive list for each tile that it is found to fall within. Thus, taking the example shown in FIG. 3, the primitive 303 is added to the primitive list for tile 304, the primitive 305 is included in the primitive list for tiles 306 and 307, the primitive 308 is included in the primitive lists for tiles 309, 3010, 3011 and 3012, and the primitive 3013 is included in the primitive list for tile 3012. (It should be noted here that FIG. 3 shows only a few tiles and primitives for clarity purposes. As will be appreciated by those skilled in the art, in an actual graphics processing operation, there will typically be many more primitives and tiles.)

It is also known however to prepare primitive lists with a lower precision than is achieved with exact binning. This can be useful to, e.g., simplify the preparation of the primitive lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part). Thus, it will be appreciated that the process of determining the primitives that should be listed (rendered) for any given region described above (the "binning" process) can be carried out at varying levels of precision, for example depending on efficiency optimisations for different parts of the tiling and rendering processes.

Once lists of primitives to be rendered (primitive lists) have been prepared for each sub-region (tile) in this way, the (primitive) lists are stored for use, e.g., to allow the system to identify which primitives need to be considered (and rendered) for the respective rendering tiles.

The advantage of such tile-based rendering is that primitives that do not appear in a given tile do not have to be processed for that tile, and therefore can be ignored when the tile is processed. This can allow the overall amount of graphics processing necessary for a given scene to be reduced.

Figure 4:
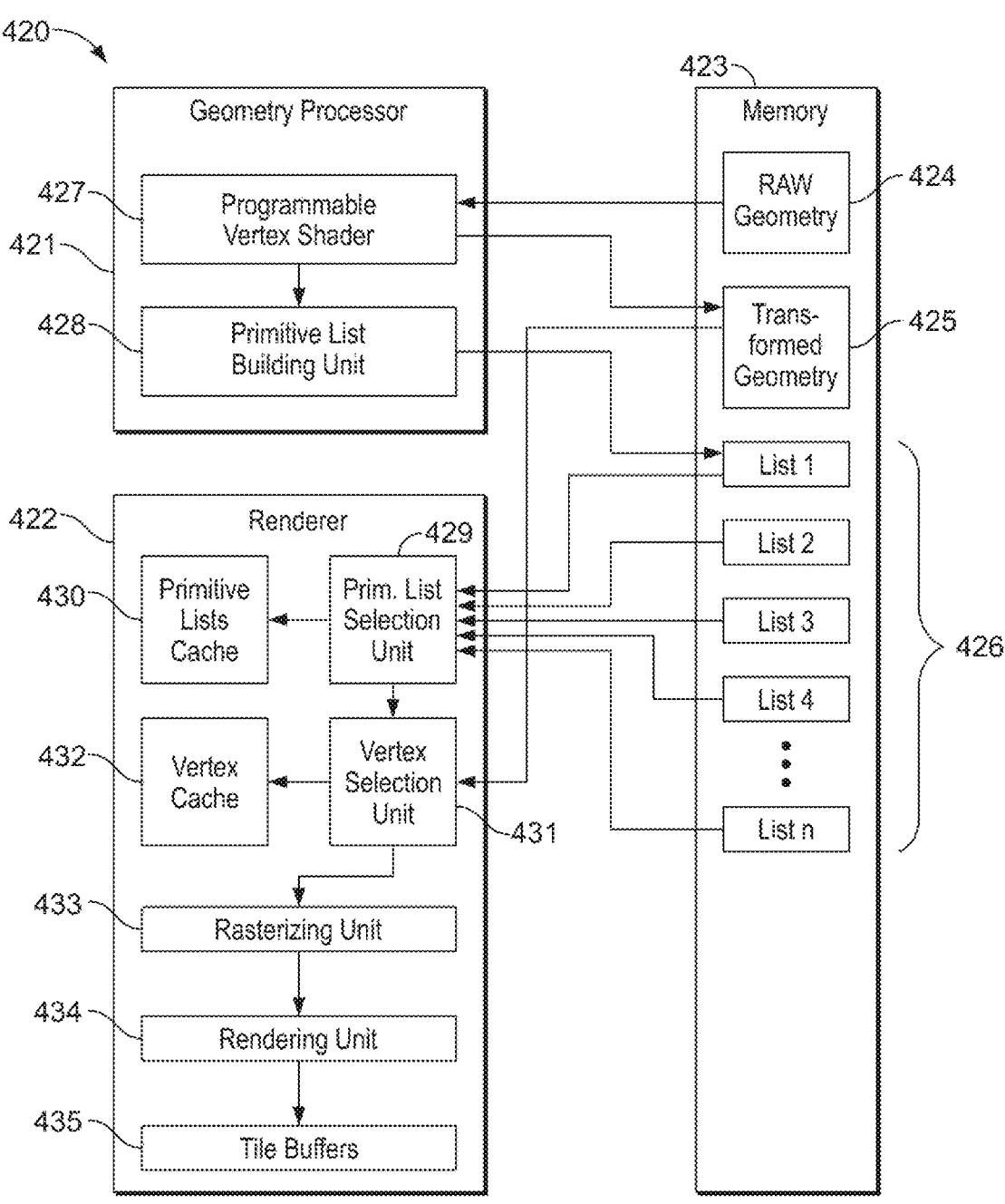
FIG. 4 and FIG. 5 schematically illustrate the operation of a traditional tile-based graphics processing system.

FIG. 4 shows schematically a graphics processor 420 that is configured to perform such tile-based rendering. The graphics processor 420 includes a geometry processor 421, and a renderer 422, both of which can access a memory 423. The memory 423 may be "on-chip" with the geometry processor 421 and renderer 422, or may be an external memory that can be accessed by the geometry processor 421 and renderer 422.

The memory 423 stores, among other things, and as shown in FIG. 4, a set of raw geometry data 424 (which is, for example, provided by the graphics processor driver or an API running on a host system (microprocessor) of the graphics processor 420), a set of transformed geometry data 425 (which is the result of various transformation and processing operations carried out on the raw geometry 424), and a set of primitive lists 426. The transformed geometry data 425 comprises, for example, transformed vertices (vertex data), etc.

The geometry processor 421 comprises, among other things, a programmable vertex shader 427, and a primitive list building unit 428. The programmable vertex shader 427 takes as its input the raw geometry data 424 stored in the memory 423, and processes that data to provide transformed geometry data 425 (which it then stores in the memory 423) comprising the geometry data in a form that is ready for two-dimensional ('2D') placement in the frame to be displayed. The programmable vertex shader 427 and the processes it carries out can take any suitable form and be any suitable and desired such processes.

The primitive list building unit 428 carries out the tiling and primitive list preparation processes of allocating the primitives (or draw calls of primitives) to the primitive lists which are then used by the renderer 422 to identify the primitives (draw calls) that should be rendered for each sub-region of the scene to be rendered (and includes suitable circuitry for doing this). To do this, the primitive list building unit 428 takes as its input the transformed and processed vertex data from the programmable vertex shader 427 (i.e. the positions of the graphics object in the scene), builds primitive lists using that data, and stores those lists as the primitive lists 426 in the memory 423.

The renderer 422 includes a primitive list selection unit 429, a primitive list cache 430, a vertex selection unit 431, a vertex data cache 432, a rasterising unit 433, a rendering unit 434, and tile buffers 435.

The rasterising unit 433, rendering unit 434, tile buffers 435 operate, in this embodiment, in the same manner as such units normally operate in graphics processing systems. Thus the rasterising unit 433 takes as its input a primitive and its vertices, rasterises the primitive to fragments, and provides those fragments to the rendering unit 434. The rendering unit 434 then performs a number of rendering processes, such as texture mapping, blending, shading, etc., on the fragments, and generates rendered fragment data which it stores in the tile buffers 435 for providing to a frame buffer for display.

The primitive list selection unit 429 of the renderer 422 determines which primitive (or, e.g., which draw call, where primitives are batched together into draw calls), is to be rendered next. It does this by considering the primitive lists 426 stored in the memory 423, and selecting from one of those lists the next graphics object (e.g. primitive, or draw call) to be rendered.

The primitive list selection unit 429 provides the primitive that it has selected for rendering next to the vertex selection unit 431. In response to this, the vertex selection unit 431 obtains the relevant vertex data for the primitive in question, and then provides the primitive (i.e. its transformed vertex data) to the rasterising unit 433 for processing. The obtaining of the vertex data can be done in various ways as desired. For example, in some embodiments, the vertex selection unit 431 retrieves the appropriate transformed vertex data for the primitive in question from the transformed geometry data 425 stored in the memory 423. In that case, the transformed vertex data may be generated up-front by the programmable vertex shader 427 of the geometry processor 421 and then stored appropriately for subsequent use by the renderer 422. In other embodiments however the vertex selection unit 431 may itself trigger vertex shading. That is, in embodiments, as will be described further below, the renderer 422 may also comprise a programmable vertex shader (not shown in FIG. 4) that is operable to take as its input the raw geometry data 424 stored in the memory 423, and processes that data to provide transformed geometry data, as desired. That is, in some embodiments, some or all of the vertex shading may be performed by the renderer 422. Various arrangements are contemplated in this regard.

The vertex selection unit 431 can cache vertex data that it has retrieved from the memory 423 in the vertex data cache 432, if desired. The primitive list selection unit 429 can also place one or more primitive lists in the primitive list cache 430. For example, the primitive list cache 430 and the vertex data cache 432 may comprise local memory provided on the renderer 422 that can be more rapidly accessed by processing units of the renderer (and in particular the primitive list selection unit 429 and vertex selection unit 431, respectively) than the main memory 423.

Figure 5:
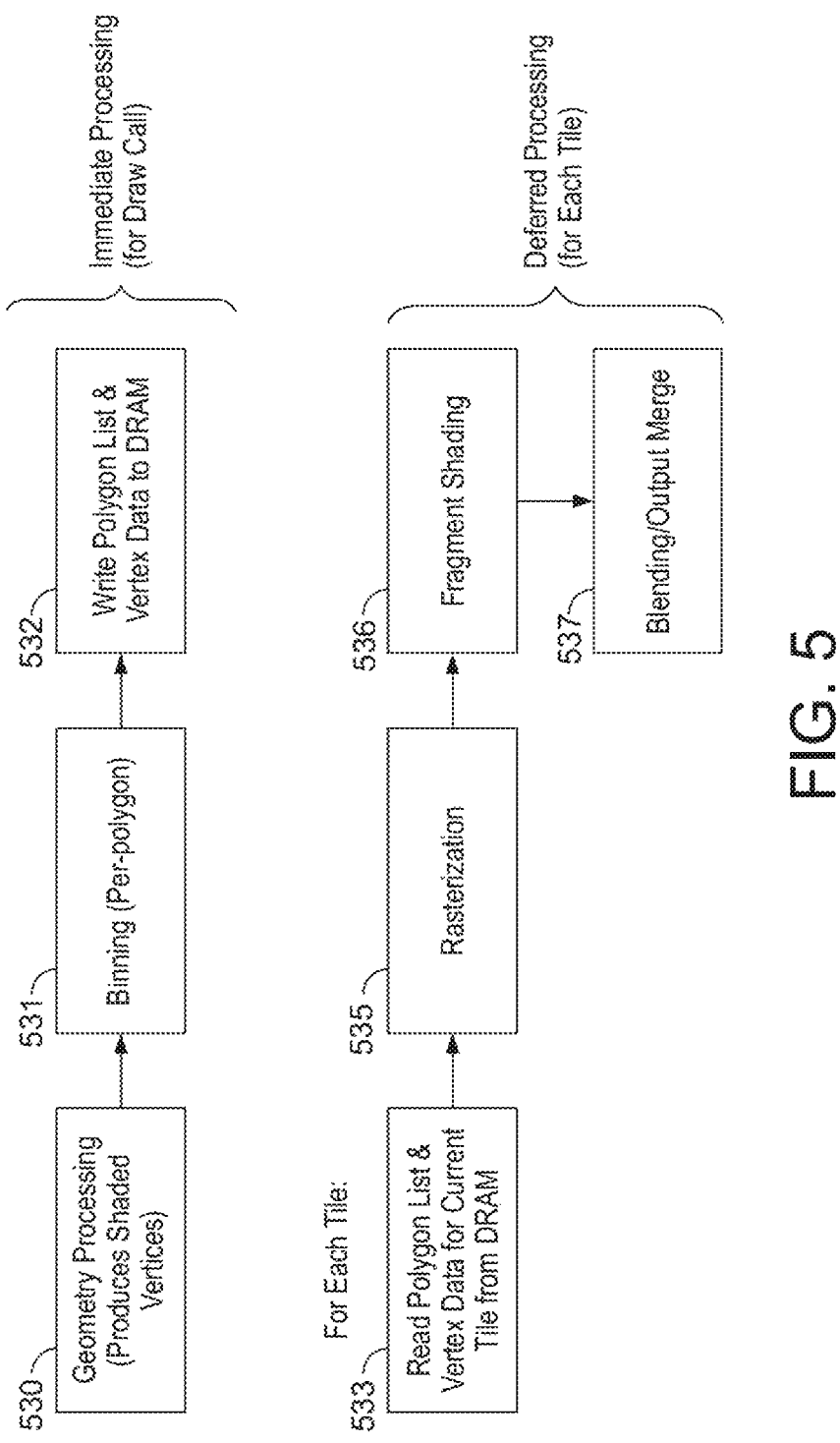

In the tile-based rendering scheme described above, a first processing stage (that is performed by the geometry processor 421) thus acts to process, e.g. sort, all of the geometry for the render output, to generate a set of primitive lists identifying which primitives should be rendered for which regions of the render output. The rendering of the individual tiles is then performed in a second processing stage (in the renderer 422). Thus, for each rendering tile, it is determined from the respective tile list(s) which primitives should be processed for that tile, and the associated transformed geometry data for those primitives is obtained, and subjected to further graphics processing to generate the desired, final rendered output data. As shown in FIG. 5, the rendering is performed using a tile buffer 435 that resides locally to the renderer 422, e.g. in on-chip memory. Thus, the rendering of a given tile is performed locally to the graphics processor. Once the rendering for the tile has complete, the rendered data is then written out to the memory 423, e.g. into a frame buffer, e.g. for display. The overall processing flow in a tile-based rendering scheme is shown, for example, in FIG. 5.

As shown in FIG. 5, in the first ("immediate") processing stage, all of the geometry-related processing for the primitives is performed (step 530), to produce a set of shaded vertices for the primitives, and a tiling operation (step 531) is then performed for the primitives to generate the primitive lists, which are then written back to the external memory, together with the shaded vertex data (step 532). This data is then used in a second ("deferred") processing stage during which the render output is generated by rasterising/rendering the polygons using their associated geometry. Thus, as shown in FIG. 5, the second processing stage involves reading in the primitive list and vertex data for the current tile (step 533), and then performing the desired rendering operations to determine the desired rendered output data.

The second processing (rendering) stage thus uses the primitive lists generated by the first processing stage to identify which primitives should be rendered for which tiles, and the individual tiles are then rendered (separately), e.g. one-after-another. Thus, when rendering a tile, the vertex data for the primitives to be rendered for that tile is obtained (which may involve obtaining the transformed geometry 425 from memory 423 but may also involve re-shading the raw vertex data 424, and various arrangements are possible in this regard for performing some or all of the geometry processing during the second processing stage). The shaded vertices for the primitives indicated to be processed for the tile are then rasterised into respective sets of fragments (step 535), and fragment shading operations are performed on the resulting fragments (step 536). Finally, the shaded fragments are subject to a blending operation (step 537), and any other such operations (such as downsampling, etc.) and the blended fragment values are then written into a suitable frame buffer, e.g. for display.

The present embodiments relate particularly to the rendering operations performed by the second ("deferred") processing stage within a tile-based rendering system. It will be appreciated that the rendering operations are triggered by the graphics processor receiving and processing a command to render a tile. For example, as described above in relation to FIG. 1 and FIG. 2, the graphics processor 3 is controlled to perform graphics processing work for an application 2 executing on a host processor 1 by a driver 4 for the graphics processor 3 preparing a command stream including commands to cause the graphics processing to perform the desired graphics processing work.

The commands prepared by the driver 4 are thus processed by the command stream frontend 20 accordingly to schedule processing work for the graphics processor's functional units. This is illustrated, for example, in FIG. 6.

Figure 6:
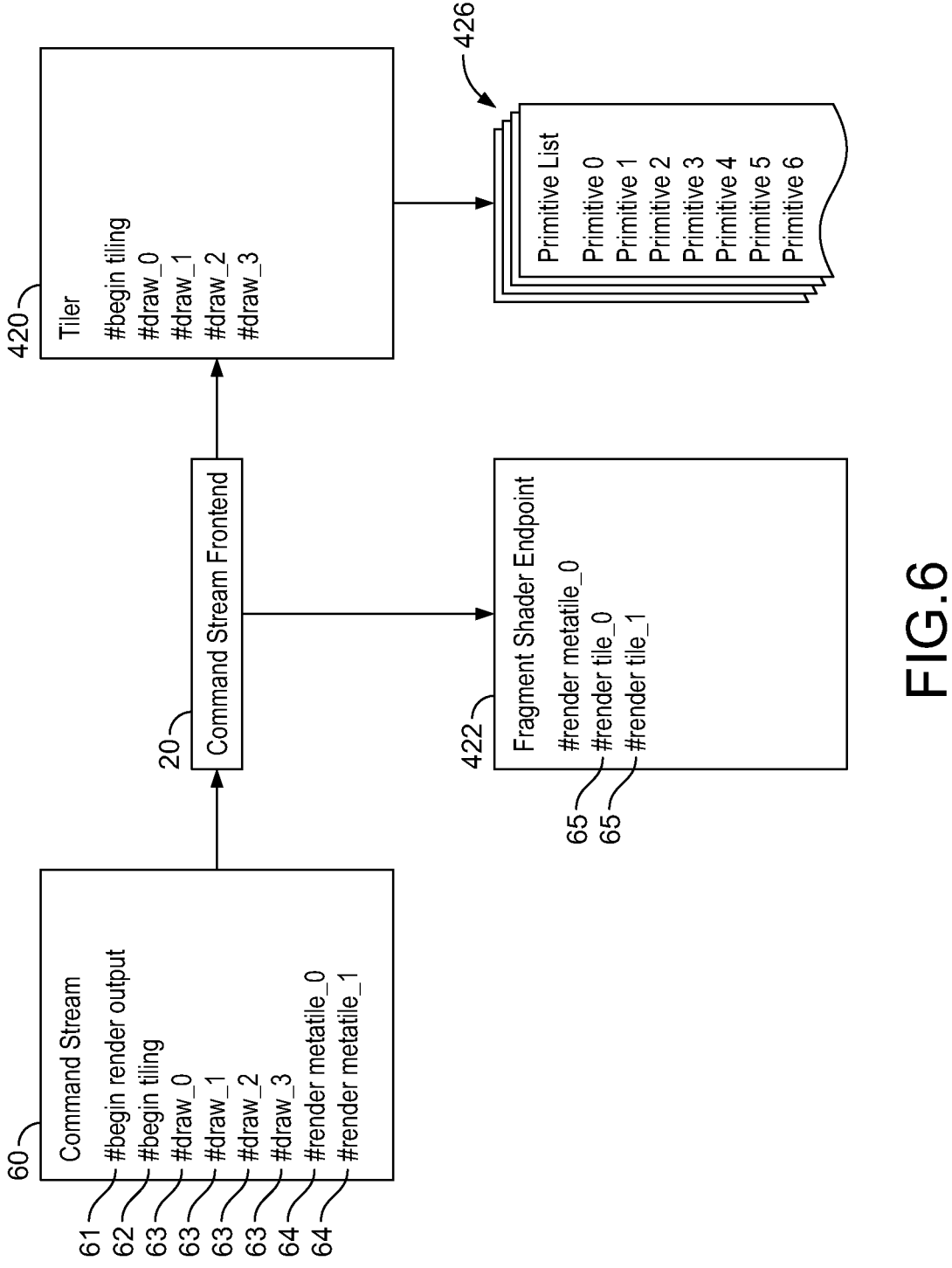
FIG. 6 schematically illustrates a command stream for causing a graphics processor to perform tile-based rendering.

FIG. 6 shows schematically an example command stream 60 for causing a graphics processor to perform tile-based rendering in the manner described above. The command stream thus starts with a suitable "begin render output" command 61 that initialises the graphics processor for the current render output (e.g. scene). This is then followed in the command stream 60 by a "begin tiling" command 62 that when executed causes the graphics processor to perform the up-front geometry processing (e.g. tiling) operations for the render output. This is then followed by a sequence of respective draw commands 63 defining the geometry for the render output that is to be processed. These draw commands are thus processed by the command stream frontend 20 to trigger the geometry processor 420 to perform the required vertex shading and primitive list building operations described above.

The result of this processing is therefore to generate a set of primitive lists which each include a respective list of primitive commands corresponding to the primitives that it has been determined should be rendered for the region(s) of the render output for which the primitive list has been prepared for. As described above, once all of the geometry has been processed and the respective primitives lists generated, the initial geometry processing operation is then complete.

The commands 62, 63 relating to the initial geometry processing operations are accordingly then followed by respective commands 64 to trigger the subsequent rendering operations. In the example shown in FIG. 6 the commands prepared by the driver 4 include commands 64 to render larger area regions ("metatiles") of the render output including groups of rendering tiles (i.e. the regions into which the render output is subdivided for rendering purposes). These metatile commands 64 are then passed to the graphics processor fragment shader endpoint that splits the metatile commands into respective processing tasks for the respective rendering tiles 65. The fragment shader endpoint then controls the scheduling and issuing of tasks 65 (e.g. for rendering tiles) to the renderer 422 for rendering. The processing of a metatile command by the command stream frontend 20 thus triggers the scheduling of one or more tile rendering tasks by the fragment shader endpoint. The fragment shader endpoint will then issue the tile rendering tasks to the renderer 422 in turn, which will trigger a sequence of processing (rendering) operations to be performed for the tile, as will be described further below.

Various other arrangements would however be possible in this regard. For example, rather than the driver 4 preparing commands relating to larger processing jobs ("metatiles") that are then split into smaller processing task (tiles) by the fragment shader endpoint, the command stream that is provided by the driver 4 to the command stream frontend 20 may itself include commands to render individual rendering tiles, such that the fragment shader endpoint schedules such tasks accordingly, but does not divide the overall processing job (metatile) into separate tiles for rendering purposes. In that case, the rendering operations (for a tile) may be triggered directly by the commands that are prepared by the driver 4.

It will also be appreciated that FIG. 6 shows a simplified command stream for illustrative purposes and that a typical graphics processing command stream may include many more commands and different types of commands to those shown in FIG. 6. Various arrangements would be possible in this regard.

In any event, in response to the graphics processor command stream frontend 20 encountering an appropriate rendering command (whether that be a command to render a metatile that launches a plurality of tile rendering tasks, or a command to render a tile as such), this ultimately triggers the rendering of a tile, in which the renderer 422 is caused to perform a desired sequence of processing operations in order to render the tile. The rendering command therefore triggers the renderer 422 to automatically perform a certain sequence of processing operations to generate the desired rendered output data for the tile in question. In particular, in response to such command, the renderer 422 may be (and ultimately is) caused to obtain via the primitive list selection unit 429 the primitive list or lists for the tile in question to identify the primitives to be rendered, obtain the relevant vertex data for the primitives, and then rasterise and render the primitives accordingly, e.g. as described above.

In the present embodiments however, rather than the rendering command triggering a rendering operation in which primitives are rasterised and then rendered in full (as necessary) in a single rendering pass, e.g., as in the second processing stage depicted in FIG. 5, a novel "pre-pass" operation is introduced into the processing operations that are automatically performed in response to the rendering command, such that the rendering of primitives for a (and each) tile is effectively divided into two separate processing passes (although in some cases there may be more than two processing passes, in particular when a third, "fallback" operation is triggered during the rendering of a tile, as will be explained further below). In the present embodiments, the fragment shader endpoint when scheduling the rendering of a tile is accordingly configured to split the rendering of a tile into two processing passes, such that the same tile is effectively issued for rendering twice, but with the graphics processor configured to perform different sequences of processing operations for the respective, different processing passes.

In particular, and as will be explained further below, when rendering a sequence of primitives for a tile (which sequence of primitives may be the entire sequence of primitives for the tile, or may be a draw call for the tile, for example), the processing of primitives in the sequence of primitives is performed in two passes whereby a first, "pre-pass" operation is initially performed to process the primitives to determine a set of "visibility" information for the sequence of primitives, and which first, pre-pass operation is followed by a subsequent, "main" pass operation that processes at least some of the primitives that were processed by the corresponding first, pre-pass operation again to complete their rendering and produce the final rendered output data (e.g. to determine the appearance (e.g. colour) that the respective sampling positions covered by the primitives should have in the final render output). Thus, for a given tile to be rendered, the fragment shader endpoint will schedule respective tasks for the renderer 422 to perform a first, "pre-pass" operation and to then perform a corresponding "main" pass operation.

According to the present embodiments, the first, pre-pass operation therefore does not produce any rendered output data, but instead serves only to determine a set of "visibility" information for the sequence of primitive. As will be explained further below, the "visibility" information can take various suitable forms but generally reflects whether or not a given fragment for a primitive in the sequence of primitives is visible (and hence whether or not the fragment should be processed further for the render output). The visibility information determined by the first, pre-pass operation can thus be (and is) subsequently used during the corresponding second, main pass operation in order to control the processing of fragments during the second, main pass, e.g., and in particular, to cull any fragments for which it can be determined from the visibility information that the fragments have no visible effects, and therefore do not need to be processed further. This then has various benefits in terms of providing improved, e.g. sample-perfect, hidden surface removal as will be explained further below. In particular, because the first, pre-pass operation is operable to process the sequence of primitives up-front to determine the "visibility" information for the entire sequence of primitives, this then means that when the same sequence of primitives is processed again during the second, main pass operation, the processing of the primitives in the second, main pass operation can be controlled accordingly based on the determined "visibility" information such that at each sampling position, only the primitive (or primitives) that need to be processed further for that sampling position are processed further.

Figure 7:
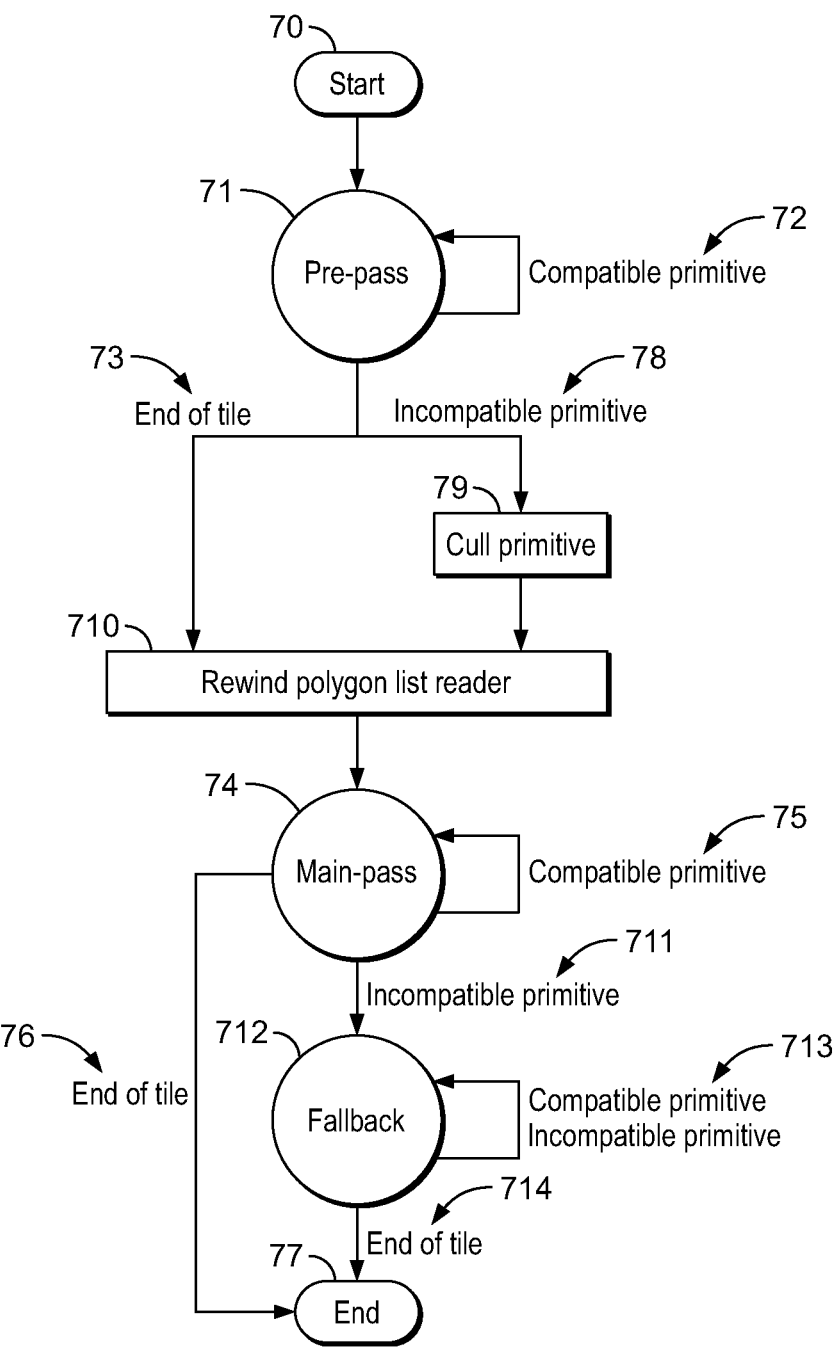
FIG. 7 schematically illustrates a rendering operation according to an embodiment in which a novel "pre-pass" operation is introduced such that primitives are effectively rendered in two processing passes.

FIG. 7 is a state diagram illustrating the rendering operation that is performed for an individual rendering tile according to an embodiment of the technology described herein. As mentioned above, the rendering operation is triggered by the graphics processor encountering an appropriate command to render the tile and the fragment shader endpoint scheduling the corresponding rendering passes in response to such command. The rendering operation is then performed automatically, and under hardware control, with the graphics processor transitioning between different respective "states" (wherein the graphics processor is configured in a respective state to perform a respective corresponding processing operation) according to the state diagram shown in FIG. 7, as will be explained further below.

Thus, in response to a suitable such command (step 70—start), the graphics processor in the present embodiment is caused to automatically perform the rendering operation shown in FIG. 7, in particular by the fragment shader endpoint scheduling an appropriate task to perform the first, pre-pass operation for the tile in question. The graphics processor at this point is therefore configured in the "pre-pass" state. The rendering operation accordingly starts by processing primitives that are identified to be rendered for the tile by the first, pre-pass operation in order to generate the desired "visibility" information for the sequence of primitives (tile) (step 71). The first, pre-pass operation may generally comprise any suitable sequence of processing operations, depending on the desired format of the "visibility" information. Various different examples of how the first, pre-pass operation may be configured will be described below but FIG. 8 illustrates the processing operations (the graphics processing pipeline) according to the first, pre-pass operation in a first example in which the determined visibility information comprises a depth buffer for the sequence of primitives (tile).

Figure 8:
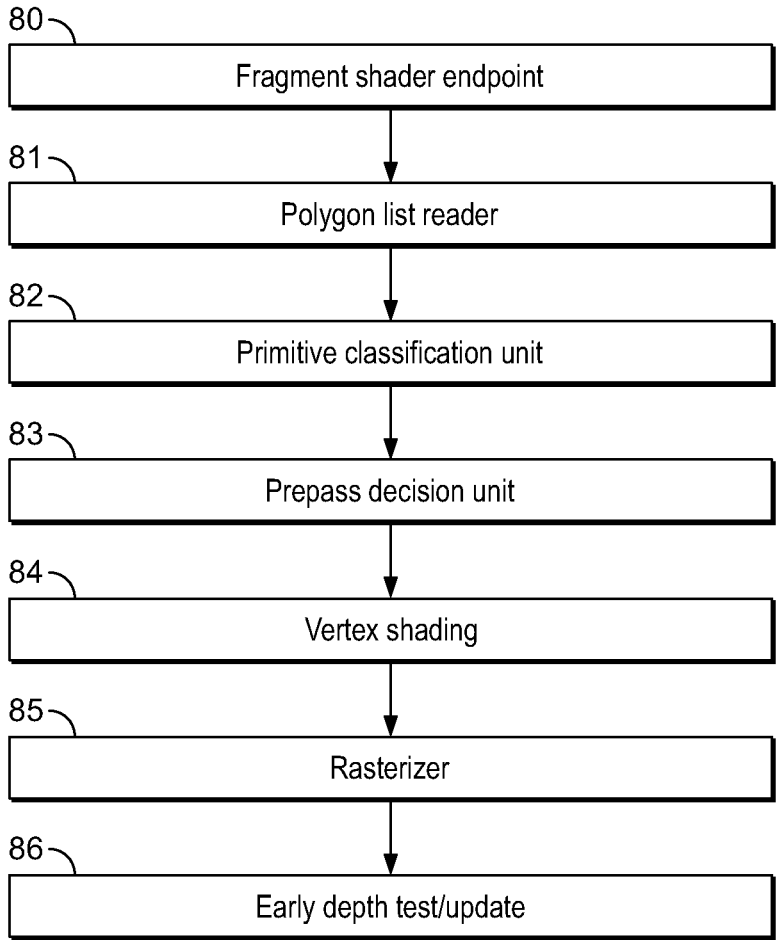
FIG. 8 shows schematically a sequence of processing operations for a pre-pass operation according to a first example.

In the first example as shown in FIG. 8, the first, pre-pass operation thus comprises a pipelined sequence of processing operations including: a fragment shader endpoint 80 that schedules the rendering work that the graphics processing pipeline needs to perform in order to render a tile; a primitive list reader (polygon list reader 81) that reads the appropriate primitive list(s) for the tile to identify the primitives that are to be rendered for the tile; a primitive classification unit 82; a pre-pass decision unit 83; a vertex processing (e.g. shading) stage 84 that obtains (and shades, if necessary) the relevant vertex data for the primitives to be rendered for the tile; a rasteriser 85 that rasterises primitives into respective fragments corresponding to sampling positions within the render output; and an (early) depth test/update stage 86 that performs fragment depth testing and updates the depth buffer accordingly.

Accordingly, when the fragment shader endpoint 80 issues a tile for rendering, the primitive list reader (polygon list reader 81) issues primitives in the sequence of primitives in turn to the graphics processor for processing by the first, pre-pass operation. The primitive are then processed by the processing stages shown in FIG. 8 accordingly in order to determine the desired "visibility" information. In this first example, the "visibility" information comprises the depth buffer. Thus, the primitives are processed up to and including the (early) depth test/update stage 86 but in this example are not processed further (such that there is no fragment shading, for example, during the first, pre-pass operation). In this first example, once the depth buffer has been updated (if necessary), the pre-pass processing of a primitive stops at that point, and the next primitive in the sequence is processed accordingly.

So long as the primitives in the sequence of primitives being processed are compatible with being processed by the first, pre-pass operation (which can be (and is) determined by the primitive classification unit 82, as will be explained in further detail below), the first, pre-pass operation works through the primitives in the sequence of primitives (step 72), processing the primitives accordingly to update the depth buffer for the sequence of primitives, until the first, pre-pass operation reaches the end of the sequence (the end of the tile) (step 73) (or until the first, pre-pass operation is otherwise stopped).

Once the first, pre-pass operation has finished (or is stopped), and the depth buffer (visibility information) for the sequence of primitives determined, at that point, the second, main pass operation should be initiated (step 74). The graphics processor should thus be (and is) switched at this point into a "main pass" state. As mentioned above, the second, main pass operation is performed to process again at least some primitives that were processed by the first, pre-pass operation (step 71) in order to generate the final, desired rendered output data. Thus, at the end of the first, pre-pass operation, the primitive list reader (polygon list reader 81) is in an embodiment "re-wound" to the start of the sequence of primitives (step 710) ready for the corresponding second, main pass. The fragment shader endpoint 80 then issues a corresponding task for the second, main pass operation to be performed. Thus, in response to the respective task for the second, main pass operation, the graphics processor is caused to transition into the "main pass" state, and the sequence of primitives is then re-issued, from the start, for processing by the second, main pass operation. The second, main pass operation thus works through the primitives in the sequence of primitives (again) accordingly to produce the desired rendered output data, e.g. by rasterising the primitives again into their respective fragments, and then completing the rendering of the fragments. However, when performing the second, main pass, the graphics processor uses the visibility information generated by the first, pre-pass operation to cull fragments when it is possible to do. For example, as will be explained further below, after rasterising a primitive into its respective fragments, the second, main pass then performs a fragment visibility test using the visibility information to determine whether or not the fragments need to be processed further. Any fragments that fail the fragment visibility test can therefore be culled accordingly, such that further processing of those fragments is avoided.

Figure 9:
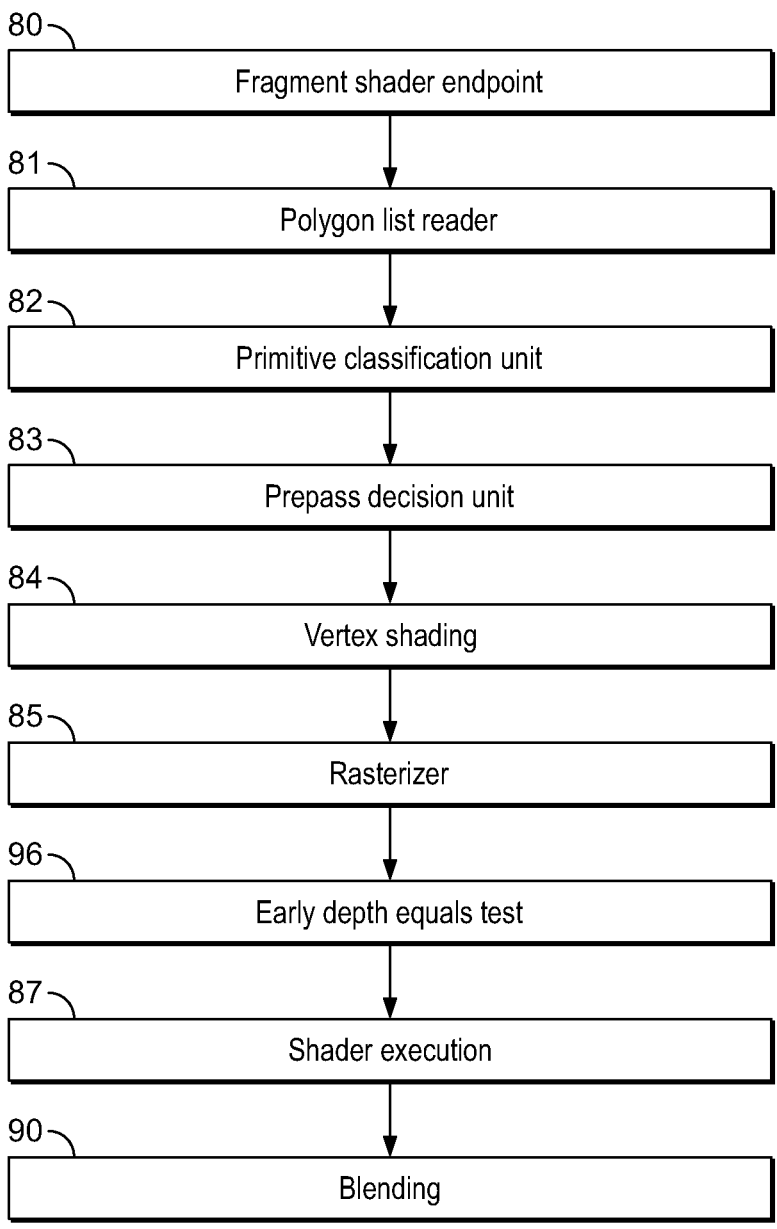
FIG. 9 shows schematically a sequence of processing operations for a corresponding main pass operation to be performed after the pre-pass operation shown in FIG. 8.

FIG. 9 illustrates the corresponding processing operations performed according to the second, main pass operation in this first example. As shown in FIG. 9, the second, main pass operation comprises a pipelined sequence of processing operations including, in common with the first, pre-pass operation: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output.

The second, main pass operation also performs depth testing of the fragments. However, depth buffer writes are disabled for the depth testing that is performed during the second, main pass operation such that the second, main pass operation does not update the depth buffer. Instead, as shown in FIG. 9, in this example, the depth test function is modified for the depth testing in the second, main pass operation such that the depth testing comprises an 'equals' test. The early depth equals test 96 accordingly tests whether or not the depth value for the fragment being tested matches the depth value stored in the depth buffer for the corresponding sampling position. Thus, if the fragment has the same depth value as that stored in the depth buffer, the fragment survives the early depth equals test 96, and is therefore further processed by executing a fragment shader 87, and then performing blending 90, etc., to generate the final rendered output data. On the other hand, if the fragment's depth value does not match the depth value stored in the depth buffer, such that the fragment fails the early depth equals test 96, the fragment can be (and is culled) at this point during the second, main pass, with the fragment shading 87, etc., being avoided. In this way, the fragment processing during the second, main pass operation can be controlled based on the depth buffer generated during the first, pre-pass operation such that rendered output data is only produced for fragments that are actually visible.

The result of the second, main pass operation is thus to produce the desired, final rendered output data for the tile. This can then be written out accordingly from the tile buffer, e.g. to a frame buffer, e.g. for display.

Again, so long as the primitives are compatible with being processed in this way, the primitives in the sequence of primitives are processed in turn by the second, main pass (step 75) until all of the primitives in the sequence have been processed (e.g. the end of the tile is reached) (step 76), at which point the rendering of the tile is completed (step 77—end).

That is, so long as the primitives are compatible with being processed in the two-stage manner described above, the primitives are processed in this way, such that the same primitive is subject to both the first, pre-pass operation and to the second, main pass operation. However, there are certain types of primitives that have one or more properties that mean that they cannot be safely processed in this manner. There are various reasons why this might be the case, as will be discussed further below, but generally this will be because dividing the processing into two separate passes may introduce artefacts to the final rendered output data.

As shown in FIG. 7, the graphics processor is in the present embodiment also therefore operable in a third, "fallback" operation. The third, fallback operation can be (and is) triggered by the first, pre-pass operation encountering an 'incompatible' primitive, i.e. a primitive for which it has been determined that the primitive cannot safely be processed using the pre-pass operation. In that case, to ensure continued safe processing of the sequence of primitives, the graphics processor may switch to a third, fallback operation in which primitives are processed in a 'fail-safe' manner. This is particularly important as the rendering in the technology described herein is performed under hardware control, and the graphics processor should therefore be (and in the present embodiment is) capable of 'safely' handling all different types of primitives that an application may specify to be rendered, i.e. without potentially introducing artefacts. The switching to the third, fallback operation in the present embodiments may be (and is) triggered and controlled by the pre-pass decision unit 83 based on the output from the primitive classification unit 82, as will now be explained further.

For instance, as mentioned above, the first, pre-pass operation shown in FIG. 8 (and the second, main pass operation shown in FIG. 9) includes a primitive classification unit 82 and pre-pass decision unit 83. The primitive classification unit 82 is able to identify whether the current primitive is compatible or not with the pre-pass operation. The pre-pass decision unit 83 is then able to determine how the processing should proceed. For example, in the case that the primitive classification unit 82 identifies that a primitive is incompatible with being processed by the first, pre-pass operation (step 78 in FIG. 7), the pre-pass decision unit 83 causes the first, pre-pass operation to be stopped at that point (and the incompatible primitive is culled for the first, pre-pass operation—step 79—such that it can subsequently be processed instead by the third, fallback operation).

When the first, pre-pass operation is stopped due to an incompatible primitive, at this point, the primitive list reader (polygon list reader 81) is again "re-wound" to the start of the sequence of primitives (step 710), and the second, main pass operation is then performed to complete the rendering operation for primitives in the sequence of primitives up to the primitive immediately before the incompatible primitive (step 74). That is, rather than immediately aborting the pre-pass operation to perform the third, fallback operation, the graphics processor is first switched to the second, main pass operation to complete the rendering of the primitives that have been processed so far by the first, pre-pass operation. When the second, main pass operation reaches the incompatible primitive, the primitive classification unit 82 in the second, main pass operation will accordingly identify again that the primitive is incompatible (step 711), and the pre-pass decision unit 83 will accordingly cause the second, main pass operation to be stopped at that point. The graphics processor is then switched to the third, fallback operation to process the incompatible primitive (step 712) (and in this example the graphics processor then continues processing primitives by the third, fallback operation until the end of the tile (step 714)).

Figure 10:
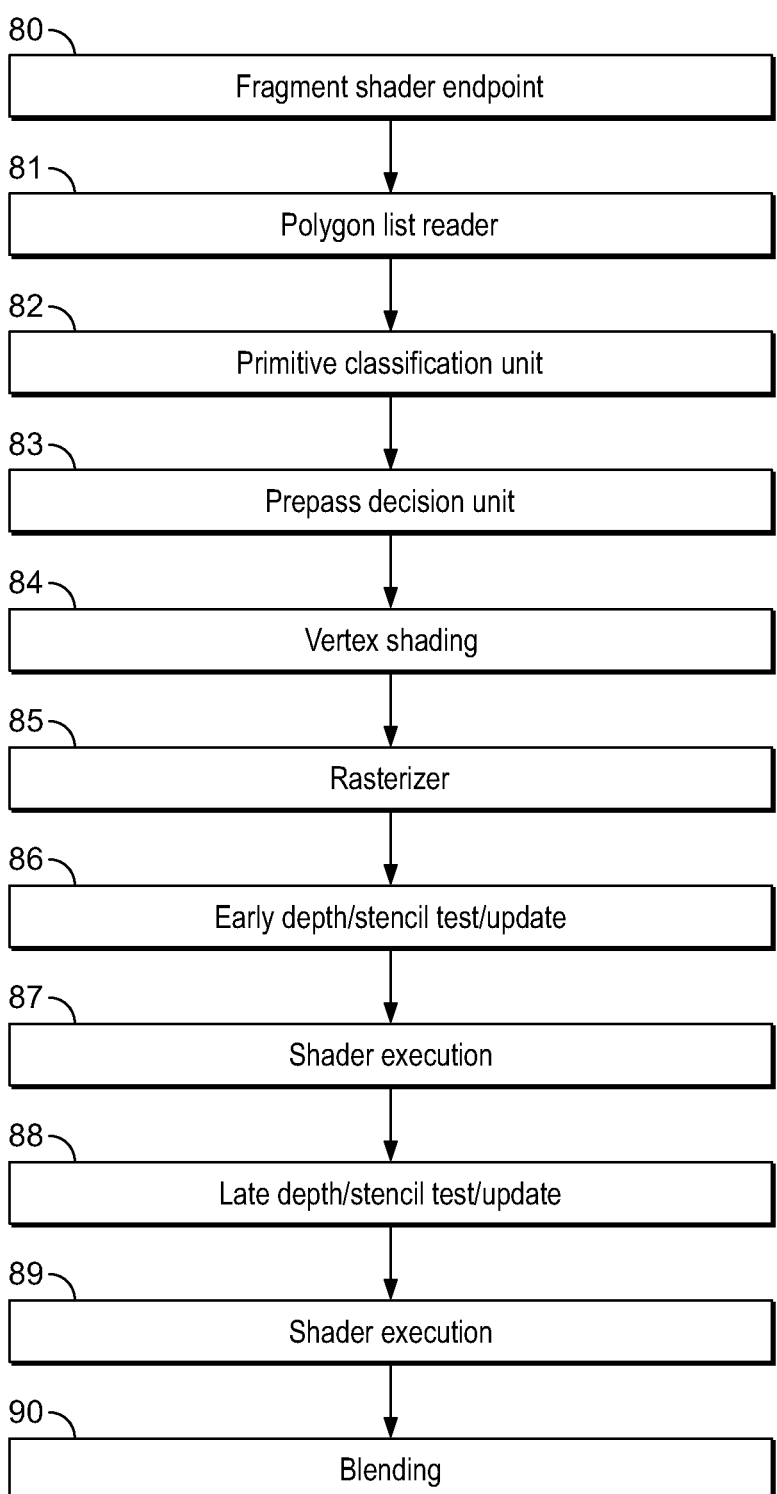
FIG. 10 shows schematically a sequence of processing operations for a fallback operation in which primitives are processed in a fail-safe manner.

FIG. 10 illustrates the processing operations according to the third, fallback operation in the first example. In the example shown in FIG. 10, the third, fallback operation thus comprises a pipelined sequence of processing operations including: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output. In the third, fallback operation, after rasterisation, the fragments are then subject to an early depth (and optionally (early) stencil) test/update 86, e.g. as in the first, pre-pass operation, but the processing then continues by executing a fragment shader 87 for any fragments that survive the early depth test/update 86, performing a late depth (stencil) test/update 88, and then executing a final fragment shader 89, and performing blending 90, etc., for any remaining fragments to generate the desired rendered output data. Note that in FIG. 10 the early depth test/update 86 and late depth test/update 88 also perform corresponding (early/late) stencil test/updates. That is, in this example, stencilling is disabled during the first, pre-pass and second, main pass operations but is active in the third, fallback operation.

Accordingly, as shown in FIG. 10, the third, fallback operation processes primitives in 'full' in a single rendering pass, e.g., similarly to the normal rendering operations within a traditional tile-based rendering system (e.g. as shown in FIG. 5). The third, fallback operation thus allows primitives to be processed in a 'fail-safe' manner. This then ensures that the sequence of primitives can continue to be processed to generate the desired rendered output data even if there are some primitives that cannot be processed in this way. This is beneficial in ensuring an improved, safer hardware implementation that is able to handle all different types of primitives (and primitive properties) that may be encountered, e.g. by falling back if necessary to processing in such 'fail-safe' manner (at the cost of hidden surface removal efficiency). In the example shown in FIG. 7, the remaining primitives in the sequence of primitives are then all processed by the third, fallback operation (step 713) until all of the primitives for the tile have been processed. (It is also contemplated however that in some embodiments the graphics processor may attempt to switch back from the third, fallback operation to the first, pre-pass operation within a sequence of primitives for a tile when it is possible to do so. This will be explained further below in relation to FIG. 73.)

At that point, once of the primitives to be rendered for the tile have been processed accordingly to generate the final rendered output data (with some of the primitives, i.e. the primitives that were before the incompatible primitive in the sequence of primitives having been processed by the pre/main pass operations, and others of the primitives, i.e. the incompatible primitive, and any following primitives in the sequence of primitives, processed by the third, fallback operation) (step 714) and the rendering of the sequence of primitives (for the tile) is completed (step 77—end).

Once the rendering of the sequence of primitives (e.g. for the current tile) is completed (step 77—end), assuming there are further sequences of primitive (tiles) to be rendered, the fragment shader endpoint 80 can then (and does) schedule the next sequence of primitives for rendering accordingly. For example, the fragment shader endpoint 80 at this point may issue respective processing tasks for rendering the next tile that is to be rendered (although the next sequence of primitives to be rendered could also, e.g., be another draw call for the current tile).

The next sequence of primitives to be rendered is then processed in the same manner described above in relation to FIG. 7, e.g. by initiating a new pre-pass operation and then subsequently controlling the state of the graphics processor as necessary to render the primitives. In this respect, it will be appreciated that even in the event that a tile does contain an incompatible primitive, such that the graphics processor has to revert to the third, fallback operation for that tile, this may only affect that tile, and the rendering operation for the next tile can re-start with a new pre-pass operation. Thus, hidden surface removal efficiency is only temporarily lost in the event that an incompatible primitive is encountered, and the improved hidden surface removal can be resumed for the next tile. Of course if the or another incompatible primitive is encountered during the rendering of that tile, the third, fallback operation will again be triggered in the same way, but at least for tiles that do not contain any incompatible primitives, and for those tiles it is possible therefore to achieve sample-perfect hidden surface removal using the novel pre-pass operation of the present embodiment.

The "in-tile" pre-pass operation of the present embodiment can therefore provide significant improvement in hidden surface removal, and can thus improve the overall graphics processing operation.

Figure 11:
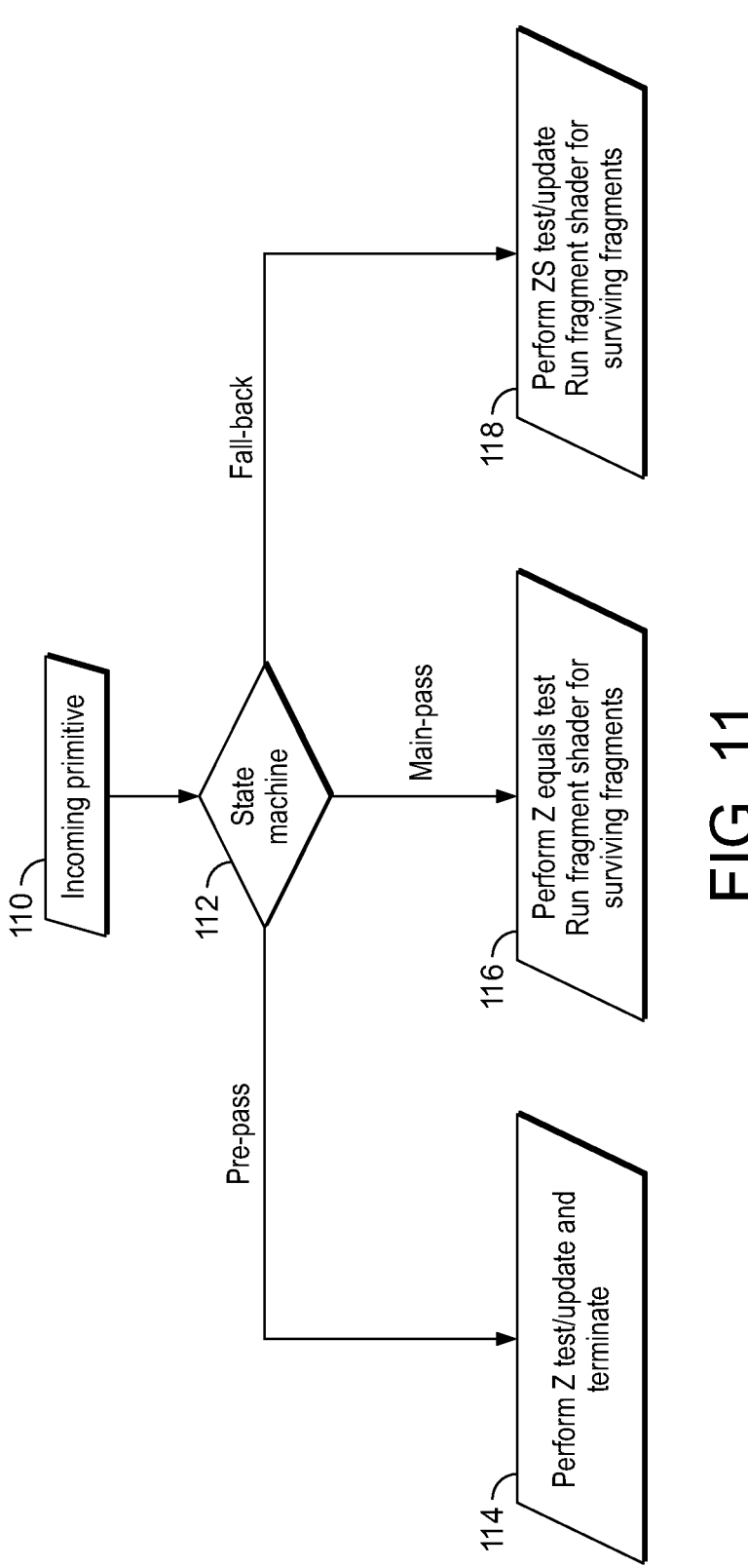
FIG. 11 shows schematically a state machine for a graphics processor operating according to the first example

It will be appreciated from the description above that the first, pre-pass, second, main pass and third, fallback operations described above are in an embodiment performed using the same graphics processing pipeline but with different stages enabled/disabled appropriately. Thus, the fragment shader endpoint 80 may be configured to issue the same sequence of primitives rendering multiple times, but with the processing operations that are performed for each pass effectively being modulated according to the state of the graphics processor, with different processing stages 'active' for the different configurations of the graphics processor. The fragment shader endpoint 80 can thus indicate to the graphics processing pipeline which type of task is being performed and the graphics processing pipeline can then be configured (or re-configured) accordingly to perform the desired processing operation. This is illustrated, for example, in FIG. 11. FIG. 11 thus illustrates a state machine 112 showing, for an incoming primitive 110 to be processed, how the primitive 110 is processed differently according to the different possible states of the graphics processor in this first example.

For example, when the graphics processor is performing the first, pre-pass operation (i.e. the graphics processor is configured in the pre-pass state 114), the primitive is accordingly processed in the manner described above with the graphics processing pipeline configured as shown in FIG. 8, with (only) those processing stages 'active', such that the primitive is processed by the graphics processing pipeline up to and including the depth testing/updating of the depth buffer, but the processing of the primitive finishes at that point, without performing further processing. Correspondingly, when the graphics processor is performing the second, main pass operation (i.e. the graphics processor is configured in the main pass state 116), the (same) primitive is processed again but with the graphics processing pipeline configured as shown in FIG. 9, in the main pass stage, with a different set of processing stages 'active'. Thus, during the second, main pass operation, as described above, the (same) primitive may be processed again up to the depth testing, but the depth testing is now modified to perform an equals test, and the fragment shader and blending stages are additionally active such that a fragment shader is then executed, and blending is performed, for fragments that survive the depth equals test, to thereby produce the final rendered output data.

On the other hand, in the third, fallback operation (state 118), the primitive is processed with the graphics processing pipeline configured as shown in FIG. 10. In this case, the primitive undergoes depth (and optionally stencil) testing with any fragments that survive the early/late depth testing being shaded accordingly, e.g. in the normal manner for depth (stencil) testing. For example, in the fallback state, all of the graphics processing pipeline stages may be 'active' such primitives are processed in full in a single processing pass.

Example 1—Primitive Classification

As mentioned above, the determination as to whether or not a primitive is compatible with being processed by the pre-pass operation (and hence the possible triggering of the third, fallback operation, when needed) is performed based on a primitive "classification". In general, there are various reasons why a primitive may not be compatible with being processed by the pre-pass operation, depending on exactly how the pre-pass operation is configured. The primitive classification can thus be performed by checking various conditions associated with the primitive (or properties of the primitive) to determine whether the primitive is or is not compatible with the pre-pass operation.

Figure 12:
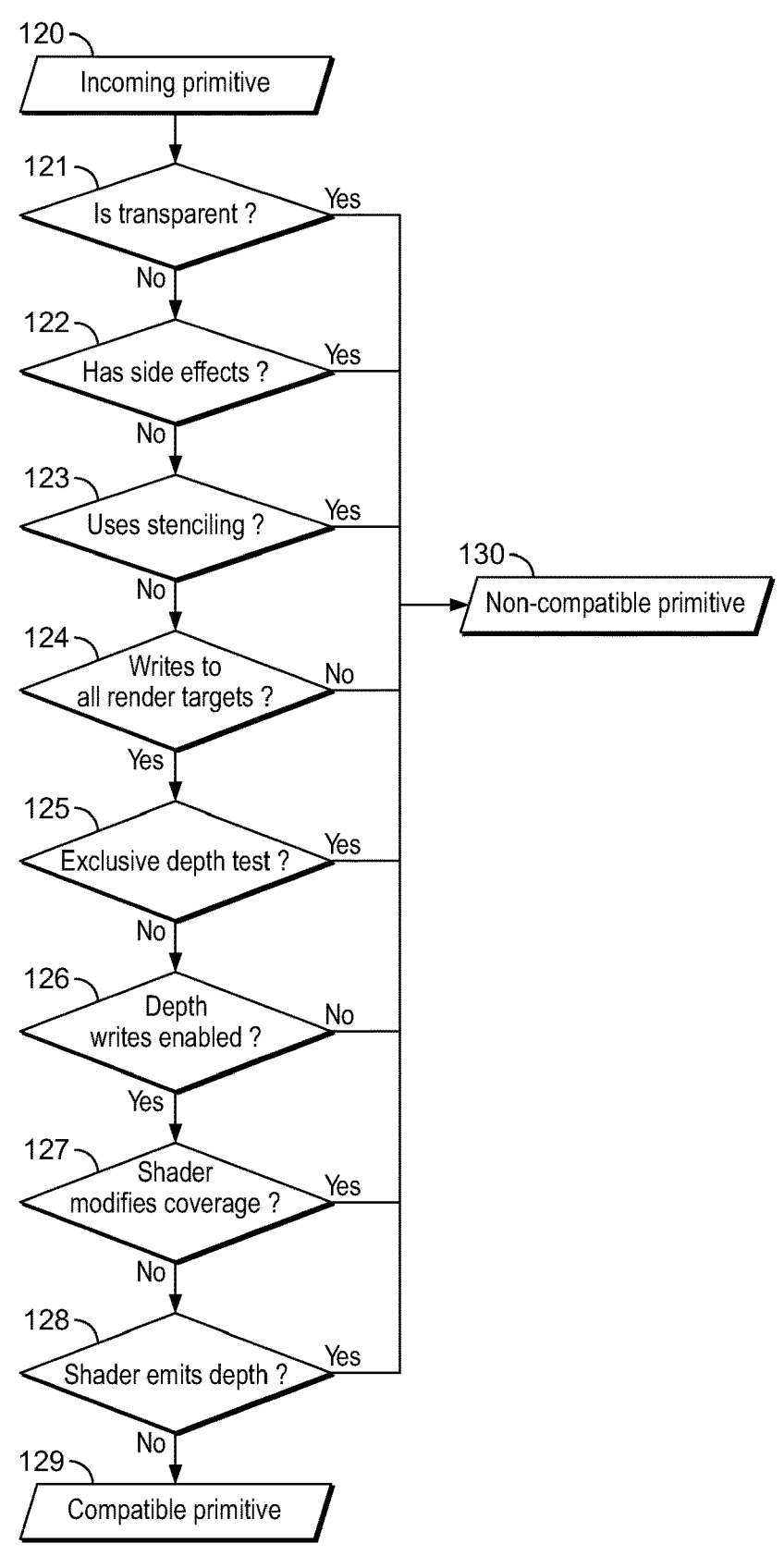
FIG. 12 illustrates a primitive classification process according to the first example.

FIG. 12 shows an example primitive classification process for the first example described above in which the pre-pass operation is configured as shown in FIG. 8 and the corresponding main pass operation is configured as shown in FIG. 9. In this example, as mentioned above, the pre-pass operation populates a depth buffer, and the second, main pass operation then performs 'equals' depth testing against the depth buffer, with only primitives that survive the equals depth testing being further processed by the second, main pass operation.

In this example, for an incoming primitive 120 to be classified, the conditions that are checked to determine whether a primitive is (potentially) incompatible with the pre-pass operation in this example include the following conditions;

1) The primitive is transparent (step 121)—since transparent primitives will typically not update the depth buffer and so would be incorrectly culled by the depth equals test during the main pass shown in FIG. 9;
2) The primitive has side effects (step 122)—since any primitives with side effects should generally only be processed once;
3) The primitives uses stencilling (step 123);
4) The primitive doesn't write to all render targets (step 124);
5) The primitive uses an exclusive depth test during the first, pre-pass operation (such as a 'greater than' test rather than a 'greater than or equals' depth test) (step 125);
6) The primitive does not write depth (step 126);

7) A fragment shader is required to determine the primitive coverage (in other words the fragment shader potentially modifies the coverage) (step 127); or 8) A fragment shader is required to determine the depth value (in other words the fragment shader emits a depth value) (step 128).

As shown in FIG. 12, the primitive classification process in this first example thus comprises checking each of the conditions listed above in order to determine whether or not the primitive is compatible, and only if none of the conditions are satisfied is the primitive identified as being compatible with the pre-pass (step 129). That is, in this example, with the pre-pass operation configured as described above, if any of the above conditions are satisfied, the primitive is identified as being incompatible with the pre-pass (step 130), and is handled accordingly (i.e. by causing the graphics processor to switch to the third, fallback operation to process that primitive).

The result of the primitive classification process is therefore to identify whether or not primitives are compatible with being processed by the first, pre-pass operation. The primitive classification result can therefore be provided to the pre-pass decision unit 83 to control the state of the graphics processor according to the state machine shown in FIG. 7 and thus control depending on which state the graphics processor is currently in how the primitive should be processed (as shown in FIG. 11). It will be appreciated that this primitive classification may generally be performed on a primitive-by-primitive basis or for larger units of geometry, e.g. on a draw call basis, depending on how the system is configured. For instance, the properties identified above will typically vary only on a draw call basis, such that classification can be (and in embodiments is) performed for draw calls of primitives. Other arrangements would however be possible.

The primitive classification process shown in FIG. 12 may be performed during the first, pre-pass operation by the primitive classification unit 82 with the result of the primitive classification then being used accordingly by the pre-pass decision unit 83 to determine how the processing should continue (i.e. whether the pre-pass operations should continue or whether the pre-pass should be terminated, and the primitive instead subsequently processed by the fallback operation).

However, it will be appreciated that at least some of the primitive properties that are being considered during the primitive classification in FIG. 12 will typically be known in advance, such that some or all of the primitive classification process that is shown in FIG. 12 may correspondingly also be performed in advance, e.g. by the driver 4 for the graphics processor 3 when preparing the corresponding command stream for the graphics processor 3. In that case, the driver may annotate the primitives (or draw calls) within the command stream accordingly with a suitable flag (e.g. an associated bit) to indicate to the graphics processor whether or not the primitive is compatible with the pre-pass operation. The flag can then be provided to the graphics processor and checked accordingly by the primitive classification unit 82 with the result of the primitive classification checking then being used by the pre-pass decision unit 83 to determine whether (and how) the processing should continue. For example, if an 'incompatible' flag is present (i.e. the relevant bit is set, or not set, depending on design), the primitive classification unit 82 can identify this, and the pre-pass decision unit 83 can then trigger the third, fallback operation appropriately. Typically, however, at least some of the primitive classification is performed at run-time, during the respective first, pre-pass and/or second, main pass operations, particularly for the more complex classifications that will be described in the examples that follow later.

It will be appreciated that the primitive classification process shown in FIG. 12 is based on the particular configuration of the pre-pass operation in the first example described above, wherein the pre-pass includes the specific processing operations shown in FIG. 8 but does not, e.g., perform stencilling, or execute a fragment shader, such that any primitives that require stencilling, or that require a fragment shader to be executed, are treated as incompatible. Thus, it should be understood, that depending on the particular configuration of the pre-pass operation, there may be (and generally will be) different sets of conditions that mean that a primitive may or may not be compatible with being processed by that pre-pass operation. That is, the pre-pass operation according to embodiments of the technology described herein may be more or less complex as desired and may therefore be able to handle various different types of primitives without having to revert to the third, fallback operation. Various arrangements are contemplated in this regard and a number of examples will now be contemplated to illustrate alternative pre-pass configurations that can handle further types of primitives (or further primitive properties).

Example 2—Exclusive Depth Test Disambiguation

For instance, in the primitive classification process shown in FIG. 12 relating to the first example, a primitive is considered to be incompatible with the pre-pass operation if the primitive depth testing uses an exclusive depth test (step 125). This is because if an exclusive depth test is specified for a primitive, because the depth testing that is performed during the second, main pass operation is modified to use depth 'equals' test (for all primitives, regardless of the depth test function used during the first, pre-pass operation, e.g. as specified by the application), if there are two primitives that write the same depth value, the second, main pass may not be able to replicate the correct rendering behaviour.

In particular, when two primitives write the same depth value, but the depth test function used in the first, pre-pass operation for the later primitive is an exclusive test (i.e. is strictly 'less than' or 'greater than', rather than 'less than or equal', 'greater than or equal', or 'equals'), the correct behaviour as specified by the API requirements is for the later primitive to be culled. That is, if the depth buffer is updated by the earlier primitive to record that depth value, the later primitive with the same depth value should fail the exclusive depth test, e.g. since its depth value would be equal to the depth value stored in the depth buffer, and not strictly greater (or lesser) than the stored depth value. However, because for the purposes of the present embodiments the depth test in the second, main pass operation is modified to comprise a depth 'equals' test for all primitives, in this situation, the later primitive writing the same depth value would also incorrectly survive the depth 'equals' test.

In some embodiments, therefore, any primitives that the application specifies should use an exclusive depth test function during the first, pre-pass operation are therefore simply treated as being incompatible with the pre-pass operation, and are instead caused to be processed by the third, fallback operation. This is the case, for example, in FIG. 12, as shown above. This can work well to ensure continued safe processing of the primitives for the render output in such situations.

In other embodiments, however, according to a second example, the pre-pass and corresponding main pass operations can be configured to handle such primitives by providing a suitable depth test disambiguation mechanism that allows two primitives that write the same depth value to be disambiguated to thereby ensure the correct rendering behaviour. For example, as mentioned above, when there are two primitives that write the same depth value, the correct rendering behaviour for the later primitive when the later primitive uses an exclusive depth test function in the first, pre-pass operation is for the later primitive to be culled. (Whereas, if the later primitive uses an inclusive depth test function, it should survive.)

The solution to this in the second example is to store in the depth buffer a suitable 'tracking' bit that can be set/cleared appropriately during the first, pre-pass operation and/or during the second, main pass operation in order to ensure the correct rendering behaviour. This depth test disambiguation mechanism is illustrated, for example, in FIG. 13 and FIG. 14. In these examples it is assumed that the depth compare function is either a 'greater than' (exclusive) or 'greater than or equals' (inclusive) test. However, a similar approach could also be used for 'lesser than' (exclusive) or 'lesser than or equals' (inclusive) tests.

Figure 13:
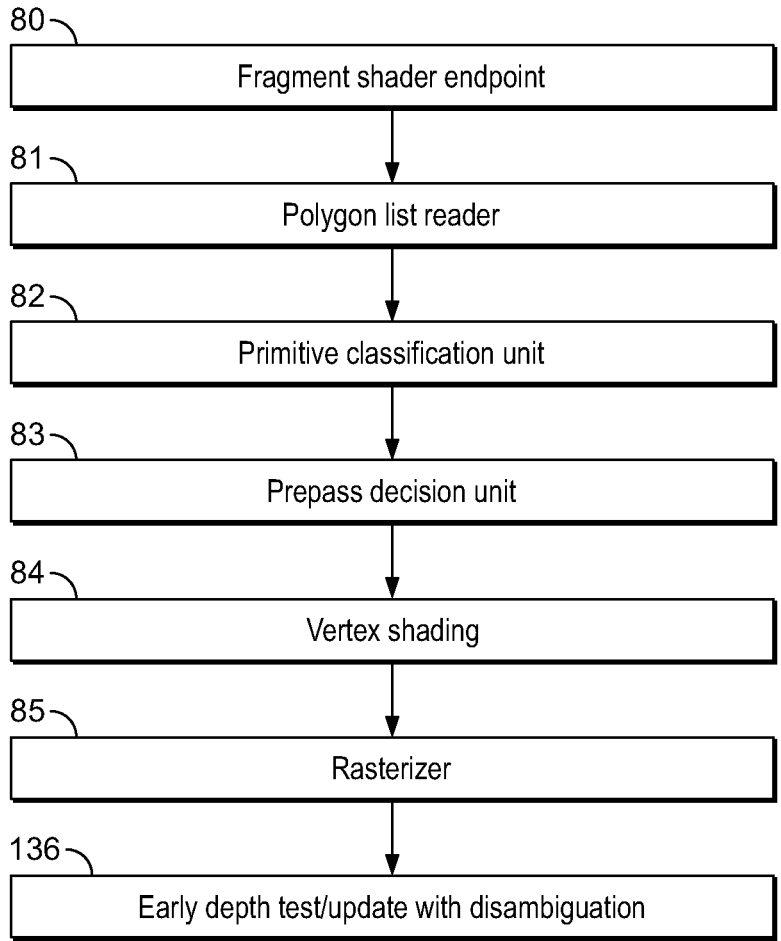
FIG. 13 shows schematically a sequence of processing operations for a pre-pass operation according to a second example including a depth test disambiguation mechanism.

FIG. 13 illustrates the processing operations (the graphics processing pipeline) according to the first, pre-pass operation according to this second example. The processing operations are the same as described above in relation to FIG. 8 except the depth testing/updating stage 136 is modified to include a further disambiguation mechanism that sets the 'tracking' bit appropriately to ensure the desired rendering behaviour during the subsequent second, main pass operation. The disambiguation mechanism during the first, pre-pass is illustrated in FIG. 14.

Figure 14:
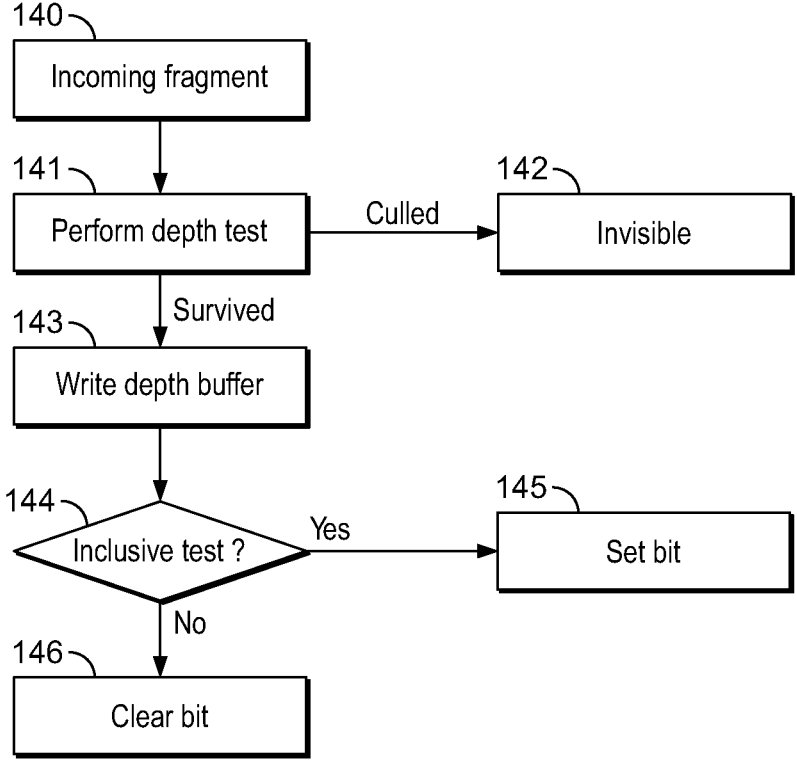
FIG. 14 shows schematically an example of a depth test disambiguation mechanism that may be performed in the pre-pass operation according to the second example.

As shown in FIG. 14, for an incoming fragment 140 to the depth testing/updating stage 136, depth testing is performed for the fragment (step 141). The fragment depth testing is performed in the normal manner for (early) depth testing. For instance, the primitive that generated the fragment will be associated a certain depth test function that has been specified for the primitive (e.g. by the application). The fragment's depth value is then tested against the corresponding entry in the depth buffer according to the specified depth test function. If the fragment fails the depth testing, the fragment is determined to be invisible, and so is culled on that basis (without updating the depth buffer) (step 142). On the other hand, if the fragment survives the depth testing, the depth buffer is updated accordingly (step 143) to record the depth value of the fragment.

In the event that a fragment causes an update to the depth buffer (step 143), it is then further checked whether the specified depth test function for the fragment that caused the depth buffer updated was an inclusive test function (step 144). If the depth test function is inclusive (step 144—yes), the extra 'tracking' bit in the depth buffer associated with the sampling position in question is set accordingly (step 145). Otherwise, if the depth test function is exclusive (step 144—no), the 'tracking' bit is not set (or is cleared if it has previously been set) (step 146).

Thus, during the first, pre-pass operation, if a fragment survives the original depth (or stencil) test, the corresponding 'tracking' bit associated with the sampling position is then set/cleared accordingly depending on whether or not the original depth test function was inclusive or exclusive.

For example, in an embodiment, if a fragment survives the original depth (or stencil) test, and the original depth test function for the fragment is inclusive, the 'tracking' bit is in an embodiment set to a first value (e.g. to '1') at this point. On the other hand, if a fragment survives the depth (or stencil) test, and the original depth test function for the fragment is exclusive, the 'tracking' bit is in an embodiment cleared (to '0', or generally set to a second value).

The processing of primitives continues in this way and the resulting content of the depth buffer at the end of the first, pre-pass operation is then stored appropriately for use by the subsequent, second, main pass. Thus, the status of the extra per-sample 'tracking' bit is carried through to the second, main pass with the depth buffer. The 'tracking' bit can thus be used during the depth testing in the second, main pass to ensure the correct rendering behaviour. The use of this 'tracking' bit during the second, main pass operation is illustrated, for example, in FIG. 15 and FIG. 16.

Figure 15:
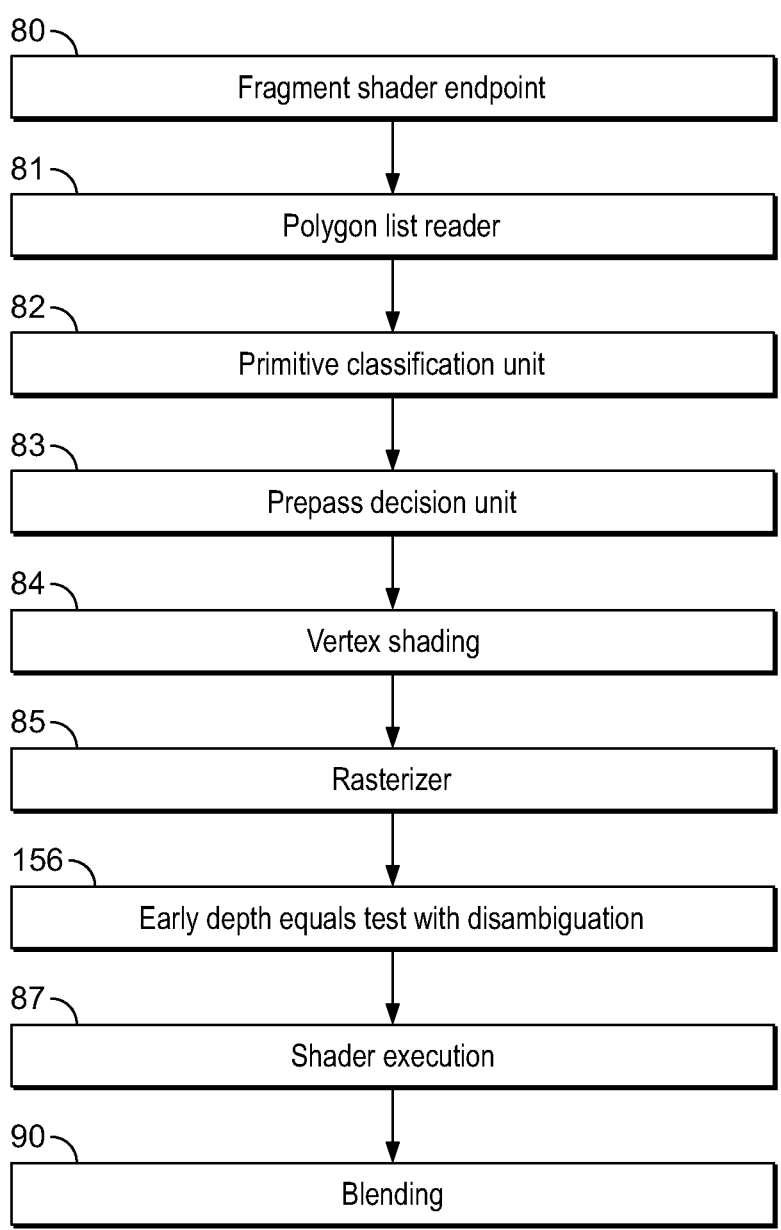
FIG. 15 shows schematically a sequence of processing operations for a corresponding main pass operation to be performed after the pre-pass operation shown in FIG. 13 according to the second example.

FIG. 15 illustrates the processing operations (the graphics processing pipeline) according to the second, main pass operation in this example. The processing operations are the same as described above in relation to FIG. 9 except the depth equals test 156 is modified to include a further disambiguation process that checks the status of the extra bit appropriately to ensure the desired rendering behaviour. The disambiguation process during the second, main pass is illustrated in FIG. 16.

Figure 16:
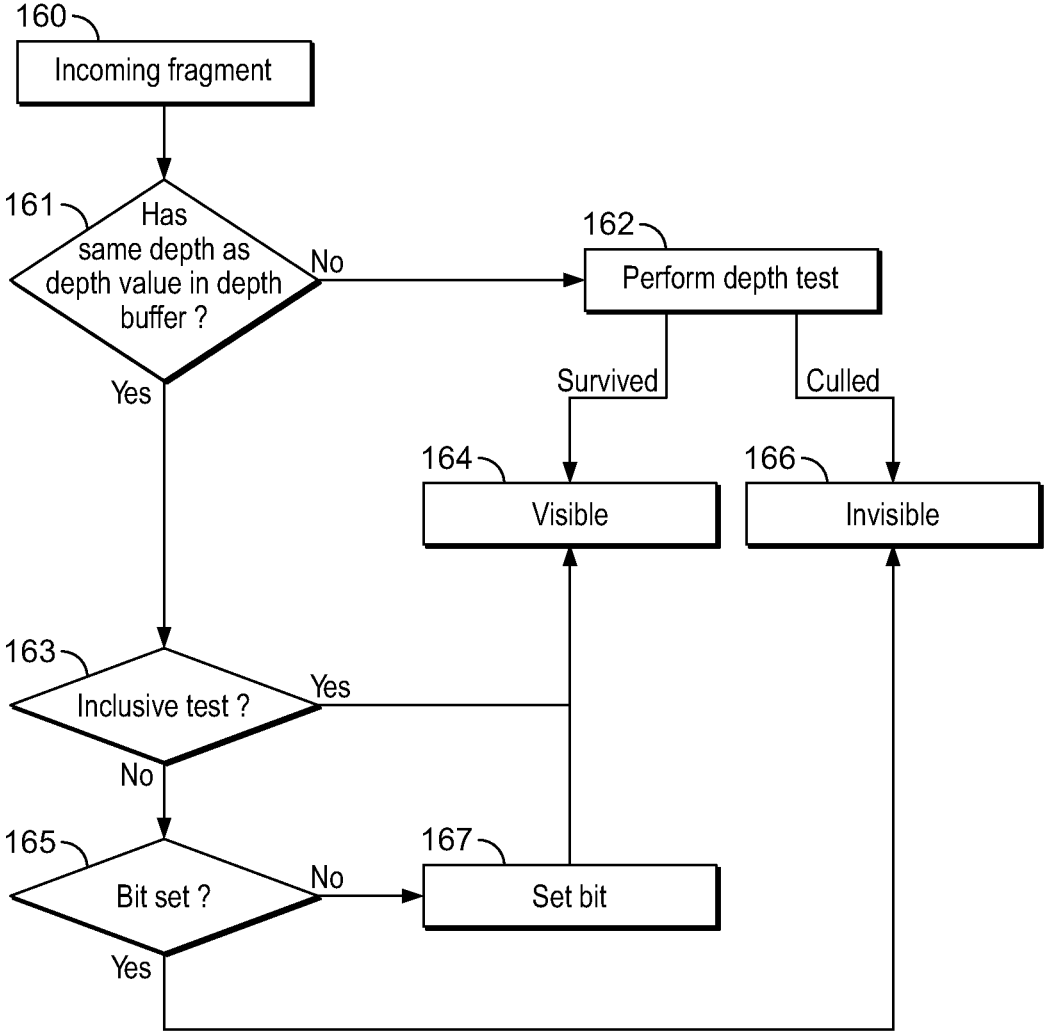
FIG. 16 shows the corresponding depth test disambiguation mechanism in the second, main pass operation according to the second example

FIG. 16 thus shows the processing flow that is performed during the second, main pass operation for fragments incoming to the depth equals test 156 stage in FIG. 9. For an incoming fragment 160 to the depth equals test 156, it is thus checked whether the fragment 160 has the same depth value as the corresponding depth value recorded in the depth buffer (step 161). If the depth values do not match (step 161—no), further depth testing may then be performed (step 162), and depending on the outcome of the depth testing, the fragment may either survive the depth testing (such that it is determined to be visible—step 164), or may be culled at this point (such that it is determined to be invisible—step 166) (note that in this example, when using the depth 'equals' test, any primitives that do not match the depth value stored in the depth buffer (step 161—no) may already be culled on that basis, such that the further depth testing (at step 162) may not be necessary in this example).

On the other hand, if the depth values do match, such that the fragment 160 survives the depth equals test (step 161—yes), it is then checked whether the original specified depth test function for the associated primitive (and hence for the fragment) was an inclusive test (step 163). If the original depth test function was inclusive (step 163—yes), the fragment 160 should be rendered, and the fragment 160 is therefore determined to be visible (step 164). However, if the original depth test function was exclusive (step 163—no), the correct rendering behaviour is that only the first fragment at that depth value should survive. It is therefore checked whether or not the 'tracking' bit in the depth buffer associated with the sampling position in question has been set (step 165).

If the 'tracking' bit has not been set (step 165—yes), this means that the fragment 160 is the first fragment having that depth value, and the fragment 160 should therefore survive (and so the fragment is determined to be visible—step 164). At this point, the 'tracking' bit is set (step 167). This then means that if another later primitive is processed that has the same depth value (step 161—yes), and for which an inclusive test was used (step 163—yes), the 'tracking' bit will have been set at this point, i.e. by a previous primitive having the same depth value. Thus, when the later primitive is processed, it will now be determined at this step that the 'tracking' bit is set (step 165—yes), which will cause the later fragment to be (correctly) culled (step 166).

Accordingly, if the fragment survives the depth equals test during the second, main pass operation, the behaviour is then determined based on the original depth test function for the fragments and the state of the 'tracking' bit is then set as follows;

(i) If the fragment's original depth test function was inclusive and the 'tracking' bit is set, the fragment is passed, and is processed further to generate the desired rendered output data;

(ii) If the fragment's original depth test function was inclusive and the 'tracking' bit is not set, the fragment can be (and in an embodiment is) culled (note that this state should not be possible as the 'disambiguation' bit should always be in the first state if the original depth test function was inclusive);

(iii) If the fragment's original depth test function was exclusive and the 'tracking' bit is set, the fragment can be (and in an embodiment is) culled; and (iv) If the fragment's original depth test function was exclusive and the 'tracking' bit is not set, the fragment is passed, and is processed further to generate the desired rendered output data, and the 'tracking' bit is set at this point.

The effect of all this is therefore that the extra 'tracking' bit essentially tracks for fragments for primitives for which the original depth test function was exclusive whether or not the fragment for the primitive was the fragment that caused the depth buffer update, and hence whether or not the fragment should be processed further. In particular, because the 'tracking' bit is set (to the first state) as a result of condition (iv) being met, this ensures that any later arriving fragments that write the same depth value but for which the original depth test function was exclusive will be correctly culled (based on the 'tracking' bit being set).

In this way, the extra 'tracking' bit in the depth buffer can be used to ensure the correct rendering behaviour is maintained, even when the depth testing in the second, main pass is modified to use a depth equals test, such that the original depth test function is not used during the second, main pass. By providing such mechanism for disambiguating primitives that write the same depth value based on the type of depth test function, this means that such primitives can be safely handled by the pre-pass operation.

For instance, consider an example in which three primitives P0, P1, P2 all write the same depth value, and in which each primitive may have either an inclusive or an exclusive depth compare function. The following table then shows the operation according to each of the eight possible cases. It can be seen that in all cases the desired rendering behaviour is achieved (i.e. the final visible primitive is the correct primitive based on the application-specified depth compare functions).

TABLE 1

| Depth Test Disambiguation Examples | | | | | | | | | |
|---|---|---|---|---|---|---|---|---|---|
| Depth Compare Functions | | | Pre-Pass Results | | | | Main Pass Results | | Final visible |
| P0 | P1 | P2 | P0 | P1 | P2 | Bit | P0 | P1 | P2 | primitive |
| Excl. | Excl. | Excl. | Pass Z, clear bit | Fail Z | Fail Z | 0 | Pass Z. Pass bit test. Set bit. Survive | Pass Z. Fail bit test. Cull | Pass Z. Fail bit test. Cull | P0 |
| Excl. | Excl. | Incl. | Pass Z, clear bit | Fail Z | Pass Z test, set bit | 1 | Pass Z. Fail bit test. Cull | Pass Z. Fail bit test. Cull | Pass Z. Pass bit test. Survive | P2 |
| Excl. | Incl. | Excl. | Pass Z, clear bit | Pass Z, set bit | Fail Z | 1 | Pass Z. Fail bit test. Cull | Pass Z. Pass bit test. Survive | Pass Z. Fail bit test. Cull | P1 |
| Excl. | Incl. | Incl. | Pass Z, clear bit | Pass Z, set bit | Pass Z, set bit | 1 | Pass Z. Fail bit test. Cull | Pass Z. Pass bit test. Survive | Pass Z. Pass bit test. Survive | P2 |
| Incl. | Excl. | Excl. | Pass Z, set bit | Fail Z | Fail Z | 1 | Pass Z. Pass bit test. Survive | Pass Z. Fail bit test. Cull | Pass Z. Fail bit test. Cull | P0 |
| Incl. | Excl. | Incl. | Pass Z, set bit | Fail Z | Pass Z, set bit | 1 | Pass Z. Pass bit test. Survive | Pass Z. Fail bit test. Cull | Pass Z. Pass bit test. Survive | P2 |
| Incl. | Incl. | Excl. | Pass Z, set bit | Pass Z, set bit | Fail Z | 1 | Pass Z. Pass bit test. Survive | Pass Z. Pass bit test. Survive | Pass Z. Fail bit test. Cull | P1 |
| Incl. | Incl. | Incl. | Pass Z, set bit | Pass Z, set bit | Pass Z, set bit | 1 | Pass Z. Pass bit test. Survive | Pass Z. Pass bit test. Survive | Pass Z. Pass bit test. Survive | P2 |

It should be noted that the disambiguation mechanism described above assumes that the depth test function is monotonic, i.e. that the polarity of the depth test function does not change between primitives (or between the front/back faces of a primitive) within a sequence of primitives, e.g., such that the depth test function does not change from a 'greater than' (or 'greater than or equal to') test to a 'less than' (or 'less than or equal to') test, or vice versa, and also that the depth test function does not change to 'always' write to the depth buffer. In those cases, the correct rendering behaviour becomes more complex such that it may not be possible to track the correct behaviour using a single 'tracking' bit and more complex tracking mechanisms may therefore need to be used. Otherwise, such cases can be handled using the fallback operation, which is the case in this example.

Figure 17:
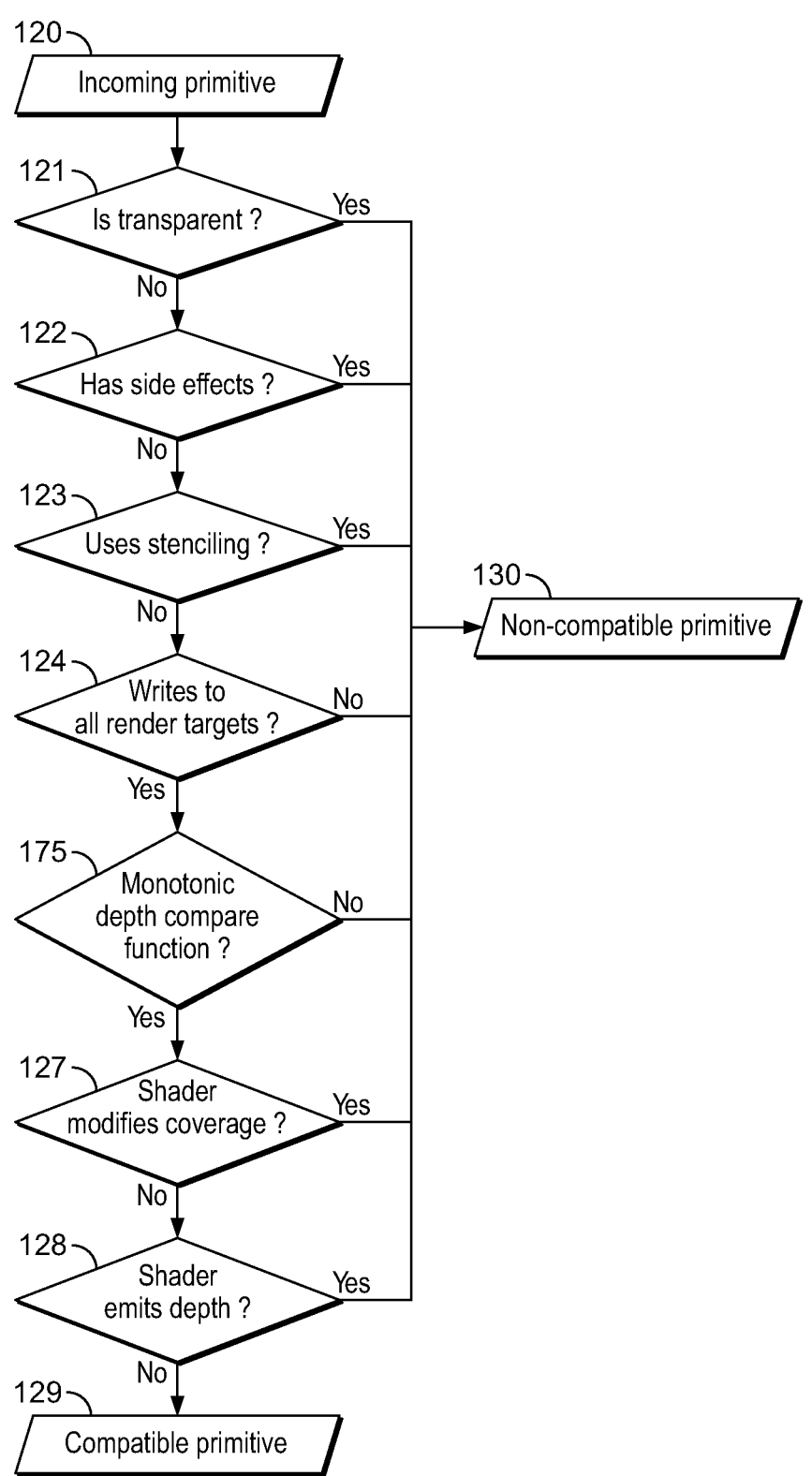
FIG. 17 illustrates a primitive classification process according to the second example in which primitives having an exclusive depth test function are no longer treated as being incompatible with the "pre-pass" operation.

Thus, the primitive classification process for this example is shown in FIG. 17, and as shown, the primitive classification generally checks the same conditions as the example shown in FIG. 12, except rather than checking whether the primitive has an exclusive depth test function (step 125 in FIG. 12), it is instead checked whether the primitive has a monotonic depth compare function (at step 175). In this example, the third, fallback operation may therefore (and will) be triggered accordingly when it is determined that the depth test function changes polarity within a sequence of primitives. Note that it is also no longer required for this example to check that depth writes are enabled as the limitation that the depth compare function must be monotonic eliminates this requirement as well.

Example 3—Stencilling

The description so far focusses mainly on determining visibility information based on depth testing fragments for primitives during the first, pre-pass operation, and then using the depth buffer determined by the first, pre-pass operation to control the subsequent rendering of primitives during the second, main pass operation. For instance, in the first and second examples presented above, stencilling is not performed either in the first, pre-pass operations or the corresponding second, main pass operations. Thus, for these examples, stencilling is effectively disabled, and any primitives that require stencilling are therefore instead treated as incompatible primitives during the primitive classification process, as shown in FIG. 12. In the examples described so far, any primitives requiring stencilling are therefore processed subsequently by the third, fallback operation (for which both depth and stencil test/updates are performed, as shown in FIG. 10).

However, it will be appreciated stencilling may in some cases (and in some embodiments is) handled in a similar manner as the depth testing described above. For example, certain types of stencil testing can be performed during the first, pre-pass operation in a corresponding manner as the depth testing described above in order to populate a stencil buffer, e.g., and in particular, so long as the front and back compare operations are monotonic (have the same polarity). The stencil buffer can then be used to control fragment processing during the second, main pass by performing a suitable stencil 'equals' test. Again, if two primitives write the same stencil value, a suitable disambiguation mechanism may be required in the situation that an exclusive stencil test function is being used. The stencil equals testing disambiguation mechanism is in an embodiment performed in the same manner described above in relation to the depth equals testing disambiguation mechanism, but now using an additional per-sample 'tracking' bit associated with the stencil buffer.

Figure 18:
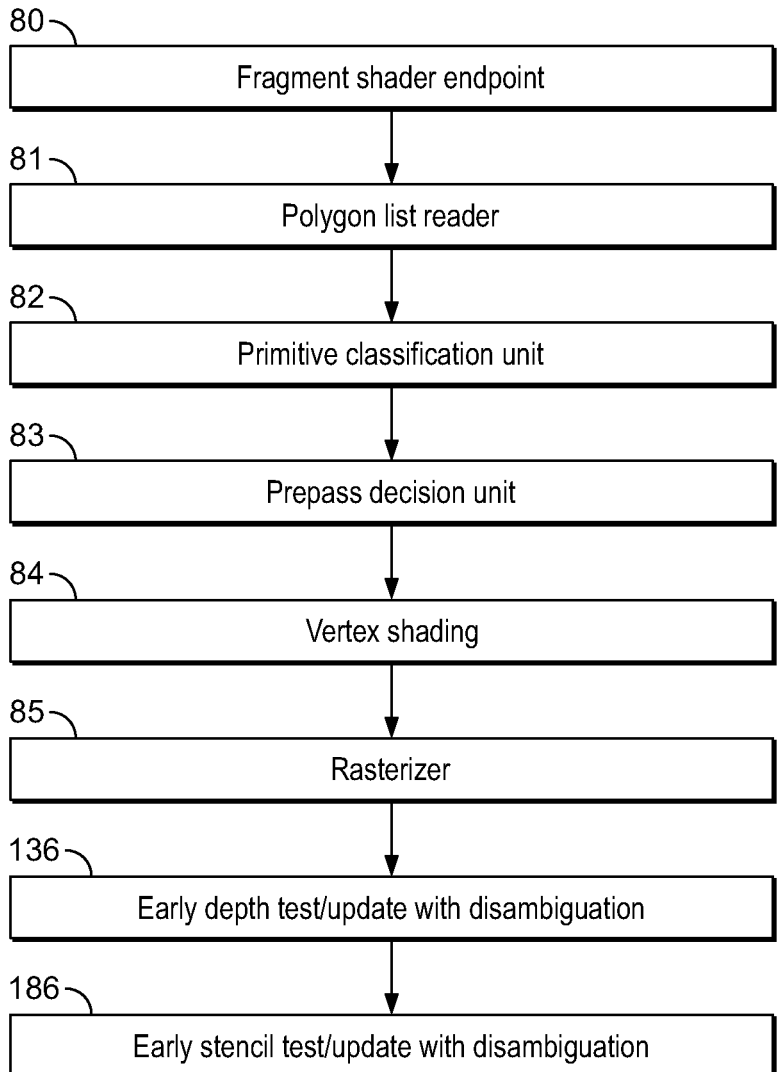
FIG. 18 shows schematically a sequence of processing operations for a pre-pass operation according to a third example in which stencil testing/updating is performed.

FIG. 18 illustrates the processing operations (the graphics processing pipeline) according to the first, pre-pass operation in a further example in which stencilling is enabled. The processing operations are otherwise the same as described above in relation to FIG. 8 and FIG. 13 except that there is an additional step of early stencil test/update with disambiguation 186 performed after the depth test/update 136. The per-sample 'tracking' bit that is stored in the stencil buffer can thus be set/cleared accordingly during the first, pre-pass operation in the same manner described above in relation to FIG. 14, but based on the stencil test rather than the depth test (at step 141). The corresponding disambiguation process for stencilling during the second, main pass operation is thus illustrated in FIG. 19 and basically mirrors the disambiguation process for depth testing described above in relation to FIG. 16.

Figure 19:
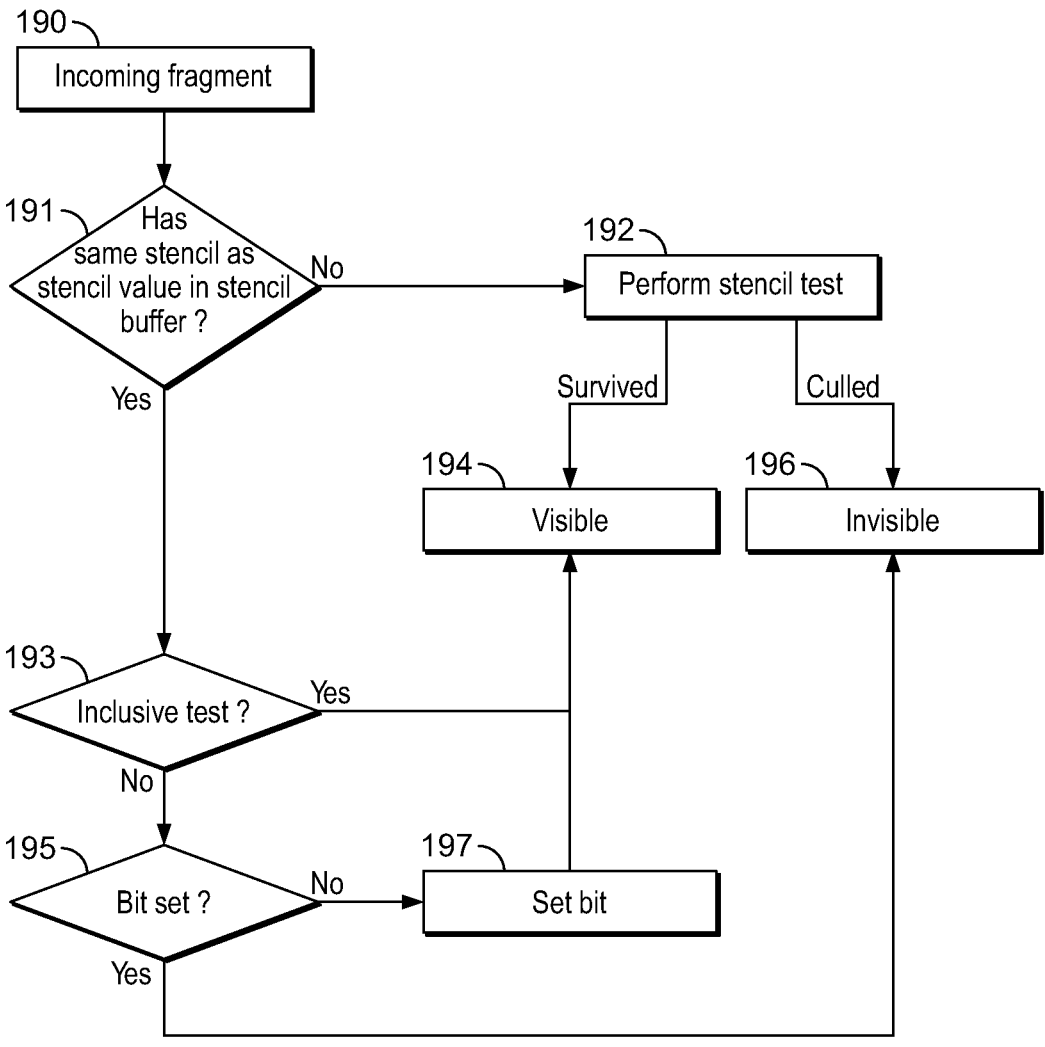
FIG. 19 shows schematically a stencil test disambiguation mechanism that may be performed during the second, main pass operation according to the third example.

Thus, as shown in FIG. 19, for an incoming fragment 190 to the stencil test 186, it is thus checked whether the fragment 190 has the stencil value as the corresponding stencil value recorded in the stencil buffer (step 191). If the stencil values do not match (step 191—no), further stencil testing may then be performed (if necessary/desired) (step 192), and depending on the outcome of the stencil testing, the fragment may either survive the stencil testing (such that it is determined to be visible—step 194), or may be culled at this point (such that it is determined to be invisible—step 196). If the stencil values do match, such that the fragment 190 survives the stencil equals test (step 191—yes), it is then checked whether the original specified stencil test function for the associated primitive (and hence for the fragment) was an inclusive test (step 193). If the original stencil test function was inclusive (step 193—yes), the fragment 190 should be rendered, and the fragment 190 is therefore determined to be visible (step 194). However, if the original stencil test function was exclusive (step 193—no), the correct rendering behaviour is that only the first fragment at that stencil value should survive. At this point, it is therefore checked whether or not the 'tracking' bit in the stencil buffer associated with the sampling position in question has been set (step 195). If the 'tracking' bit has not been set (step 195—yes), this means that the fragment 190 is the first fragment having that stencil value, and the fragment 190 should therefore survive (and so the fragment is determined to be visible—step 194). At this point, the 'tracking' bit is set (step 197). This means that if another later primitive is processed that has the same stencil value (step 191—yes), and for which an inclusive test was used (step 193—yes), the 'tracking' bit will have been set at this point, i.e. by a previous primitive having the same stencil value. Thus, it will be determined at this point that the 'tracking' bit is set (step 195—yes), which will cause the later fragment to be (correctly) culled (step 196).

Figure 20:
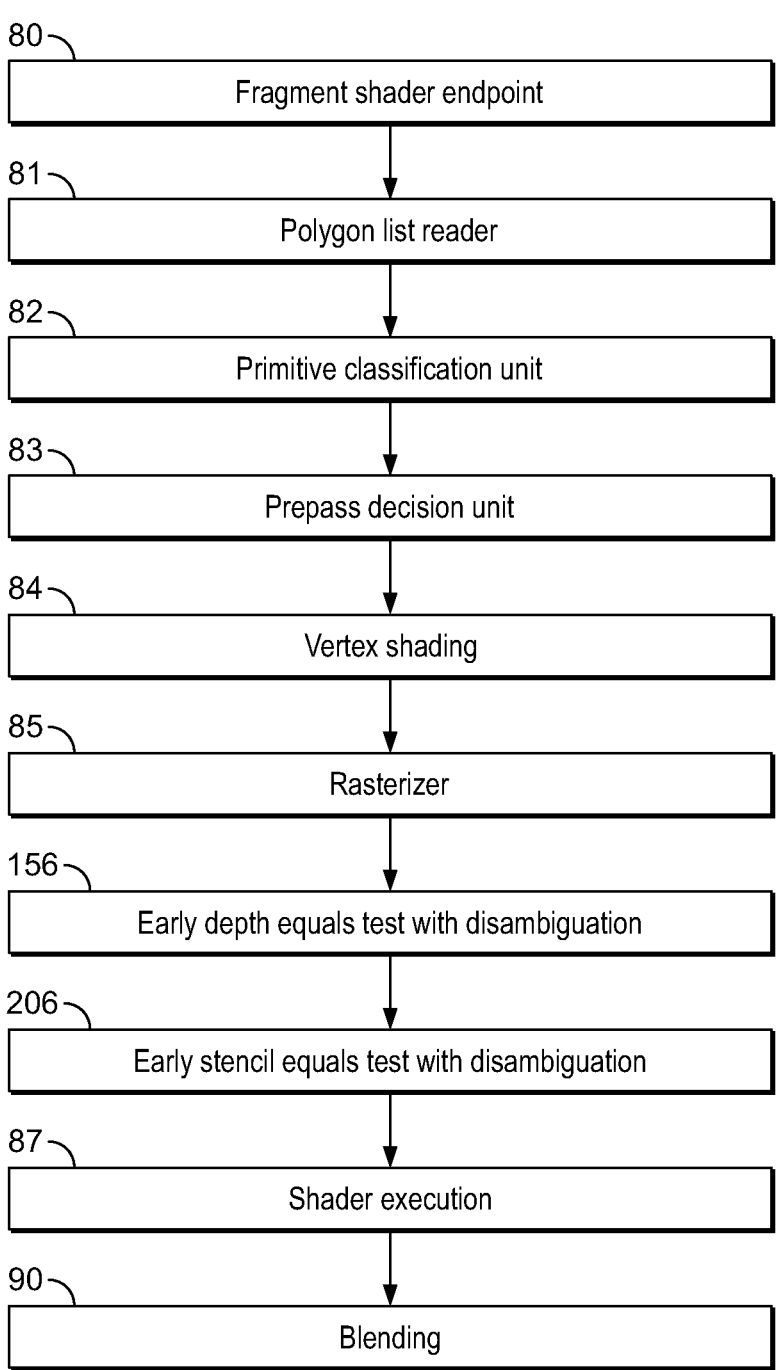
FIG. 20 shows the sequence of processing operations for corresponding main pass operation to be performed after the pre-pass operation shown in FIG. 18 according to the third example.

FIG. 20 illustrates the corresponding processing operations (the graphics processing pipeline) according to the second, main pass operation in this further example in which stencilling is enabled. This is the same as the processing pipeline illustrated in FIG. 15 except that an additional early stencil equals test with disambiguation stage 206 is included after the early depth equals test with disambiguation stage 156.

Figure 21:
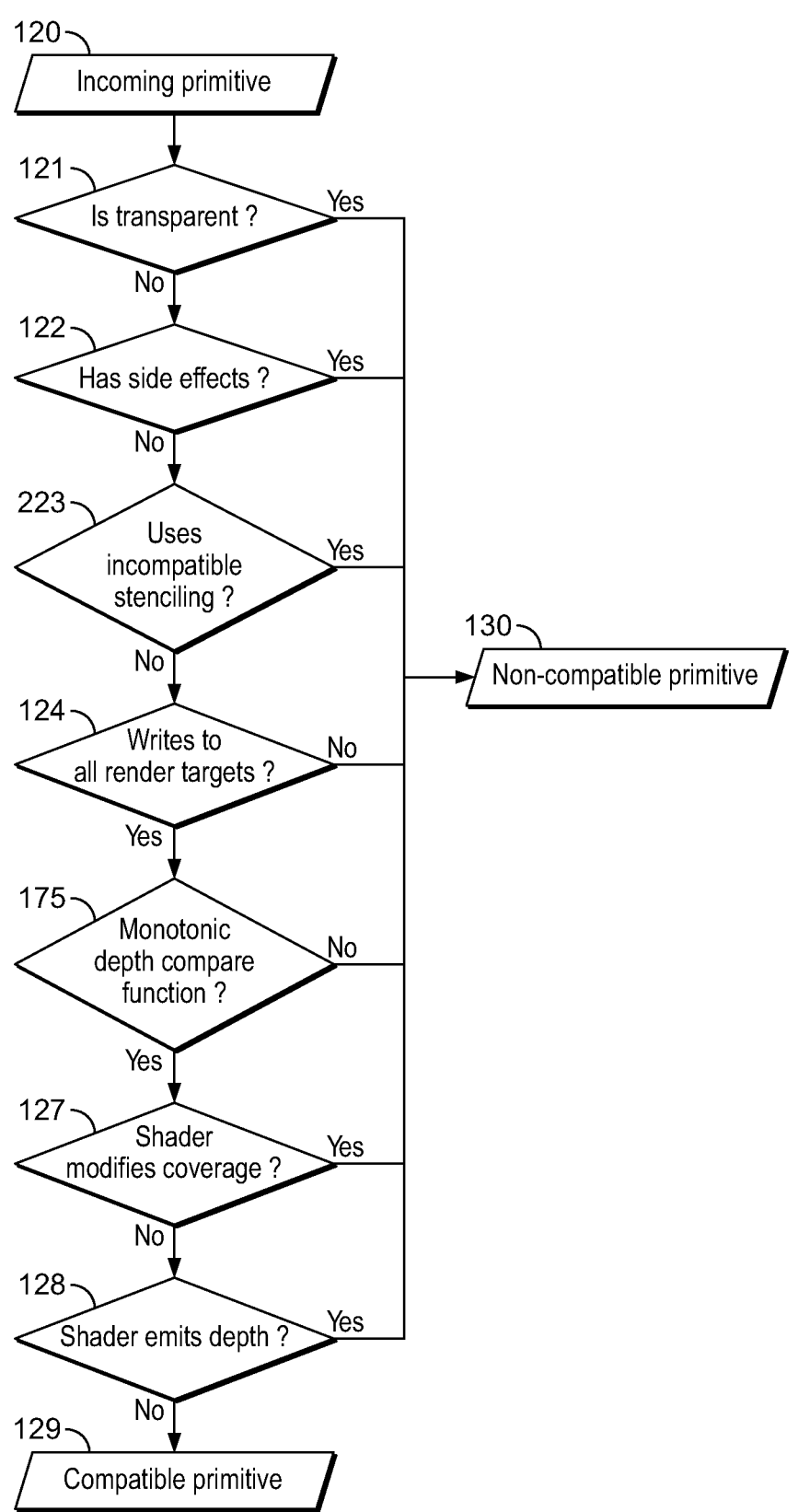
FIG. 21 illustrates a primitive classification process according to the third example in which primitives having certain types of stencilling can be made compatible with the "pre-pass" operation.

The effect of this is that at least some types of stencilling can now be handled by the pre-pass operation. FIG. 21 thus shows a corresponding primitive classification process for this example. In particular, as shown in FIG. 21, the primitive classification is generally the same as described above except now it is only certain types of incompatible stencilling that are considered incompatible with the pre-pass operation (at step 223). That is, there may be some types of stencilling that are still incompatible with the pre-pass operation. There are various conditions that may mean that stencilling is still incompatible with the pre-pass operation and these can generally be determined in advance, e.g. based on the properties of the stencil testing. For example, this may be the case where the front and back stencil test functions have different polarities. In that case, the primitives are therefore still treated as being incompatible, such that they should instead be handled using the third, fallback operation, as described above.

Example 4—Shader Modifies Coverage

In the examples described above, the first, pre-pass operation does not execute a fragment shader. This means that any primitives that require a fragment shader to be executed in order to fully determine the coverage and/or depth values for the primitive must be treated as incompatible, and this is shown accordingly in FIG. 12. That is, as shown in FIG. 12, primitives are determined to be incompatible with the pre-pass operation when the primitive has either of the properties shader modifies coverage (step 127) or shader emits depth (step 128). However, it may be desirable to execute at least a partial fragment shader during the first, pre-pass operation in order to expose the pre-pass to enough information to be able to handle such primitives, and in further examples this is therefore done.

For instance, as explained above, the purpose of the first, pre-pass operation is to determined "visibility" information for the sequence of primitives, which "visibility" information is then usable to control the fragment processing during the second, main pass operation, e.g., and in an embodiment, to cull fragments during the second, main pass operation for which it can be determined based on the visibility information that the fragments have no visible effect for the render output. The "visibility" information is in an embodiment generated based on depth (and optionally stencil) testing the fragments.

The application requiring the graphics processing may however specify various different types of primitives in which fragment shading is required in order to determine the final fragment coverage and/or depth values. Accordingly, for such primitives, it may be desirable to execute a first ("pre-pass") fragment shader routine during the first, pre-pass operation in order to determine the desired "visibility" information (otherwise, the primitive may have to be treated as being 'incompatible' with the pre-pass operation, e.g. and instead processed by a third, fallback operation, as in the examples described so far). An example of this is illustrated in FIG. 22 which shows the configuration of the first, pre-pass operation according to a fourth example in which the first, pre-pass operation is also operable to execute a respective (partial) fragment shader.

Figure 22:
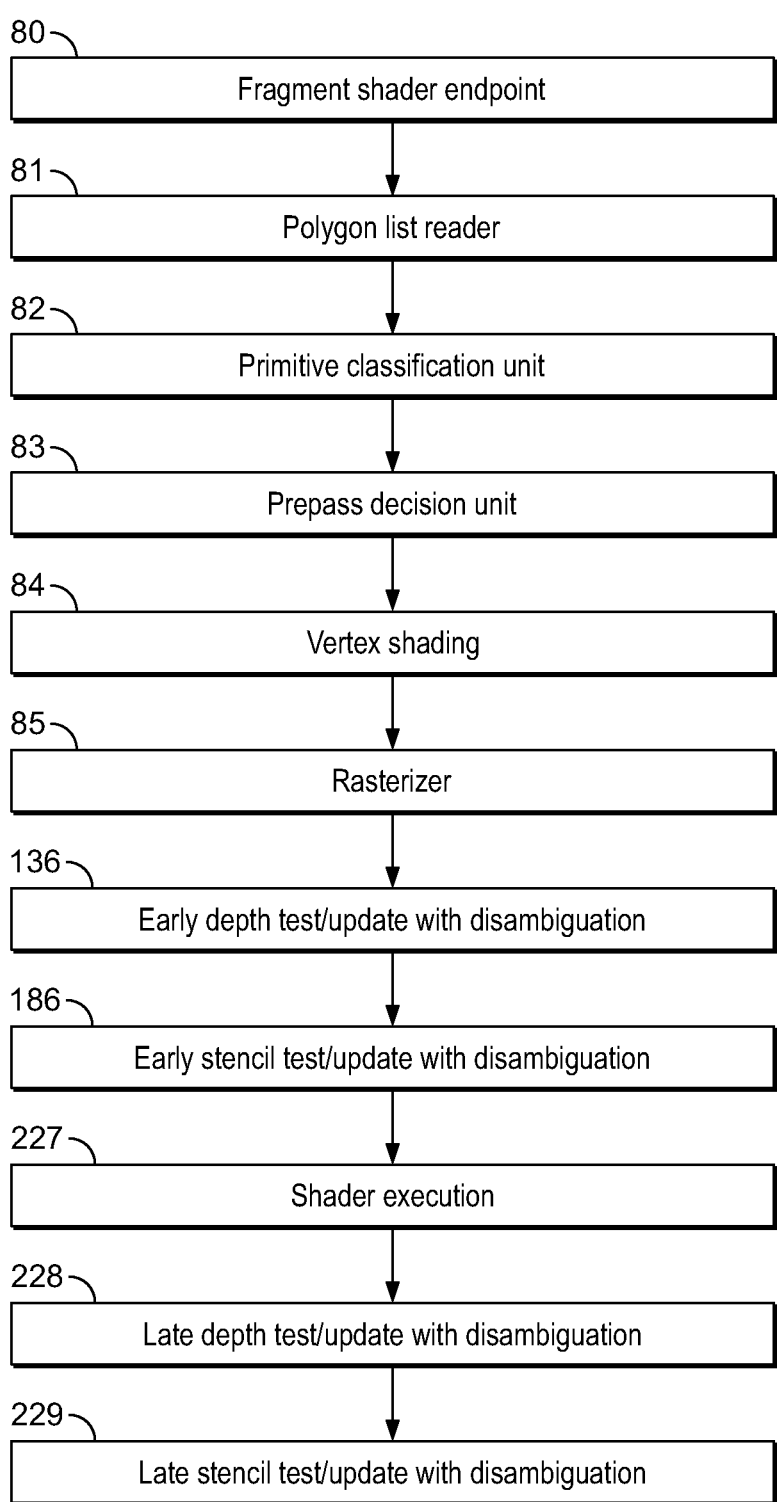
FIG. 22 shows schematically a sequence of processing operations for a pre-pass operation according to a fourth example in which a fragment shader is executed during the first, pre-pass operation.

FIG. 22 thus illustrates the processing operations (the graphics processing pipeline) according to the first, pre-pass operation according to a fourth example in which the visibility information comprises the depth/stencil buffer (such that the initial processing is in common with the example shown in FIG. 18) but in which after the (early) depth/stencil testing is performed, the first, pre-pass operation is further operable to execute a fragment shader 227 at least for primitives that require a fragment shader to be executed to determine the final coverage. The fragment shader 227 can then be executed accordingly to determine the final coverage which can then be used accordingly to perform late depth testing/update 228 and late stencil testing/update 229. The late depth/stencil testing/update can be performed in the normal manner but in an embodiment also include suitable disambiguation mechanisms for ensuring the correct rendering behaviour for primitives that use an exclusive depth/stencil test function in the situation that there are two primitives that write the same depth/stencil value, e.g. as described above in relation to the second and third examples.

The fragment shader is thus operable to execute a first fragment shader routine during the first, pre-pass operation. For example, this is in an embodiment a partial version of the full fragment shader that is executed during the second, main pass operation. For example, the first fragment shader routine may execute up to a certain 'discard' instruction with the fragment shader routine being executed accordingly just far enough to generate the desired visibility information, but not producing the final rendered output data (which is still deferred to the second, main pass operation which in an embodiment then runs the full fragment shader, when required to complete the rendering to produce the final rendered output data). Various arrangements are contemplated for determining how far and whether a fragment shader should be executed during the first, pre-pass operation, e.g. depending on the desired shader state (including potential shader side effects) that may desirably be obtained during the respective processing passes.

Figure 23:
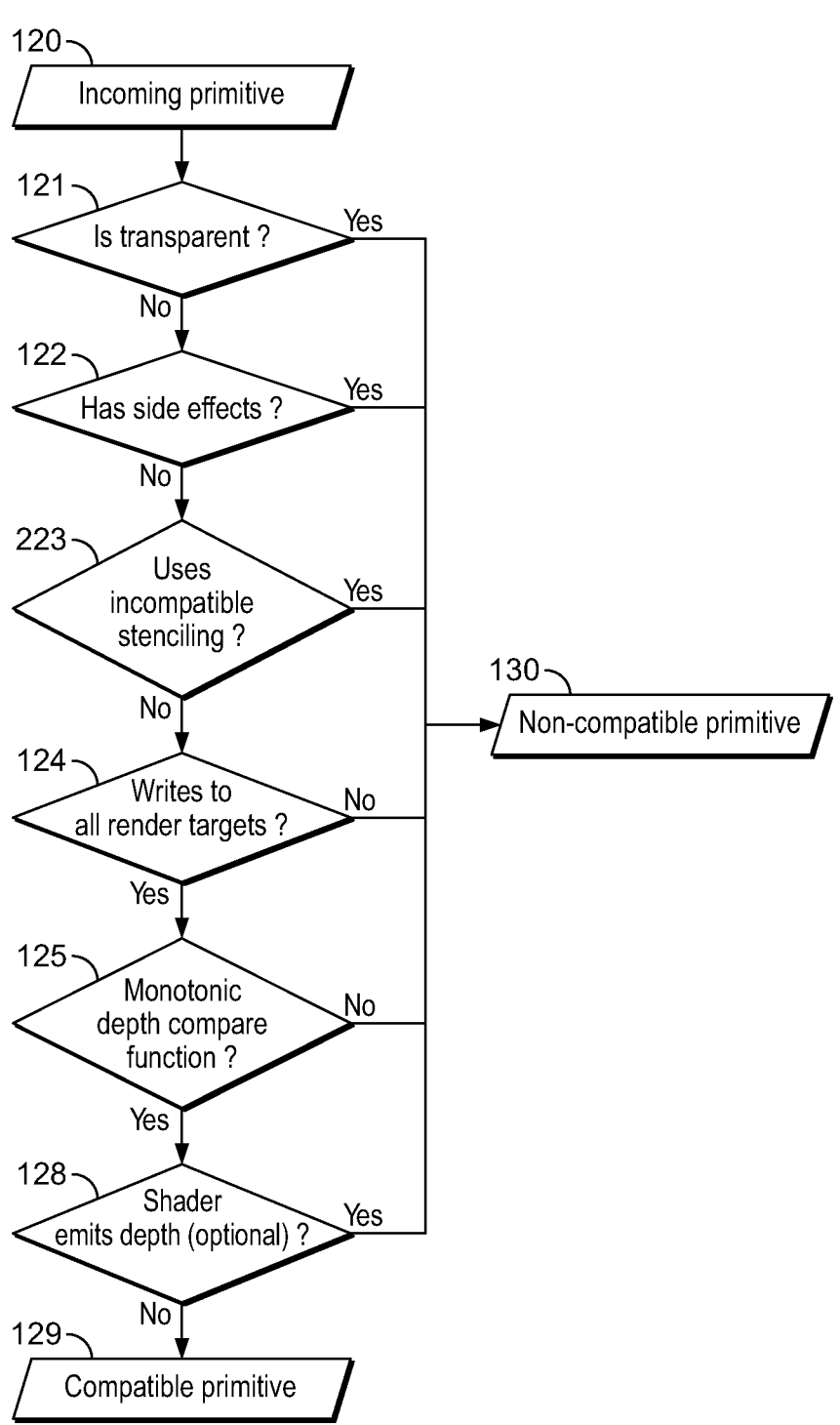
FIG. 23 illustrates a primitive classification process according to the fourth example.

The classification process in this fourth example is therefore correspondingly modified as shown in FIG. 23 such that primitives for which the shader modifies coverage are no longer treated as being incompatible with the pre-pass operation. The classification process is thus generally similar to that described above and shown in FIG. 17, except that the shader modifies coverage condition no longer needs to be checked.

In the specific example that is shown in FIG. 23 the condition shader emits depth is still considered incompatible (since in this example the fragment shader does not write depth). However, it would of course also be possible to allow the shader that is executed in the pre-pass operation to write depth, in which case shader emits depth primitives would also no longer be determined to be incompatible. That is, the fragment shader that is executed in the pre-pass operation may be executed up to and including the discard point to determine whether the shader modifies coverage and may also be executed up to and including the point where late depth is determined. In general, the fragment shader that is executed in the pre-pass operation may therefore be executed up to any suitable and desired point in order to expose the first, pre-pass operation to enough state to determine the full visibility information, whatever that involves. Various arrangements are contemplated in this regard for how far the fragment shader that is executed in the first, pre-pass may be executed.

Example 5—"HSR ID" Buffer

The examples described so far all relate to a first main embodiment in which the depth buffer (and optionally also the stencil buffer) generated during the first, pre-pass operation is used as the "visibility" information for controlling fragment processing during the second, main pass operation. Various other examples are however contemplated and the "visibility" information that is generated during the first, pre-pass operation that is then used to control the processing during the second, main pass operation may in general take any suitable and desired form.

For example, in a second main embodiment for generating the "visibility' information, rather than using the depth (stencil) buffer itself as the "visibility" information that is used to control the further processing of primitives during the second, main pass operation, the first, pre-pass operation generates "visibility" information in the form of a dedicated set of per-sample primitive identifying information that stores for respective sampling positions within the render output a respective primitive identifier indicating which primitive should be further processed for the sampling position in question (which primitive identifiers will also be referred to herein as hidden surface removal identifiers ("HSR IDs"), with the set of per-sample primitive identifying information correspondingly being referred to as a "HSR ID buffer").

The HSR ID buffer may generally take any suitable and desired form but may generally match the size and form of the depth buffer in that it is capable of storing a respective HSR ID for each sampling position within the render output in a similar fashion to how the depth buffer stores a respective depth value for each sampling position within the render output. The HSR ID buffer can thus be (and is in this example) populated during the first, pre-pass operation to record the desired visibility information for the respective sampling positions of the render output. The result of this is thus that the HSR ID buffer at the end of the first, pre-pass operation stores a respective set of HSR IDs indicating which primitives should be processed further for which sampling positions within the render output.

Figure 24:
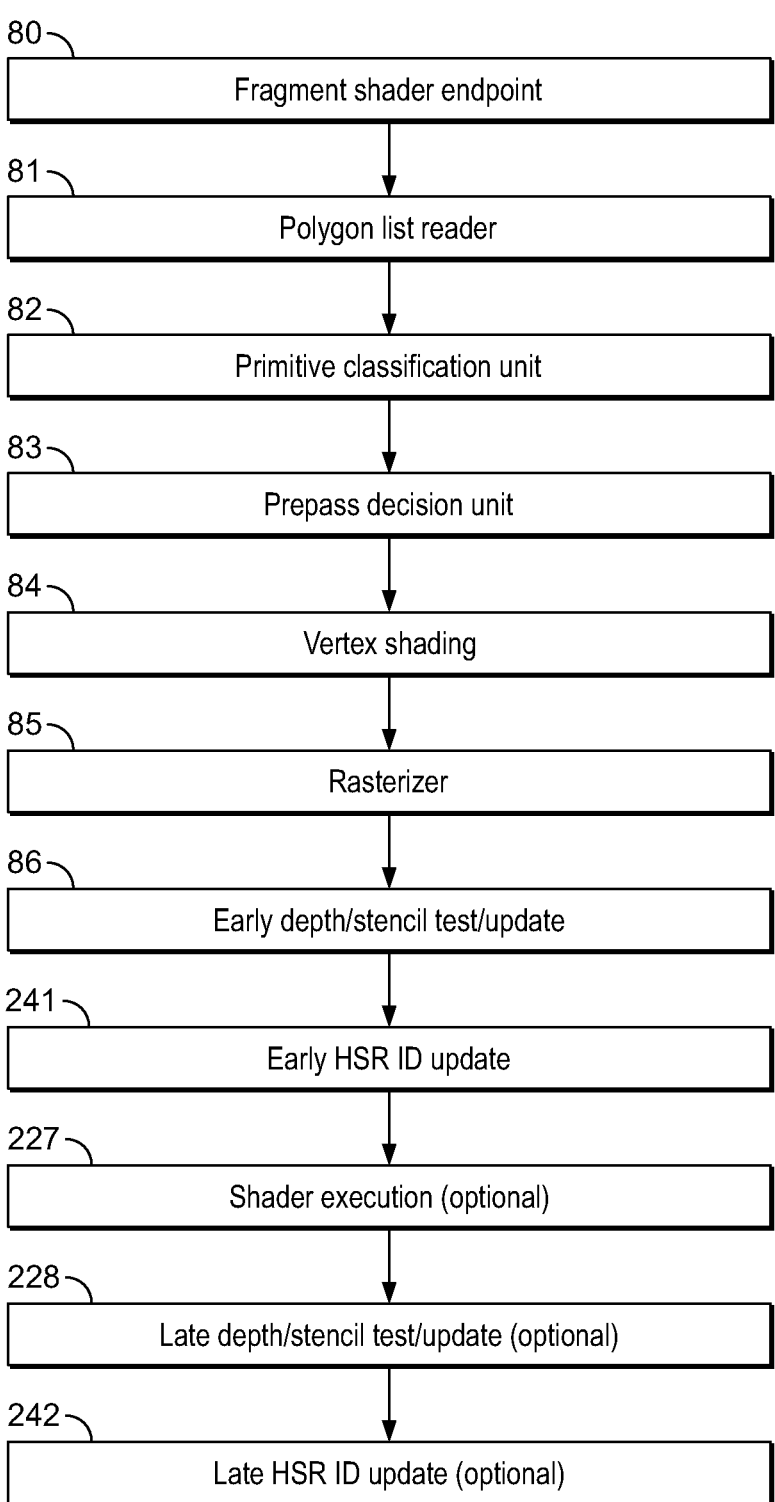
FIG. 24 shows schematically a sequence of processing operations for a pre-pass operation according to an example according to an embodiment in which visibility information is generated in the form of a set of per-sample primitive identifying information (which will be referred to hereinafter as a "HSR ID" buffer)

FIG. 24 shows a sequence of processing operations for a pre-pass operation according to an example according to an embodiment in which visibility information is generated in the form of such HSR ID buffer. In this example, the first, pre-pass operation thus comprises a pipelined sequence of processing operations including: a fragment shader endpoint 80 that schedules the rendering work that the graphics processing pipeline needs to perform in order to render a tile; a primitive list reader (polygon list reader 81) that reads the appropriate primitive list(s) for the tile to identify the primitives that are to be rendered for the tile; a primitive classification unit 82; a pre-pass decision unit 83; a vertex processing (shading) stage 84 that obtains (and shades, if necessary) the relevant vertex data for the primitives to be rendered for the tile; a rasteriser 85 that rasterises primitives into respective fragments corresponding to sampling positions within the render output; and an (early) depth test/update stage 86 that performs fragment depth testing and updates the depth buffer accordingly.

So far, the processing pipeline is therefore similar to that described above in relation to the earlier examples. In this example, however, after the (early) depth/stencil test/update 86, a further HSR ID update 241 is performed that updates the HSR ID buffer as needed in response to the (early) depth/stencil test/update 86. In the example shown in FIG. 24 the first, pre-pass operation may optionally also execute a fragment shader 227 and perform late depth/stencil test/update 228 as described above in relation to FIG. 22. In that case, there may be a further late HSR ID update 242 that updates the HSR ID buffer as needed in response to the results of the late depth/stencil test/update 228.

Figure 25:
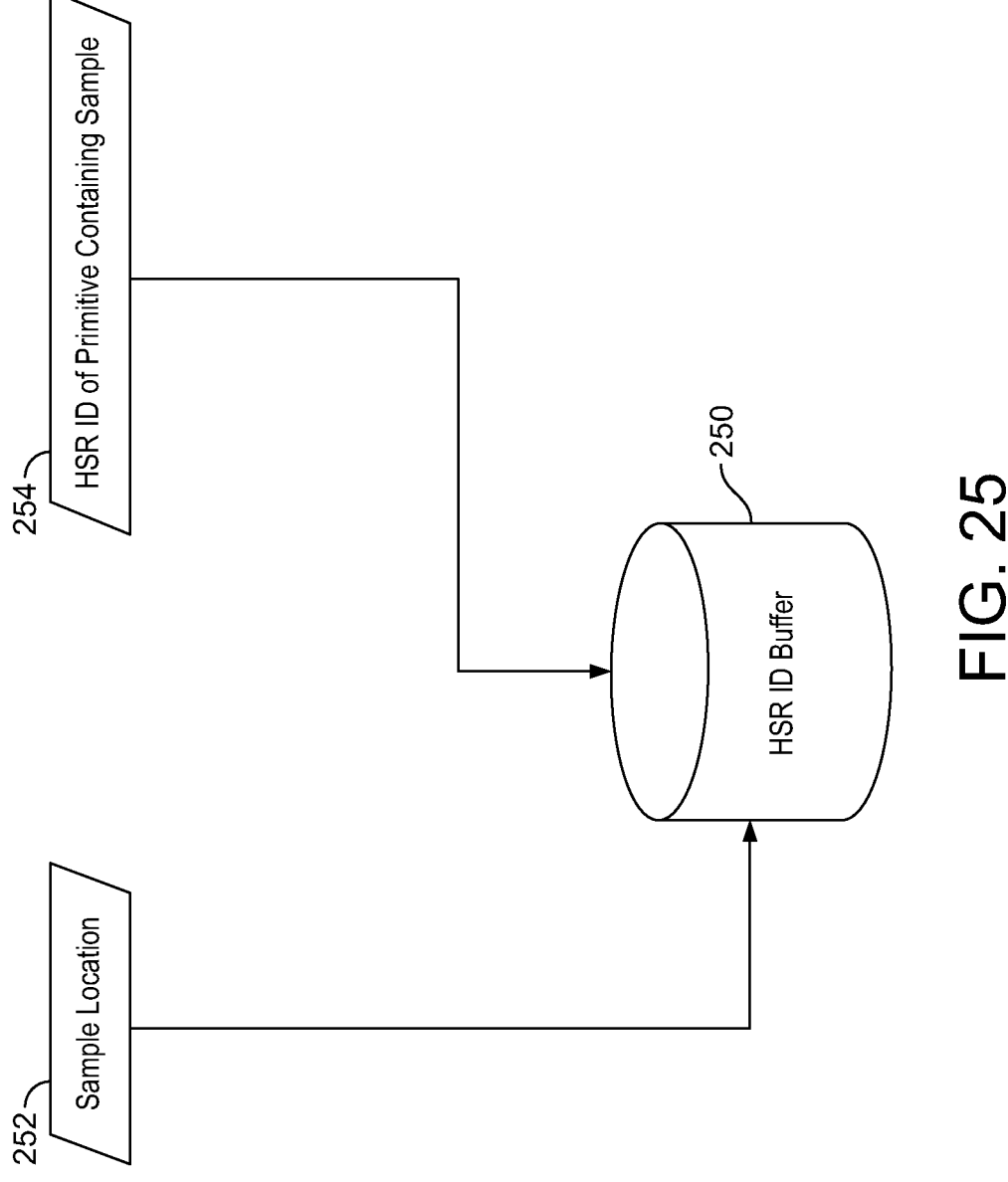
FIG. 25 shows schematically how such HSR ID buffer may be populated during the first, pre-pass operation.
Figure 26:
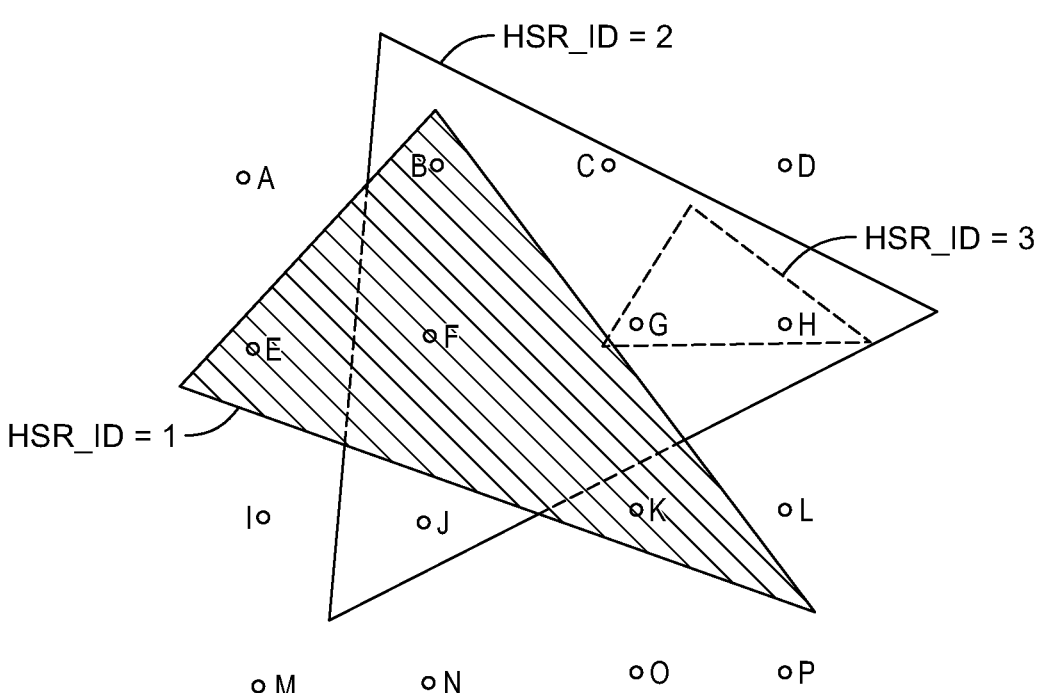
FIG. 26 shows schematically an example of populating such HSR ID buffer.

The updating of the HSR ID buffer is thus performed based on the depth/stencil testing. FIG. 25 shows schematically how such HSR ID buffer may be populated during the first, pre-pass operation. In particular, as shown in FIG. 25, when it is determined during the early depth/stencil test/ update 86 that a fragment for a primitive is visible at the sampling position or positions to which the fragment relates, the HSR ID buffer 250 is then updated at that point to record the associated HSR ID for the primitive to which the fragment relates. Whenever a fragment is determined to survive the early depth/stencil test/update 86, such that the fragment is determined to be visible at the respective sampling position or positions to which the fragment relates (at least based on the visibility information generated so far), the first, pre-pass operation writes to the HSR ID buffer accordingly, with the address of the write being determined by the sample location 252 and the value being written corresponding to the HSR ID of the primitive containing the sample in question 254. A worked example of populating the HSR ID buffer in this way is illustrated in FIG. 26.

In this example, there is shown three primitives that at least partially overlap with each other. It will be appreciated in typical case there will be many primitives that need to be rendered but this simplified example is used for ease of illustration. As will be described further below, each primitive is allocated a respective unique primitive identifier, i.e. a respective HSR ID. In this example, the frontmost primitive is drawn first, and is thus allocated the first HSR ID (i.e. its HSR ID=1). There is a larger primitive drawn behind that (with HSR ID=2) and another primitive (with HSR ID=3) that is completely behind the other two primitives (such that it is not visible in the final render output). There is also shown a corresponding set of sampling positions {A, B . . . P}, defined within the render output.

In this example, it can be seen that the top left sampling position (position A) is not covered by any of the three primitives. Thus, as shown in FIG. 26, a 'null' value ('zero') is recorded in the HSR ID buffer in the respective entry for sampling position A. For the next sampling position (sampling position B), it can be seen that this is covered by the first two primitives, however, it can be seen from FIG. 25 that the first primitive (with HSR ID=1) should be visible, as it is drawn in front of the other primitive. Thus, in this example, the fragment for the first primitive will survive the depth testing at sampling position B and thus cause the HSR ID buffer to be updated accordingly such that its HSR ID ('1') is stored in the respective entry for that sampling position. The corresponding fragment for that sampling position for the next primitive (with HSR ID=2) in this example fails the depth testing, and so does not cause the HSR ID buffer to be updated again. This is then repeated for all primitives and all sampling positions appropriately in order to determine the final HSR ID buffer. The determined HSR ID buffer is then used during the second, main pass operation in order to control the subsequent fragment processing.

Thus, during the first, pre-pass operation, primitives in the sequence of primitives are processed into their respective fragments, and the resulting fragments are then processed to determine the desired visibility information associated with the fragments (e.g., and in an embodiment, by depth (and optionally also stencil) testing the fragments against a corresponding depth (stencil) buffer to determine the fragment's visibility), with the HSR ID buffer being updated accordingly during the first, pre-pass operation. That is, as mentioned above, whenever a fragment for a primitive is determined to be visible for a respective sampling position within the render output based on the visibility information generated so far by the processing of earlier primitives in the sequence of primitives, a respective entry in the HSR ID buffer for the sampling position or positions to which the fragment relates should be (and in this example is) updated accordingly to record the primitive identifier for the primitive in question (i.e. the primitive that caused the update). This is then repeated for further primitives in the sequence of primitives. Thus, it will be appreciated that the entry for a given sampling position may (and will) subsequently be overwritten if a fragment for a later primitive is subsequently determined to be visible at that sampling position. The effect of this is therefore that at the end of the first, pre-pass operation the HSR ID buffer correspondingly reflects the full visibility information for the sequence of primitives, with the stored HSR IDs indicating, on a per-sampling position basis, which primitives should be further processed for which of the sampling positions.

Figure 27:
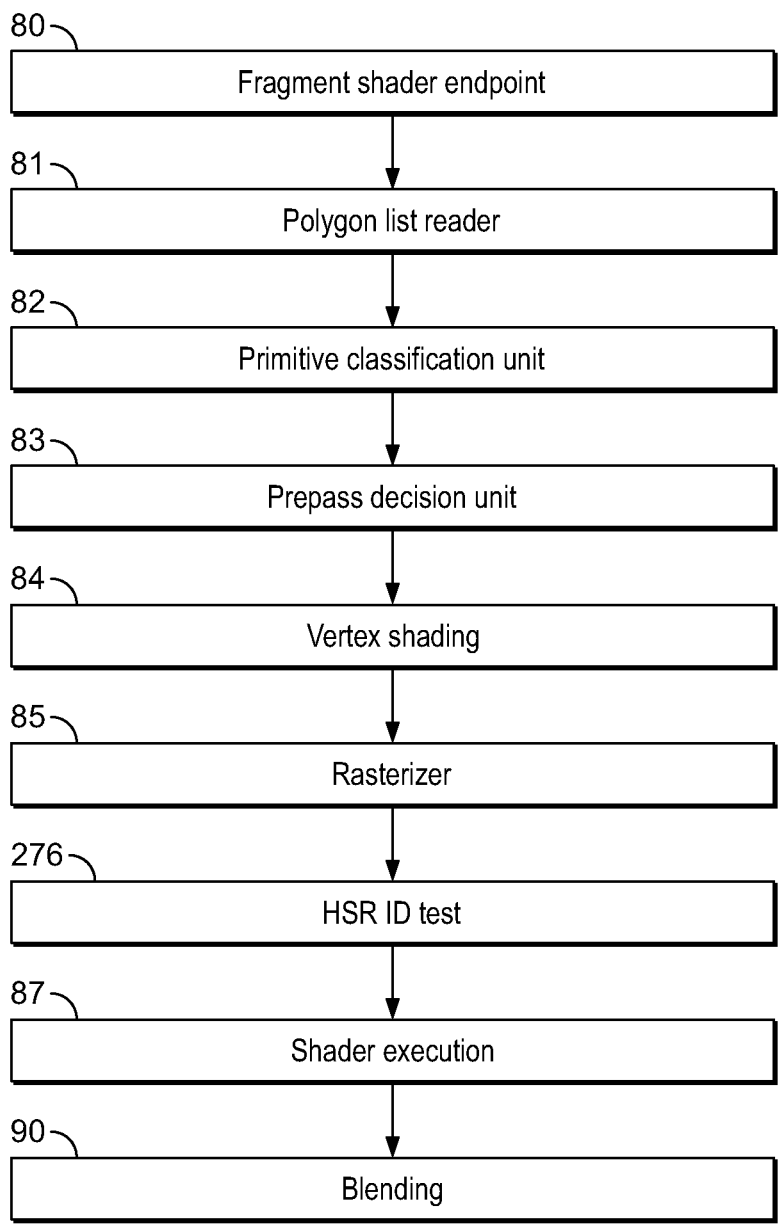
FIG. 27 shows schematically a sequence of processing operations for a corresponding main pass operation to be performed after the pre-pass operation shown in FIG. 24 including a visibility test against the HSR ID buffer.

The per-sampling position primitive identifiers can then be used as part of a subsequent fragment visibility testing operation during the second, main pass operation to identify which primitive should be further processed for a given sampling position, and hence allow fragments for other primitives to be culled accordingly for the second, main pass. FIG. 27 shows the sequence of processing operations for the corresponding main pass operation in this example that is to be performed after the pre-pass operation shown in FIG. 24.

As shown in FIG. 27, the second, main pass operation in this example comprises a pipelined sequence of processing operations including, in common with the first, pre-pass operation: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output.

The second, main pass operation in this example does not perform depth testing of the fragments (although further depth testing could be performed if desired) but instead performs a HSR ID test 276 that tests whether the HSR ID for the fragment being tested matches the HSR ID value stored in the HSR ID buffer 250 for the sampling position or positions to which the fragment relates. Thus, if the fragment has the same HSR ID value as that stored in the HSR ID buffer 250, the fragment survives the HSR ID test 276, and is therefore further processed by executing a fragment shader 87, and then performing blending 90, etc., to generate the final rendered output data. On the other hand, if the fragment's HSR ID does not match the value stored in the HSR ID buffer 250, such that the fragment fails the HSR ID test 276, the fragment can be (and is) culled at this point during the second, main pass, with the fragment shading 87, etc., being avoided. In this way, the fragment processing during the second, main pass operation can be controlled based on the depth buffer generated during the first, pre-pass operation such that rendered output data is only produced for fragments that are actually visible.

Figure 28:
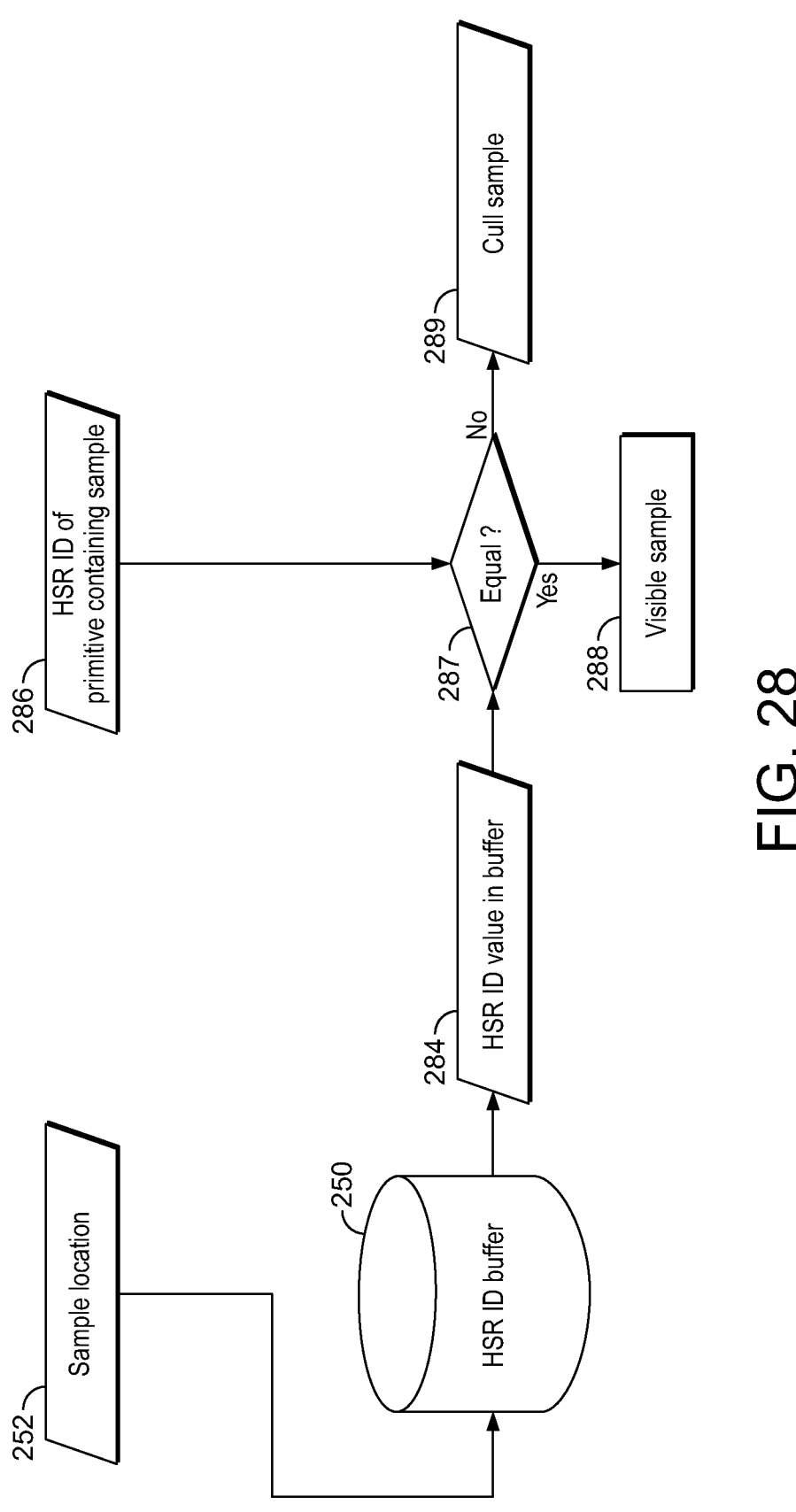
FIG. 28 shows schematically how such visibility testing against the HSR ID buffer is performed during the second, main pass operation.

FIG. 28 shows schematically how such visibility testing against the HSR ID buffer is performed during the second, main pass operation. Here, the address of the location to read from the HSR ID buffer 250 is determined by the sample location 252. The read HSR ID value stored in the buffer 284 is then compared to the HSR ID 286 of the primitive the sample being tested was rasterised from. If the values are equal (step 287—yes), the fragment is determined to be visible and is thus passed for further processing. On the other hand, if the values are not equal (do not match) (step 287—no), the sample is accordingly determined to be invisible. That is, for primitives that were processed during the first, pre-pass operation, and which could therefore have updated the HSR ID buffer in respect of a particular sampling position (but did not do so), this means that the primitive must have no visibility at that sampling position, and the fragments for the primitive relating to that sampling position can accordingly be culled on this basis (step 289).

Thus, in this example, the HSR ID test 276 uses an 'equals' test function. For instance, for any primitives that were processed during the first, pre-pass operation, and that could potentially therefore have updated the HSR ID buffer 250, if a fragment for such a primitive is visible in the final render output, the associated HSR ID for that primitive should be (and is) stored in the respective entries in the HSR ID buffer for the sampling position or positions to which the fragment relates. The HSR ID test 276 thus allows the graphics processor to cull any fragments for primitives that are not visible for the final render output when it is possible to do so, and to thereby provide sample-perfect hidden surface removal. The HSR ID values that are stored in the HSR ID buffer 250 are thus usable during the subsequent visibility testing in the second, main pass operation to determine which primitives should be processed further for which sampling positions within the render output.

To facilitate the generation and use of the HSR ID buffer in this way, each primitive is therefore allocated a respective HSR ID that uniquely identifiers the primitive within its sequence of primitives (i.e. within the tile). This can be done during primitive classification as shown in FIG. 29.

Figure 29:
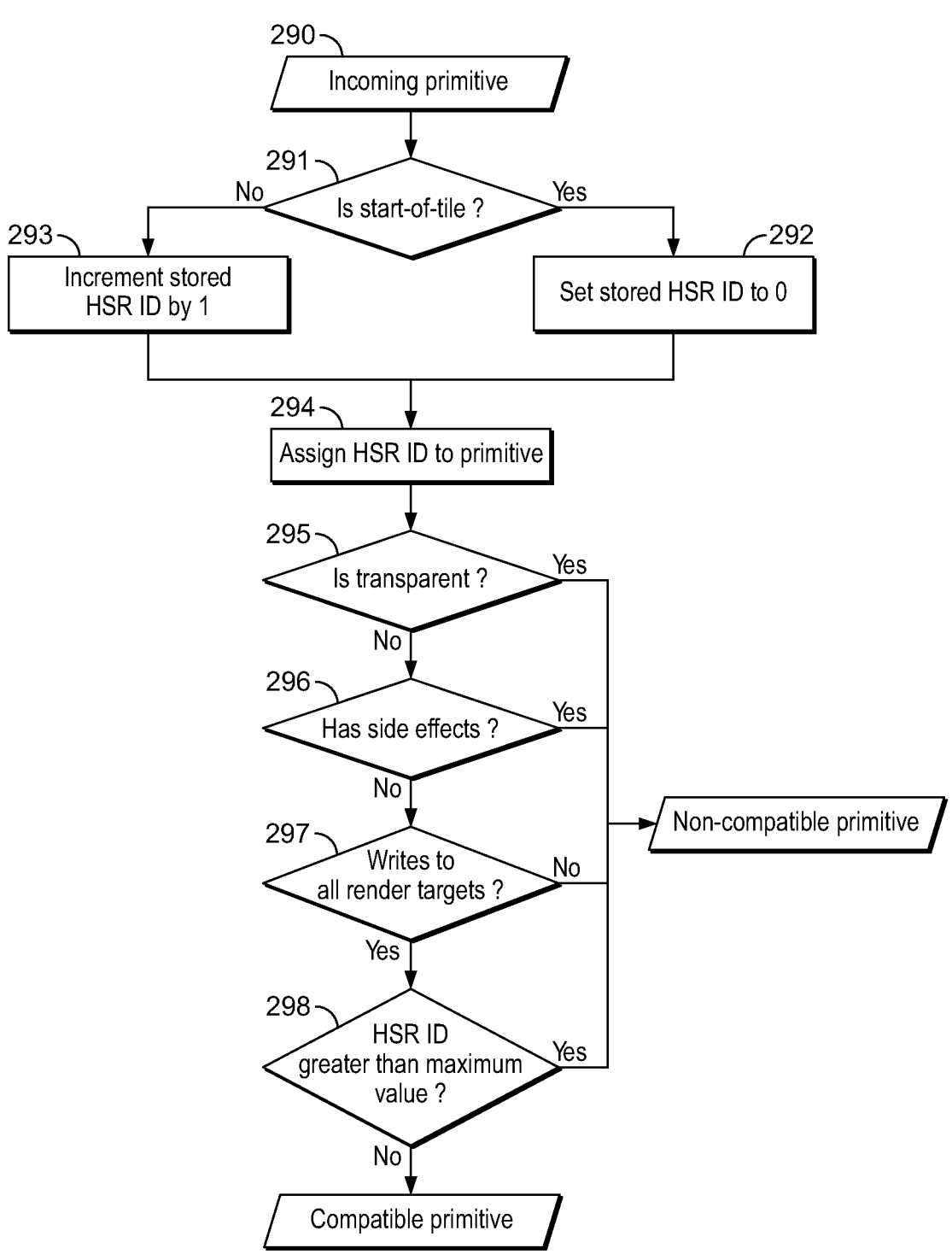
FIG. 29 shows schematically an example primitive classification process according to an embodiment using a HSR ID buffer.

FIG. 29 thus shows an example primitive classification process according to this fifth example in which the visibility information generated during the first, pre-pass operation comprises a dedicated HSR ID buffer. In this example the primitive classification may be performed at run-time. As shown in FIG. 29, for an incoming primitive 290 to the primitive classification, it is first checked whether the primitive is simply indicating the start of the tile (step 291) (in which case the HSR ID is set to 'zero' (step 291—yes)). For all subsequent primitives (step 291—no), the stored HSR ID is incremented by one, and then assigned to the primitive accordingly (step 294). Thus, each primitive in the sequence of primitives being processed is associated with a unique primitive identifier, with the primitive identifiers increasing monotonically within the sequence of primitives. In particular, in this example, the primitives may be indexed within the sequence of primitives starting from 'one' (such that the first primitive in the sequence may be identified as primitive 'one', the second primitive identified as primitive 'two', and so on). The value 'zero' is thus used to indicate as a null, or 'clear' value, to indicate that there is no primitive coverage at the sampling position in question.

The primitive classification in this example then continues as shown in FIG. 29. In particular, in this example, any primitives that are transparent (step 295), have side effects (step 296), or that do not write to all render targets (step 297) are treated as incompatible primitives. In this example, there is a further condition to be checked, namely whether or not the HSR ID is greater than the maximum possible HSR ID value. For example, if there are too many primitives to be processed, the system may effectively run out of HSR IDs that can be allocated. In that situation, any primitives that exceed the maximum possible HSR ID value are in this example simply treated as being incompatible with the pre-pass operation (step 298), and are therefore instead processed by the third, fallback operation as described above. Otherwise, if none of these conditions are met, the primitive is determined to be compatible with the pre-pass operation and is processed accordingly.

As described above, the primitive classification result is then used to drive the state machine for the graphics processor such that the pre-pass decision unit causes the graphics processor to initially process primitives by the first, pre-pass operation, and continue in this manner to the end of the tile so long as the primitives are compatible with being processed by the first, pre-pass operation, but is caused to transition to the third, fallback operation in the event that an incompatible primitive is encountered (as described above and shown in FIG. 7, for example).

Figure 30:
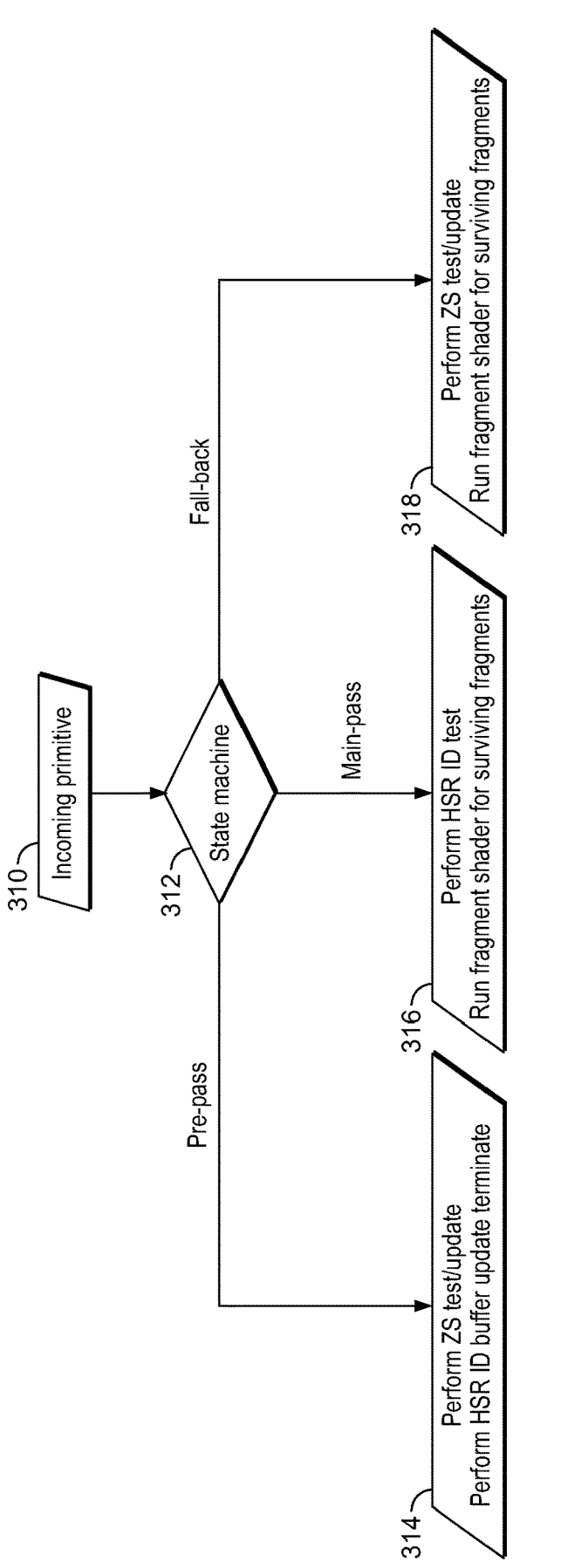
FIG. 30 shows schematically a state machine for a graphics processor operating according to this example using the HSR ID buffer.

FIG. 30 shows schematically a state machine 312 for a graphics processor operating according to this example using the HSR ID buffer showing, for an incoming primitive 310 to be processed, how the primitive 310 is processed differently according to the different possible states of the graphics processor in this example. Thus, when the graphics processor is configured in the pre-pass state 314, the pipeline stages shown in FIG. 24 are active, and the primitive is processed accordingly. Likewise, when the graphics processor is configured in the main pass state 316, the primitive is processed accordingly by the pipeline stages shown in FIG. 27. In this example, the graphics processor in the fallback state 318 may be configured as shown in FIG. 10 above, such that depth testing is performed as normal but no attempt is made to update the HSR ID buffer once the fallback mode is triggered (although in some cases the HSR ID update 241 may be left on during the fallback mode as well).

A benefit of this approach compared to the earlier examples is that there is no need to disambiguate primitives having the same depth (or stencil) values, since this can all be worked out during the first, pre-pass operation when determining the HSR ID buffer 250. This approach can also naturally handle stencilling, for example, since the stencil testing can be performed as normal during the first, pre-pass operation and the resulting visibility information recorded in the form of the HSR ID for the fragment that survives the depth/stencil testing. Thus, it can be seen from FIG. 29 that there are fewer conditions that trigger the fallback mode in this example compared to some of the earlier examples.

Example 6—HSR ID Buffer, ZS-Only Primitives

In example classification shown in FIG. 29, primitives that do not write to all render targets are however still treated as incompatible with the pre-pass operation (step 297). However, in some examples, primitives that do not write to all render targets may be compatible so long as they do not write to the final rendered output data, e.g. so long as they are only write depth/stencil values. This is illustrated in FIG. 31 and FIG. 32, for example.

Figure 31:
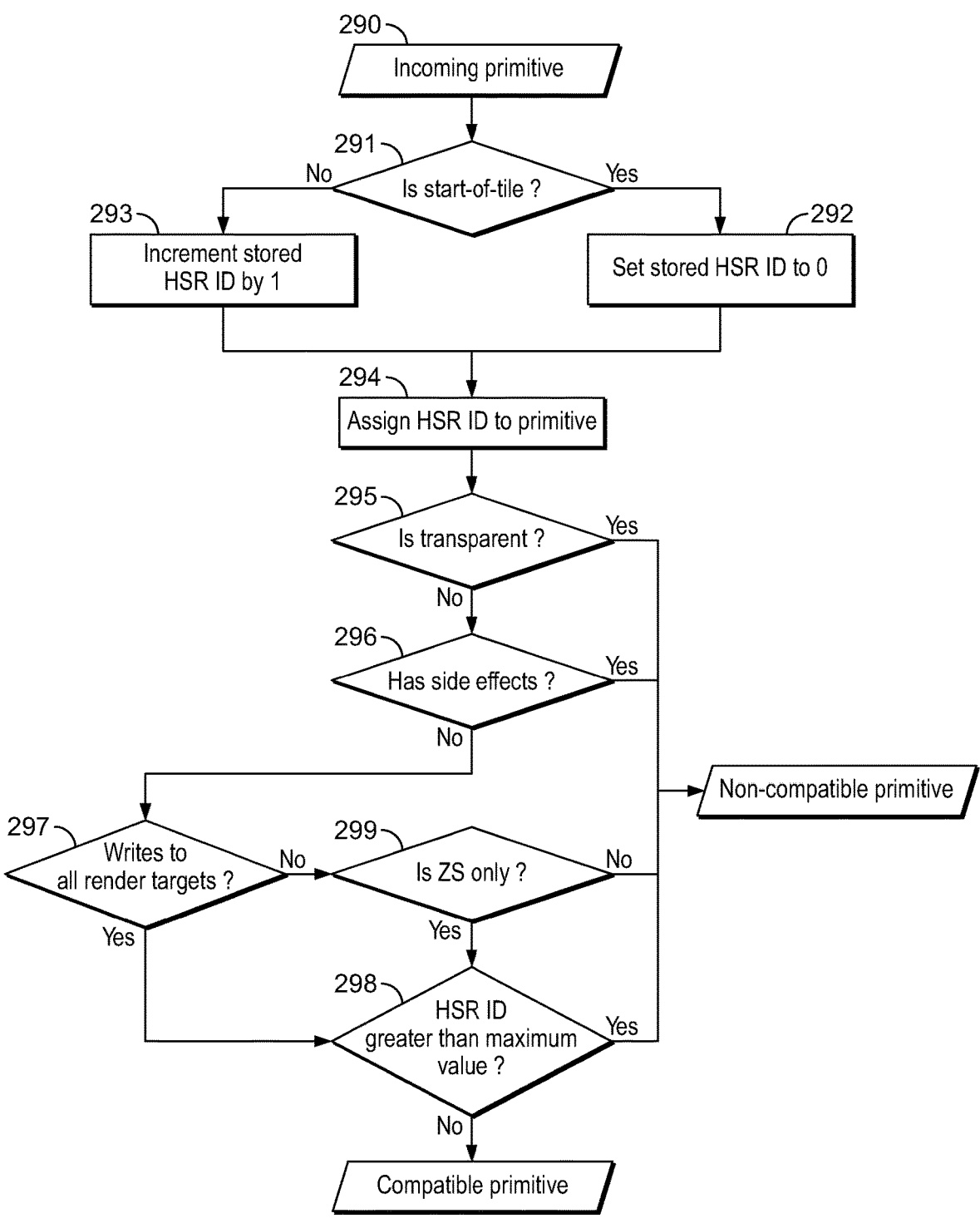
FIG. 31 shows schematically an example primitive classification process according to an example in which primitives that do not write to all render targets are made compatible with the pre-pass operation, so long as they only write depth/stencil values.

FIG. 31 shows a corresponding classification process for this example. The primitive classification process shown in FIG. 31 is generally similar to that shown in FIG. 29 except that for primitives that do not write to all render targets (step 297—no), it is then checked whether the primitive only writes depth/stencil values (step 299). If the primitive only writes depth/stencil values (step 299—yes), then so long as the HSR ID does not exceed the maximum possible HSR ID value (step 298—no), the primitive is determined to be compatible.

Figure 32:
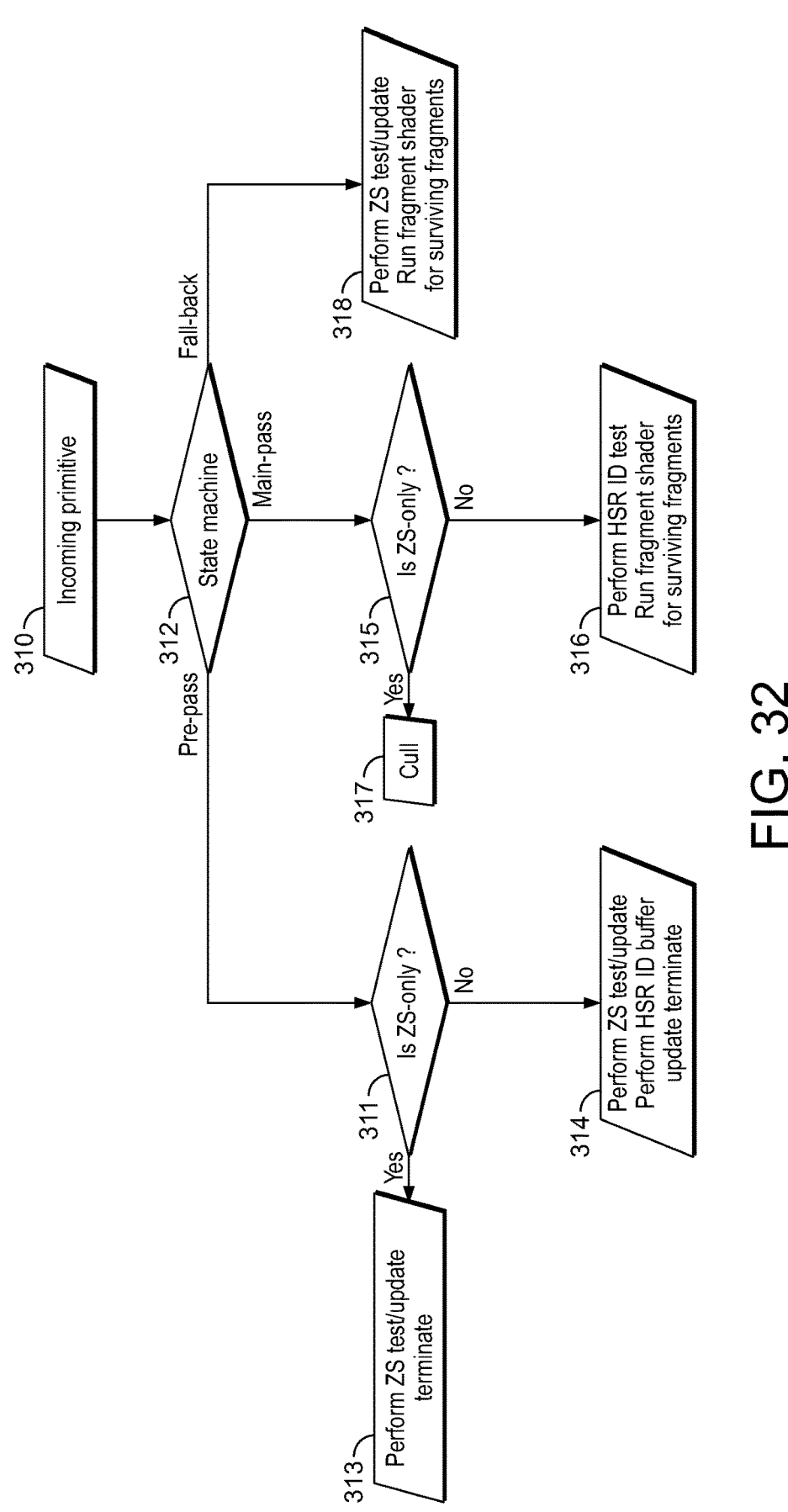
FIG. 32 shows the operation of the corresponding state machine for the example that is illustrated in FIG. 31.

FIG. 32 shows the corresponding pre-pass decision logic in this example. Again, this is generally the same as the state machine 312 shown in FIG. 30 except that it is also checked during the first, pre-pass operation whether the primitive only writes depth/stencil values. If the primitive only writes depth/stencil values (step 311—yes), the depth/stencil test/ update is then performed but there is no need to update the HSR ID buffer (step 313). Otherwise, the first, pre-pass operation is performed as described above (step 314). This condition is also checked during the second, main pass operation in order to cull primitives that only write depth/ stencil values (step 315). Thus, any primitives that only write depth/stencil values (step 315—yes), and hence do not need to be processed by the second, main pass to produce the final rendered output data, are culled at this point (step 317).

Example 7—HSR ID Buffer, Transparent Primitives

In the examples above, "transparent" primitives are determined to be incompatible with the pre-pass operation. This is because transparent primitives generally do not write depth values, and so cannot update the depth buffer, or therefore the HSR ID buffer. This means that the HSR ID equals testing if performed as described above would always cull any such transparent primitives that are not capable of updating the HSR ID buffer (since the HSR ID for the transparent primitive can never match the stored value in the HSR ID buffer), even if the correct behaviour based on the original depth testing is for the transparent primitive to be rendered.

For instance, as described above, at least for primitives that were capable of updating the HSR ID buffer during the first, pre-pass operation, the visibility testing during the second, main pass operation against the HSR ID buffer should (and does) comprise an 'equals' test. This works because if the primitive was already processed in the first, pre-pass operation such that it could in principle have updated the HSR ID buffer in respect of a particular sampling position, but it did not do so, this must mean that the primitive is not in fact visible at that sampling position. In other words, only primitives that were determined during the first, pre-pass operation to be visible at a particular sampling position will be recorded in the HSR ID buffer, and so only fragments whose HSR ID matches the value stored in the HSR ID buffer for the sampling position or positions to which the fragment relates should survive the HSR visibility testing. However, this does not work for transparent primitives that are not capable of updating the HSR ID buffer.

In the example described above therefore any transparent primitives are simply treated as being incompatible with the pre-pass operation. Another option would be to always pass transparent primitives and allow them to be dealt with appropriately by the fragment shader (or even by additional depth testing after the HSR ID test, if that were desired). In an embodiment, however, transparent primitives are also tested against the HSR ID buffer to try to cull them where it is possible to do so. To do this, the HSR ID test 276 that is performed during the second, main pass operation is modified accordingly for such transparent primitives such that a 'greater than' test function is used. That is, the HSR ID test 276 may either use an 'equals' test or a 'greater than' test, depending on the type of primitive (in particular whether or not the primitive could potentially have updated the HSR ID buffer in the first, pre-pass operation). In this case, there may be no need to process the transparent primitives in the first, pre-pass operation at all.

Figure 33:
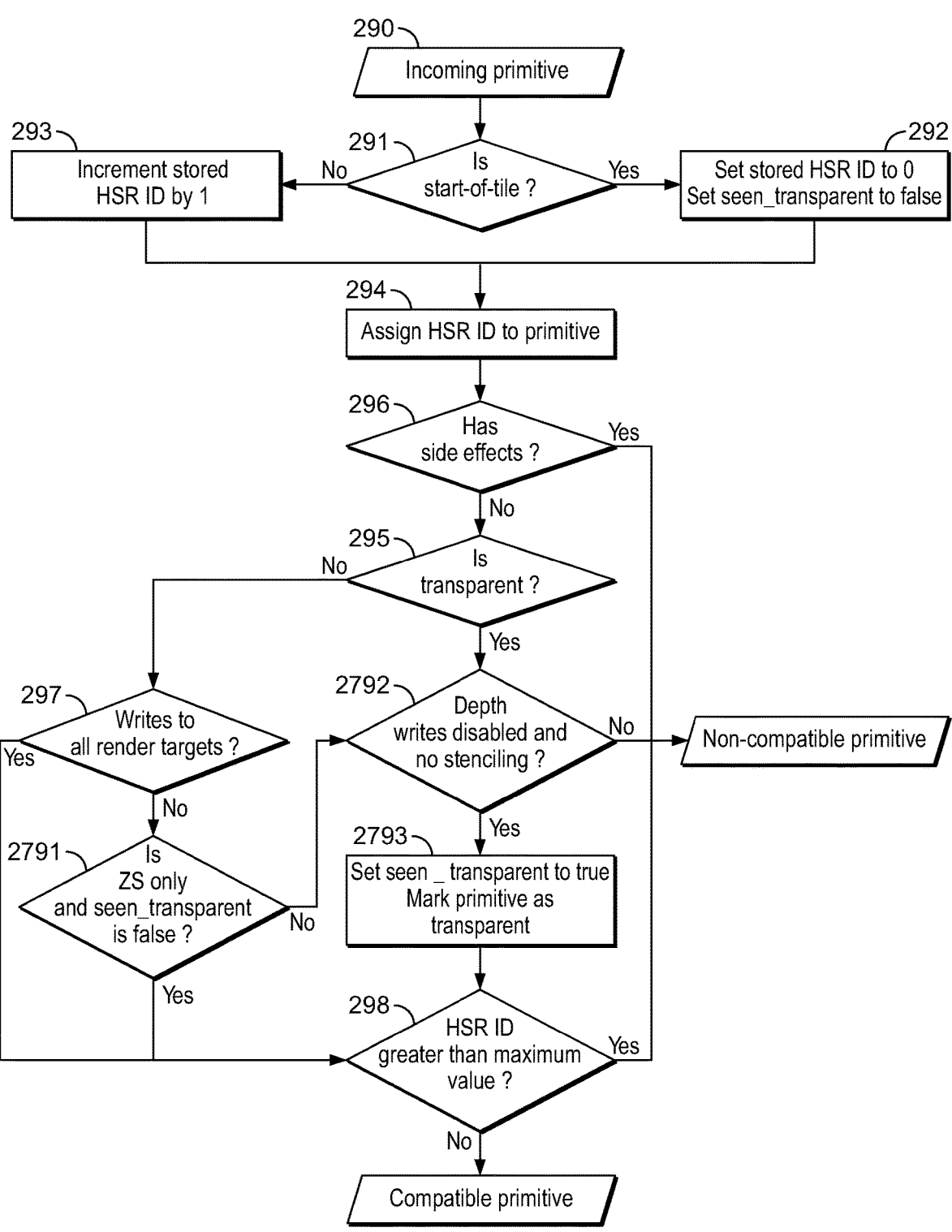
FIG. 33 shows schematically an example primitive classification process according to another example in which primitives that are marked as 'transparent' may be handled by processing the transparent primitives only by the second, main pass operation.

The following example illustrates how "transparent" primitives may be handled by the pre-pass operation. FIG. 33 shows a corresponding classification process for this example and FIG. 34 shows the corresponding pre-pass decision logic in this example.

As shown in FIG. 33, the primitive classification in this example generally proceeds as described above in relation to FIG. 31, except that in this case, if a primitive is determined to be transparent (step 295—yes), rather than this itself leading to the primitive being classified as incompatible, it is then checked whether depth writes are disabled and no stencilling is required for the primitive (step 2792). If this is not the case, as either depth writes are enabled or stencilling is required (step 2792—no), the primitive is then determined to be incompatible. Otherwise, so long as the HSR ID value is not greater than the maximum available HSR ID value (step 298—no), the primitive is compatible. In this even, the primitive is marked as transparent and a 'seen_transparent' flag is set to 'true' to indicate that a transparent primitive has been seen (step 2793) (note that this flag is initially set to false at the start of the tile (at step 292)).

The 'seen_transparent' flag is also used in the case that a primitive is not transparent (step 295—no), and the primitive does not write to all render targets (step 297—no). In that case, if the primitive writes only depth/stencil values and no transparent primitives have been seen so far (i.e. the 'seen_transparent' flag is set to false) (step 2791—yes), the primitive may still be compatible, assuming that there are no other conditions that would make it incompatible. If the primitive does not write only depth/stencil values or the 'seen_transparent' flag is set to true (step 2791—no), the classification then continues to determine whether depth writes are disabled and no stencilling is required for the primitive (step 2792) and the testing proceeds as above from that step.

Figure 34:
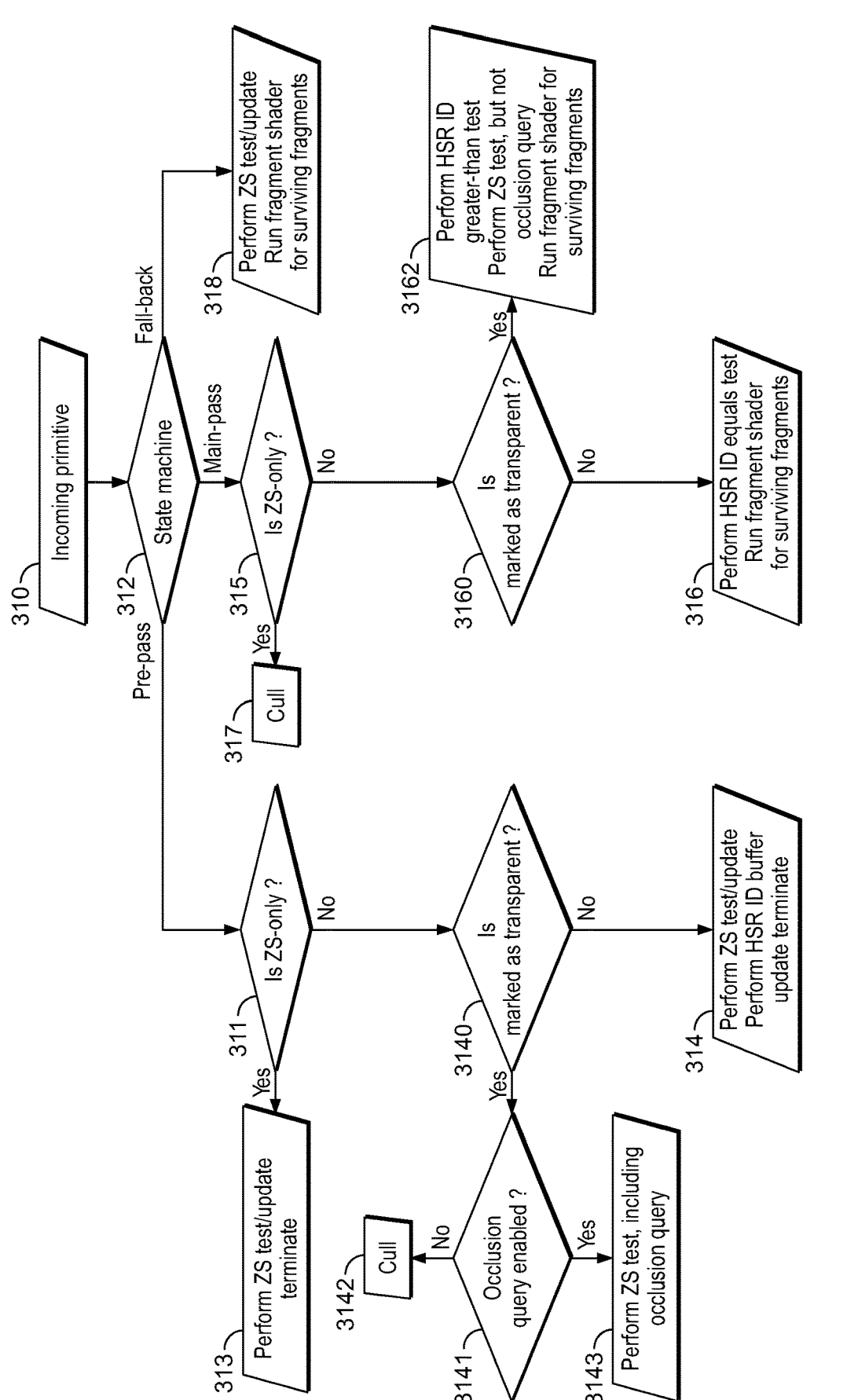
FIG. 34 shows the operation of the corresponding state machine for the example that is illustrated in FIG. 33.

FIG. 34 shows the corresponding pre-pass decision logic in this example. This basically corresponds to the state machine shown in FIG. 32 except that further decision logic is incorporated to handle primitives that are marked as transparent (at step 2793 in FIG. 33 above). In this example, the graphics processor in the fallback state 318 is again configured as shown in FIG. 10 above.

Thus, as shown in FIG. 34, when the graphics processor is configured in the pre-pass state, such that the pipeline stages shown in FIG. 24 are active, for primitives that do not only write depth/stencil values (step 311—no), it is further checked (at step 3140) whether primitives are marked as transparent. For primitives that are not marked as transparent (step 3140—no), the first, pre-pass operation is performed in the same manner described above, with the processing pipeline configured as shown in FIG. 24.

For transparent primitives, when the graphics processor is in the pre-pass state, if the primitive is transparent (step 3140—yes), the primitive may generally be culled unless an occlusion query is enabled that means that all primitives should be processed during the first, pre-pass operation. Thus, if occlusion queries are not enabled (step 3141—no), the transparent primitive is culled at this point (step 3142). Otherwise, if occlusion queries are enabled (step 3141—yes), the depth/stencil test should be performed including the occlusion query (step 3143).

Correspondingly, when the graphics processor is in the main pass state, if the primitive is transparent (step 3160—yes), the primitive should be passed to the graphics processing pipeline for further processing, but in this case the HSR ID test should be modified to comprise a 'greater than' test (step 3162). Thus, if the HSR ID for the transparent primitive is greater than the corresponding value stored in the HSR ID buffer 250, the transparent primitive survives the HSR ID test, and is further processed accordingly. On the other hand, if the HSR ID is not greater than the corresponding value stored in the HSR ID buffer 250, the greater than test is failed, and the transparent primitive can be culled on this basis (since the transparent primitive does not write a depth (or stencil) value (otherwise the transparent primitive would be determined to be incompatible with the pre-pass operation, as shown in FIG. 31) and so the correct behaviour is for the later opaque primitive to survive). (In this case further depth/stencil testing in an embodiment performed in main pass to cull transparent primitives that survive the 'greater than' test when it is possible to do so. However, occlusion queries should be disabled.) A fragment shader can then be run for any surviving fragments.

Accordingly, in this example, transparent primitives that do not write depth or stencil values and do not perform any stencilling operations are no longer necessarily treated as incompatible with the pre-pass operation but are instead in an embodiment processed only during the second, main pass operation as shown in FIG. 34.

Example 8—HSR ID Buffer, Primitives that Write to Less than all Render Targets In the examples above, primitives that do not write to all render targets are determined to be incompatible with the pre-pass operation. For example, in addition to depth, stencil, etc., a primitive may write to multiple different render colour targets. In that case, in the examples presented so far, the primitives are simply treated as incompatible primitives, and processed by the third, fallback operation. However, in further examples the primitive classification can be further modified in order to handle such primitives, at least in some situations. The following example thus illustrates how primitives that write to less than all render targets may be handled by the pre-pass operation.

Figure 35:
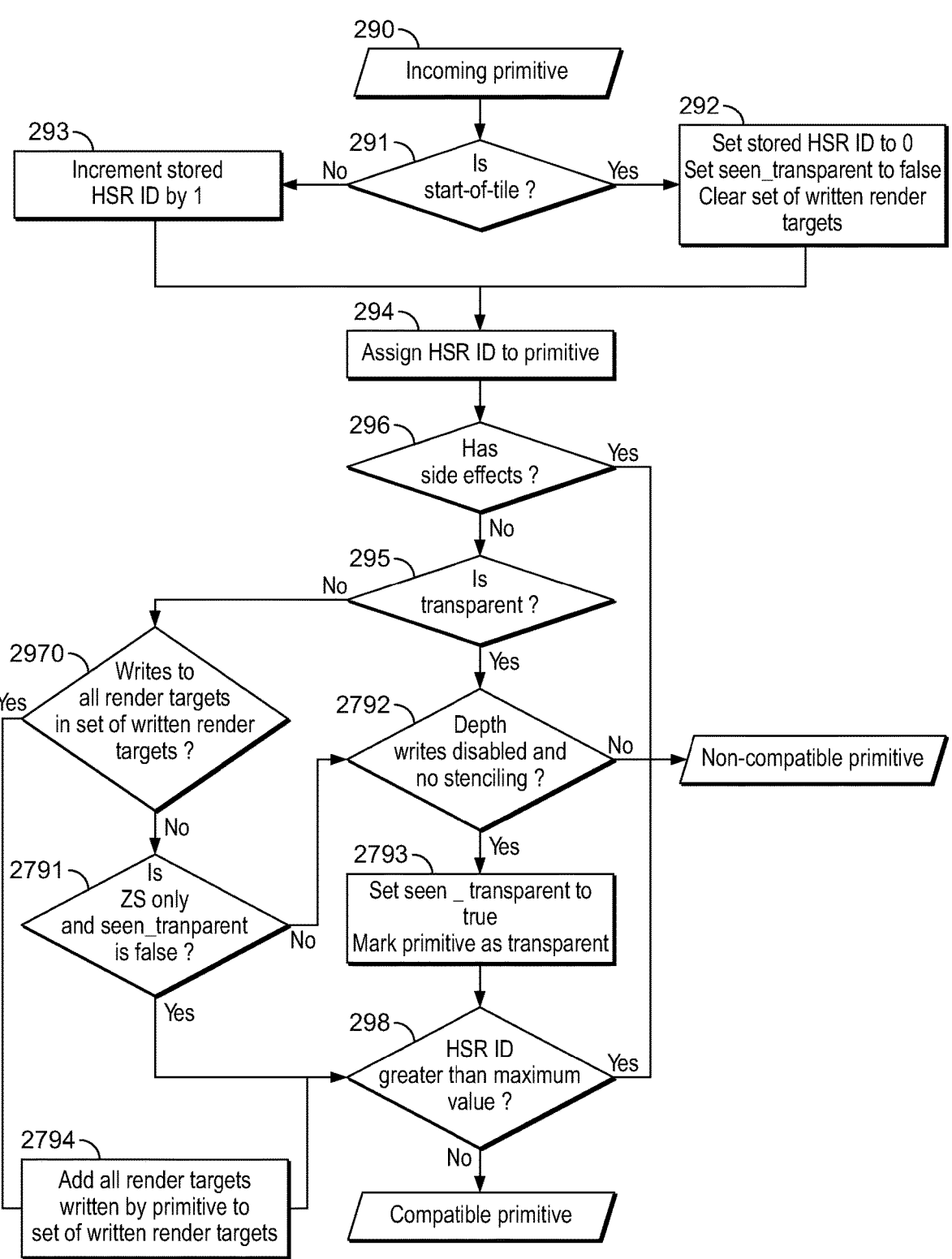
FIG. 35 shows schematically a corresponding classification process according to yet another example using the HSR ID buffer wherein the classification is performed to allow the pre-pass operation to handle some primitives that do not write to all render targets.

FIG. 35 shows a corresponding classification process according to another example using the HSR ID buffer wherein the classification is performed to allow the pre-pass operation to handle some primitives that do not write to all render targets (whereas in FIG. 29 above, any primitives that do not write to all render targets are automatically treated as incompatible). In this example, it is again assumed that any occlusion queries are performed during the depth/stencil testing stage.

As shown in FIG. 35, the primitive classification is generally the same as the primitive classification described above in relation to FIG. 33, except that instead of considering (at step 297) whether or not all render targets are written to, the primitive classification only requires that all render targets that have previously been written to are written to (step 2790). Thus, a set of render targets written render targets is maintained, and if the primitive writes to all render targets in the set of render targets written render targets (step 2790—yes), any (further) render targets written by the primitive are added to the set of written render targets (step 2974), and the primitive is then determined to be compatible (so long as its HSR ID does not exceed the maximum possible HSR ID (step 298)). This example can therefore support primitives that write only a subset of render targets. In this example the set of previously written render targets is thus cleared to zero at the start of the tile (at step 292) and then incremented as primitives are processed. It will be appreciated that in this example he primitive must therefore be performed at run-time.

Figure 36:
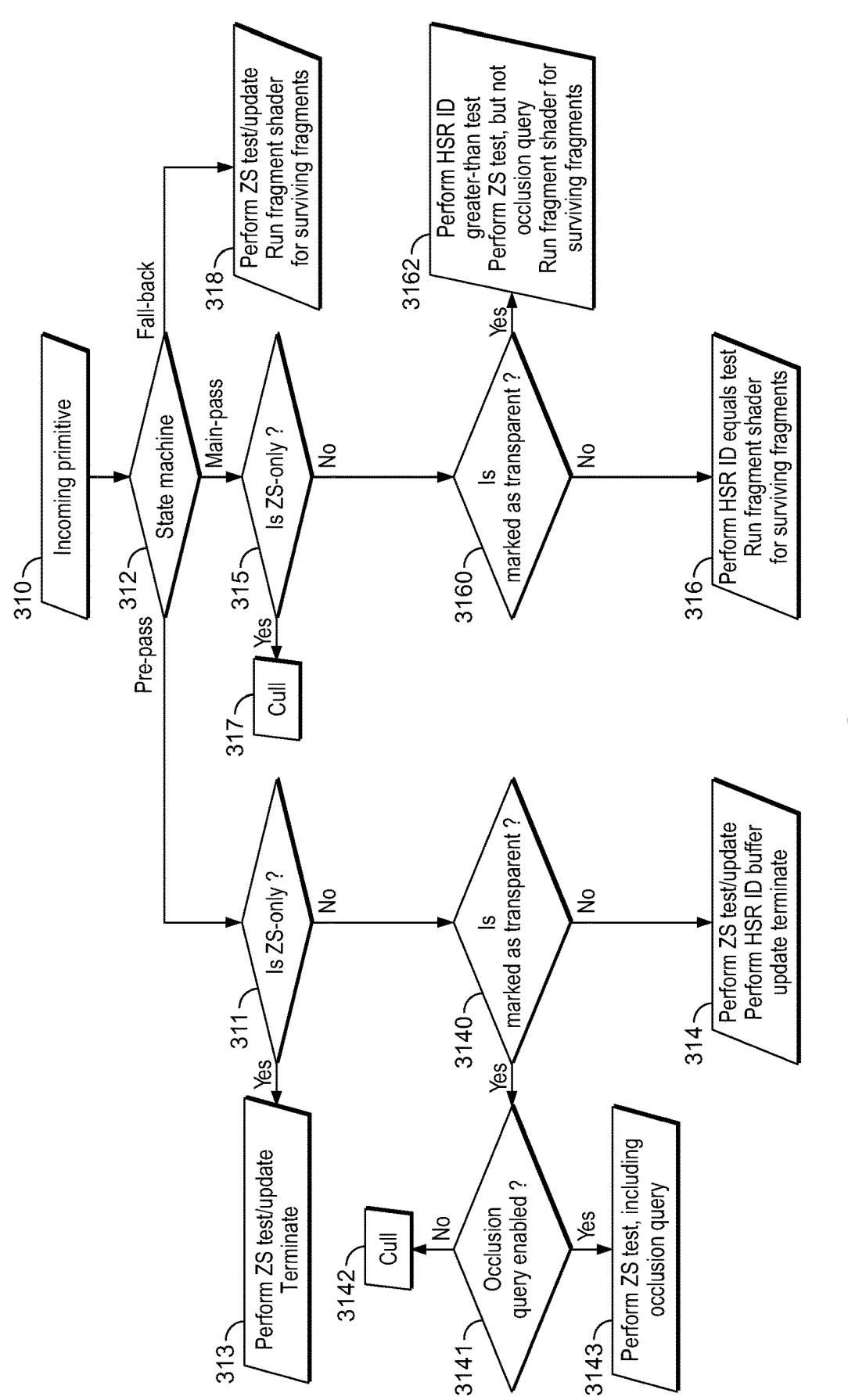
FIG. 36 shows the operation of the corresponding state machine for the example that is illustrated in FIG. 35.

FIG. 36 shows the corresponding pre-pass decision logic in this example. As shown in FIG. 36, the corresponding pre-pass decision logic in this example is the same as that shown in FIG. 34.

Example 9—HSR ID Buffer, Hierarchical HSR ID Testing

In the examples described above the HSR ID buffer stores a respective HSR ID for each sampling position within the render output. In some embodiments the HSR ID buffer however is also capable of (and contains respective entries for) storing HSR IDs for groups of plural sampling positions (with the groups of sampling positions corresponding to respective "patches" (regions) of the render output, and hence, correspondingly, "patches" of sampling positions).

In particular, the HSR ID buffer may (and does) store for respective patches of the render output a respective "minimum" HSR ID indicating the first primitive in the sequence of primitives that may subsequently need to be processed further for a sampling position encompassed (covered) by the patch and a corresponding "maximum" HSR ID indicating the final primitive of the primitives that were processed by the first, pre-pass operation that may need to be processed again during the second, main pass operation.

As will be explained further below, by arranging the HSR ID buffer in this "hierarchical" manner, such that respective HSR IDs are stored both at the level of the individual sampling positions within the render output and for higher level groups of sampling positions ("patches"), this can then allow subsequent visibility testing to be performed at one or more different levels of subdivision of the render output, e.g., and in particular, by allowing groups of fragments to be tested at the patch level, and culled (when possible), in one go, e.g. thus avoiding having to test individual fragments when it is possible to determine already at the patch level that the fragments have no visible effect for their respective sampling positions. This can therefore facilitate speeding up the visibility testing and hence make the overall graphics processing operation more efficient.

For instance, in some examples the rasteriser 85 may use a "hierarchical" rasterisation arrangement in which primitives are iteratively tested against progressively smaller patches (regions) of the render output area (and thus, correspondingly, patches of fragments (and patches of sampling positions)). A primitive to be rasterised is thus in an embodiment first tested against a larger patch (e.g. a tile, in a tile-based rendering system) of the render output, to determine if the primitive covers (at least in part) any smaller patches of the render output encompassed by the larger patch. If the primitive does cover (at least in part) any smaller patches of the render output encompassed by the larger patch, the larger patch is then sub-divided into those smaller patches, and the process is then repeated for each smaller patch of the render output that was found to be at least partially covered by the primitive, until a minimum patch size is reached.

The HSR ID buffer may correspondingly also be arranged in such "hierarchical" manner to allow the primitive patches output by the rasteriser 85 to be tested against the respective per-patch entries (the "minimum" and "maximum" values for the respective patches) of the HSR ID buffer.

Figure 37:
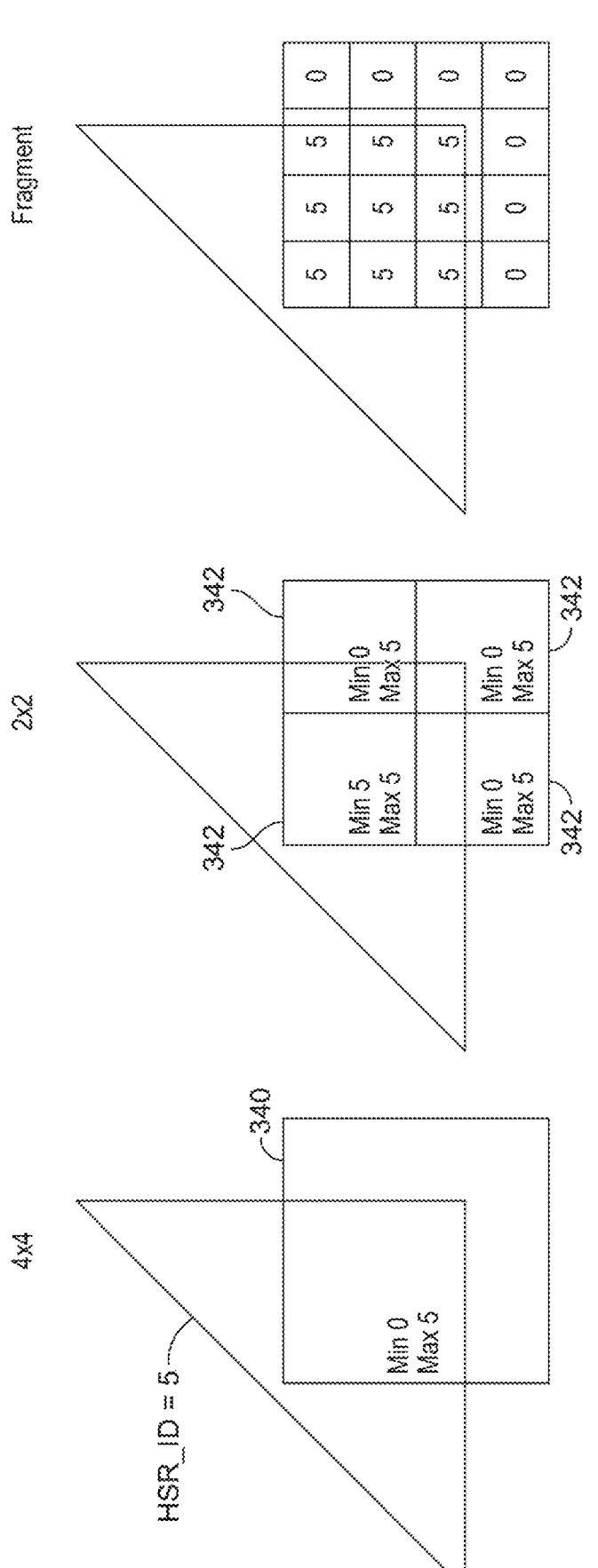
FIG. 37 shows schematically a "hierarchical" arrangement of such HSR ID buffer in which respective minimum and maximum primitive identifiers are stored for larger area "patches" of the render output.

FIG. 37 shows schematically a "hierarchical" arrangement of such HSR ID buffer in which respective minimum and maximum primitive identifiers are stored for larger area "patches" of the render output. In particular, FIG. 34 shows an arrangement in which the render output is subdivided into larger patches 340 which in this example correspond to patches of 4×4 fragments, and which larger patches 340 in turn are subdivided into smaller patches of 2×2 fragments 342. Although in this example only a single larger patch 340 is illustrated it will be appreciated that the entire render output will be similarly subdivided in this way into respective (non-overlapping) patches. It will also be appreciated that the patch sizes may be selected as desired and FIG. 34 is merely one example.

In the example shown in FIG. 37, there is a single visible primitive having HSR ID value of 5 which partially covers the larger patch 340. Therefore, it can be assumed that the earlier primitives with HSR ID values 1 to 4 are fully occluded by the visible primitive.

Figure 38:
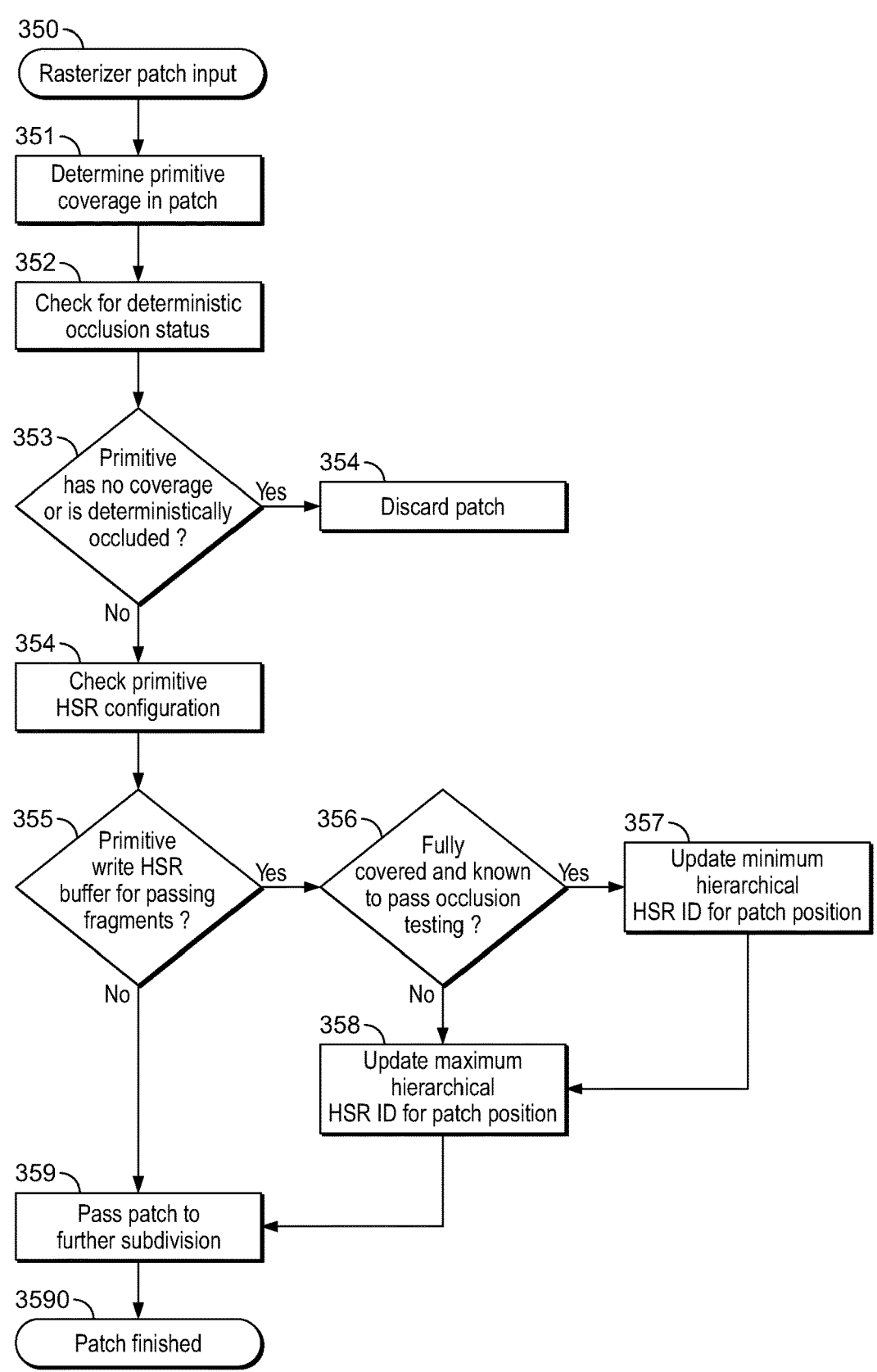
FIG. 38 shows schematically the generation of such hierarchical HSR ID buffer during the first, pre-pass operation.

FIG. 38 illustrates how the hierarchical HSR ID buffer can be generated during the early HSR ID update 241 in the first, pre-pass operation, which in this example is performed in a hierarchical manner, by first testing larger patches of the render output, and then testing progressively smaller patches of the render output, as necessary, down to the level of the individual fragments, in order to determine the HSR ID buffer.

As shown in FIG. 38, for an incoming primitive patch from the rasteriser (step 350), the primitive coverage in the patch is first determined (step 351). It is also determined whether or not the primitive patch is deterministically occluded (step 352). If the primitive has no coverage in the patch, or is deterministically occluded (step 353—yes), the primitive patch is then discarded (step 354), with no further testing. This then means that any further testing of the primitive against the individual sampling positions encompassed by the patch can be omitted as it has been determined already at the patch level that the primitive is not visible for any of those sampling positions.

On the other hand, if the primitive at least partially covers the patch, and is not deterministically occluded (step 353—no), testing of the patch continues. It is thus then checked whether or not the primitive is configured to write to the HSR ID buffer (step 354). This can be determined from the primitive classification, e.g. as described above. If the primitive is configured such that passing fragments do not update the HSR ID buffer (step 355—no), the HSR ID buffer should not be updated, and assuming there are further patches to be tested, the patch should instead be passed for further subdivision (step 359), and the testing of that patch is finished (step 3590).

For primitives that are configured such that passing fragments for the primitive should write to the HSR ID buffer (step 355—yes), the testing should continue to determine whether or not the HSR ID buffer should be updated for the patch in question. Accordingly, it is then determined whether the primitive fully covers the patch that is being tested and is visible at that patch. If the patch is fully covered and visible at the patch (step 356—yes), the minimum HSR ID for the patch position is updated accordingly to record the HSR ID associated with the primitive that is being tested (step 357). The maximum HSR ID for the patch position is also updated in either situation (step 356—yes or no) based on the primitive being potentially visible, in that it has been determined at this point that the primitive must partially cover the patch (step 353—yes) and it is known that any surviving fragments should write to the HSR ID buffer (step 355—yes). Thus, it cannot be excluded that the primitive might be visible within the patch, and the primitive should therefore be further processed (so the maximum HSR ID should be incremented accordingly).

The determined hierarchical HSR ID buffer including the per-patch minimum and maximum values is then used during the HSR ID test 276 in the second, main pass operation to try to cull primitives at the patch level, when it is possible to do so, thus avoiding having to always test the individual sampling positions. The testing against the hierarchical HSR ID buffer is shown in FIG. 39, for example.

Figure 39:
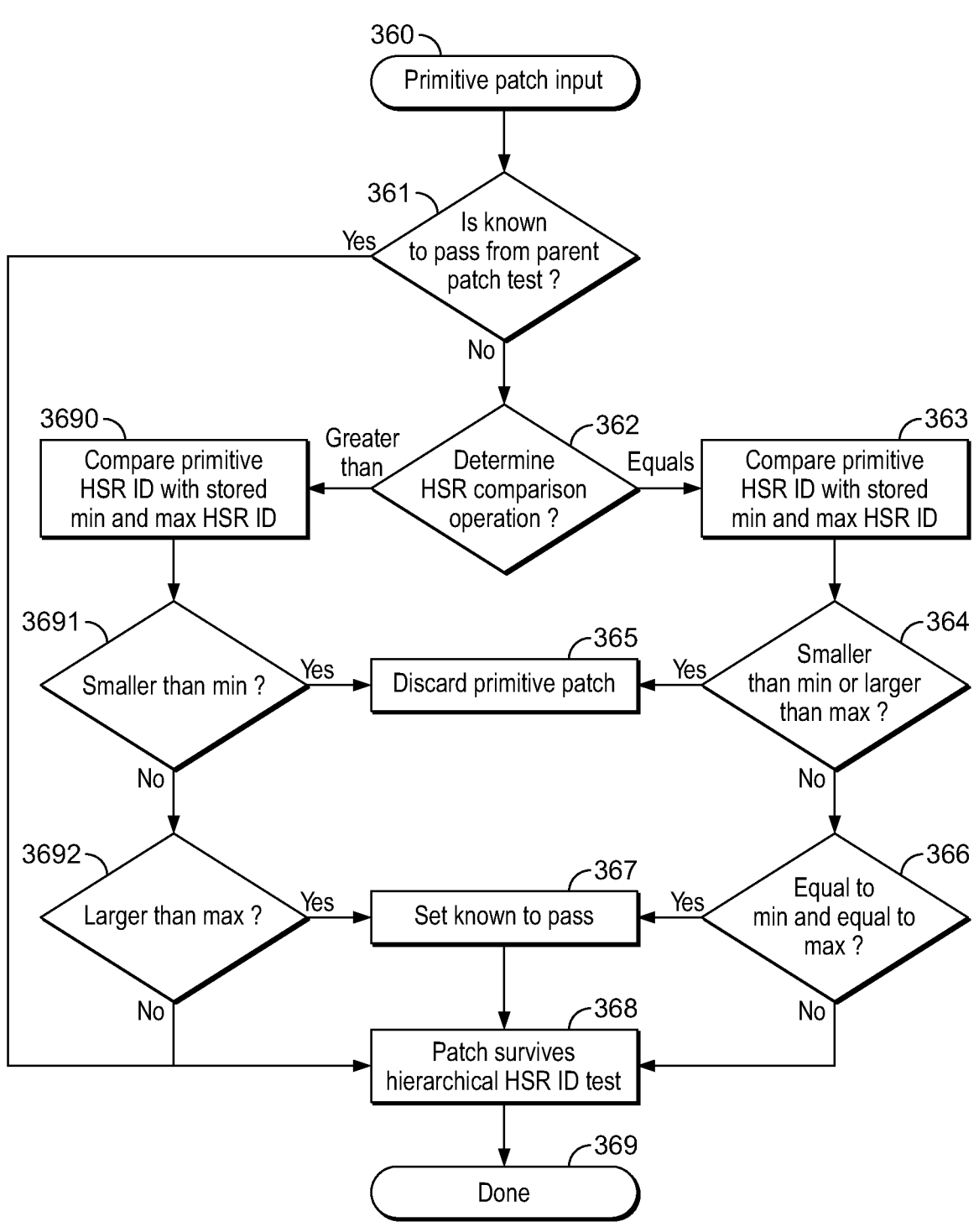
FIG. 39 shows the corresponding use of such hierarchical HSR ID buffer during the second, main pass operation.

As shown in FIG. 39, for an incoming primitive patch to be tested (step 360) against a respective patch of the render output, it is first checked whether or not the primitive patch is already known to pass based on it having already passed the testing in respect of a parent patch (step 361). Thus, if the primitive patch is set known to pass (step 361—yes), the patch is determined to survive the hierarchical HSR ID test without further explicit testing (step 368), and the testing of the patch is done (step 369). The testing can then proceed to the next smaller patch, as necessary.

Assuming that the primitive patch has not been set as known to pass (step 361—no), the testing then proceeds as follows. Firstly, it is determined what type of HSR ID test function should be used (step 362). For primitives that use an 'equals' test function, the primitive HSR ID associated with the primitive is then compared with the stored minimum and maximum HSR IDs for the patch (step 363). If the HSR ID associated with primitive patch being tested is smaller than the minimum HSR ID for the patch or greater than the maximum HSR ID for the patch (step 364—yes), this means the primitive patch can be culled (step 365), and no further subdivision or testing of the primitive is necessary.

If the HSR ID associated with the primitive patch lies between the stored minimum and maximum HSR IDs for the patch, the primitive patch should generally survive the hierarchical HSR ID testing at this level. However, there is a special case in which the stored minimum and maximum HSR IDs for the patch are the same. In that case, if the HSR ID associated with the primitive patch is equal to both the minimum and maximum HSR IDs for the patch (step 366—yes), it is known that the primitive must pass all further visibility testing for any sampling positions encompassed by the current patch, since it is only primitive that can survive. In this case, the primitive may therefore be set as known to pass (step 367). The primitive patch thus survives (step 368) and the testing of that patch is done (step 369). In this situation, because the primitive is set as known to pass, any smaller primitive patches also automatically pass the testing (step 361—yes).

Otherwise, if the stored minimum and maximum HSR IDs for the patch are not the same, so that the HSR ID associated with the primitive patch cannot be equal to both of them (step 366—no), the primitive is determined to survive the hierarchical HSR ID test at this level (step 368), and the testing at that level is done (step 369), but the primitive patch may still need to be tested further against smaller patches of the render output, assuming the minimum patch size has not yet been reached.

The above relates to the testing for primitives that use the 'equals' test (e.g. opaque primitives that could in principle have updated the HSR ID buffer during the pre-pass operation). As mentioned earlier, there may be other primitives that use a different 'greater than' test. This is particularly the case for transparent primitives that do not write depth or stencil values and which are in some examples processed only during the second, main pass operation.

For such primitives using the 'greater than' test, the HSR ID associated with the primitive patch is again compared with the stored minimum and maximum HSR IDs for the patch in question (step 3690). However, in this case, the patch can only be discarded (step 365) if the HSR ID associated with the primitive is lower than the stored minimum HSR ID for the patch (step 3691—yes). That is, since the test comprises a 'greater than' test, the primitives cannot be culled based on the maximum HSR ID. Conversely, if the HSR ID associated with the primitive patch is greater than the maximum HSR ID (step 3692—yes), this means that the primitive must always pass the greater than testing for all of the sampling positions encompassed by the patch. In that case, therefore, the primitive may be set as known to pass (step 367), such that the primitive is caused to pass the hierarchical testing at the current level (step 368) and is always set to automatically pass the testing for all sampling positions encompassed by the current patch.

Otherwise, if the HSR ID associated with the primitive patch lies between the stored minimum and maximum HSR ID values for the patch (step 3692—no), the primitive survives the testing against the current patch (step 368), but the primitive should be further subdivided and tested further against smaller patches of the render output, assuming the minimum patch size has not yet been reached. For instance, it may be possible that the HSR ID associated with the primitive patch is either smaller than the minimum value stored for a smaller patch of the render output, or greater than the maximum value, in which case the smaller primitive patch can be culled/passed at that level.

The effect of this is therefore that the minimum HSR ID stored for a patch indicates the first primitive that may need to be processed further for the patch in question. Thus, referring to the example shown in FIG. 37, for the larger patch 340, the shown primitive does not fully cover the larger patch 340 (step 356—no). Thus, the minimum HSR ID cannot be updated for the larger patch 340. The HSR ID buffer thus stores in respect of the larger patch 340 a minimum HSR ID value of 0 and a maximum HSR ID value of 5. This means that during the HSR ID testing 276 in the second, main pass operation, each of the primitives having HSR IDs 1 to 5 will survive the hierarchical HSR ID testing against the larger 4×4 patch 340.

The hierarchical HSR ID testing will accordingly then proceed to test each primitive against the set of smaller 2×2 patches 342. In this case, as shown in FIG. 37, the top left 2×2 patch is fully covered, and so the minimum HSR ID stored for that patch 342 will be updated accordingly during the first, pre-pass operation such that the minimum HSR ID stored for that patch is 5. Thus, when testing against the top left 2×2 patch 342, the primitive patch having associated HSR ID of 5 will be detected as known to pass, since its HSR ID matches both the minimum and maximum stored HSR ID values for that patch. In this case, the individual testing of the top left four fragments can be avoided since those fragments are all known to pass based on the hierarchical testing. Otherwise, in this example, it is not possible to cull/pass any other patches, and so the remaining fragments must be individually tested.

In the example described above the hierarchical HSR ID buffer is thus determined 'on the fly' as part of the HSR ID update 241 during the first, pre-pass operation. Thus, as described above, the minimum HSR ID stored for a patch is generally updated whenever a primitive that fully covers that patch is found to be visible, as described above in relation to FIG. 38.

In further examples, a finalisation ('baking') process may be performed at the end of the first, pre-pass operation that iterates over the determined hierarchical HSR ID buffer to try to refine the stored minimum and maximum HSR values for the different patches. For example, it may be the case that there is no single primitive that fully covers a patch, but the patch is fully covered by a group of primitives. In that case, it may be possible to identify a (narrower) range of primitives that should be processed further for the patch, and the minimum and maximum HSR ID values stored for the patch may thus be updated accordingly. This is illustrated in FIG. 40, for example.

In the example shown in FIG. 40 there are now two visible primitives, having respective HSR ID values 5 and 6. As shown in FIG. 40, neither primitive fully covers the larger 4×4 patch. Likewise, neither primitive fully covers any of the smaller 2×2 patches. Thus, according to the scheme as shown in FIG. 35 above, the stored minimum HSR ID is not updated for any of the patches during the first, pre-pass operation. However, it can be seen from FIG. 40 that the top left 2×2 patch is in fact fully covered by the combination of the two primitives. Thus, by suitably iterating over the initially determined HSR ID buffer, the minimum HSR ID for that patch can be updated accordingly (such that the minimum HSR ID value is now 5). This therefore allows at least the primitives with HSR ID values 1 to 4 to be culled for that patch, without having to test those primitives against the individual sampling positions covered by that patch.

The finalisation ('baking') process in this example is shown in FIG. 41. As shown in FIG. 41, once the pre-pass operations for a tile have finished, such that all primitives for the tile that are to be processed by the pre-pass have passed through the graphics processing pipeline shown in FIG. 24, to thereby determine an initial HSR ID buffer, the finalisation ('baking') process is initiated by starting a traversal over the initially determined HSR ID buffer (step 380).

In this example, the traversal starts at the smallest patch size, and selects the first patch position in the tile (step 381). The traversal then iterates over the sampling positions encompassed by the selected patch to find the actual minimum and maximum HSR ID values that are stored in the HSR ID buffer for the sampling positions encompassed by the selected patch (step 382). For all larger patches covering the currently selected patch position, the minimum and maximum HSR ID values are then updated accordingly (if it is possible to do so) (step 383). Assuming the current patch position is not the last position in the current tile (step 384—no), the next patch position is selected (step 385), and the process is repeated for that patch position. Once all of the patch positions have been processed in this way (step 384—yes), the hierarchical HSR ID buffer refinement is finished (step 386).

Figure 42:
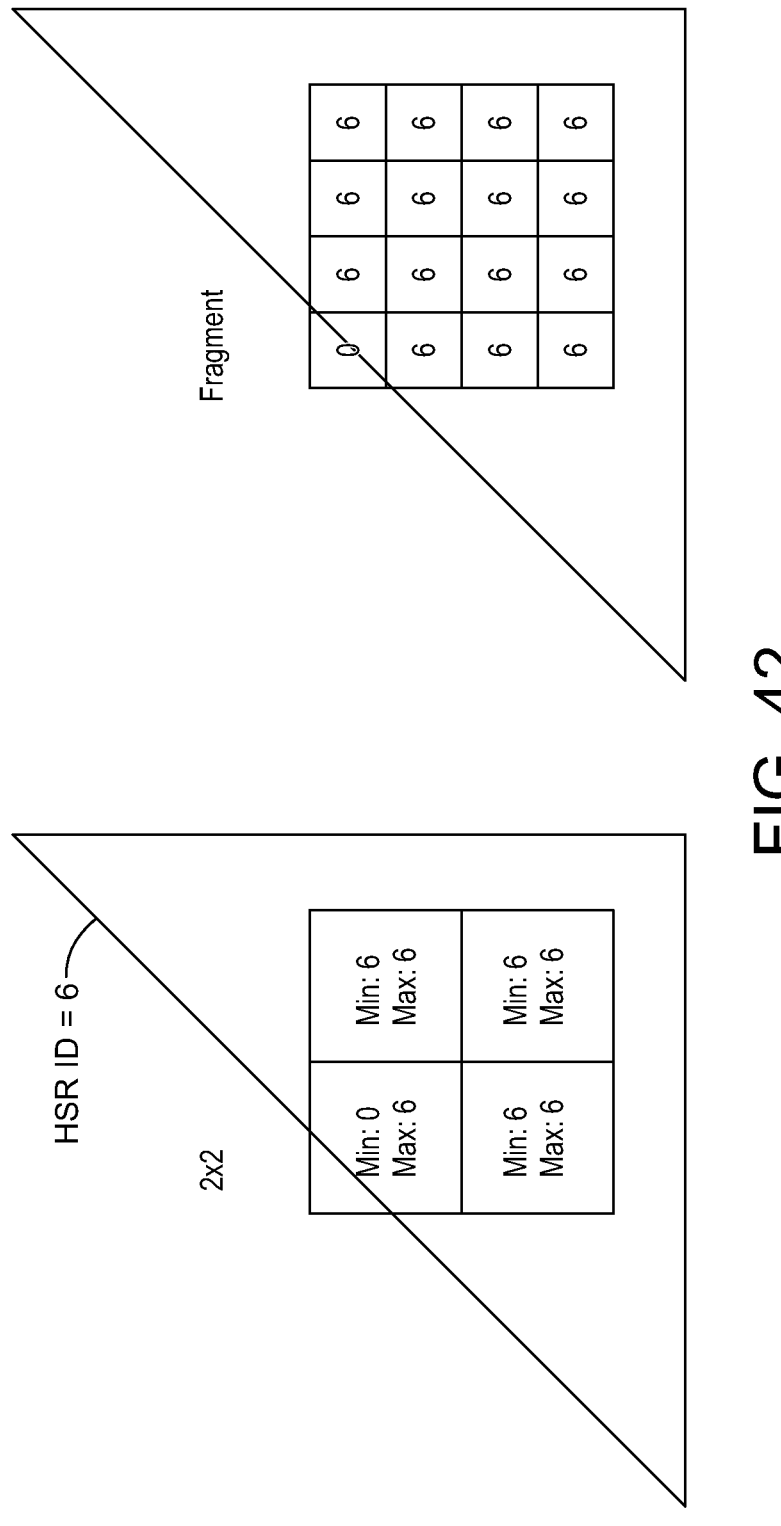
FIG. 42 illustrates how it may be determined during the first, pre-pass operation that no further refinement of the HSR ID buffer is possible.

In the example shown in FIG. 41, the finalisation ('baking') process thus iterates over all of the sampling positions in the render output. This can therefore take a significant time. In this respect, however, it will be appreciated that at least some of this iteration may be omitted if it can already be determined from the initially determined HSR ID buffer that no further refinement would be possible. An example of this is shown in FIG. 42. In this example, it can be seen that three of the 2×2 patches are fully covered by the same primitive, having HSR ID value of 6. As described above according to the 'on the fly' population of the HSR ID buffer as shown in FIG. 38, the HSR ID buffer will therefore store as the respective minimum and maximum HSR IDs for each of these patches the same value (i.e. '6'), with this indicating that the primitive with HSR ID of 6 is known to pass for all sampling positions encompassed by the 2×2 patch. In this case, it is clear that no further refinement of the minimum or maximum is possible for those patches.

Figure 43:
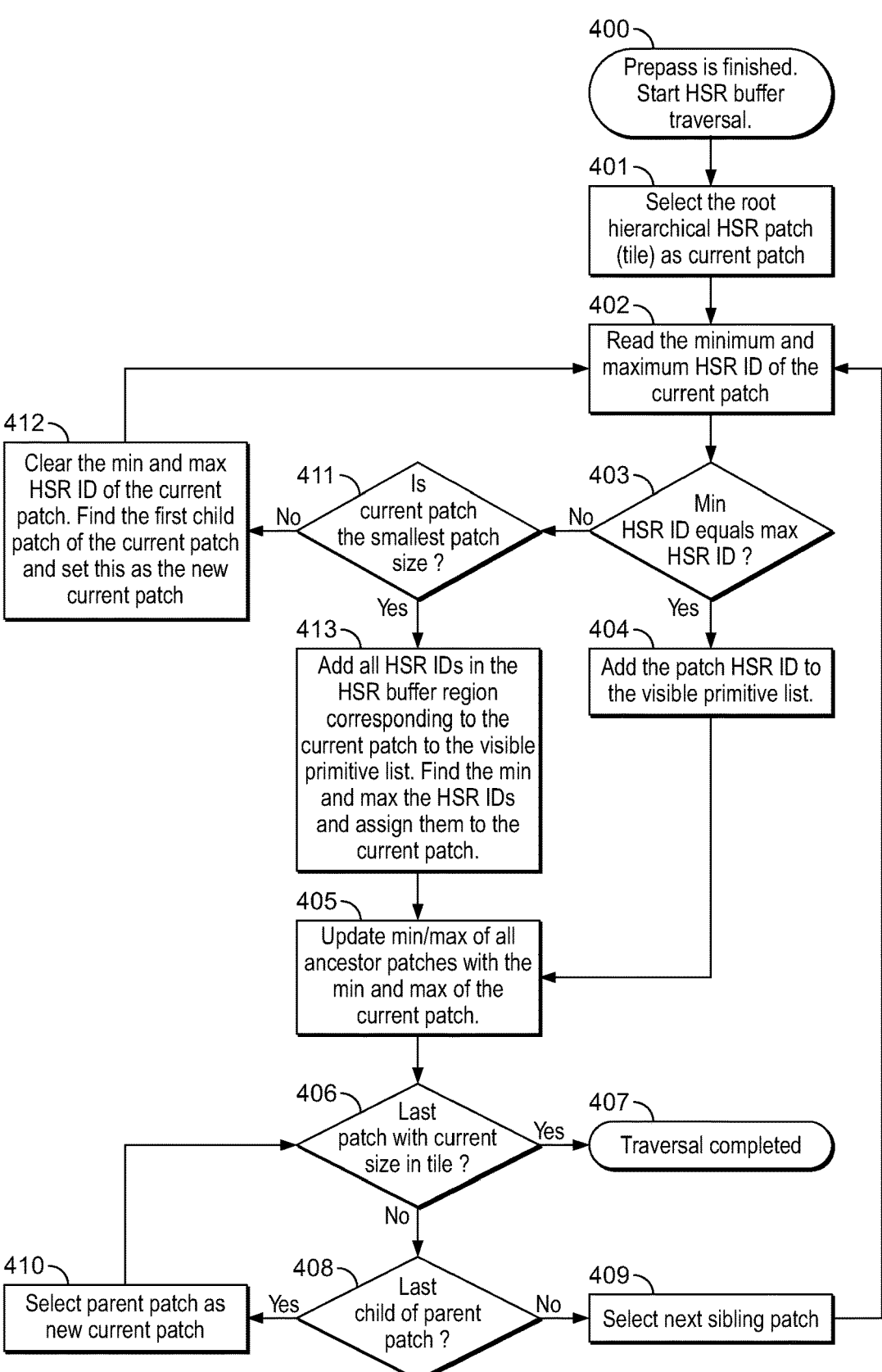
FIG. 43 shows schematically an improved finalisation ("baking") process for refining the hierarchical HSR ID buffer at the end of the first, pre-pass operation in which iteration is skipped for patches for which further refinement of the HSR ID buffer is possible.

FIG. 43 thus shows an improved finalisation ("baking") process according to a further example in which the traversal can be accelerated in such situations where it can already be determined that no refinement is possible. Again, this starts (step 400) once the pre-pass operations for a tile have finished, such that all primitives for the tile that are to be processed by the pre-pass have passed through the graphics processing pipeline shown in FIG. 24, to thereby determine an initial HSR ID buffer. In this example, the minimum and maximum HSR IDs for the current patch are read (step 402), and it is determined whether or not they are the same (i.e. whether the minimum HSR stored ID matches the maximum stored HSR ID). If the minimum and maximum HSR IDs for the current patch are the same (step 403—yes), the patch HSR ID is then added to a list of visible primitives (step 404). At this point, the minimum and maximum values for all higher level patches are updated (as necessary) with the minimum and maximum values for the current patch (step 405). If the current patch is the last patch at the current level of testing (step 406—yes), the traversal is then completed (step 407). Otherwise, if current patch is not the last child of a given parent patch, such that there are further 'sibling' patches to be tested (step 408—no), the next sibling patch is selected (step 409), and its minimum and maximum HSR ID values are then read accordingly (step 402), etc. If the current patch is the last child of its parent patch, the parent patch is selected as the new current patch (step 410), as shown in FIG. 43.

If it is determined that the minimum and maximum HSR IDs for the current patch are not the same (step 403—no), it is determined whether the current patch is the smallest patch size, and if not (step 411—no), the minimum and maximum HSR IDs of the current patch are cleared, and the first child patch of the current patch is selected as the new current patch for testing (step 412). This process thus traverses the hierarchical HSR ID buffer from the top down to find the smallest patch size, unless it is determined at a higher level that no further refinement is possible. Once the smallest patch size is reached (step 411—yes), the sampling positions encompassed by that patch are then iterated over (step 413), in a similar manner as described above in relation to FIG. 41, and the minimum and maximum values for all higher level patches are then updated accordingly (step 405). It is then checked whether there are further patches to be processed (step 406, etc.) until the traversal is complete (step 407).

The traversal thus starts by first selecting the root (i.e. largest) hierarchical HSR patch as the current patch (step 401). If the minimum and maximum HSR IDs for the root (largest) patch are the same (step 403—yes), the traversal is then completed at that point. Otherwise, the traversal continues by checking for progressively smaller patches whether or not the minimum and maximum HSR IDs are the same to check whether further refinement is possible. In this way, the iteration over the individual sampling positions (step 413) is only performed when there is some possible refinement that could be made. This can therefore speed up the finalisation of the HSR ID buffer.

In the examples above, during the first, pre-pass operation, in the event that a primitive is determined to cover one or more sampling positions within the render output, the HSR ID for the primitive is written to the HSR ID buffer in respect of the sampling position(s) for which the primitive is visible. Especially if a larger patch is found to cover many sampling positions this can therefore represent a significant write bandwidth. In order to clear the HSR ID buffer a number of "clear" bits are provided in registers that when set are able to indicate that N sampling positions represented by the clear bit are all zero. In a further example, these clear bits are re-purposed to simplify the updating of the HSR ID buffer, as will be explained in relation to FIG. 44, for example.

Figure 44:
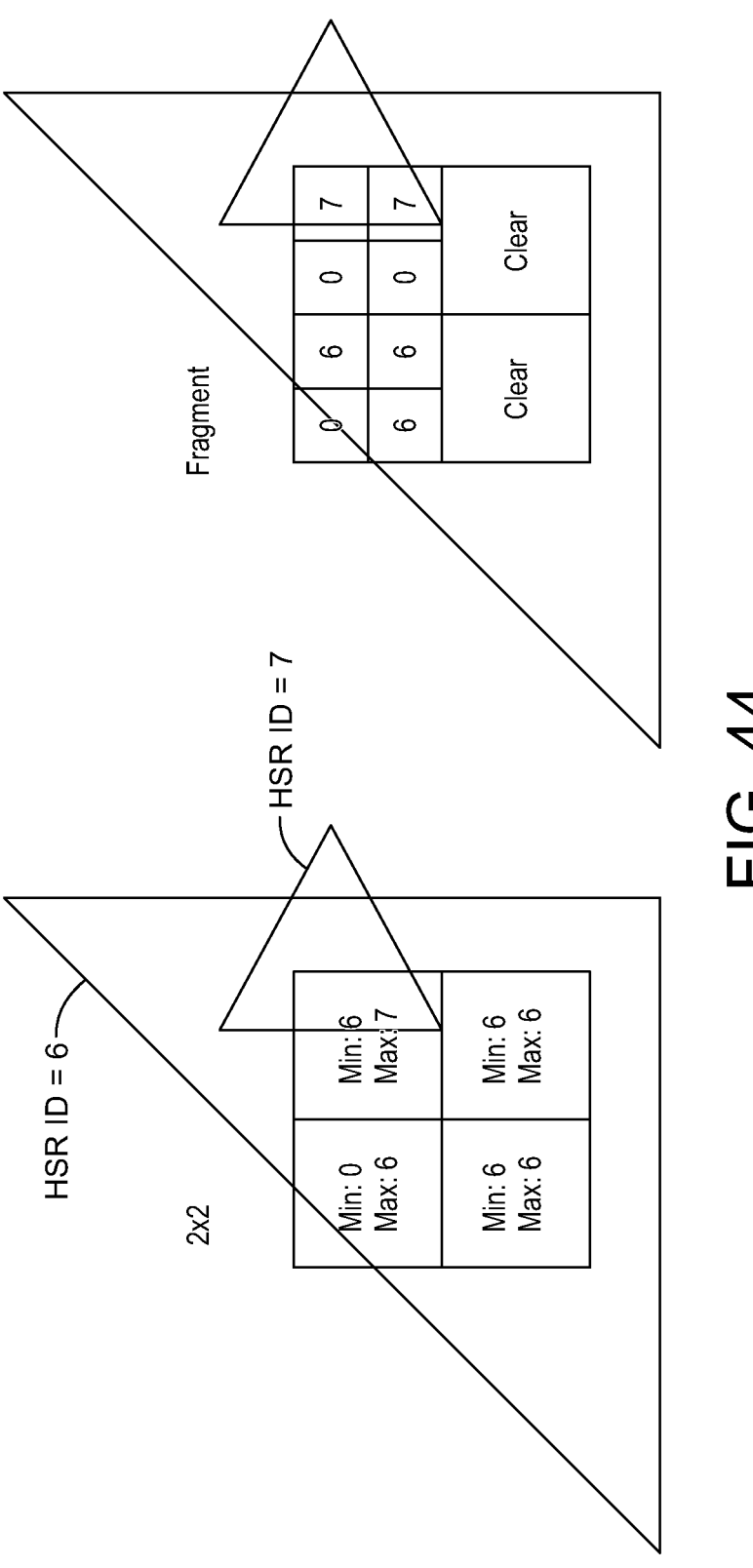
FIG. 44 illustrates how the updating of the HSR ID buffer may be simplified in some cases to save having to write the same HSR ID out repeatedly to many sampling positions encompassed by a patch.

FIG. 44 thus shows an example where there are two primitives, having respective HSR ID values of 6 and 7. In this example, the bottom two 2×2 patches are both fully covered by the primitive with HSR ID value 6. The top left 2×2 patch is partially covered by the primitive with HSR ID value 6. The top right 2z2 patch is fully covered by the primitive with HSR ID value 6 but is partially overwritten by the later primitive with HSR ID value 7. The result of the finalisation process discussed above is therefore that the minimum and maximum stored HSR IDs for each 2×2 patch are set as shown in FIG. 44. Thus, the minimum HSR ID for all of the top right and bottom two 2×2 patches is set to 6.

Figure 45:
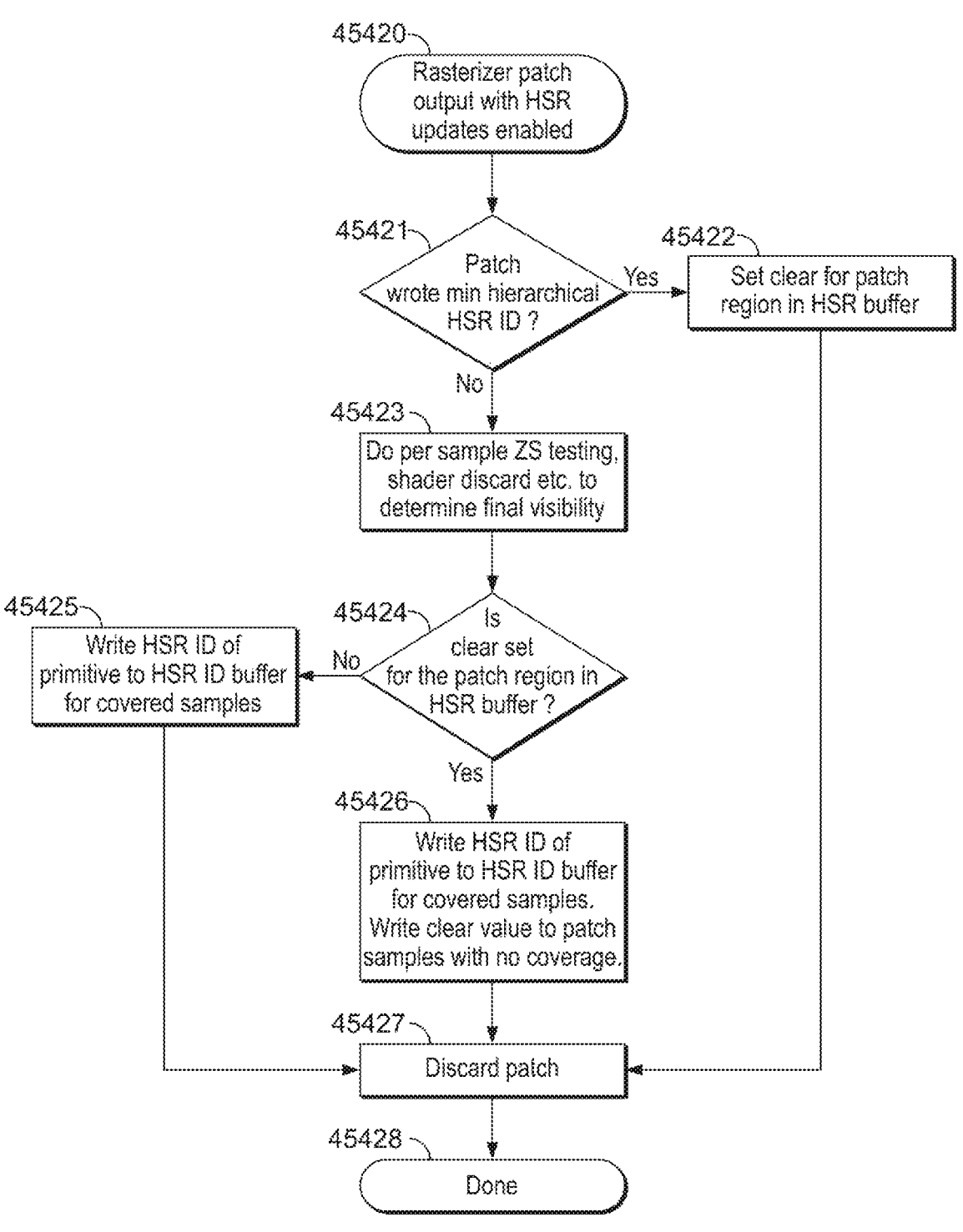
FIG. 45 shows schematically the updating of the HSR ID buffer during the first, pre-pass operation according to an example in which when a visible primitive is found to fully cover a patch of the render output, the sampling positions encompassed by the patch are cleared.
Figure 46:
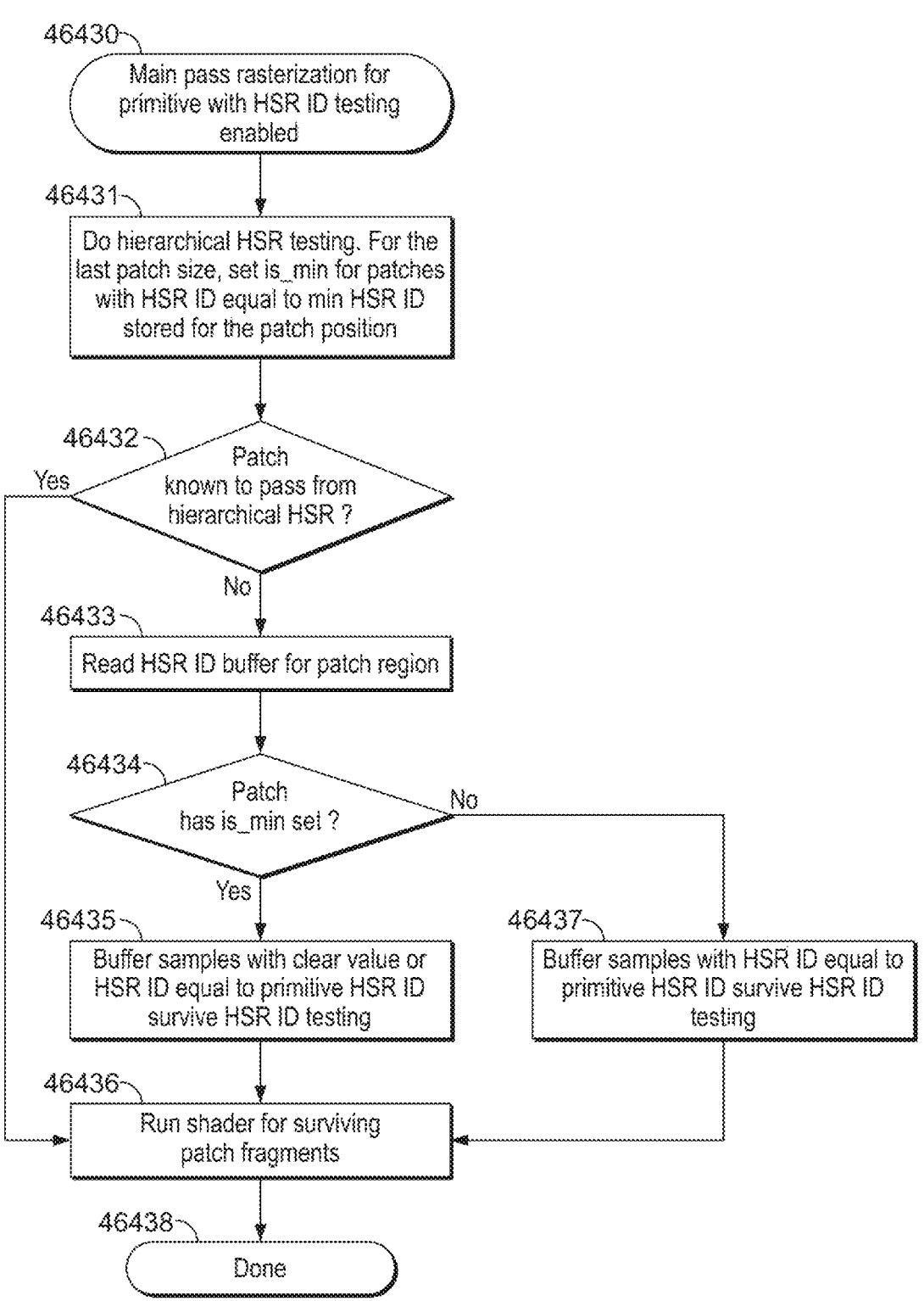
FIG. 46 shows schematically how the corresponding second, main pass operation can interpret any "clear" or zero values in order to ensure the correct rendering behaviour.

In this example, rather than writing the value 6 to each of the sampling positions encompassed by those patches, a "clear" value, i.e. 0 is instead used, as will be explained further below. This then saves having to explicitly write the same value out many times when it is possible to avoid doing so. FIG. 45 illustrates the operation of writing to the HSR ID buffer during the first, pre-pass operation and FIG. 46 illustrates how the "clear" values are used during the second, main pass operation to ensure the correct rendering behaviour.

As shown in FIG. 45, for an incoming primitive patch that is capable of updating the HSR ID buffer (step 45420), it is first determined whether the primitive patch is derived from the primitive that wrote the minimum HSR ID value for the corresponding patch (step 45421). If yes, a corresponding "clear" bit is set for the patch region in the HSR ID buffer (step 45422) to indicate that all of the sampling positions covered by the patch can be cleared (at this point). The primitive patch can thus be discarded (step 45427), and the updating of the HSR ID buffer for the primitive patch in respect of the sampling positions covered by the primitive patch is thus done (step 45428). The next primitive can thus be processed accordingly.

If the primitive patch does not correspond to the primitive that wrote the minimum HSR ID value for the corresponding patch (step 45421—no), the operation proceeds to perform the per-sampling position depth (and stencil) testing, as well as any fragment shader execution, etc., necessary to determine the final visibility for the sampling positions encompassed by the patch (step 45423). If the "clear" flag has not been set for the patch region in the HSR buffer (step 45424—no), the HSR ID of the primitive is then written to the HSR ID buffer for any covered sampling positions (step 45425), as described above. On the other hand, if the "clear" flag has been set (step 45424—yes), the HSR ID of the primitive is still written to the HSR ID buffer for any covered samples, and the "clear" value is written to any patch samples with no coverage. In either case, at that point, the primitive patch can be discarded (step 45427), as the updating of the HSR ID for that primitive patch is done (step 45428).

The effect of this is that for any sampling positions encompassed by a patch of the render output that are covered by the primitive associated with the stored minimum HSR ID for the patch in question, rather than storing the same HSR ID in respect of each of the individual sampling positions that are covered by that primitive, the sampling positions are instead cleared. Thus, referring back to FIG. 44, it can be seen that the sampling positions encompassed by the bottom two 2×2 patches, for which the primitive having HSR ID of 6 is visible, are all set to the clear value, without having to explicitly write that value to the HSR ID buffer. Likewise, for the top right 2×2 patch, the primitive having HSR ID of 6 is visible for the two left-most sampling positions, and so a 'zero' value is stored in the HSR ID buffer for those two sampling positions. The two right-most sampling positions are however overwritten by the primitive having HSR ID of 7, and so that value is stored for those sampling positions. This then reduces write bandwidth associated with updating the HSR ID buffer. However, it is then necessary to be able to correctly interpret any clear values during the second, main pass operation to ensure the correct rendering behaviour. This is illustrated in FIG. 46, for example.

FIG. 46 thus shows the corresponding HSR ID testing for an incoming primitive to be processed (step 46430). Firstly, hierarchical HSR ID testing is performed, as described above. If the primitive is determined to match the stored minimum HSR ID value for the current patch that is being tested, the primitive is marked accordingly by setting an 'is_min' bit to indicate that the primitive is the primitive that caused the update to the minimum HSR ID value for the current patch (step 46431). This 'is_min' bit when set can then be used to allow any fragments to automatically pass testing for any sampling positions for which the "clear" or zero value is set.

If the primitive patch being tested is known to pass all visibility testing from the hierarchical HSR ID testing (step 46432—yes), the primitive patch as a whole is passed for further processing, and a fragment shader is executed accordingly for all of the fragments encompassed by the patch (step 46436) to determine the rendered output data, and the second, main pass operation is then done for the sampling positions encompassed by the primitive patch being tested (step 46438).

On the other hand assuming the primitive patch being tested is not known to pass all visibility testing from the hierarchical HSR ID testing (step 46432—no), the testing of the primitive patch continues by reading the HSR ID buffer for the patch region (step 46433) and checking whether or not the 'is_min' bit has been set for the primitive in question (step 46434). If the 'is_min' bit has not been set (step 46434—no), the testing of the fragments against the individual sampling positions is then performed as normal, e.g. such that for primitives that use the 'equals' test, the fragments survive the HSR ID testing when their associated HSR ID matches the value stored in the HSR ID buffer (step 46437). Whereas, when the 'is_min' bit is set (step 46434—yes), the testing is performed such that in addition to fragments surviving the testing when their associated HSR ID matches the value stored in the HSR ID buffer, the fragments are also caused to automatically pass the visibility testing for any sampling positions for which the "clear" or zero value is set.

The above examples relating to a hierarchical HSR ID buffer arrangement thus allow various optimisations of the HSR ID testing, and hence allow for improved overall graphics processing operation.

Culling Vertex (Varyings) Attribute Shading

As mentioned above, the rasterising and rendering processes use the vertex attributes associated with the vertices of the primitive that is being processed. To facilitate this operation at least some of the attributes of the vertices defined for the given graphics processing output are usually subjected to an initial so-called "vertex shading" (vertex processing) operation, before the primitives are, e.g. rasterised and rendered. This "vertex shading" operation operates to transform the attributes for a vertex into a desired form for the subsequent graphics processing operation(s). This may comprise, for example, transforming vertex position attributes from the model or user space that they are initially defined in, to the screen space that the output of the graphics processing is to be displayed in.

A graphics processing pipeline executed by a graphics processor will typically therefore include a vertex processing stage (a vertex shader) that executes vertex processing (shading) computations on initial vertex attribute values defined for the vertices so as to generate a desired set of output vertex attributes (i.e. appropriately "shaded" attributes) for use in the subsequent processing stages of the graphics processing pipeline.

The vertex shader execution typically produces (transformed) vertex positions and one or more outputs explicitly written by the vertex shader. Attributes communicated from the vertex shader to rasterisation and rendering other than position are usually referred to as "varyings". (Thus the non-position outputs from the vertex shader (and only the non-position outputs from the vertex shader) are "varyings".)) Once the vertex attributes have been shaded, the "shaded" attributes are then used when processing the vertices (and the primitives to which they relate) in the remainder of the graphics processing pipeline.

The primitives that are to be processed for the render output according to the present embodiments are (each) defined in terms of a set of vertices (e.g., and in an embodiment, chosen from a larger set of vertices to be used for the graphics processing output (e.g. frame for display)). Each vertex in the set of vertices will have and has associated with it a set of one or more vertex attributes (vertex attribute data (values)). These vertex attributes can be any suitable and desired attributes that may be associated with a vertex, such as one or more of, and in an embodiment all of: position (e.g. x, y, z, w coordinates/values for the vertex), colour (e.g. RGB values for the vertex), transparency (an alpha value for the vertex), etc. In an embodiment, each vertex has associated with it a position (position data) and one or more other, non-position attributes (data) (varyings), e.g. defining colour, light, normal, texture coordinates, etc, for the vertex in question. These vertex attributes are then used when rasterising and rendering the primitives.

As is often the case in graphics processing, the vertex data (the vertex attributes) may need to be processed (e.g. shaded) in order to transform the vertex attributes into a desired form for subsequent processing. Thus, according to the present embodiments, the graphics processor comprises a vertex processing circuit (e.g., and in an embodiment, in the form of a "vertex shader") that is configured to process (e.g. shade) vertex data in the form in which it is stored/obtained by the graphics processor (the 'raw' vertex data) to generate appropriately vertex shaded attribute data for vertices to be processed for primitives for a render output.

The processing (shading) of the vertex attributes can be performed at various stages within the overall graphics processing operation. For example, in the present embodiment, the graphics processor operates a tile-based rendering scheme as described above, in which, as shown in FIG. 4, a programmable vertex shader 427 is executed as part of the initial geometry processing stage in order to process (shade) at least the vertex position attributes to facilitate such sorting of the geometry. The initial upfront geometry processing could also shade the non-position (varyings) vertex attributes, and store all of the transformed vertex geometry (attributes) 425 together in memory 423 such that it can subsequently be obtained and used by the renderer 422 to perform the rendering operations.

In some examples, however, the processing of (at least some of) the, e.g., non-position (varyings), vertex attributes is deferred to the rendering stages of the graphics processing operation, i.e. to the point at which those vertex attributes are desired to be used. This can advantageously reduce bandwidth requirements, e.g., by saving having to write out all of the vertex shaded varyings data upfront, as at least some of the vertex attribute processing (shading) can instead be performed for an individual tile, rather than for the entire render output.

Figure 47:
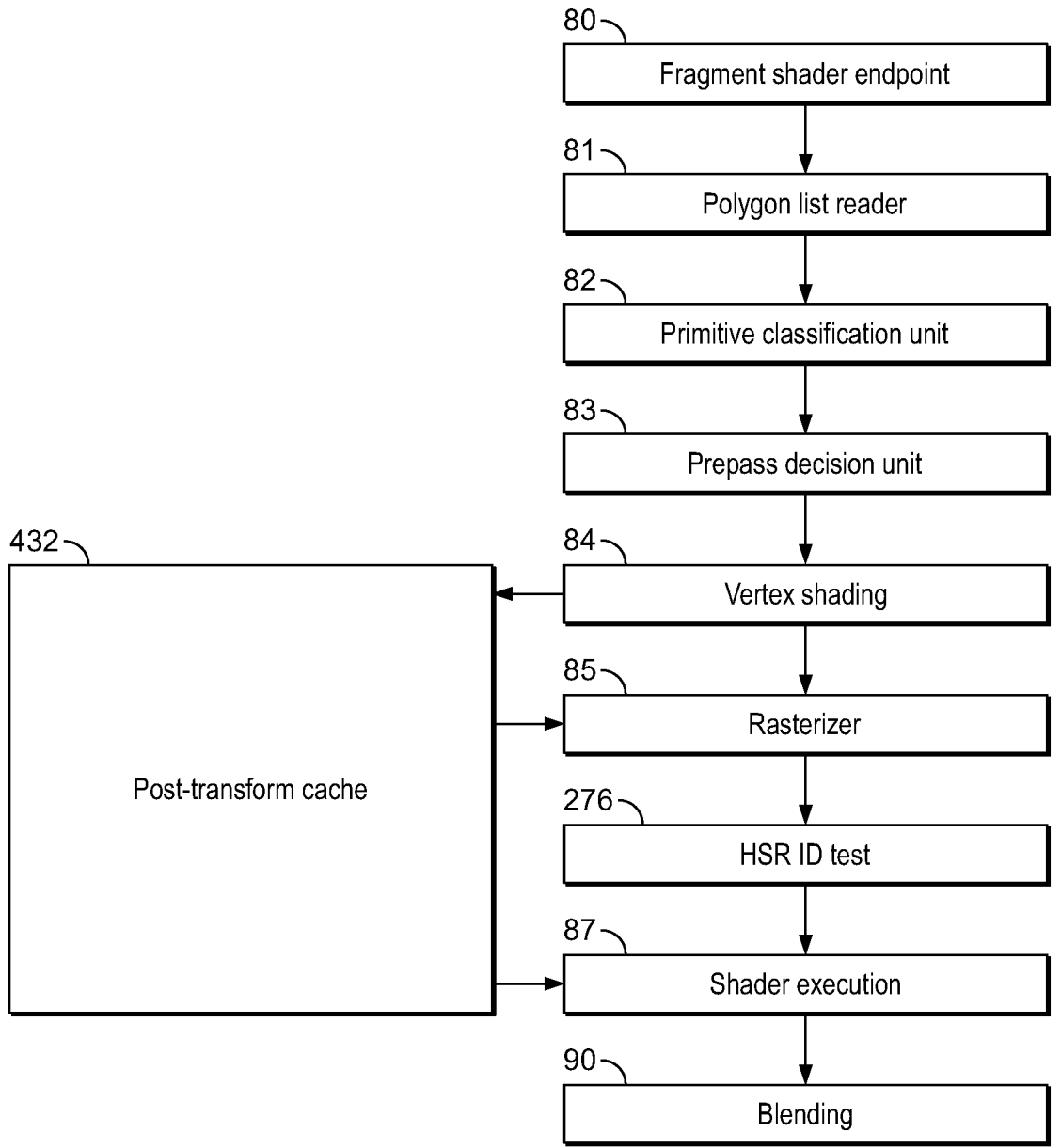
FIG. 47 shows schematically an arrangement in which at least some vertex attribute shading is deferred to the rendering stages of the graphics processor.

FIG. 47 shows a corresponding graphics processing pipeline according to such examples. As shown in FIG. 47, the vertex processing (shading) stage 84 in this example performs vertex shading. The vertex processing (shading) stage 84 in this example can thus trigger a vertex processing circuit (e.g. vertex shader) to process the vertex data for the set of vertices defining the primitive in question to generate vertex shaded attribute data for the primitive in the desired form for further processing of the primitive. As shown in FIG. 47, the vertex processing (shading) stage 84 is also coupled to the vertex cache (post-transform cache) 432. When the fragment shader endpoint 80 issues a primitive for rendering, this can therefore trigger a vertex processing (shading) operation to process the corresponding vertex data (vertex attributes) for the primitive in question. The transformed (vertex shaded) geometry data is then in an embodiment suitably stored, and read back into the graphics processor at the relevant graphics processing stages, i.e. by the rasteriser 85 and the fragment shader 87, in order to rasterise and render the primitive.

The graphics processing pipeline shown in FIG. 47 generally corresponds to the graphics processing pipeline shown in FIG. 27 above, in which the testing comprises the HSR ID test 276. However, it will be appreciated that deferred vertex shading may also be performed for any of the other examples described above, and is not limited to examples using the HSR ID buffer.

As described above, the fragment shader endpoint 80 is caused to issue the same primitives to the graphics processing pipeline twice, namely to perform the respective first, pre-pass operation for the primitive and to then perform the corresponding second, main pass operation for the primitive. This means that some of the processing for a primitive (and its corresponding fragments) is performed twice, i.e. as the same primitive may be subject to both the first, pre-pass operation and the second, main pass operation. For example, when the same primitive is subject to both the first, pre-pass operation and the second, main pass operation, it will typically (necessarily) be rasterised twice, since both passes involve processing primitives into their associated fragments. Similarly, because in the example shown in FIG. 47 at least some vertex attribute processing (shading) in the technology described herein is deferred to the rendering stages, this means that vertex attribute processing (shading) may be (and in some cases will be) triggered during the first, pre-pass operation and then triggered again during the second, main pass operation.

In an example therefore the graphics processor is caused to skip at least some varyings shading in the pre-pass if it can be determined that the varying is not in fact required by the first, pre-pass operation to determine the desired "visibility" information. For example, for primitives that would otherwise be compatible with the pre-pass operation, the following conditions can be used to prove that no varyings are used in the first, pre-pass operation: (i) the fragment shader does not modify coverage; (ii) the fragment shader does not emit depth, and (iii) alpha-to-coverage is not in use.

Figure 48:
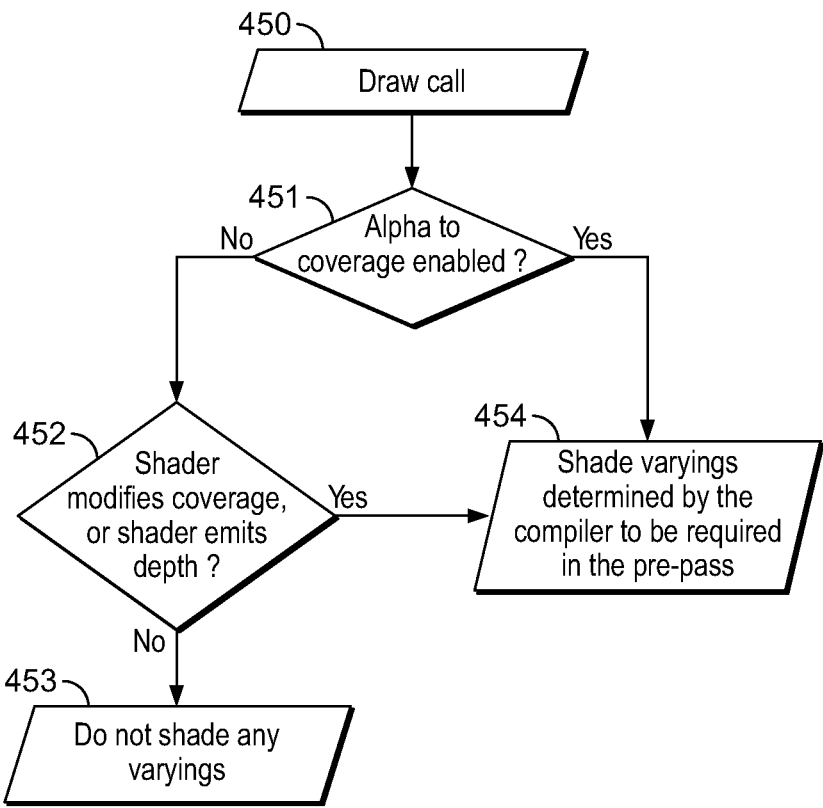
FIG. 48 shows schematically a driver operation that determines whether or not vertex attribute (varyings) shading is required during the first, pre-pass operation.

This can be determined by the driver 4 for the graphics processor 3, as shown in FIG. 48. FIG. 48 is thus a flow chart illustrating the driver operation to determine whether or not varyings are required for the first, pre-pass operation. Thus, for an incoming draw call (step 450), it is checked whether alpha-to-coverage is enabled (step 451) and also whether or not the shader modifies coverage or emits depth (step 452). If either of these conditions are satisfied, the pre-pass operation should therefore shade the varyings determined by the compiler to be required in the pre-pass operation (step 454). Otherwise, if none of these conditions are satisfied, varyings shading can be omitted in the first, pre-pass operation (step 453).

This can be flagged accordingly. For example, in some cases, if any of the varyings are required, the graphics processor may be caused to shade all of the varyings. That is, this may be indicated in a binary manner. However, the compiler is also able to determine which varyings are actually required. For example, when the first, pre-pass operation executes a fragment shader, the fragment shader program can be configured (ordered) such that fragments only run up to a certain point. The compiler can thus check whether there is any path through the fragment shader that will read a particular varying before that point. In that case, the indication of which varyings are required may be more complex and may indicate a set of one or more varyings that should be shaded during the first, pre-pass operation.

Figure 49:
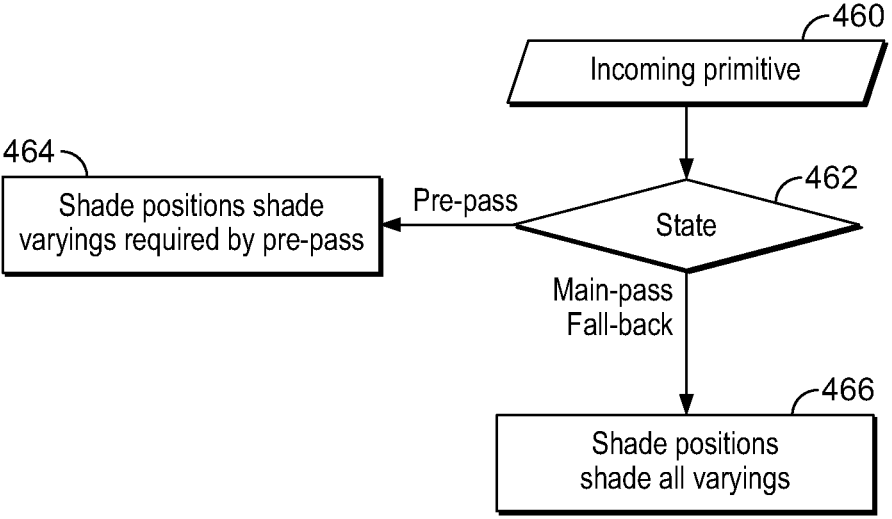
FIG. 49 shows schematically a state machine illustrating how the graphics processor may be controlled according to this example.

FIG. 49 is a state diagram showing how the operation of the graphics processor is controlled in the different states depending on whether or not the varyings are required. As shown in FIG. 49, for an incoming primitive (step 460), if the graphics processor state machine (462) is the pre-pass state, the vertex shader 84 is caused to shade all vertex position attributes but to shade only the vertex non-position (varyings) attributes that have been determined to be required for the first, pre-pass operation (step 464). When the graphics processor is in the main pass state, the vertex shader 84 is in this example caused to shade all of the vertex attributes including both the vertex position and non-position (varyings) attributes (step 466). (In the fallback state, again, all of the vertex attributes including both the vertex position and non-position (varyings) attributes will be shaded.)

Various examples are possible for allocating storage for vertex data in the vertex cache (post-transform cache) 432 when some of the vertex attribute shading is omitted during the first, pre-pass operation.

Figure 50:
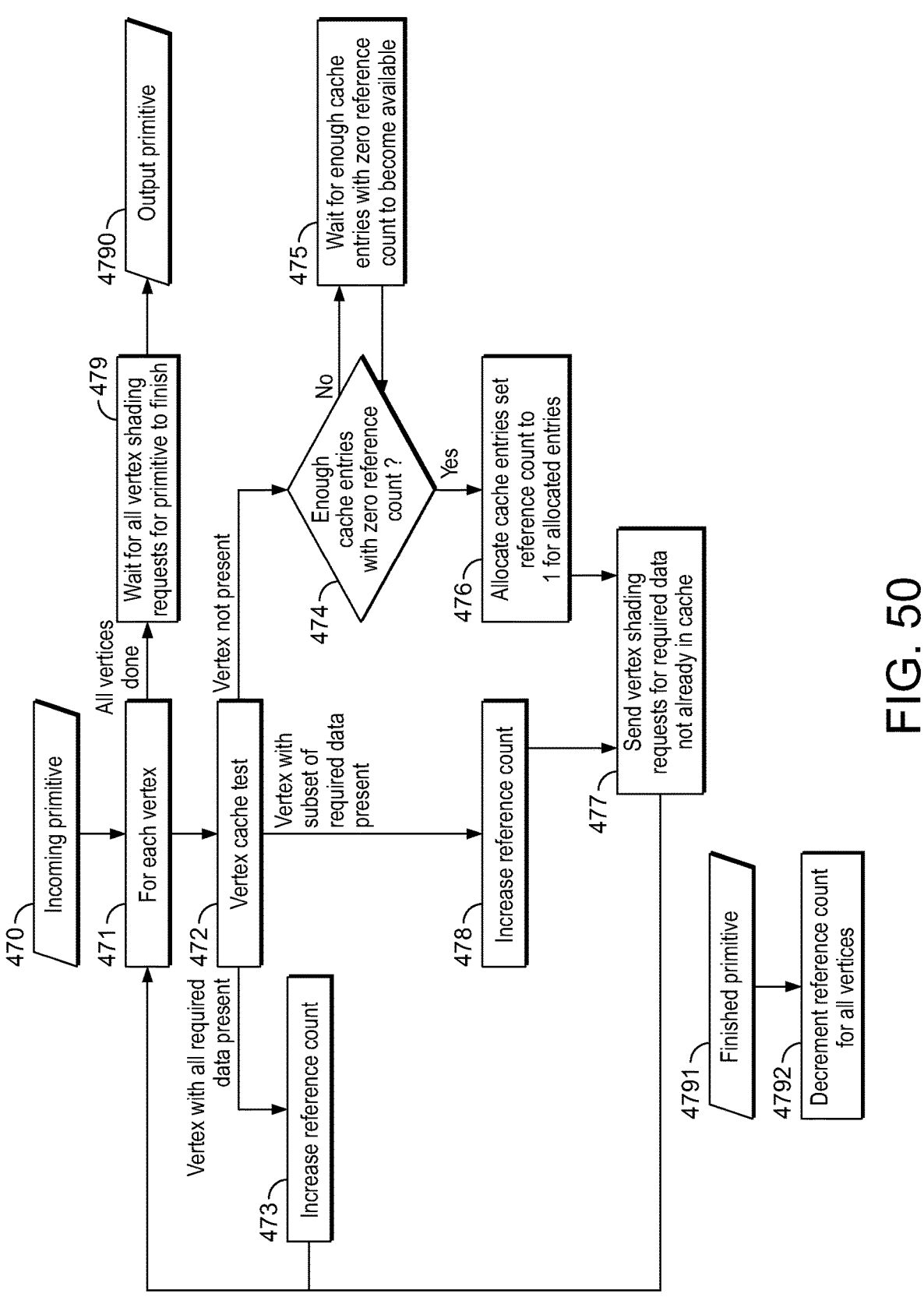
FIG. 50 shows schematically an example of how vertex data may be handled when vertex attribute (varyings) shading is omitted by the first, pre-pass operation.

A first example is illustrated in FIG. 50. In the example shown in FIG. 50, enough space is allocated in the vertex cache (post-transform cache) 432 during the first, pre-pass operation for the entire vertex, even if only the vertex position attributes are populated.

As shown in FIG. 50, for an incoming primitive (step 470), for each vertex (step 471), a vertex cache look up is performed to determine whether or not the vertex is already stored in the cache (step 472). If the vertex with all of the required vertex data is already stored in the cache, no further processing for that vertex is required, so the reference count is incremented accordingly (step 473), and the next vertex is processed. On the other hand, if the vertex is not yet present in the cache at all, so long as there is sufficient space for the entire vertex in the cache (step 474—yes), respective cache entries are allocated for storing the entire vertex, and the reference count is set to 1 for the allocated entries (step 476). If there is not sufficient space for the entire vertex in the cache (step 474—no), the vertex processing waits for enough cache entries to be available (step 475).

The desired vertex shading requests are then issued for the required vertex data (step 477). Thus, if the vertex varyings attributes are not required, the request at this point may simply be issued for the vertex position attributes. In this way, at the end of the first, pre-pass operation, the vertex will be stored in the cache with a subset of the required vertex data. Thus, during the corresponding second, main pass operation, when the vertex data is required for that vertex, the vertex cache test (step 472) will determine that the vertex is present, but only with a subset of the required data present in the vertex cache (i.e. the position attributes are stored but some or all varyings attributes are not stored). In that case, the reference count is increased (step 478), and vertex shading requests are then issued for the missing vertex data (step 477).

Once all vertices have been processed, the process then waits for all vertex shading requests to finish (step 479), before outputting the respective primitive (step 4790). Once the primitive is finished (step 4791), the reference count for all vertices is decremented accordingly (step 4792).

The approach shown in FIG. 50 thus allows the vertex packet to be re-used during the main pass. However, this requires a larger than necessary vertex cache allocation during the pre-pass operation, which can increase the frequency of allocation stalls.

Figure 51:
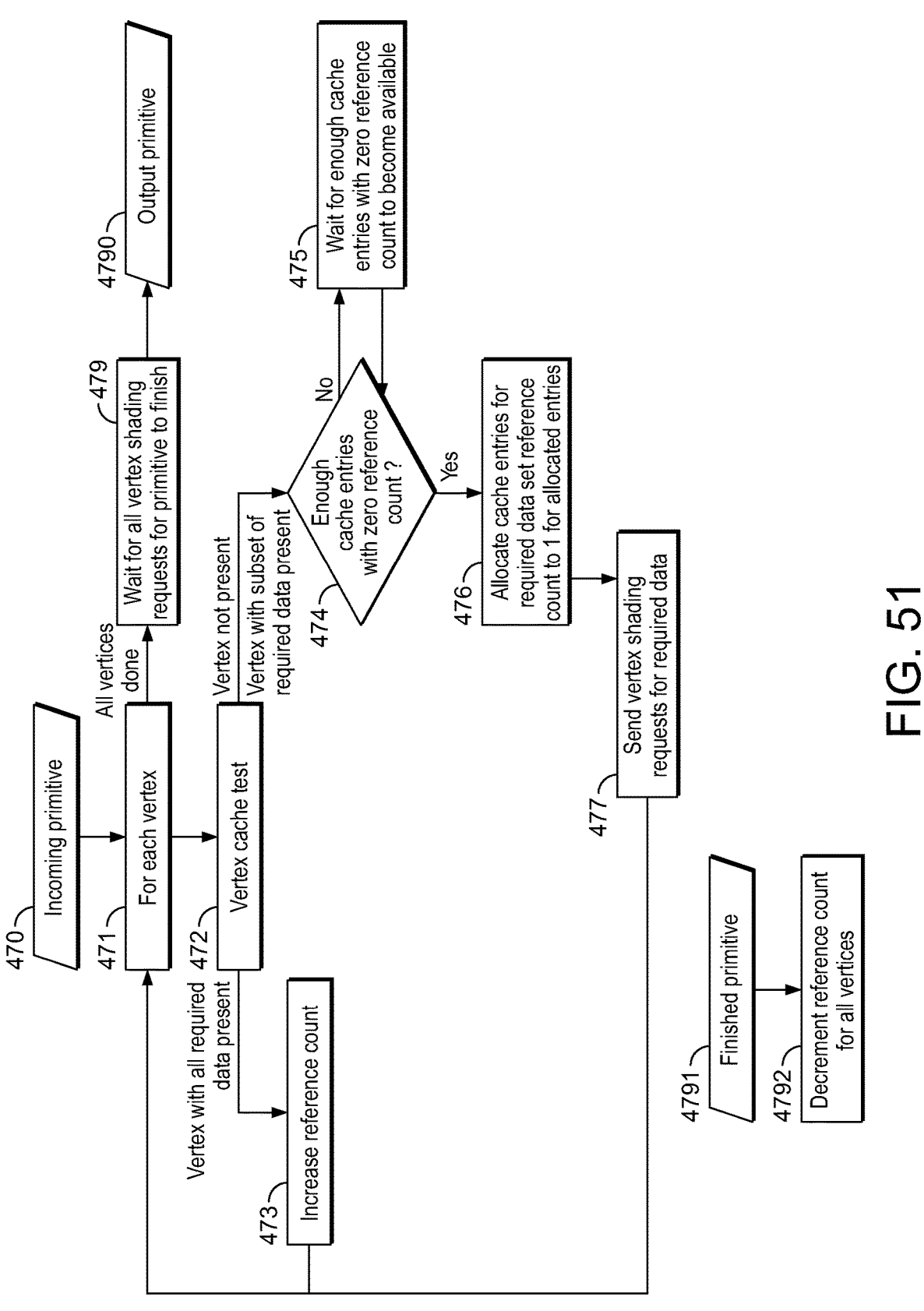
FIG. 51 shows schematically another example of how vertex data may be handled when vertex attribute (varyings) shading is omitted by the first, pre-pass operation.

Another approach is thus illustrated in FIG. 51 in which during the pre-pass operation, when the varyings are not required, there is only allocated enough space in the vertex cache for the vertex positions. The second, main pass when looking for a vertex does not then re-use the position data but instead makes a new allocation that can fit both the position and varyings attributes for the entire vertex. This keeps the vertex cache allocation small in the pre-pass but at the cost of having to shade the positions twice. The vertex processing in FIG. 51 is therefore similar to FIG. 50 except that in FIG. 51 there is no check whether the vertex is already present in the cache but with only a subset of the required data and instead in all cases when the required vertex data is not already present in the vertex cache, a new vertex cache allocation is made for the entire vertex (step 476).

Figure 52:
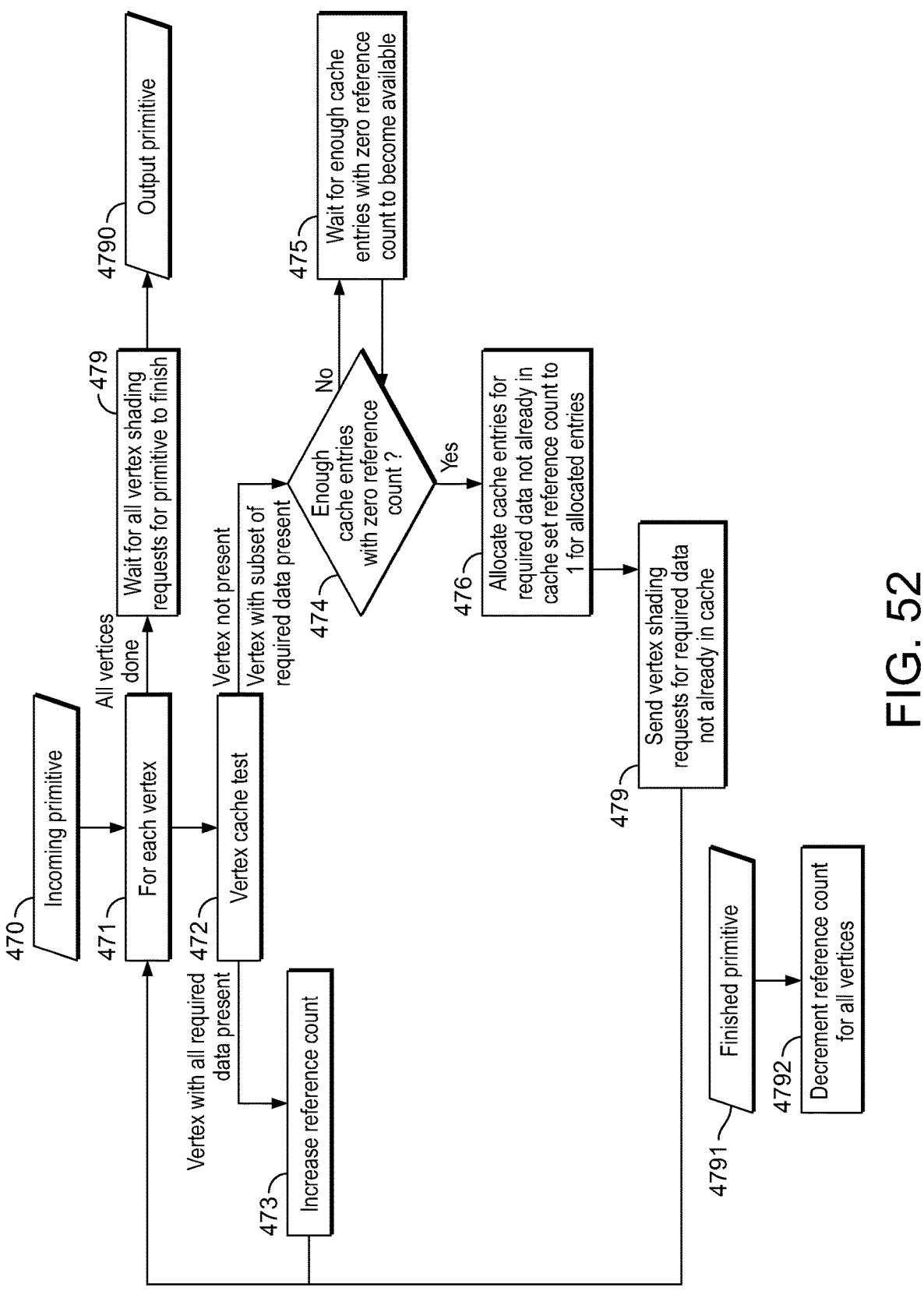
FIG. 52 shows schematically another example of how vertex data may be handled when vertex attribute (varyings) shading is omitted by the first, pre-pass operation.

FIG. 52 illustrates another approach similar to FIG. 51 but wherein the main pass attempts to re-use the position attributes from the first, pre-pass, and makes only a new allocation for the varyings attributes during the second, main pass. This also works but the positions and varyings may now end up in different allocations. Again, the vertex processing in this example is therefore similar to that described above except in this case, the vertex cache allocation in the second, main pass is made only for the required data that is not already present in the vertex cache (step 496). Correspondingly, vertex shading requests are only issued for required data that is not already present in the cache (step 497).

Various other arrangements would be possible for processing the vertex data as part of the pre-pass operations described herein.

Primitive Culling

The first, pre-pass operation may comprise any other suitable processing operations as desired. For example, in some embodiments, a "primitive culling" data structure is also generated during the first, pre-pass operation that can be used to identify entire primitives that do not need to be processed further, and which can therefore be culled relatively earlier in the second, main pass operation (e.g. prior to rasterisation and also prior to any vertex processing that is performed during the main pass operation). For example, for any primitives processed during the first, pre-pass operation for which it can be determined that none of the associated fragments needs to be processed further (e.g. since none of the fragments has any visible effect for their respective sampling positions within the final render output), the primitive in its entirety may be culled. In this way it is possible to avoid some or all processing of the primitive during the second, main pass.

This can then avoid primitive processing in the fragment frontend (e.g. the processing up to and including rasterisation). For example, the ability to cull (entire) primitives in this way may also be particularly beneficial in situations where at least some vertex attribute processing (e.g. varyings shading) is deferred to the rendering stage as in that case the use of the primitive culling data structure can (and in an embodiment does) also at least allow such vertex attribute processing to be avoided during the second, main pass for any primitives for which it can be determined using the primitive culling data structure that the primitive does not need to be processed further.

Figure 53:
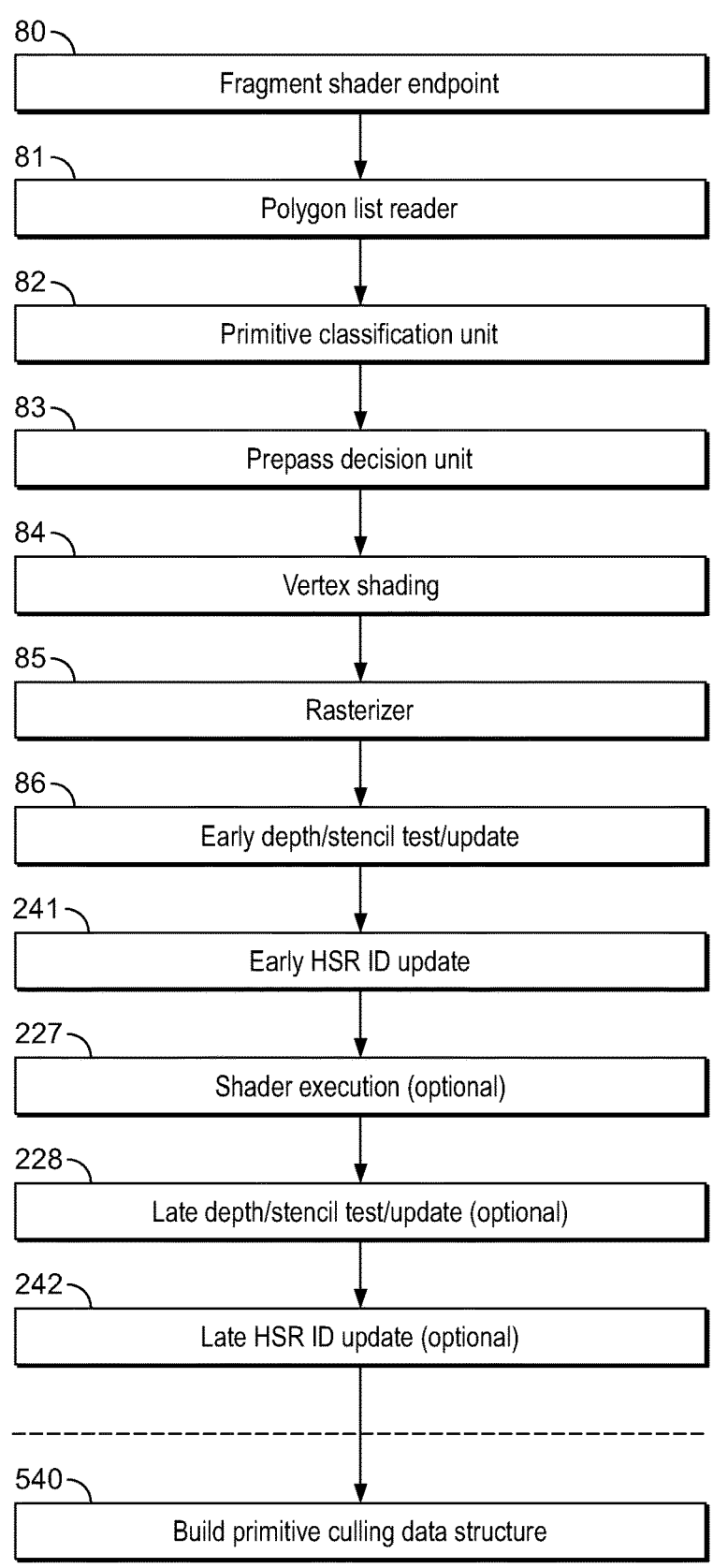
FIG. 53 illustrates an example in which a "primitive culling" data structure is built at the end of the first, pre-pass operation.

FIG. 53 shows a first example of building such "primitive culling" data structure based on the pre-pass operation that is illustrated in FIG. 24 above. In this example, the primitives are thus subject to the same graphics processing pipeline operations as described above in relation to FIG. 24, with the first, pre-pass operation accordingly generating a HSR ID buffer reflecting the visibility information for the sequence of primitives. In FIG. 53 however an additional final step of building a "primitive culling" data structure 540 is performed after the final determination of the HSR ID buffer. The step of building a "primitive culling" data structure 540 is thus executed at the end of the pre-pass operation, such that it is only performed once for every tile.

Figure 54:
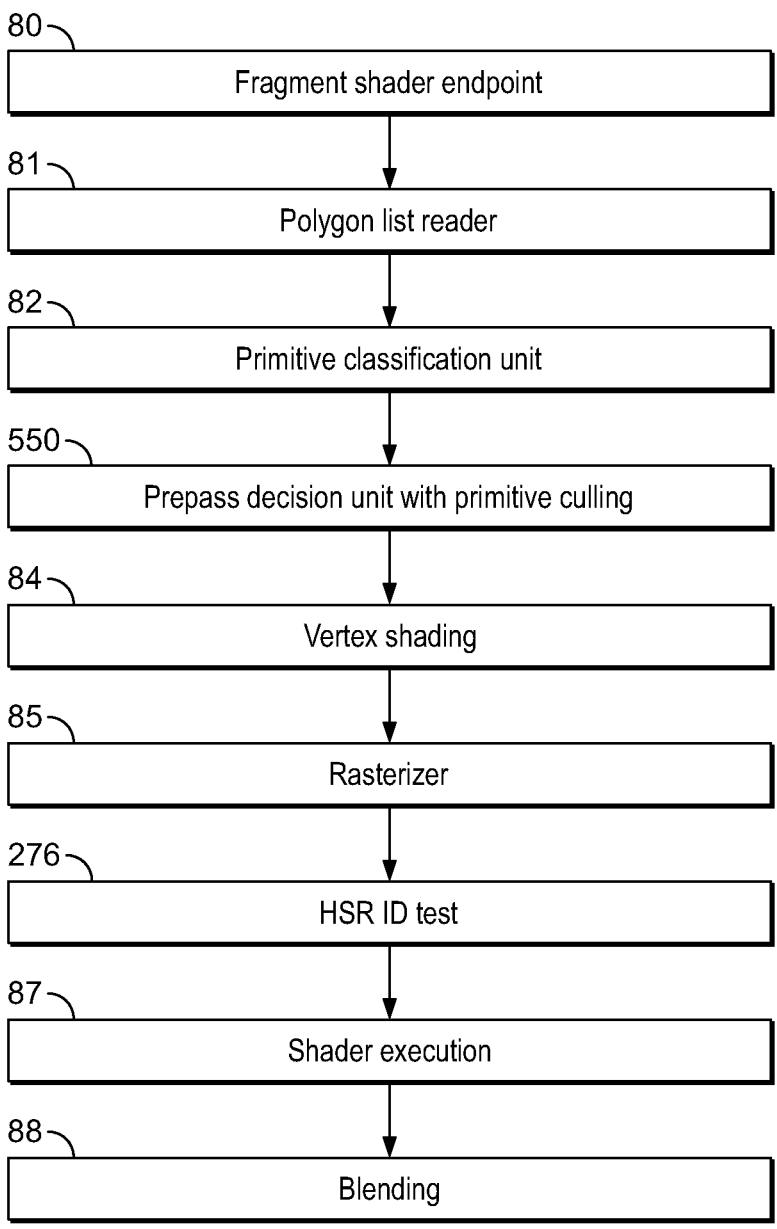
FIG. 54 shows schematically the corresponding second, main pass operation for the example shown in FIG. 53 using the generated "primitive culling" data structure.

FIG. 54 then shows the corresponding modified main pass operation according to this example in which the main pass operation proceeds as described above in relation to FIG. 27, except that the pre-pass decision stage 550 is also operable to cull entire primitives against the "primitive culling" data structure.

Figure 55:
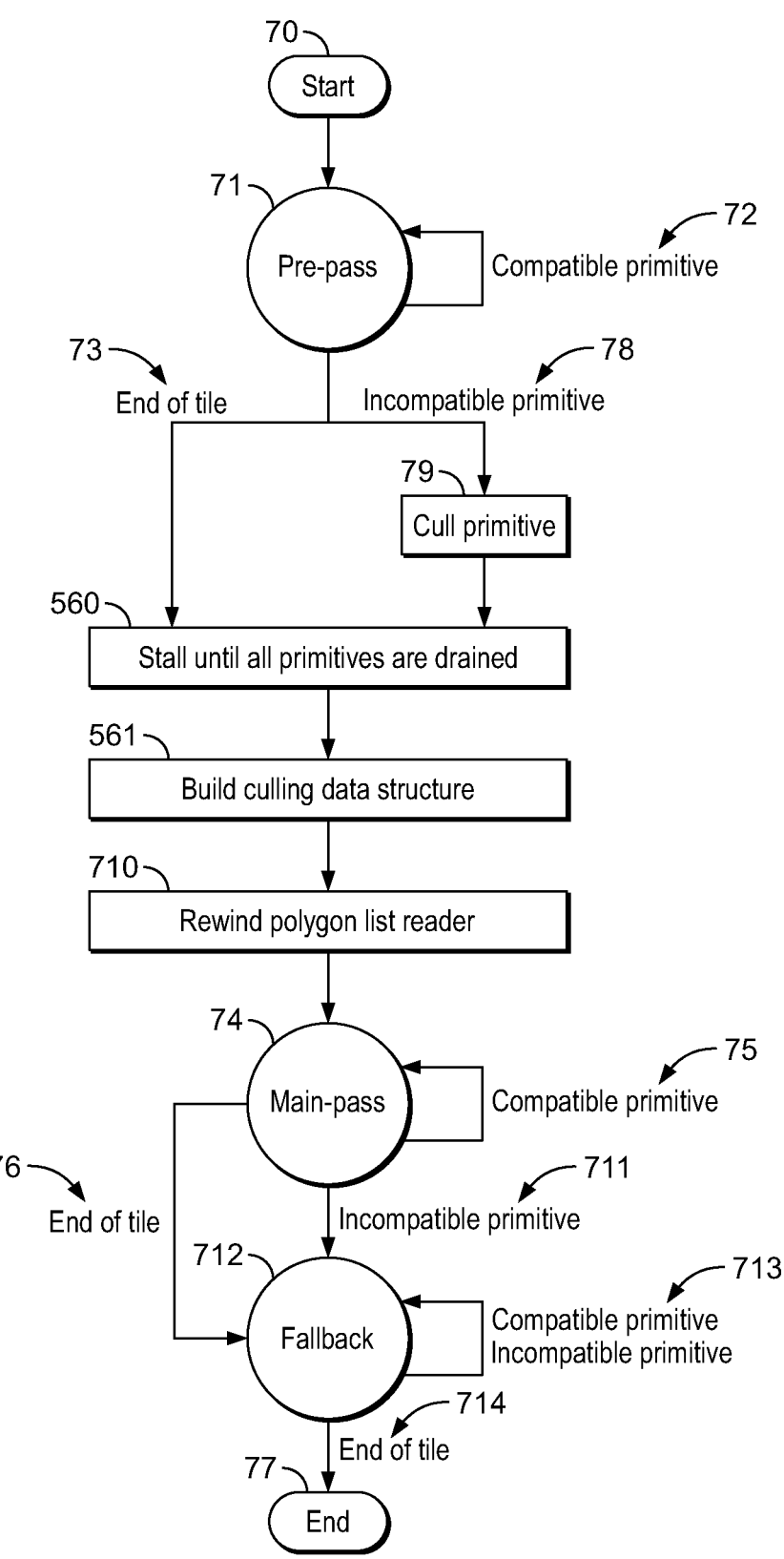
FIG. 55 shows schematically a state diagram for the graphics processor according to this example.

FIG. 55 is a state machine showing the operation of the graphics processor in this example. The state machine in this example is essentially the same as that described above in FIG. 7 except that after the first, pre-pass operation is finished, or is stopped in response to encountering an incompatible primitive, prior to rewinding the primitive list reader (step 710) ready for the subsequent main pass operation (step 74), the graphics processor must first stall until all primitives have completed the first, pre-pass operation (step 560), to allow the primitive culling data structure to be built (step 561) before the second, main pass operation is started.

Figure 56:
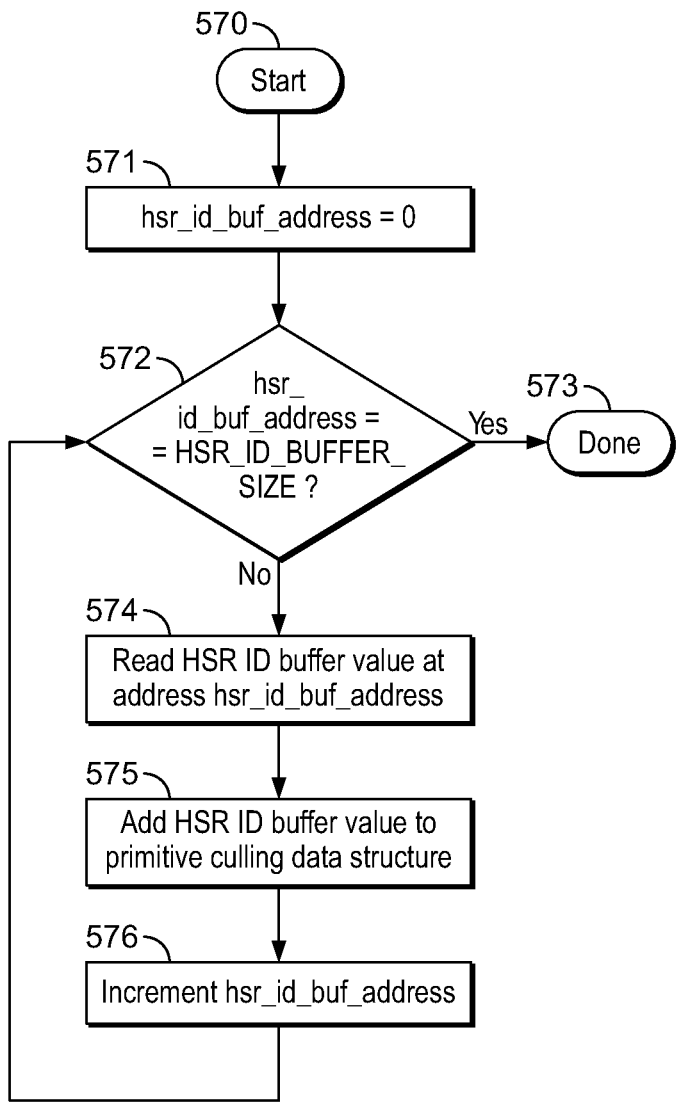
FIG. 56 shows in more detail the generation of the "primitive culling" data structure according to an example.

FIG. 56 is a flow chart illustrating how the primitive culling data structure may be built from the HSR ID buffer according to one example. As shown in FIG. 56, at the start of the process (step 570), the HSR ID buffer address is initialised to zero (step 571). The current HSR ID buffer address is then checked to see whether it matches the size of the HSR ID buffer (step 572). If the current HSR ID buffer address matches the size of the HSR ID buffer (step 572—yes), this means that all entries of the HSR ID buffer have been processed, and the process is therefore done (step 573). Otherwise, the primitive culling data structure is built by reading the HSR ID value that is stored at the current HSR ID buffer address (step 574), adding the HSR ID value accordingly to the primitive culling data structure (step 575), and then incrementing the HSR ID buffer address (step 576) to cause the processing to continue with the next HSR ID buffer address, and so on.

The result of this is thus to identify by their HSR ID values all primitives for which a HSR ID value is stored in the HSR ID buffer and add these to the primitive culling data structure. Any remaining primitives that are not added to the primitive culling data structure are therefore not visible at any sampling positions within the render output and can accordingly be culled in their entirety.

Figure 57:
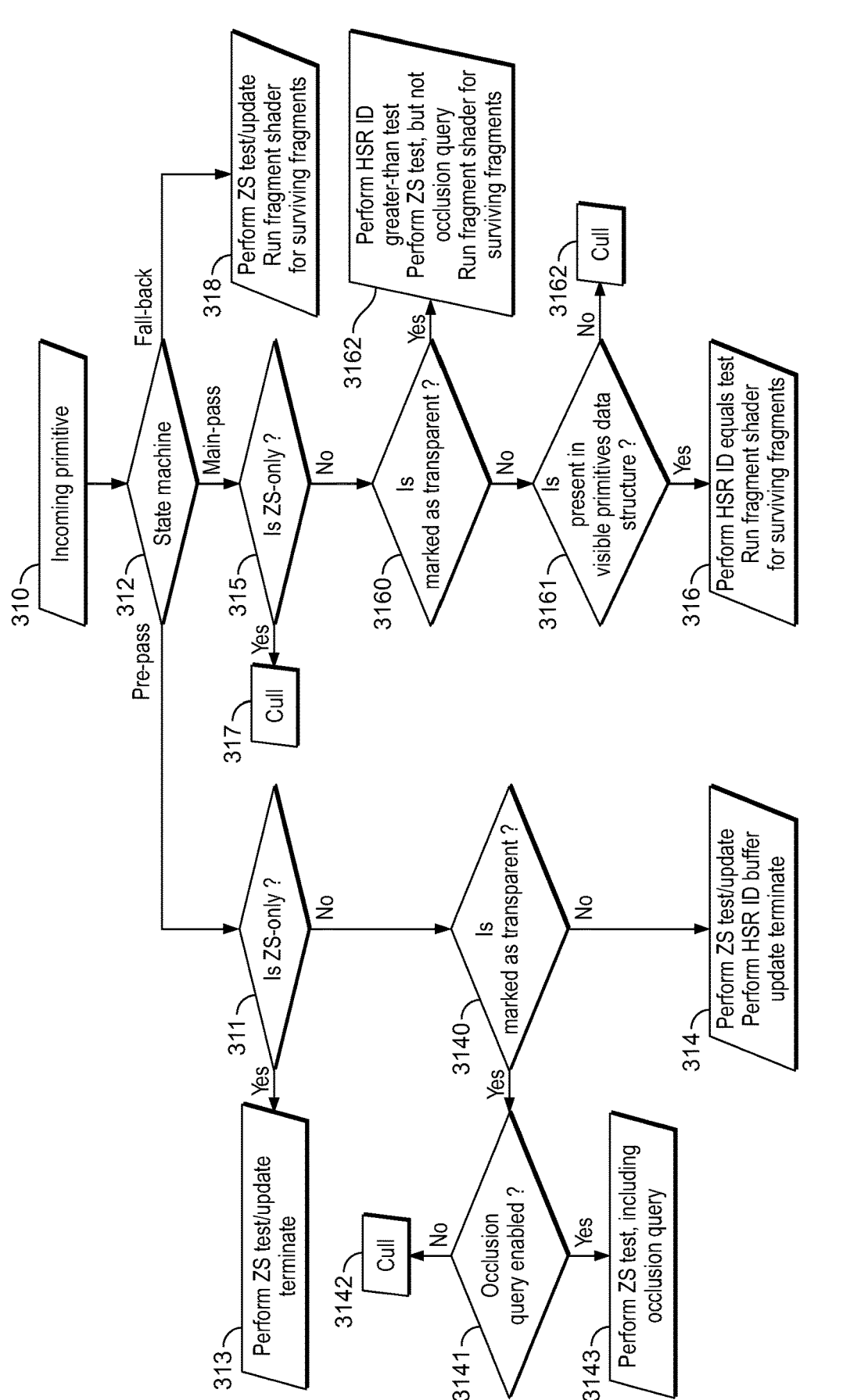
FIG. 57 shows schematically the operation of the corresponding state machine for the example that is illustrated in FIG. 56.

The "visible primitive culling data structure" in this way can then be used during the pre-pass decision stage 83 to cull entire primitives, as shown in FIG. 57. The decision logic in FIG. 57 is generally the same as that shown in FIG. 36 described above, however, during the second, main pass operation, for primitives that would otherwise be caused to be passed onwards, it is further checked (at step 580) whether or not the primitive is present in the visible primitive culling data structure. If the primitive is not present (step 3161—no), it can be culled (step 3162). Otherwise, the primitive is passed to the rasteriser 85, etc., and the second, main pass operation is performed as normal.

Figure 58:
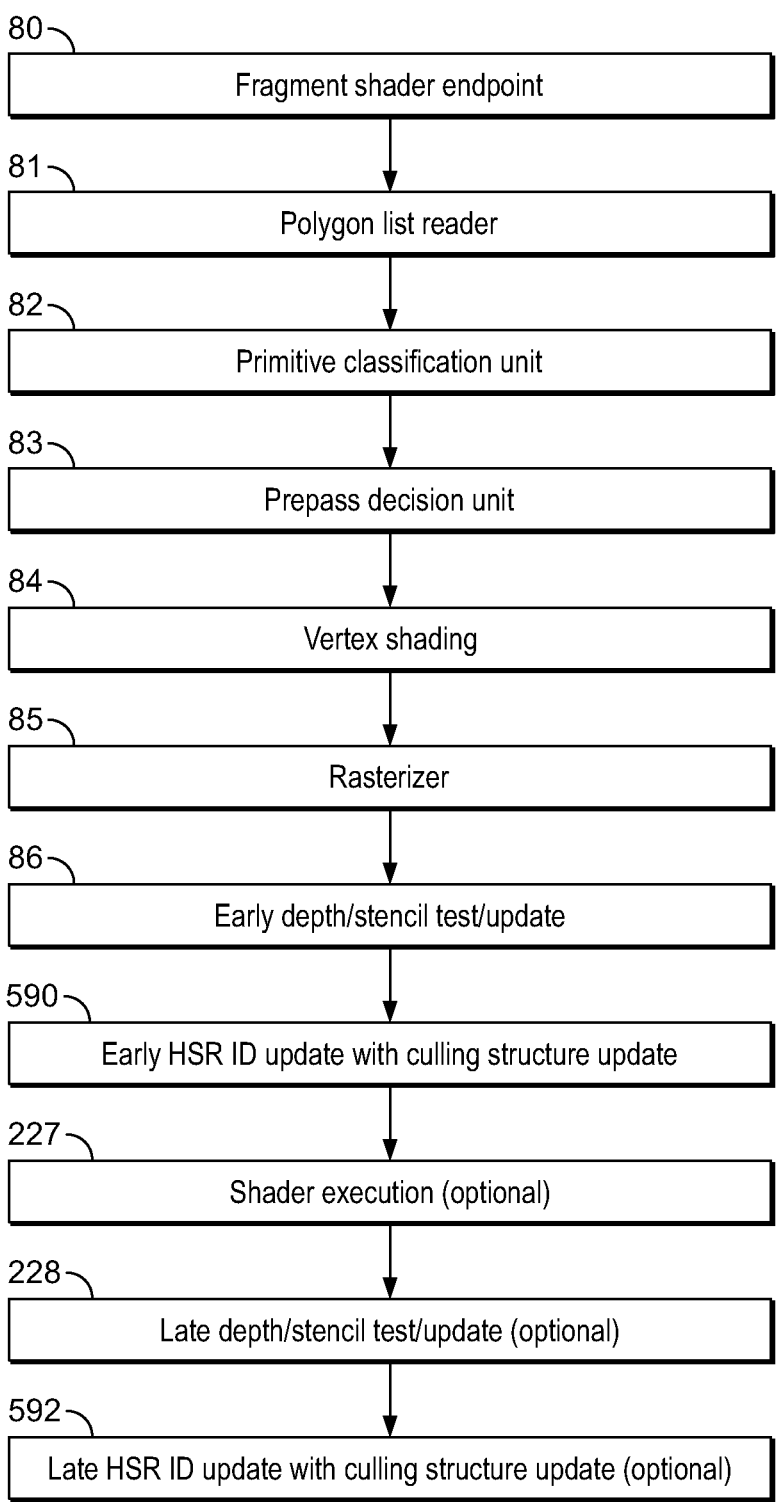
FIG. 58 shows schematically another example in which a "primitive culling" data structure is built during the first, pre-pass operation.

Various other examples are contemplated for building the primitive culling data structure. For example, FIG. 58 illustrates another example in which the primitive culling data structure is generated during the first, pre-pass operation 'on the fly' alongside updating the HSR ID buffer. Thus, the processing pipeline in this example is generally the same as that shown in FIG. 24 except that as shown in FIG. 58 the (early) HSR ID update 590 is modified to also update the primitive culling structure (and the (late) HSR ID update 592 when present is correspondingly also modified to perform a later update of the primitive culling structure).

Figure 59:
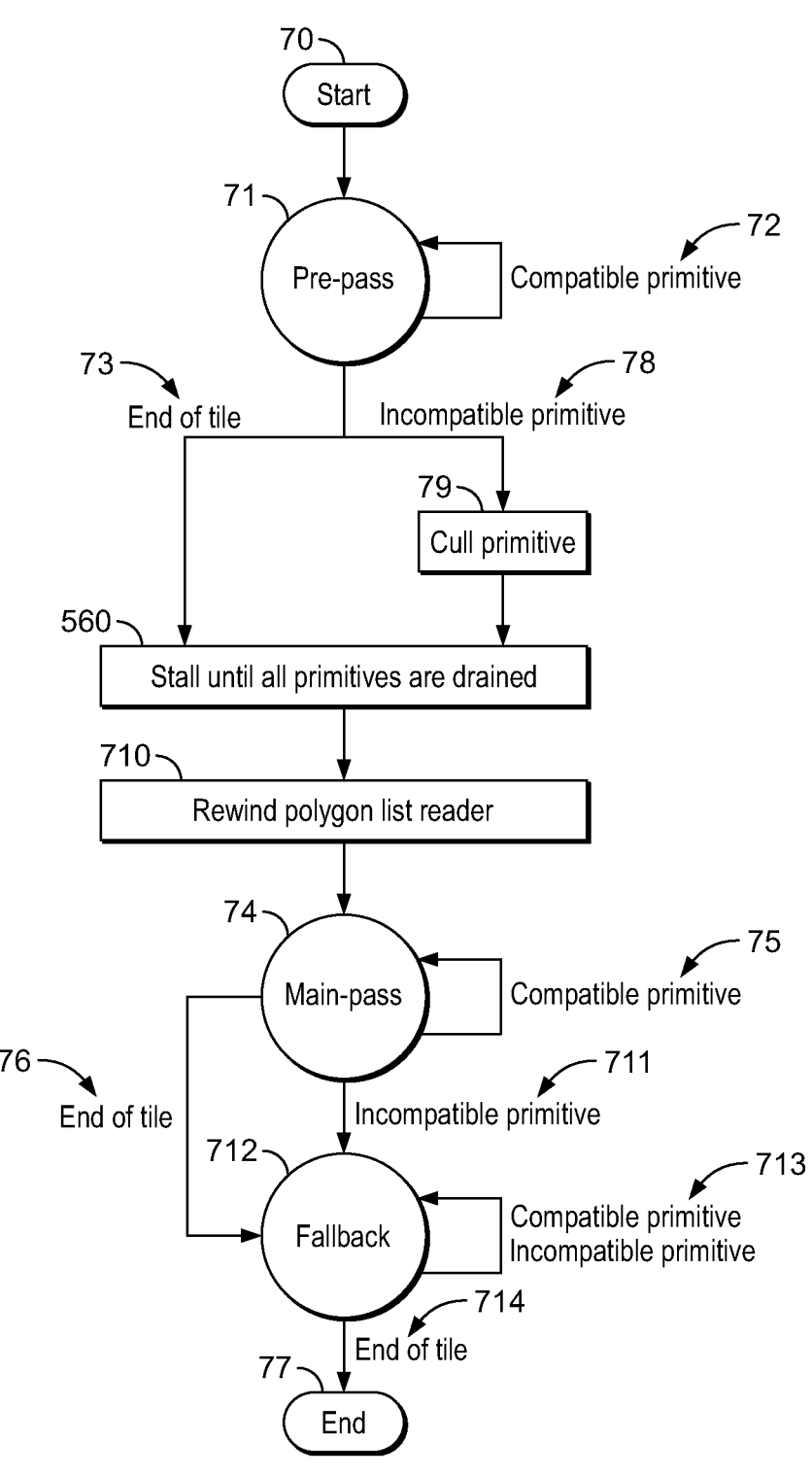
FIG. 59 shows schematically a state diagram for the graphics processor according to this example.

FIG. 59 shows the corresponding state diagram in this situation. Here, the second, main pass operation must still stall until all primitives are drained from the first, pre-pass operation (step 560), however, there is no additional step of building the primitive culling data structure (as compared to FIG. 55, for example), as this is instead done as part of the first, pre-pass operation. Various other arrangements would be possible in this regard.

Figure 60:
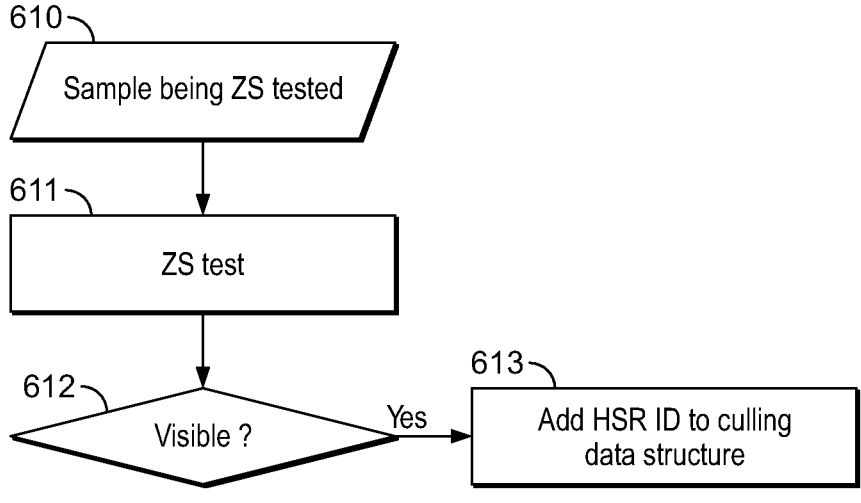
FIG. 60 shows schematically the generation of the "primitive culling" data structure according to another example.
Figure 61:
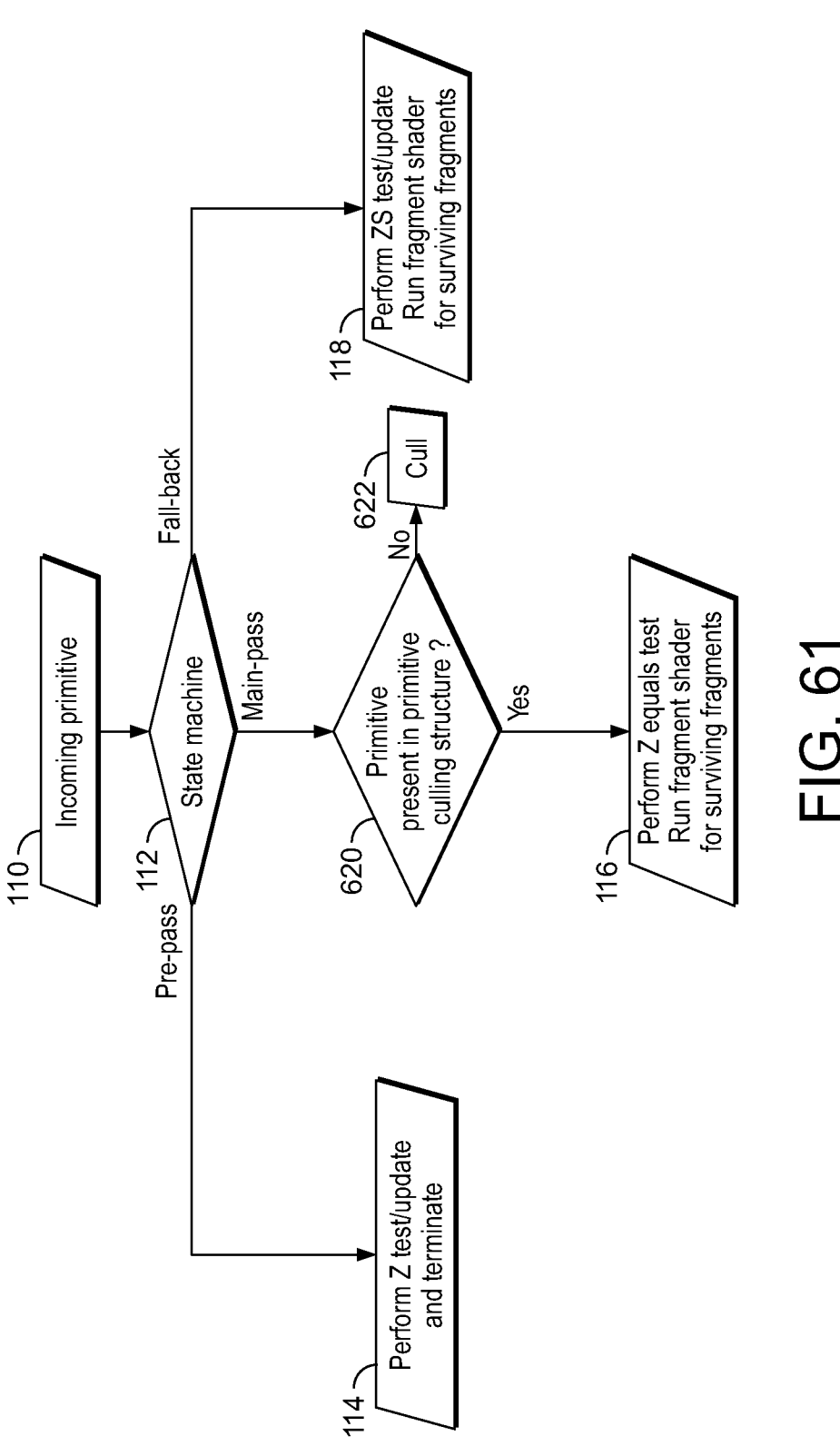
FIG. 61 shows schematically the operation of the corresponding state machine for the example that is illustrated in FIG. 60.

The primitive culling data structure can also be built directly from the depth (or stencil) testing without requiring a HSR ID buffer to be produced. An example of this is illustrated in FIG. 60. As shown in FIG. 60, for an incoming fragment for which depth/stencil testing is to be performed (step 610), the depth/stencil testing is performed (step 611), and if the fragment is determined to be visible (step 612), a respective HSR ID value identifying the primitive from which the fragment was derived is added to the primitive culling data structure (step 613). Note that in this example primitives are therefore still allocated HSR IDs during primitive classification, as described above, however, these are simply used to build the primitive culling data structure. FIG. 61 then shows a state machine illustrating, for an incoming primitive 110 to be processed, how the primitive 110 is processed differently according to the different possible states of the graphics processor in the example of FIG. 60. It will be appreciated that the state machine is identical to that shown in FIG. 11 except that when the graphics processor is configured in the main pass state, the pre-pass decision unit 83 is further configured to check whether or not the primitive 110 is present in the primitive culling data structure (step 620), and, if not, to cull the primitive accordingly in its entirety (step 622) at this point.

In the examples above it is described how primitives are added to the primitive culling data structure as and when they are determined to be visible. It may however be prohibitive to provide a primitive culling data structure that is capable of storing all possible primitives for an arbitrary sequence of primitives. In some examples therefore the primitive culling data structure is a fixed-size data structure. In that case, if the number of visible primitives is greater than the fixed-size of the primitive culling data structure, the primitive culling may be lost at that point. Alternatively, various arrangements are considered for using the entries of the fixed-size data structure to indicate sets of multiple primitives that are visible.

Figure 62:
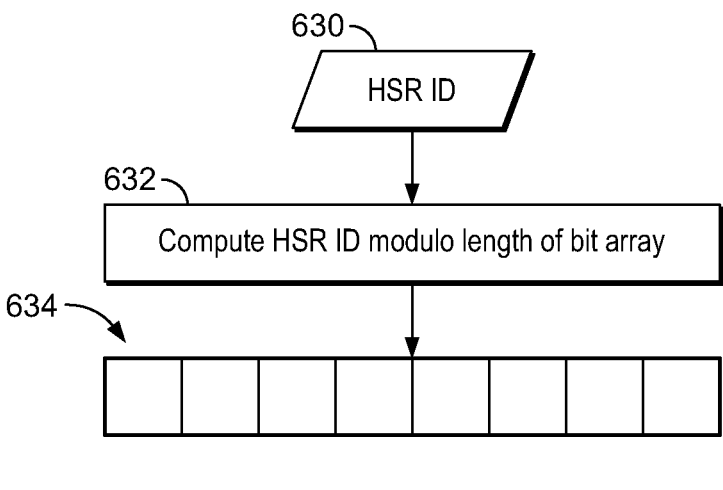
FIG. 62 shows schematically one example of populating a fixed-size "primitive culling" data structure.
Figure 63:
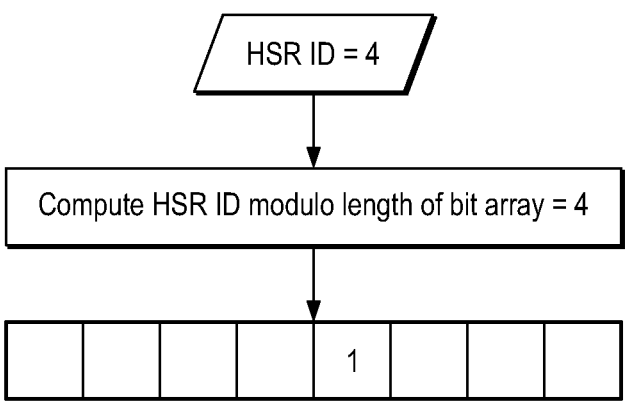
FIG. 63 and FIG. 64 provide worked examples to illustrate how fixed-size "primitive culling" data structure would be populated according to the example of FIG. 62.
Figure 64:
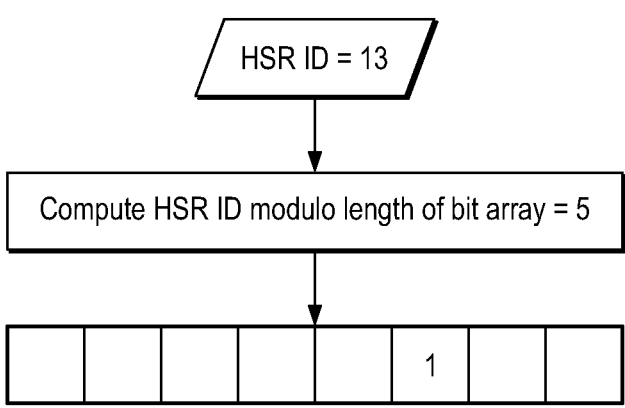

For instance, in FIG. 62, when a HSR ID value 630 is to be added to the primitive culling data structure 634, which in this example comprises an 8-bit value, the HSR ID value is computed modulo the length of the bit array (step 632), and the corresponding bit is then set accordingly if that primitive is visible. Thus, as shown in FIG. 63, for the HSR ID value 4, the computed length is 4, and so the fourth bit is set accordingly. Likewise, as shown in FIG. 64, for the HSR value 13, the computed length is 5, and so the fifth bit is set accordingly. This of course means that a bit may be set even when a primitive covered by that bit is not in fact visible. However, this is acceptable, as it simply means the primitive will be subsequently killed during the fragment level processing.

Figure 65:
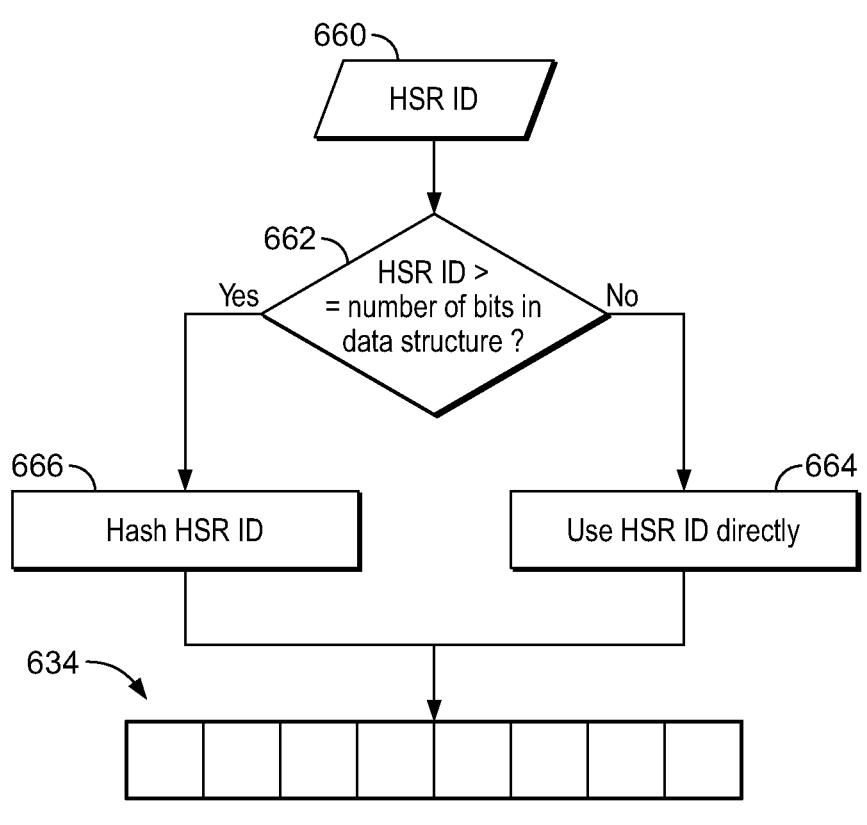
FIG. 65 shows schematically another example of populating a fixed-size "primitive culling" data structure.
Figure 66:
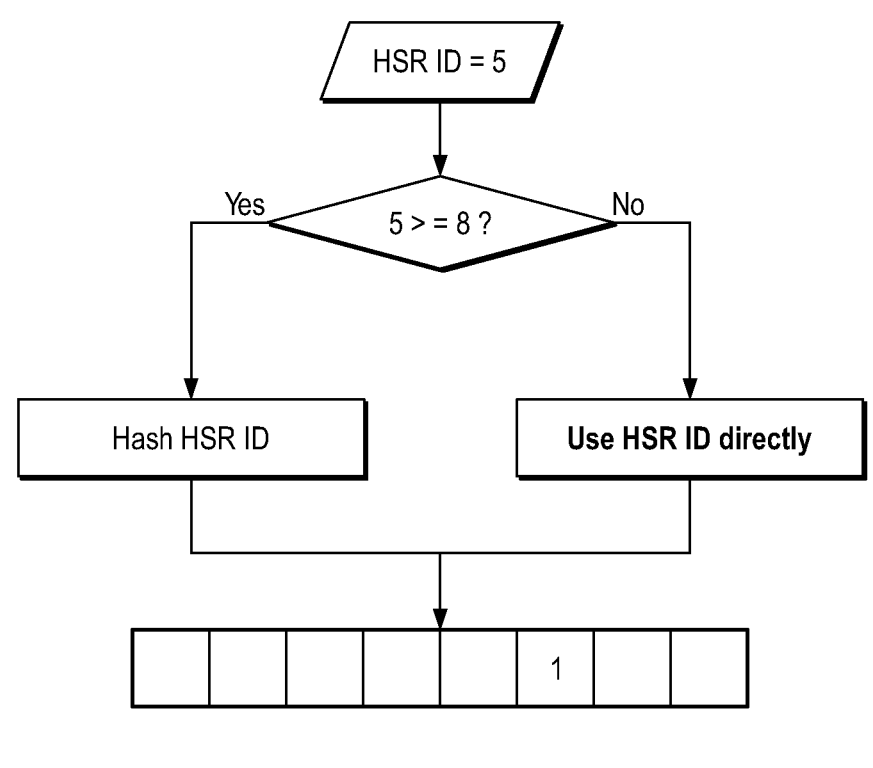
FIG. 66 and FIG. 67 provide worked examples to illustrate how fixed-size "primitive culling" data structure would be populated according to the example of FIG. 65.
Figure 67:
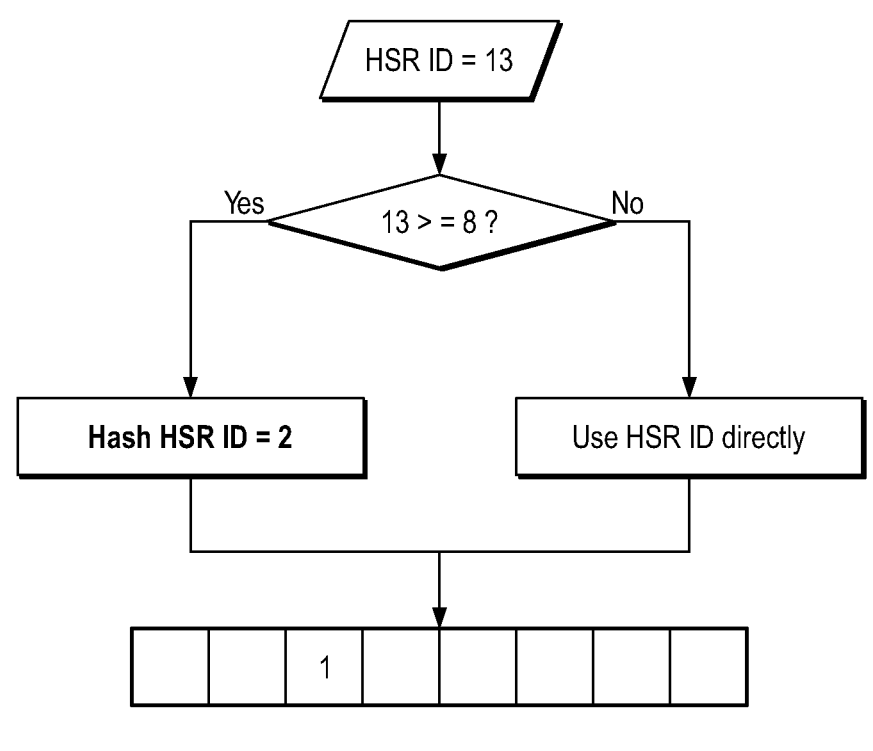

FIG. 65 shows another example, where in this case, when a HSR ID value 660 is to be added to the primitive culling data structure 634, it is checked whether the HSR ID value is greater than the number of bits available in the primitive culling data structure (step 662). If the HSR ID value is not greater than the number of bits available in the primitive culling data structure (step 662—no), the HSR ID value is used directly to set the corresponding bit (step 664). Thus, as shown in FIG. 66, for a HSR ID value of 5 (which is less than 8), the HSR ID value is used directly such that the fifth bit is set. On the other hand, for HSR ID values that are greater than the number of bits available in the primitive culling data structure (step 662—yes), a suitable hash function is computed using the HSR ID value to determine the respective bit that should be set (step 666). This is illustrated in FIG. 67.

Figure 68:
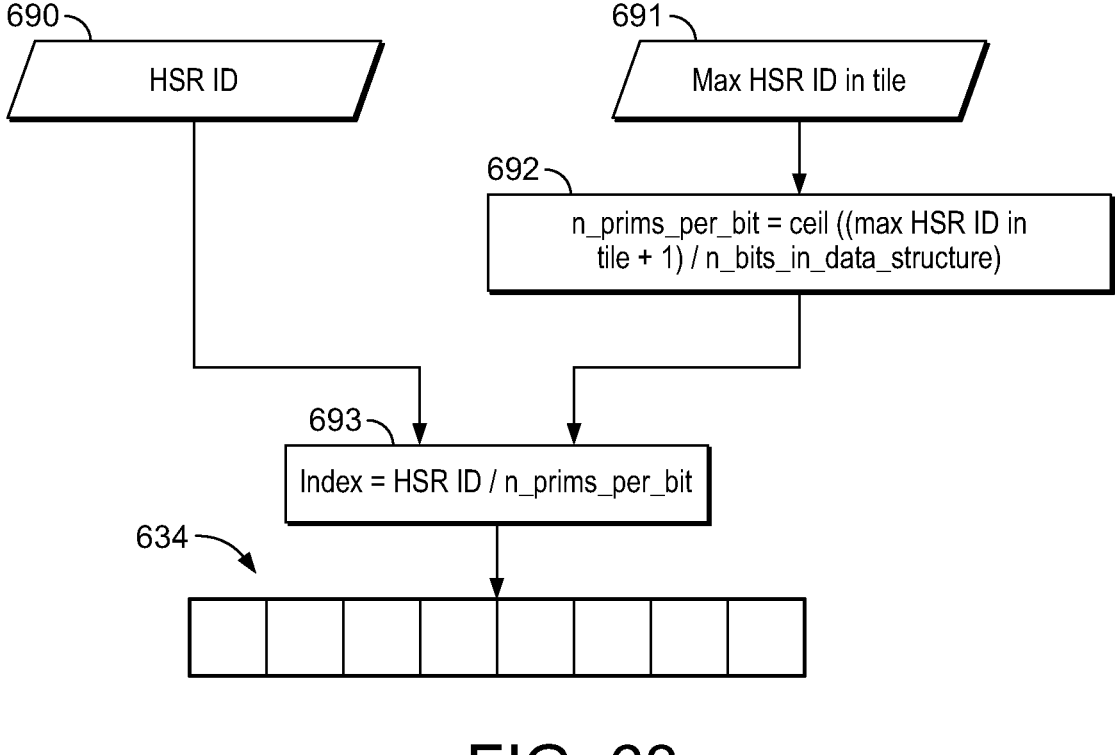
FIG. 68 shows schematically a yet further example of populating a fixed-size "primitive culling" data structure.
Figure 69:
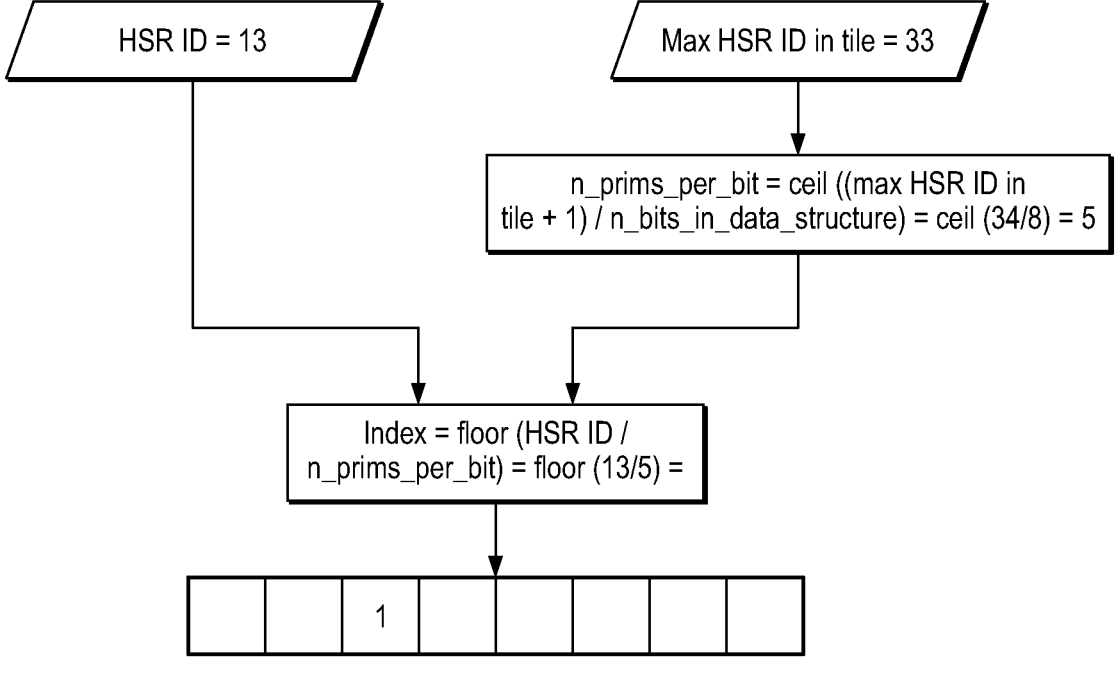
FIG. 69 provides a worked example to illustrate how fixed-size "primitive culling" data structure would be populated according to the example of FIG. 68.

FIG. 68 shows a further example, where in this case, when a HSR ID value 690 is to be added to the primitive culling data structure 634, the bit that should updated to reflect this is determined by working out the maximum HSR ID for the tile to which the primitive culling data structure relates (step 691), calculating the number of primitives that each bit of the primitive culling data structure should represent (step 692), and then calculating an index by dividing the HSR ID value 690 by the number of primitives represented by each bit of the primitive culling data structure (Step 693). FIG. 69 shows a worked example of this.

Fragment Shader Endpoint Optimisation

As described above, the rendering of each tile may comprise first and second processing passes. In typical graphics processing arrangements there may be many tiles that need to be rendered. Each tile is in an embodiment processed in the same manner described above. In that case, the tiles could be rendered 'back-to-back' such that the pre-pass operation for a tile is only started after the main pass operation (or fallback operation, if required) for the previous tile has completed. This can generally work well. An example of this approach is shown in FIG. 70.

Figure 70:
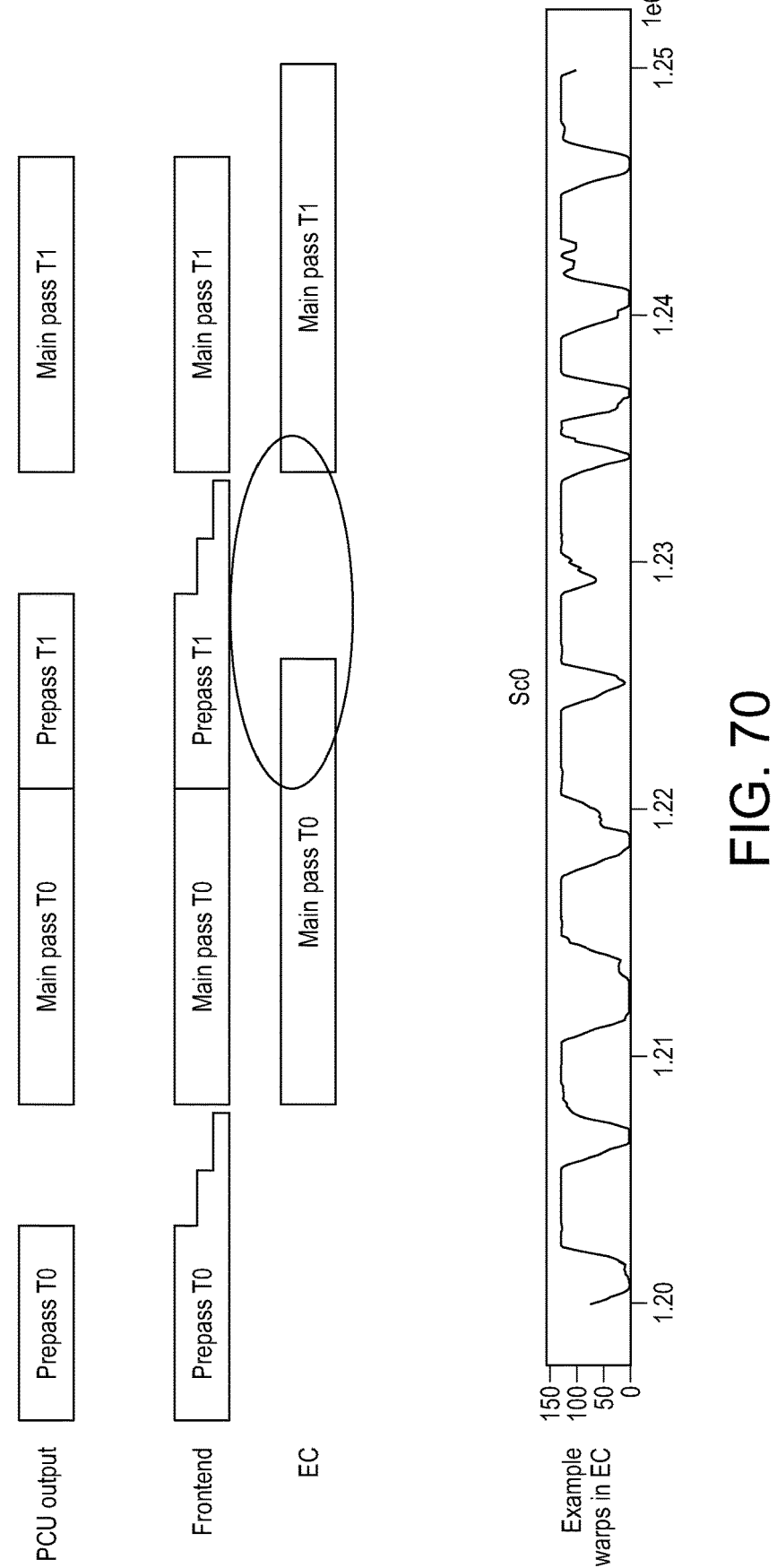
FIG. 70 shows schematically how respective processing tasks (passes) for different tiles may be issued to the graphics processing pipeline in a serial or 'back-to-back' manner.

As shown in FIG. 70, a first task for performing a first, pre-pass operation for a first tile is issued ('prepassT0') to the graphics processing pipeline. The primitives associated with that tile are then processed accordingly in the primitive list reader and correspondingly by the fragment frontend stages, as described above. In this example, there is no fragment shader executed during the first, pre-pass operation (although this could be done if desired). The corresponding main pass operation for the first tile ('mainpassT0') cannot be started until all of the primitives have completed the first, pre-pass operation. Thus, as shown in FIG. 70, the main pass operation for the first tile ('mainpassT0') waits for the corresponding pre-pass operation for the first tile ('prepassT0') to complete. The pre-pass operation for the second tile ('prepassT1') can be launched immediately after the previous main pass operation ('mainpassT0'). However, again, the corresponding main pass operation for the second tile ('mainpassT1') must wait for its pre-pass operation ('prepassT1') to complete. The effect of this, as shown in FIG. 70, is that there may be bubbles of inactivity especially in the execution core between adjacent main pass operations.

Various arrangements are therefore contemplated to attempt to improve speed of pre-pass operation.

Figure 71:
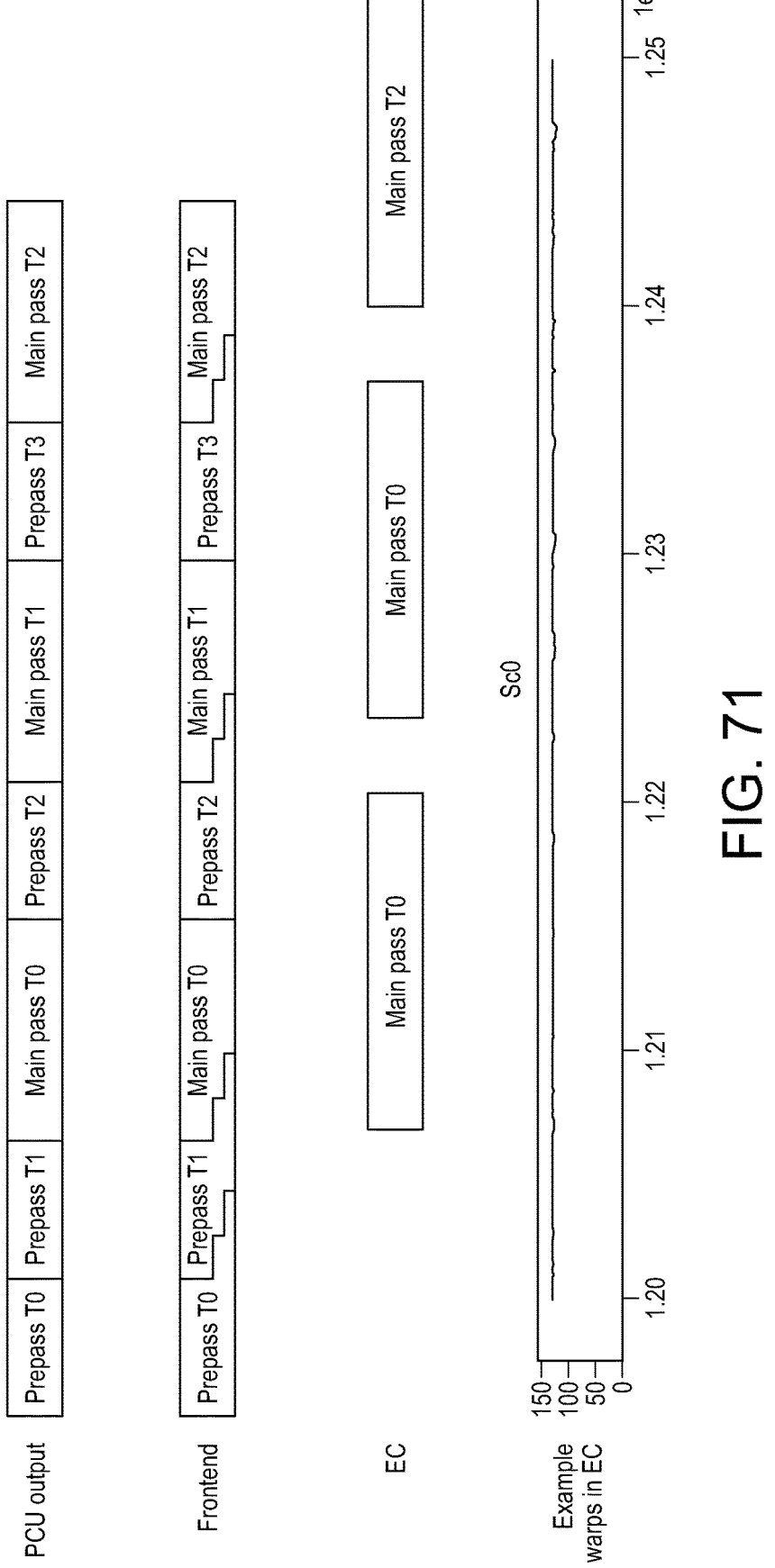
FIG. 71 shows schematically how respective processing tasks (passes) for different tiles may be interleaved in order to improve throughput of processing tasks (passes) for different tiles.

This can therefore work well to increase the speed of the overall rendering job. In other embodiments, the graphics processing pipeline may not be duplicated, but instead the fragment shader endpoint 80 attempts to interleave processing tasks for different tiles to provide a more continuous throughput. An example of this approach is shown in FIG. 71. In particular, as shown in FIG. 71, the fragment shader endpoint 80 may attempt to interleave processing tasks for respective processing passes for different tiles. To make this work, as shown in FIG. 71, the fragment shader endpoint 80 may initially schedule a set of two (or more) pre-pass operations, before attempting to interleave pre-pass and main pass operations for different tiles. This then means that the processing effectively works at least one pre-pass operation ahead which can reduce the bubbles described above. Thus, as shown in FIG. 71, the main pass operation for the first tile ('mainpassT0') can overlap in the fragment frontend with the pre-pass operation for the second tile ('prepassT1'). The main pass operation for the second tile ('mainpassT1') can thus be started relatively earlier since its corresponding pre-pass operation ('prepassT1' has already completed by the time the main pass operation for the second tile ('mainpassT1') is ready to be issued.

Figure 72:
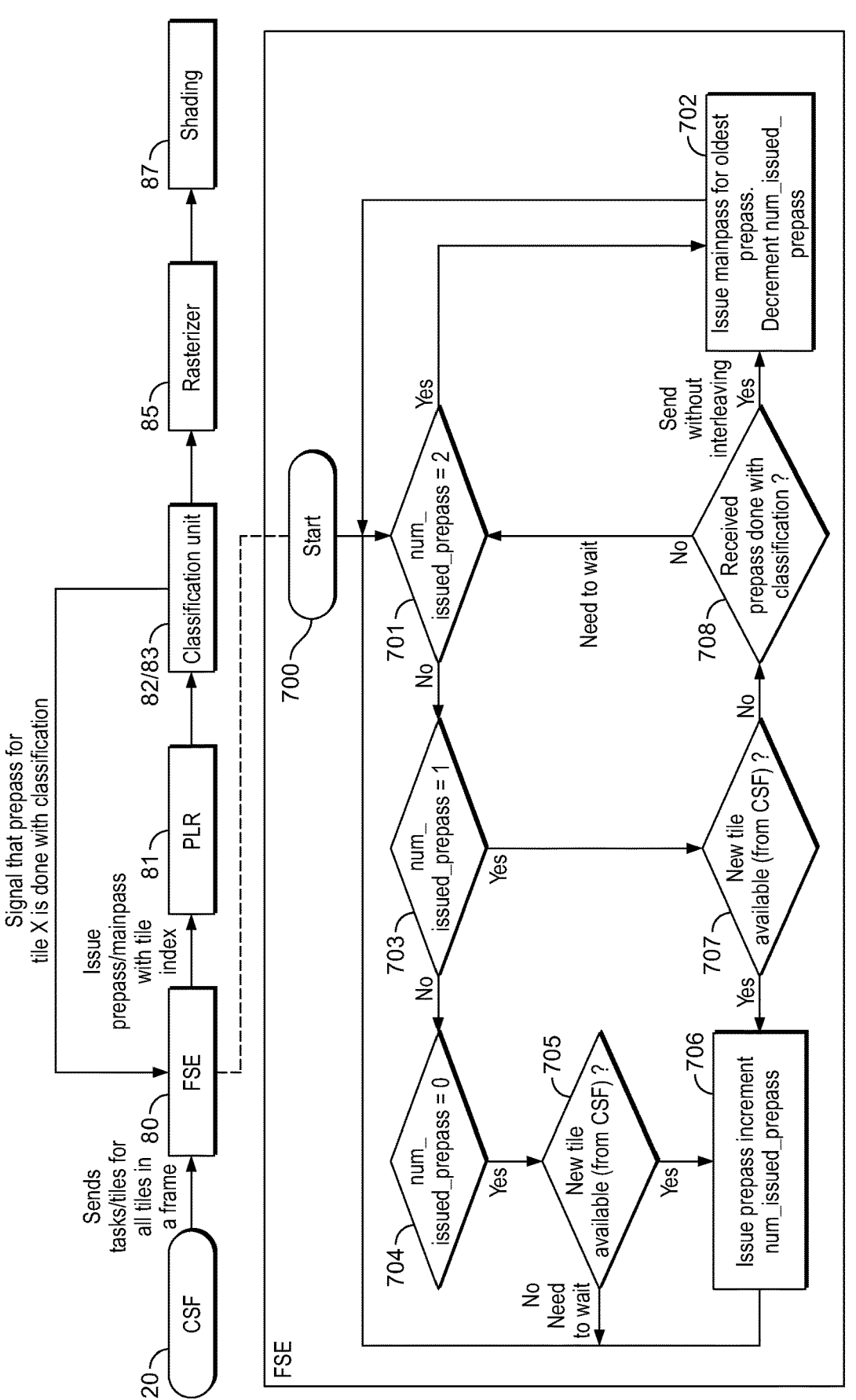
FIG. 72 schematically shows schematically a dynamic scheduling of tasks based on the interleaved operation shown in FIG. 71.

In some examples, the fragment shader endpoint 80 may always issue tasks according to the desired scheduling operation as shown in FIG. 71. In other examples however the fragment shader endpoint 80 may attempt to interleave tasks according to the desired scheduling operation as shown in FIG. 71 but is also able to perform a more dynamic control, e.g., and in particular, such that if the fragment shader endpoint 80 effectively runs out of the pre-pass operations, but there is a main pass operation ready to be performed, the desired scheduling operation can be interrupted accordingly to perform the main pass operation, e.g. rather than waiting for a command relating to the next pre-pass operation to be received from the command stream frontend 20. In that case, if the desired scheduling operation is interrupted the fragment shader endpoint 20 may be caused to then issue a set of two pre-passes back to back to restart the desired scheduling operation. FIG. 72 shows a corresponding work flow for a dynamic control of the scheduling such that the fragment shader endpoint 80 attempts to perform the interleaved operation as shown in FIG. 71 but is also able to interrupt the desired scheduling operation when it determines that is potentially more efficient to do so.

As shown in FIG. 72, and as described above in relation to FIG. 6, the processing tasks for performing the respective pre-pass and main pass operations for a given tile are generated by the fragment shader endpoint 80 in response to receiving a corresponding command from the command stream frontend 20. The command stream frontend 20 thus sends all tasks/tiles for all tiles in a frame to the fragment shader endpoint 80 which correspondingly breaks the tasks/tiles into respective pre-pass and main pass operations that are then issued to the graphics processing pipeline including the primitive list reader (polygon list reader 81), the primitive classification 82/pre-pass decision unit 83, rasterisation 85, fragment shading 87, etc., as described above. Although FIG. 72 shows a simplified graphics processing pipeline it will be appreciated that the graphics processing pipeline in this example may generally correspond to any of the graphics processing pipelines in the examples described above.

In the example shown in FIG. 72, at the start of a rendering job requiring multiple different tiles to be rendered (step 700), the fragment shader endpoint 80 in an embodiment issues a set of two pre-pass operations back to back, as shown in FIG. 71. The control is then performed as follows using a respective counter 'num_issued_prepass' that tracks how many pre-pass operations have been issued. If the number of issued pre-pass operations is equal to two (step 701—yes), the main pass operation for the oldest pre-pass is issued (step 702), and the counter 'num_issued_prepass' is decremented accordingly. If the number of issued pre-pass operations is not equal to two (step 701—no), it is checked whether the number of issued pre-pass operations is equal to one (step 703). If there is not even a single pre-pass available (step 701—no), such that the number of pre-pass operations is zero (step 704—yes), the fragment shader endpoint 80 is configured to check whether a new tile/task is available from the command stream frontend 20 (step 705), and either issue a pre-pass operation, and increment the 'num_issued_pre-pass' counter accordingly (step 706), when there is a tile/task available (step 705—yes), or otherwise (step 705—no), wait until a new tile/task is available. The effect of this loop is thus that at the start of a job, or if the fragment shader runs out of pre-pass operations, a set of two pre-pass operations is in an embodiment launched back to back.

However, as described above, in some cases, it may be desirable to issue a main pass operation out of sequence, when one is available to be performed. Thus, if the number of issued pre-pass operations equals one (step 703—yes), at that point it is checked whether there is already a new tile available from the command stream frontend 20 (step 707). If a new tile is available (step 707—yes), the scheduling operation proceeds according to the desired scheduling operation that is shown in FIG. 71 by issuing a pre-pass operation (step 706). On the other hand, if there is no tile available, and hence no pre-pass operation ready to be issued (step 707—no), a decision is then made as to whether to wait for a new tile to become available, or whether to immediately issue an outstanding main pass operation. In the example shown in FIG. 72, this decision checks whether the current pre-pass operation is done with primitive classification (step 708). Thus, a signal is provided from the primitive classification 82/pre-pass decision 83 stage to the fragment shader endpoint 80 to indicate this. If the received pre-pass is already done with classification (step 708—yes), the main pass operation is issued (step 702). Otherwise (step 708—no), the fragment shader endpoint 80 is caused to wait. Various other arrangements would be possible in this regard. For example, the decision as to whether or not to wait could also be performed using a time-out mechanism, such that if no new tile is available within a certain time period, a main pass is issued at that point.

Restartable Pre-Pass

The present embodiments thus introduce a novel "pre-pass" operation which, as described above, facilitates improved hidden surface removal efficiency. As shown in FIG. 7, and described above, in order to ensure safe hardware execution, a "fallback" operation is also provided, such that the graphics processor is able to switch to such fallback operation, as necessary, in order to handle primitives that cannot safely be handled by the pre-pass operation. For example, in the embodiment shown in FIG. 7, after the first, pre-pass operation encounters an incompatible primitive, the processing switches to the fallback operation and continues in the fallback operation to the end of the tile. A new pre-pass operation can then be initiated for the next sequence of primitives (e.g. the next tile) to be rendered.

In this respect, it would also be possible however to re-start the pre-pass operation within a tile, e.g. in response to identifying a further compatible primitive (or sequence of compatible primitives). This is illustrated, for example, in FIG. 73.

Figure 73:
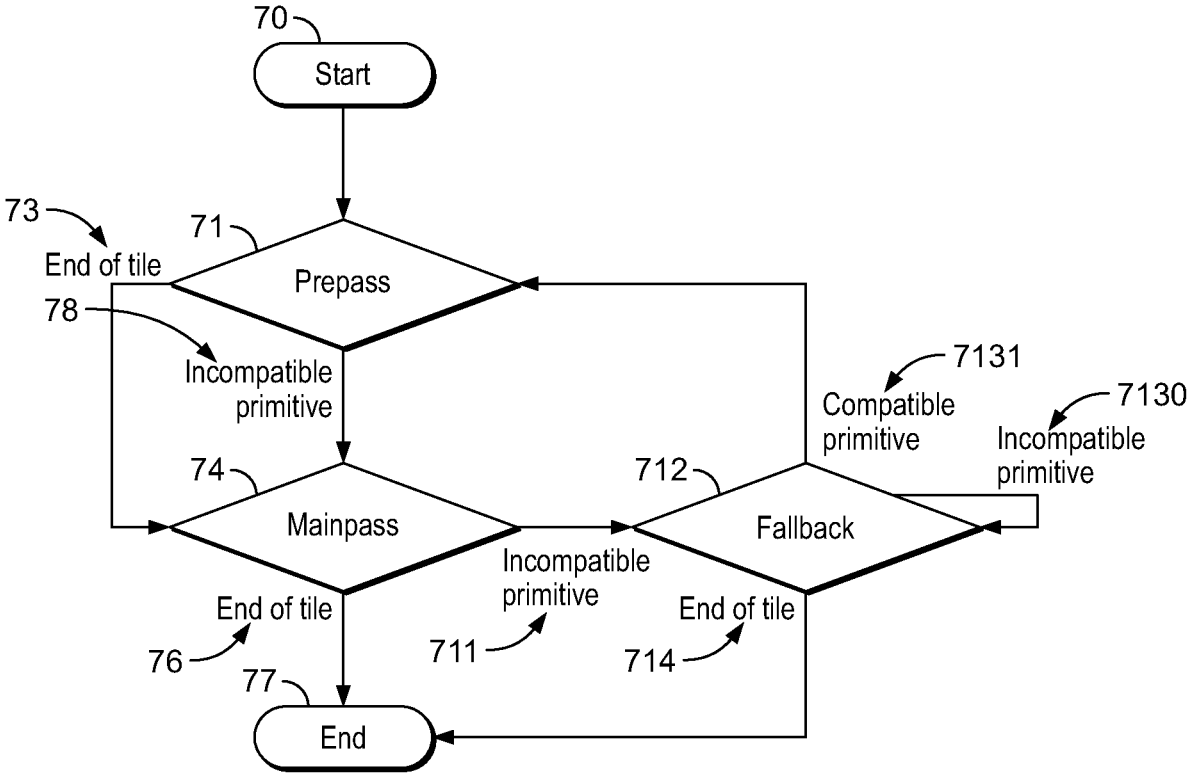
FIG. 73 schematically illustrates a rendering operation according to another embodiment in which the "pre-pass" operation can be re-started within a tile to provide continued hidden surface removal efficiency even after encountering an incompatible primitive.

FIG. 73 schematically illustrates a rendering operation according to another embodiment in which the novel "pre-pass" operation can be re-started within a tile. The processing operation thus generally proceeds as set out above in relation to FIG. 7. In this embodiment, however, after a switch to the fallback operation, the graphics processor is able to switch back from the fallback operation to the pre-pass operation in the event that a further compatible primitive is encountered. For example, consider the following sequence of primitives;

primitive 1, compatible
    #primitive 2, compatible
    #primitive 3, incompatible
    #primitive 4, compatible
    #primitive 5, compatible
    #primitive 6, incompatible If the sequence of primitives were processed according to the embodiment shown in FIG. 7, after reaching the first incompatible primitive ('#primitive3'), the graphics processor would switch to the fallback operation, and then continue to process all of the remaining primitives in the fallback operation, despite the fact that the next primitive ('#primitive4') is in fact compatible with being processed by the first, pre-pass operation. This means that some hidden surface removal efficiency may be lost. For instance, the example above is very simple, and in general a sequence of primitives may contain many primitives. In that case, there may be relatively longer sequences of compatible primitives after the first incompatible primitive, for which it may be desirable to switch back to the first, pre-pass operation, in order to allow for improved hidden surface removal efficiency.

According to the embodiment shown in FIG. 73 therefore, after the first incompatible primitive has been processed by the third, fallback operation, the graphics processor is caused to switch back to the first, pre-pass operation for the next compatible primitive ('#primitive4'). The operation sequence in this embodiment is then:

run pre-pass for primitive 1
    #run pre-pass for primitive 2
    #primitive 3 encountered
    #rewind to primitive 1
    #run main pass for primitive 1
    #run main pass for primitive 2
    #primitive 3 encountered
    #run fallback for primitive 3
    #primitive 4 encountered switch to pre-pass operation, record primitive 4 as re-
   start point
resume pre-pass for primitive 4
run pre-pass for primitive 5
primitive 6 encountered
run fallback for primitive 6
end of tile Thus, the processing begins in the first, pre-pass opera-
tion, as described above, and when the first incompatible
primitive ('#primitive3') is encountered, the first, pre-pass
operation is stopped, with the primitive list reader re-
winding to the start of the sequence of primitives, and then
performing a corresponding main pass operation to complete
the rendering of the primitives processed so far
('#primitive1' and '#primitive2'). When the second, main
pass encounter the first incompatible primitive
('#primitive3'), the second, main pass is then stopped, and
the fallback operation run to process the incompatible primi-
tive. Up to that point, the processing is therefore the same as
in the FIG. 7 embodiment. The processing then continues in
the fallback operation at least for any further incompatible
primitives in the sequence (step 7130).

However, rather than simply continuing in the fallback
operation to the end of the tile, in response to the graphics
processor identifying whilst in the fallback operation that
there is a further compatible primitive (e.g. '#primitive4'),
the graphics processor is able to switch back to the first,
pre-pass operation and re-start the pre-pass operation from
the position of the further compatible primitive (step 7131).

That is, in the example shown in FIG. 73, after the
graphics processor is caused to switch to the fallback
operation (in response to the pre-pass operation encounter-
ing an incompatible primitive), the graphics processor is
further able to switch back from the third, fallback operation
to the first, pre-pass operation in response to determining
that there is a further compatible primitive within the
sequence of primitives. The technology described herein
thus allows the first, pre-pass operation to be restated within
a sequence of primitives following a switch to the third,
fallback operation when it is possible to do so.

in order to facilitate the switching of the graphics pro-
cessor between these operations, e.g. and avoiding poten-
tially introducing artefacts when the first, pre-pass operation
is stopped and a transition is made to the third, fallback
operation (or vice versa), the graphics processor should, and
in an embodiment does, store suitable state or information to
allow the processing of the sequence of primitives to con-
tinue accordingly beyond such switching events, e.g., and in
an embodiment, in a more seamless manner that is able to
use processing results from the previous mode of operation
when continuing processing in the new mode of operation.

For example, and as will be explained further below, the
visibility information that is generated by the first, pre-pass
operation (and which is used to control the processing of
fragments in the second, main pass operation) is in an
embodiment generated based on the depth values for frag-
ments for primitives that are processed during the first,
pre-pass operation. The first, pre-pass operation may thus,
and in an embodiment does, involve updating a depth buffer
for the sequence of primitives. In the normal operation
according to the technology described herein, the depth
buffer, or other visibility information based on the depth
values that is generated during the first, pre-pass operation,
is then used during the second, main pass to control the
fragment processing. When the first, pre-pass operation is
stopped for a sequence of primitives, and the graphics
processor is subsequently switched to the third, fallback operation for continued processing of the sequence of primi-
tives, the third, fallback operation in an embodiment also
performs depth testing (e.g. in the normal manner).

The depth buffer resulting from the aborted first, pre-pass
operation is in an embodiment therefore carried through this
transition so that the content of the depth buffer (reflecting
the depth buffer for the primitives processed so far, i.e. up to
the position of the incompatible primitive) is also available
for use by the third, fallback operation. The third, fallback
operation in an embodiment then continues to update the
depth buffer based on depth testing primitives by the third,
fallback operation, and in the event that a switch back to the
first, pre-pass operation is subsequently performed, the
content of the depth buffer at the point at which the third,
fallback operation was stopped is in an embodiment then
made available for use (and then used) during the resumed
first, pre-pass operation when generating visibility informa-
tion for the subsequent primitives that are to be processed by
the resumed first, pre-pass operation, e.g., and in an embodi-
ment, to allow continued improved hidden surface removal
when the first, pre-pass operation is restated.

Thus, when the graphics processor transitions from the
first, pre-pass mode of operation to the third, fallback
operation, the depth buffer for the sequence of primitives is
in an embodiment retained and the current content of the
depth buffer generated by the processing so far (up to the
point of the incompatible primitive that triggered the tran-
sition) of primitives by the first, pre-pass operation is then
used for depth testing primitive (fragments) during the third,
fallback operation.

Correspondingly, when the graphics processor switches
back to the first, pre-pass operation from the third, fallback
operation, the content of the depth buffer is in an embodi-
ment again retained and used by the first, pre-pass operation
to continue to generate visibility information for the
sequence (or sub-sequence) of primitives that are to be
processed by the resumed first, pre-pass operation.

It is in an embodiment also tracked during such transitions
between the first, pre-pass and third, fallback operation
which primitives in the sequence of primitives have been
processed to completion so far so as to potentially generate
rendered output data (that is, which primitives have been
processed to completion either by performing both the first,
pre-pass and second, main pass operations, or by performing
the third, fallback operation). By tracking which primitives
have been processed to completion so far, this then in an
embodiment allows the graphics processor to re-start pro-
cessing of a sequence of primitives from the desired primi-
tive (such that the processing can effectively fast-forward
through the sequence of primitives and resume from an
arbitrary primitive). This may therefore facilitate the switch-
ing of the graphics processor between operation modes
within a single sequence of primitives, e.g., and in an
embodiment, by avoiding having to repeat substantial pro-
cessing of primitives that have been processed.

For example, when the first, pre-pass operation is
restarted, such that there is a switch from the third, fallback
operation back to the first, pre-pass operation, by tracking
which primitives have been processed so far, so long as the
depth buffer (and any other desired information for re-
starting the pre-pass operation) is available, the resumed
first, pre-pass operation can then (and in an embodiment
does) skip substantial processing of any primitives that have
been already been processed, so that the first, pre-pass
operation effectively resumes processing from the position
of the further compatible primitive that triggered the restart-
ing of the first, pre-pass operation.

This can be done in various suitable ways as desired. For example, in an embodiment, primitives may be annotated with suitable state indicating whether they have been previously processed in either way. In that case, the primitives could still be processed during the resumed pre-pass operation, but are in an embodiment effectively culled relatively earlier in the first, pre-pass operation on this basis, e.g., and in an embodiment, at the start of the resumed pre-pass operation, so that no substantial repeated processing of the primitives occurs during the resumed pre-pass operation. This may be relatively simpler to implement as it does not require any changes to how the primitives are obtained for processing (e.g. all of the primitives can be obtained for processing in the normal manner according to their specified rendering order, e.g. from the respective primitive lists, but primitives that have been processed already can then be culled during the first, pre-pass operation to avoid substantial repeat processing of such primitives). This approach may therefore facilitate more efficient hardware implementation. Various other arrangements would however be possible. For example, in other embodiments, the graphics processor when transitioning between operating modes may be configured to write out sufficient information to allow the processing to restart from the desired primitive in the sequence of primitives, which information can then be used accordingly when re-starting the first, pre-pass operation to start from the desired primitive.

The control of the switching from the third, fallback operation to the first, pre-pass operation may be performed in any suitable and desired manner but in an embodiment is also based on a primitive classification, e.g., and in an embodiment, based on the same primitive classification as described above in relation to the triggering of the third, fallback operation. Thus, the third, fallback mode of operation in an embodiment also comprises a step of (checking) primitive classification. However, in some embodiments, the switching back from the third, fallback mode of operation is performed more conservatively, and additional logic may therefore be provided to facilitate this. Various arrangements would be possible in this regard as will be explained below.

For example, in order to ensure safe rendering operation, the graphics processor should (and in an embodiment does) switch to the third, fallback mode whenever an incompatible primitive is encountered. Thus, the first incompatible primitive in the sequence of primitives will in an embodiment trigger stopping the first, pre-pass operation and subsequently processing the incompatible primitive by the third, fallback operation in the manner described above.

In some embodiments the graphics processor may correspondingly attempt to switch back from the third, fallback mode of operation to the first, pre-pass operation whenever a further primitive that is compatible with the first, pre-pass operation is encountered. That is, the decision to switch back to the first, pre-pass operation to process a further compatible primitive may be performed on a per-primitive basis, similarly to the decision to stop the first, pre-pass operation in response to an incompatible primitive. In that case, the graphics processor may continue processing primitives in the third, fallback operation only until the next compatible primitive is encountered, at which point the graphics processor switches back to the first, pre-pass operation. This can work well especially in typical situations where incompatible primitives are relatively rarer, such that switching on a per-primitive basis can provide improvements, at least on average.

It will be appreciated even from the simple example above that where a sequence of primitives includes a mixture of compatible and incompatible primitives this may cause the graphics processor to repeatedly switch state. At some point the additional time and energy used to switch state may outweigh any benefits of the improved hidden surface removal. Thus, in embodiments, rather than switching back to pre-pass operation as soon as the next compatible primitive (so '#primitive 4' in the example above) is encountered, the graphics processor may check one or more other conditions before triggering the switching out of the fallback operation.

These other conditions may be set as desired and various suitable heuristics may be applied in this respect. For instance, in the example above, there is a sequence of two further compatible primitives ('#primitive4' and '#primitive5'). If it can be identified in advance that there is a sequence of more than one further compatible primitives, this might therefore make switching more desirable. Thus, a look-ahead could be performed to check the sequence of primitives for contiguous sequences of more than one compatible primitive and a decision as to whether to switch (back) made on this basis. Another possible heuristic would be to wait until a set number of further compatible primitives has been reached before triggering the switch. This can work well as it is often the case that adjacent primitives are expected to have similar primitive properties (such that they can be processed in the same way).

Figure 74:
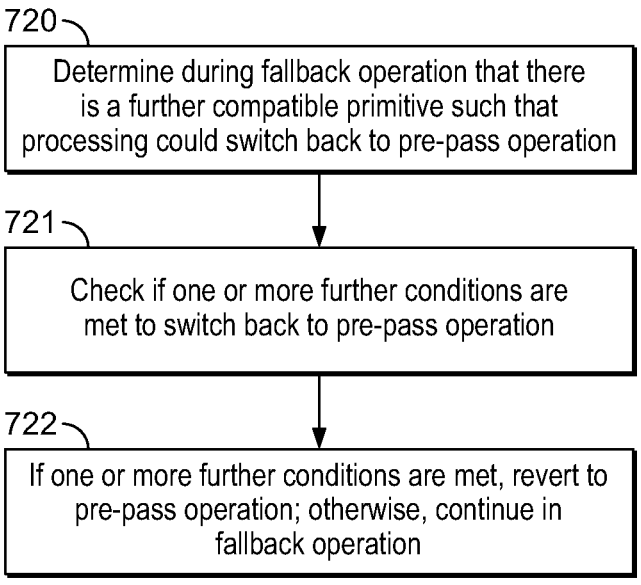
FIG. 74 is a flow chart illustrating further details of how the "pre-pass" operation can be re-started within a tile according to embodiments.

FIG. 74 illustrates this. Thus, during the third, fallback operation, when it is determined that there is a further compatible primitive (step 720), it is then checked whether one or more other conditions are met to cause the graphics processor to revert to the pre-pass operation. The further processing (step 722) is then performed accordingly. Thus, if the one or more conditions are met (step 721—yes), the graphics processor accordingly reverts to the pre-pass operation. Otherwise, if the one or more conditions are not met (step 721—no), the graphics processor continues in the fallback operation (at least for now).

Various arrangements would be possible in this regard.

Example 10—HSR ID Buffer with "Equivalence" Bits

In Example 9 described above, a hierarchical HSR ID buffer is used in which fragment visibility testing can be performed for patches (i.e. groups) of sampling positions as a whole using respective "minimum" and/or "maximum" HSR IDs stored within the HSR ID buffer in respect of different patches of sampling positions. In another example, it is tracked within the HSR ID buffer for respective patches of sampling positions whether all samples encompassed by a respective patch have the same HSR ID value, and this tracking can be used to accelerate access to the HSR ID buffer in the case when all samples encompassed by a respective patch do have the same HSR ID value, in particular by enabling the writing and reading of a single sample (value) in such cases.

For example, FIG. 75 shows schematically an arrangement of an HSR ID buffer in accordance with the present example in which the HSR ID buffer is configured and operable to store respective primitive identifiers (HSR IDs) in respect of each sampling position 751 of the render output. In this example, however, there is also stored for respective patches of sampling positions a respective indicator 752, in the form of a "fully covered" flag, that indicates whether or not the same primitive is visible for all sampling positions encompassed by the patch, and hence whether the same HSR ID can (and should) be used when performing the subsequent visibility testing for all sampling positions encompassed by the patch. In this example, the "fully covered" flag for a patch comprises a respective bit that is stored within the HSR ID buffer in association with the patch and which can be set/cleared appropriately to indicate whether the same primitive is visible for all sampling positions encompassed by that patch (and the "fully covered" flag may therefore also be referred to herein as an "equivalence" bit as it indicates that the same (equivalent) HSR ID should thus be used for all sampling positions encompassed by the patch).

In the example shown in FIG. 75, there is initially a single primitive having HSR ID value=6 that fully covers each of the bottom left, bottom right and top right patches but only partially covers the top left patch. In this case, the respective equivalence bits 752 for each of the bottom left, bottom right and top right patches can be (and are) set accordingly to '1' at this point to indicate that, based on the primitives that have been processed so far, it has been determined that the same primitive (i.e. the primitive with HSR ID=6) is visible for all of the sampling positions encompassed by those patches. The respective HSR ID value (i.e. '6') is then stored in respect of each of those patches but in this example this value is stored only once, in particular in the entry 755 that is associated with the first sampling position encompassed by the patch (i.e. the top left position for that patch) (various other arrangements would of course be possible in this regard). For instance, during the subsequent visibility testing, as will be explained further below, it can thus be determined based on the respective equivalence bit being set that those patches are fully covered by a single visible primitive, and thus the same HSR ID value should be used for the testing of all of those sampling positions (and hence the HSR ID value only needs to be stored/accessed once, which is what is therefore done).

On the other hand, in this example, the primitive having HSR ID=6 does not fully cover the top left patch. Thus, the equivalence bit for the top left patch should be cleared (to '0') and the respective HSR ID values written appropriately to the respective entries for the individual sampling positions encompassed by the patch.

In this example, as shown in FIG. 75, the next primitive to be processed, i.e. the primitive having HSR ID value=7, partially overwrites the top right patch. As such, the equivalence bit for the top right patch that was previously set based on the previous primitive fully covering that patch is now cleared (to '0') to indicate that different primitives may now be visible for different sampling positions encompassed by the patch. In this case, the HSR ID value (i.e. '6') that was previously stored for that patch is read from the first entry 755 and written to any sampling positions which are not covered by the new primitive, whereas the HSR ID value for the new primitive (i.e. '7') is written to the sampling positions that are covered by the new primitive. In this example because the new primitive only partially covers the top right patch, the entries for the other patches are unchanged.

FIG. 76 is a flow chart illustrating how the HSR ID buffer can be generated in the first, pre-pass operation according to this example.

As shown in FIG. 76, for an incoming primitive patch output from the rasteriser (step 761), per sample depth (ZS) testing, shader discard, etc., is performed, generally as in the examples above, to determine the final visibility of that fragment patch (step 762). If it is then determined that the incoming primitive is visible for the entire patch of sampling positions against which it is being tested (step 763—yes), the respective indicator (i.e. equivalence bit) associated with that patch of sampling positions is set in the HSR ID for the entry accordingly to indicate that the patch of sampling positions is fully covered by the same (visible) primitive (step 764). At the same time, the HSR ID value of the primitive that has been found to fully cover the patch is written to the HSR ID buffer entry for the primary sample of that patch. Once the testing of the primitive against the patch is finished, the primitive patch is subsequently discarded (step 765) and the process can then continue for the next primitive or next primitive patch to be tested.

On the other hand, if it is determined that the patch of sampling positions is not fully covered by the incoming primitive patch being tested (step 763—no), it is first determined whether the respective indicator (i.e. the equivalence bit) for that patch of sampling positions has previously been set within the HSR ID buffer (step 766). If the equivalence bit for the patch has not previously been set (step 766—no) then the HSR ID of the primitive that the incoming fragment corresponds to is written to the HSR ID buffer for any sampling positions that it covers (step 767) (and the equivalence bit should remain cleared). Whereas, if the equivalence bit of the patch has previously been set (step 766—yes), the equivalence bit should be (and is) now cleared and the relevant HSR ID values should then be written to the respective per sampling position entries within the HSR ID buffer. Thus, as described above, the HSR ID value that was previously stored for the primary sample of the patch is read and written to the sampling positions which are not covered by the incoming primitive (step 768). The HSR ID value of the incoming primitive is then written to the HSR ID buffer for the sampling positions that it covers (step 767). The processing of the primitive patch is then done (and the next primitive or next primitive patch can then be processed similarly).

In a similar manner as described above for the other examples, the HSR ID buffer can then be used during the second, main pass operation to try to cull fragments, when it is possible to do so (e.g. as part of the HSR ID test 276). The visibility testing operation during the second, main pass according to this example is shown schematically in FIG. 77.

As shown in FIG. 77, when performing visibility testing for an incoming primitive patch during the second, main pass operation for which HSR ID testing is enabled (step 771), the visibility testing is in embodiments performed in a hierarchical manner (step 772), e.g. as described above. In this case, it is first determined whether the patch is known to pass from hierarchical testing (step 773) (e.g. as described above in relation to Example 9). If so (step 773—yes), no further testing needs to be performed, and the fragment shader is run for all of the fragments (step 776). On the other hand, if the primitive patch is not already known to pass (and cannot otherwise be culled) based on the hierarchical HSR testing (step 773—no), the visibility testing then proceeds to perform further fragment visibility testing for the sampling positions, i.e. at the bottom of hierarchical HSR ID buffer. In this example, this involves first checking whether the respective indicator (i.e. the equivalence bit) for the patch is set (step 774).

When the equivalence bit is set (step 774—yes), this means that the same primitive was determined to be visible for all sampling positions encompassed by the patch. The respective HSR ID stored for the primary sample within the patch is then read from the HSR ID buffer, and used to perform the visibility testing (step 778). Thus, if the HSR ID stored for the primary sample matches the HSR ID of the incoming primitive patch, it is determined on this basis that the primitive patch passes the visibility testing (and the resulting fragments should then be shaded accordingly (step 776), whereas if the HSR ID stored for the primary sample does not match the HSR ID of the incoming primitive patch, then it is determined on this basis that none of the fragments should survive the visibility testing, and the fragments can be culled accordingly.

On the other hand, if the equivalence bit is not set (step 774—no), the HSR ID buffer is read for the whole region and the visibility testing is then performed for the individual samples, using the respective HSR IDs stored for those samples, i.e. as described above in relation to the 'normal' HSR ID visibility testing (step 777). Any fragments that survive the visibility testing are then shaded accordingly (step 776).

The effect and benefit of this is then that if it can be determined during the first, pre-pass that the same primitive is visible for an entire patch of sampling positions, the subsequent visibility testing during the second, main pass can be simplified as in that case it is only necessary to test against a single HSR ID for the patch. This also then means that only a single HSR ID value needs to be stored for the entire patch.

Various arrangements would be possible in this regard.

It will be appreciated from the various embodiments and examples presented above that subject to the requirements of the technology described herein the pre-pass (and main pass) operation may be configured in various suitable ways as desired. It will also be appreciated that various other modifications may be made to the pre-pass (and main pass) operations, and that, for example, any of the examples and embodiments described above may advantageously be combined. In general the first, pre-pass and second main pass operations may thus comprise any other suitable processing operations as desired.

The foregoing detailed description has thus been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor to generate a render output in which, for the purposes of generating a render output, the render output is divided into a plurality of patches, the method comprising:

for a sequence of primitives to be rendered for a render output:

performing a first, pre-pass operation in which primitives in the sequence of primitives to be rendered are processed by rasterising the primitives into respective sets of one or more fragments, each fragment associated with a respective set of one or more sampling positions within the render output, and wherein as part of the first, pre-pass operation fragments for primitives in the sequence of primitives are processed to determine visibility information for the sequence of primitives, wherein each primitive in the sequence of primitives has a unique primitive identifier, the primitive identifiers changing monotonically within the sequence of primitives from a particular starting value, and wherein the determined visibility information comprises a set of primitive identifying information that is capable of storing respective primitive identifiers for respective sampling positions within the render output, the primitive identifier stored for a respective sampling position indicating which primitive should be further processed for the sampling position, and wherein the set of primitive identifying information is further capable of storing respective primitive identifiers for respective patches of the render output, each patch encompassing a group of plural sampling positions within the render output, wherein the primitive identifier stored for a respective patch of the render output indicates the first primitive in the sequence of primitives that may subsequently need to be processed further for a sampling position encompassed by the patch, the primitive identifiers stored in the set of primitive identifying information thus being usable during a subsequent visibility testing operation to determine which primitives should be processed further for which sampling positions within the render output, wherein when it is determined during the first, pre-pass operation that a primitive that fully covers a given patch of the render output would be visible based on the visibility information generated so far, the method comprises updating the set of primitive identifying information accordingly to record the primitive identifier for the primitive in question as the primitive identifier that is stored for the patch, and indicating at this point that a particular value that is different from the primitive identifier should be stored for each of the respective sampling positions encompassed by the patch;

the method further comprising:

thereafter performing a second, main pass operation in which visibility testing is performed to determine which primitives in the sequence of primitives should be further processed for which sampling positions within the render output, wherein the visibility testing for fragments that could potentially have updated the set of primitive identifying information during the first, pre-pass operation comprises testing a primitive identifier associated with the fragment being tested against a corresponding primitive identifier stored in the set of primitive identifying information for the sampling position or positions to which the fragment relates, and wherein when the fragment's primitive identifier matches the primitive identifier stored in the set of primitive identifying information, the fragment is determined to pass the visibility testing such that the fragment is processed further, the visibility testing being further configured such that fragments whose associated primitive identifier matches the stored primitive identifier for a given patch of the render output are also caused to pass the visibility testing for any sampling positions encompassed by the patch for which the particular value that is different from the primitive identifier is stored.

2. The method of claim 1, wherein during the second, main pass operation, the method comprises identifying whether a fragment being tested against a respective sampling position is associated with the primitive whose primitive identifier matches the stored minimum primitive identifier for a patch encompassing the sampling position in question.

3. The method of claim 2, wherein for the purposes of visibility testing at least some primitives that were processed by the first, pre-pass operation are processed into respective groups of fragments, each group of fragments corresponding to a respective patch of the render output, and wherein the visibility testing is performed, if necessary, for progressively smaller groups of fragments and correspondingly smaller patches of the render output, down to the level of testing individual fragments against the sampling position or positions to which the fragments relate, wherein the testing for a group of fragments comprises testing a primitive identifier associated with the group of fragments against the minimum primitive identifier stored for the patch of the render output corresponding to the group of fragments, and wherein when the primitive identifier associated with the group of fragments matches the corresponding minimum primitive identifier stored for the patch of the render output that the group of fragments is being tested against, a flag associated with the group of fragments is set accordingly to indicate this, such that when the flag is set, fragments are caused to automatically pass visibility testing for any sampling positions encompassed by the patch for which the set value is stored.

4. The method of claim 1, wherein the particular value that is different from the primitive identifier is zero.

5. The method of claim 4, wherein a stored value of zero otherwise indicates that there is no primitive coverage for the sampling position in question.

6. The method of claim 1, wherein the step of indicating that the set value should be stored for the sampling positions encompassed by a patch comprises setting one or more clear flags representing the sampling positions encompassed by the patch, which clear flags when set cause the graphics processor to write zeros for all sampling positions represented by the clear flag.

7. The method of claim 1, wherein when a later primitive partially overwrites a patch of the render output at one or more sampling positions, the method comprises updating the set of primitive identifying information to store the primitive identifier for the one or more sampling positions that are overwritten by the later primitive, without updating the minimum primitive identifier stored for the patch.

8. The method of claim 1, wherein when a later primitive that is determined to be visible fully overwrites a patch of the render output, the stored minimum primitive identifier for the patch is updated accordingly, and it is indicated that the particular value that is different from the primitive identifier should be stored for each of the respective sampling positions encompassed by the patch.

9. A graphics processor operable to generate a render output in which, for the purposes of generating a render output, the render output is divided into a plurality of patches, the graphics processor comprising a rendering circuit that is configured to:

for a sequence of primitives to be rendered for a render output:

perform a first, pre-pass operation in which primitives in the sequence of primitives to be rendered are processed by rasterising the primitives into respective sets of one or more fragments, each fragment associated with a respective set of one or more sampling positions within the render output, and wherein as part of the first, pre-pass operation fragments for primitives in the sequence of primitives are processed to determine visibility information for the sequence of primitives, wherein each primitive in the sequence of primitives has a unique primitive identifier, the primitive identifiers within the sequence of primitives changing monotonically from a particular starting value, and wherein the determined visibility information comprises a set of primitive identifying information that is capable of storing respective primitive identifiers for respective sampling positions within the render output, the primitive identifier stored for a respective sampling position indicating which primitive should be further processed for the sampling position, and wherein the set of primitive identifying information is further capable of storing respective minimum primitive identifiers for respective patches of the render output, each patch encompassing a group of plural sampling positions within the render output, wherein the minimum primitive identifier stored for a respective patch of the render output indicates the first primitive in the sequence of primitives that may subsequently need to be processed further for a sampling position encompassed by the patch, the primitive identifiers stored in the set of primitive identifying information thus being usable during a subsequent visibility testing operation to determine which primitives should be processed further for which sampling positions within the render output, wherein when it is determined during the first, pre-pass operation that a primitive that fully covers a given patch of the render output would be visible based on the visibility information generated so far, the set of primitive identifying information is updated accordingly to record the primitive identifier for the primitive in question as the minimum primitive identifier for the patch, and it is indicated at this point that a particular value that is different from the primitive identifier should be stored for each of the respective sampling positions encompassed by the patch;

the graphics processor further configured to cause the rendering circuit to:

thereafter perform a second, main pass operation in which visibility testing is performed to determine which primitives in the sequence of primitives should be further processed for which sampling positions within the render output, wherein the visibility testing for fragments that could potentially have updated the set of primitive identifying information during the first, pre-pass operation comprises testing a primitive identifier associated with the fragment being tested against a corresponding primitive identifier stored in the set of primitive identifying information for the sampling position or positions to which the fragment relates, and wherein when the fragment's primitive identifier matches the primitive identifier stored in the set of primitive identifying information, the fragment is determined to pass the visibility testing such that the fragment is processed further, the visibility testing being further configured such that fragments whose associated primitive identifier matches the stored minimum primitive identifier for a given patch of the render output are also caused to pass the visibility testing for any sampling positions encompassed by the patch for which the particular value that is different from the primitive identifier is stored.

10. The graphics processor of claim 9, wherein during the second, main pass operation, the visibility testing comprises identifying whether a fragment being tested against a respective sampling position is associated with the primitive whose primitive identifier matches the stored minimum primitive identifier for a patch encompassing the sampling position in question.

11. The graphics processor of claim 10, wherein for the purposes of visibility testing at least some primitives that were processed by the first, pre-pass operation are processed into respective groups of fragments, each group of fragments corresponding to a respective patch of the render output, and wherein the visibility testing is performed, if necessary, for progressively smaller groups of fragments and correspondingly smaller patches of the render output, down to the level of testing individual fragments against the sampling position or positions to which the fragments relate, wherein the testing for a group of fragments comprises testing a primitive identifier associated with the group of fragments against the minimum primitive identifier stored for the patch of the render output corresponding to the group of fragments, and wherein when the primitive identifier associated with the group of fragments matches the corresponding minimum primitive identifier stored for the patch of the render output that the group of fragments is being tested against, a flag associated with the group of fragments is set accordingly to indicate this, such that when the flag is set, fragments are caused to automatically pass visibility testing for any sampling positions encompassed by the patch for which the set value is stored.

12. The graphics processor of claim 9, wherein the particular value that is different from the primitive identifier is zero.

13. The graphics processor of claim 12, wherein a stored value of zero otherwise indicates that there is no primitive coverage for the sampling position in question.

14. The graphics processor of claim 9, wherein the step of indicating that the set value should be stored for the sampling positions encompassed by a patch comprises setting one or more clear flags representing the sampling positions encompassed by the patch, which clear flags when set cause the graphics processor to write zeros for all sampling positions represented by the clear flag.

15. The graphics processor of claim 9, wherein when a later primitive partially overwrites a patch of the render output at one or more sampling positions, the set of primitive identifying information is updated to store the primitive identifier for the one or more sampling positions that are overwritten by the later primitive, without updating the minimum primitive identifier stored for the patch.

16. The graphics processor of claim 9, wherein when a later primitive that is determined to be visible fully overwrites a patch of the render output, the stored minimum primitive identifier for the patch is updated accordingly, and it is indicated that the particular value that is different from the primitive identifier should be stored for each of the respective sampling positions encompassed by the patch.

17. A method of operating a graphics processor to generate a render output in which, for the purposes of generating a render output, the render output is divided into a plurality of patches, the method comprising:

for a sequence of primitives to be rendered for a render output:

performing a first, pre-pass operation in which primitives in the sequence of primitives to be rendered are processed by rasterising the primitives into respective sets of one or more fragments, each fragment associated with a respective set of one or more sampling positions within the render output, wherein as part of the first, pre-pass operation fragments for primitives in the sequence of primitives are processed to determine visibility information for the sequence of primitives, the determined visibility information comprising a set of primitive identifying information that is capable of storing respective primitive identifiers for respective sampling positions within the render output, the primitive identifier stored for a respective sampling position indicating which primitive should be further processed for the sampling position, the set of primitive identifying information thus being usable during a subsequent visibility testing operation to determine which primitives should be processed further for which sampling positions within the render output, wherein respective patches of the render output are further associated with respective indicators that can be used to indicate that the same primitive is visible for all sampling positions encompassed by the patch, wherein when it is determined during the first, pre-pass operation that a primitive that fully covers a given patch of the render output would be visible based on the visibility information that has been determined so far, the method comprises updating the respective indicator for that patch of the render output to indicate that the same primitive is visible for all sampling positions encompassed by the patch, and storing in association with the patch a respective primitive identifier for the primitive in question, the method further comprising:

thereafter performing a second, main pass operation in which visibility testing is performed to determine which primitives in the sequence of primitives should be further processed for which sampling positions within the render output, wherein the visibility testing comprises testing a primitive identifier associated with the fragment being tested against a corresponding primitive identifier stored for the sampling position or positions to which the fragment relates to determine whether or not the primitive being tested should be processed further, and wherein when the respective indicator for a given patch indicates that the same primitive is visible for all sampling positions encompassed by the patch, the visibility testing uses the primitive identifier that is stored in association with the patch for all sampling positions encompassed by the patch.

18. The method of claim 17, wherein respective patches of the render output are associated with respective flags that can be used to indicate that the same primitive is visible for all sampling positions encompassed by the patch, the respective indicator that is updated for a given patch thus comprising a respective flag associated with that patch.

19. The method of claim 17, wherein during the first, pre-pass operation, when it is determined that a patch for which the respective indicator currently indicates that the same primitive is visible for all sampling positions encompassed by the patch is partially overwritten by a later primitive in the sequence of primitives, such that the later primitive is only visible for a subset of the sampling positions encompassed by the patch, the method comprises:

writing the primitive identifier for the later primitive to the set of primitive identifying information for the subset of the sampling positions encompassed by the patch for which the later primitive is visible;

writing the primitive identifier that is currently stored in association with the patch to any other sampling positions for which the later primitive is not visible; and updating the respective indicator to indicate that it is no longer the case that the same primitive is visible for all sampling positions encompassed by the patch.

20. A graphics processor operable to generate a render output in which, for the purposes of generating a render output, the render output is divided into a plurality of patches, the graphics processor comprising a rendering circuit that is configured to:

for a sequence of primitives to be rendered for a render output:

perform a first, pre-pass operation in which primitives in the sequence of primitives to be rendered are processed by rasterising the primitives into respective sets of one or more fragments, each fragment associated with a respective set of one or more sampling positions within the render output, wherein as part of the first, pre-pass operation fragments for primitives in the sequence of primitives are processed to determine visibility information for the sequence of primitives, the determined visibility information comprising a set of primitive identifying information that is capable of storing respective primitive identifiers for respective sampling positions within the render output, the primitive identifier stored for a respective sampling position indicating which primitive should be further processed for the sampling position, the set of primitive identifying information thus being usable during a subsequent visibility testing operation to determine which primitives should be processed further for which sampling positions within the render output, wherein respective patches of the render output are further associated with respective indicators that can be used to indicate that the same primitive is visible for all sampling positions encompassed by the patch, wherein when it is determined during the first, pre-pass operation that a primitive that fully covers a given patch of the render output would be visible based on the visibility information that has been determined so far, the respective indicator for that patch of the render output is updated accordingly to indicate that the same primitive is visible for all sampling positions encompassed by the patch, and a respective primitive identifier for the primitive in question is stored in association with the patch, the graphics processor further configured to cause the rendering circuit to:

thereafter perform a second, main pass operation in which visibility testing is performed to determine which primitives in the sequence of primitives should be further processed for which sampling positions within the render output, wherein the visibility testing comprises testing a primitive identifier associated with the fragment being tested against a corresponding primitive identifier stored for the sampling position or positions to which the fragment relates to determine whether or not the primitive being tested should be processed further, and wherein when the respective indicator for a given patch indicates that the same primitive is visible for all sampling positions encompassed by the patch, the visibility testing uses the primitive identifier that is stored in association with the patch for all sampling positions encompassed by the patch.

* * * * *